United States Patent [19]

Gueldenpfennig et al.

[11] Patent Number: 4,521,879

[45] Date of Patent: Jun. 4, 1985

[54] DIGITAL PRIVATE BRANCH EXCHANGE

[76] Inventors: Klaus Gueldenpfennig, 31 Lazy Trail, Penfield, N.Y. 14526; Stanley L. Russell, 649 Beverly Dr., West Webster, N.Y. 14580; William A. Oswald, 196 Fairhaven, Rochester, N.Y. 14610; Charles J. Breidenstein, 116A Clintwood Ct., Rochester, N.Y. 14620; Karam V. Narula, 80 Fairhill Dr., Rochester, N.Y. 14610

[21] Appl. No.: 289,960

[22] Filed: Aug. 4, 1981

Related U.S. Application Data

[63] Continuation of Ser. No. 003,070, Jan. 12, 1979, abandoned, which is a continuation of Ser. No. 855,181, Nov. 25, 1977, abandoned.

[51] Int. Cl.³ ........................ H04M 3/56; H04Q 3/54; H04Q 11/04

[52] U.S. Cl. ................................ 370/62; 179/18 AD; 179/18 ES; 370/68

[58] Field of Search ........ 179/18 ES, 18 BC, 18 AD; 370/68, 66, 58, 62, 110.1

[56] References Cited

U.S. PATENT DOCUMENTS

| | | | |
|---|---|---|---|
| 3,920,916 | 12/1975 | Brightman et al. | 370/66 |
| 3,978,290 | 8/1976 | Sarma | 370/58 |
| 4,072,825 | 2/1978 | McLay et al. | 179/18 B |
| 4,074,072 | 2/1978 | Christensen et al. | 370/68 |
| 4,076,966 | 2/1978 | Bovo et al. | 179/18 BC |
| 4,110,562 | 8/1978 | Moed | 370/110 |
| 4,112,258 | 9/1978 | Alles | 179/18 ES X |
| 4,133,979 | 1/1979 | Helliwell et al. | 370/110.2 |
| 4,150,259 | 4/1979 | Fenton et al. | 179/18 BC |

FOREIGN PATENT DOCUMENTS

| | | | |
|---|---|---|---|
| 2245708 | 4/1974 | Fed. Rep. of Germany | 370/58 |

OTHER PUBLICATIONS

"New Digital PABX Family", by R. C. Garavalia, *GTE Automatic Electric Journal,* May 1977, pp. 303-311.

"The GTD-1000 Digital PABX", by R. C. Wegner, *GTE Automatic Electric Journal,* Mar. 1977, pp. 262-268.

*Primary Examiner*—Thomas W. Brown

*Attorney, Agent, or Firm*—Antonelli, Terry & Wands

[57] ABSTRACT

A digital private automatic branch exchange provides a plurality of ports which may comprise line trunks or operator circuits, the ports being grouped with each group being controlled by an individual microprocessor circuit which performs all real time control over the ports. Voice communication between ports is effected by time division multiplex in connection with a digital switch system forming part of a common control which is controlled by a central processing unit responsive to the microprocessors in each port group for assigning time slots to each interconnection channel. Isolation between the central processing unit and the rest of the system is provided by a peripheral bus to which the common control units and port groups are connected, which peripheral bus is connected to the CPU bus by way of an interface circuit, permitting the system to operate with various types of central processing units without redesign of the peripheral units. A conference circuit is also provided for making available a range of conference sizes by combining the available lines to the conference circuit into groups of a predetermined size which may be expanded by combining groups to form conferences of larger or intermediate size.

46 Claims, 150 Drawing Figures

RAM MEMORY LAYOUT

ROM MEMORY LAYOUT

STATUS & PORT REGISTER CONTROL

MPC SOFTWARE ORGANIZATION

INPUT SIPO PARITY ERROR CCT

FIFO STORE OUTPUT CONTROL

READ I/O DATA BUS

READ MASK

TIMING DIAGRAM

TIMING DIAGRAM

SEND BIT STORE BIT 0
SEND BIT STORE BIT 1
SEND BIT STORE BIT 2
SEND BIT STORE BIT 3
SEND BIT STORE BIT 4
SEND BIT STORE BIT 5
SEND BIT STORE BIT 6
SEND BIT STORE BIT 7
SEND STORE ACTIVE/INACTIVE
RECEIVE BIT STORE BIT 0
RECEIVE BIT STORE BIT 1
RECEIVE BIT STORE BIT 2
925
926
927
928
929
930
931
932
933
934
935
936
952
953
954
955
956
957
958
959

CON-TROLLER
MSD0
MSD1
MSD2
MSD3
MSD4
MSD5
MSD6
MSD7
RSA
RWE
SWE

FIG. 87

MATRIX CONTROLLER PROGRAMMING DATA

| | | | | |
|---|---|---|---|---|
| CONTROLLER BIT # (CCD-) | 4 | 3 | 2 | 1 |
| MATRIX BIT # | 3 | 2 | 1 | 0 |

| COMMAND | TRUE DATA | DATA TO MAT | DATA FROM MAT |
|---|---|---|---|
| WRITE SEND PORT-ACTIVE | 0 0 0 0 | XOT-SPORT | - |
| READ-SEND PORT | X 0 0 1 | XOT | SPORT-A/$\bar{A}$ |
| WRITE RECEIVE PORT-ACTIVE | 0 0 1 0 | XOT-RPORT | - |
| READ RECEIVE PORT | X 0 1 1 | XOT | RPORT-A/$\bar{A}$ |
| WRITE CROSS-OFFICE HIGHWAY ACTIVE | 0 1 0 0 | XOT-XOH | - |
| READ CROSS OFFICE HIGHWAY | X 1 0 1 | XOT | XOH-A/$\bar{A}$ |
| SEARCH RECEIVE STORE-ACTIVE | 0 1 1 X | RPORT | XOT |
| WRITE SEND PORT-INACTIVE | 1 0 0 0 | XOT-SPORT | - |
| WRITE RECEIVE PORT-INACTIVE | 1 0 1 0 | XOT-RPORT | - |
| WRITE CROSS-OFFICE HIGHWAY-INACTIVE | 1 1 0 0 | XOT-XOH | - |
| SEARCH RECEIVE STORE-INACTIVE | 1 1 1 X | RPORT | XOT |

FIG. 89

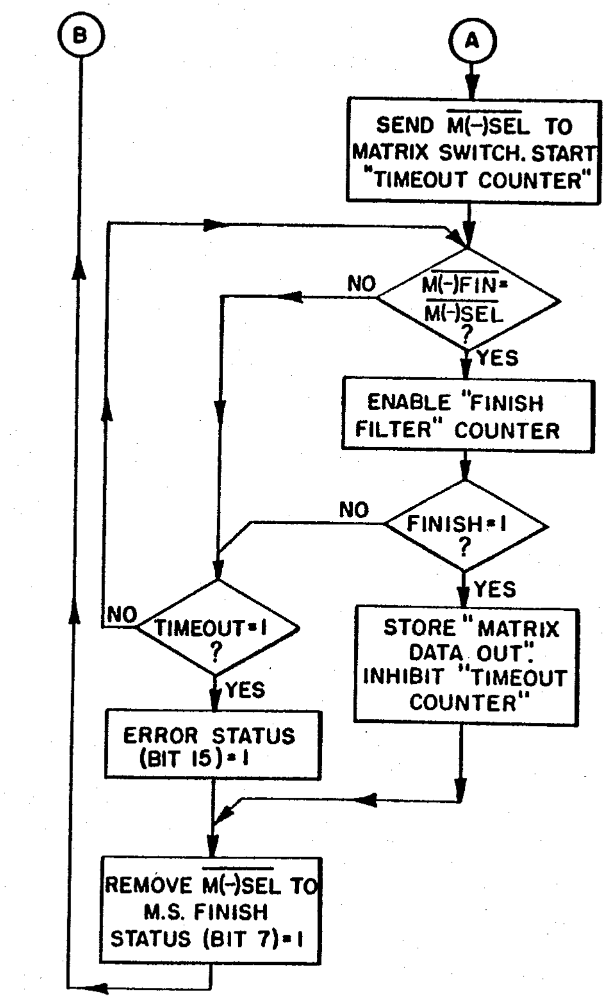

FIG. 92.

CPU READS (bits 15–11) — CPU (bits 7–5) — WRITES (bits 4–0)

| DATA BUS BIT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | X | X | X | X | 0 | 0 | 0 | 0 | 0 | X | 0 | 0 | 0 | 0 | X | 0 |

REGISTER ZERO

STATUS REGISTER

| BIT | MEANING | WRITTEN BY | CLEARED BY | INTERRUPT GENERATED ? |
|---|---|---|---|---|
| 15 | BUSY SENDING TO ATTENDANT | | | |
| 14 | PARITY ERROR IN RECEIVED MESSAGE | I/O | I/O | YES |
| 13 | INTERRUPT DUE TO FINISHING MESSAGE OUT | I/O | SETTING BIT I | YES |
| 12 | INTERRUPT DUE TO NEW MESSAGE IN | I/O | | YES |
| 11 | | | | |
| 10 | | | | |
| 9 | | | | |
| 8 | | | | |
| 7 | | | | |
| 6 | CLEAR ENTIRE I/O & INITIALIZE | CPU | I/O | NO |
| 5 | | | | |
| 4 | | | | |
| 3 | | | | |
| 2 | | | | |
| 1 | CLEAR INTERRUPT & RESPONSE BIT 13 | CPU | I/O | NO |
| 0 | | | | |

OPAR

O12RO

TO CPU
O0R2
O1R2
O8R2
O9R2
O2R2
O3R2
O4R2
O5R2
O6R2
O7R2
O10R2
O11R2
O12R2
O13R2
O14R2
REGISTER R2
1286
1287
1280
1281
1282
REG.
D
Q
FF
+5
EVEN
ODD
REG.
1283
1285
1284
O2D0
O2D1
D2
D3
D4
D5
D6
D7
A1
A2
A4
A8
A16
A32
A64
PAR
D0
D1

O BUSSI-2

COBI2
O BUSS3
OMR
ODSS
OWR2

FIG. 111.

KEY MEMORY STATES AND TRANSITION TABLE

| SEQUENCE NUMBER | OLD KEY STATE | KEY* STATUS | NEW KEY STATE | ACTION TAKEN | COMMENTS |
|---|---|---|---|---|---|
| 0 | 0 | 0 | 0 | NONE | IDLE OPEN |
| 1 | 0 | 1 | 1 | NONE | ENTER DEBOUNCE 1 |
| 2 | 1 | 0 | 0 | NONE | BACK TO IDLE OPEN |
| 3 | 1 | 1 | 2 | NONE | ENTER DEBOUNCE 2 |
| 4 | 2 | 0 | 0 | NONE | BACK TO IDLE OPEN |
| 5 | 2 | 1 | 3 | NONE | ENTER DEBOUNCE 3 |
| 6 | 3 | 0 | 0 | NONE | BACK TO IDLE OPEN |
| 7 | 3 | 1 | 4 | SEND CLOSURE | ENTER IDLE CLOSED |
| 8 | 4 | 0 | 5 | NONE | ENTER DEBOUNCE 4 |
| 9 | 4 | 1 | 4 | NONE | BACK TO IDLE CLOSED |
| 10 | 5 | 0 | 6 | NONE | ENTER DEBOUNCE 5 |
| 11 | 5 | 1 | 4 | NONE | BACK TO IDLE CLOSED |
| 12 | 6 | 0 | 7 | NONE | ENTER DEBOUNCE 6 |
| 13 | 6 | 1 | 4 | NONE | BACK TO IDLE CLOSED |
| 14 | 7 | 0 | 0 | SEND CLOSURE | ENTER IDLE OPEN |
| 15 | 7 | 1 | 4 | NONE | BACK TO IDLE CLOSED |

* KEY STATUS: 0 = OPEN KEY (NON OPERATED)
1 = CLOSED KEY (OPERATED)

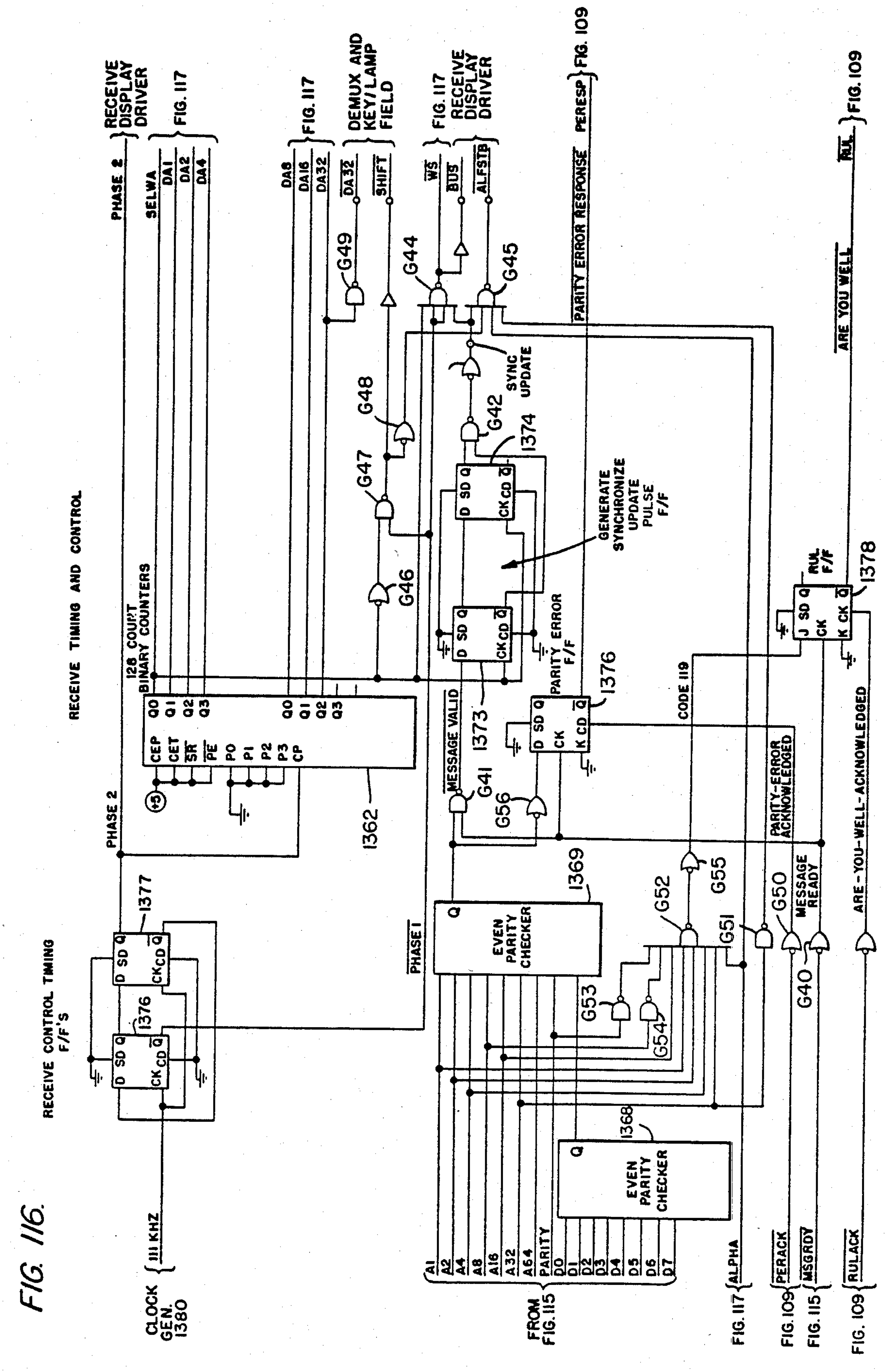
FIG. 116
RECEIVE TIMING AND CONTROL
RECEIVE CONTROL TIMING F/F'S
CLOCK GEN. 1380
111 KHZ
1376
1377
PHASE 2
PHASE 1
128 COUNT BINARY COUNTERS
CEP CET SR PE P0 P1 P2 P3 CP
Q0 Q1 Q2 Q3
+5
1362
SELWA
DA1
DA2
DA4
DA8
DA16
DA32
FIG. 117
RECEIVE DISPLAY DRIVER
DEMUX AND KEY/LAMP FIELD
SHIFT
WS
BUS
ALFSTB
PARITY ERROR RESPONSE
PERESP
FIG. 109
ARE YOU WELL
RUL
G40 G41 G42 G44 G45 G46 G47 G48 G49 G50 G51 G52 G53 G54 G55 G56
SYNC UPDATE
GENERATE SYNCHRONIZE UPDATE PULSE F/F
1373
1374
PARITY ERROR F/F
1376
MESSAGE VALID
CODE 119
RUL F/F
1378
PARITY-ERROR ACKNOWLEDGED
MESSAGE READY
ARE-YOU-WELL-ACKNOWLEDGED
EVEN PARITY CHECKER
1369
1368
A1 A2 A4 A8 A16 A32 A64 PARITY D0 D1 D2 D3 D4 D5 D6 D7
FROM FIG. 115
FIG. 117 ALPHA
FIG. 109 PERACK
FIG. 115 MSGRDY
FIG. 109 RULACK

INPUT DATA STORAGE & EXPANDOR

ALU CONTROL LOGIC TRUTH TABLE

| | INPUTS | | | OUTPUTS | | | | FUNCTION |
|---|---|---|---|---|---|---|---|---|
| CYCLE #'s | CI | BI | MXSB | ALUS12 | ALUSØ3 | ALUM | ALUCN | |
| 0,1 | 0 | 0 | 0 | 0 | 1 | 0 | 1 | A PLUS B |
| 2,3 | 0 | 1 | 0 | 0 | 0 | 0 | 1 | A |
| 4,5 | 1 | 0 | 0 | 0 | 0 | 0 | 1 | A |
| 6,7 | 1 | 1 | 0 | 0 | 1 | 0 | 1 | A PLUS B |
| 0,1 | 0 | 0 | 1 | 1 | 0 | 0 | 0 | A MINUS B |
| 2,3 | 1 | 1 | 1 | 0 | 0 | 1 | X | $\overline{A}$ |
| 4,5 | 1 | 0 | 1 | 0 | 0 | 0 | 0 | A PLUS 1 |
| 6,7 | 1 | 1 | 1 | 1 | 0 | 0 | 0 | A MINUS B |

FIG. 128.

| | WORD NUMBER | IRAM MEMORY LOCATION |
|---|---|---|
| #0 | 0 | 0 |
| | 1 | 1 |
| | 2 | 2 |
| | 3 | 3 |
| #1 | 4 | 4 |
| | 5 | 5 |
| | 6 | 6 |
| | 7 | 7 |
| #2 | 8 | 0 |
| | 9 | 1 |
| | 10 | 2 |
| | 11 | 3 |
| #3 | 12 | 4 |
| | 13 | 5 |
| | 14 | 6 |
| | 15 | 7 |
| #4 | 16 | 0 |
| | 17 | 1 |
| | 18 | 2 |
| | 19 | 3 |
| | 20 | 4 |
| | 21 | 5 |
| | 22 | 6 |
| | 23 | 7 |

TRUTH TABLE SHOWING NUMBER OF GAIN CONTROL PULSES (GCPUL) PER CHANNEL, FOR EACH POSSIBLE CONFERENCE CONFIGURATION:

| BASIC CONF. SIZE | GCTRL STATE | C( )EX STATE | IBLG | NUMBER OF GCTRL PULSES (GCPUL) |
|---|---|---|---|---|
| 4 PARTY (C INPUT TO GCPUL MUX=0) | 0 | 0 | 0 | (1) |
| | 0 | 0 | 1 | (0) |
| | 0 | 1 | 0 | (2) |
| | 0 | 1 | 1 | (0) |
| | 1 | 0 | 0 | (0) |
| | 1 | 0 | 1 | (0) |
| | 1 | 1 | 0 | (1) |
| | 1 | 1 | 1 | (0) |
| 8 PARTY (C INPUT TO GCPUL MUX=1) | 0 | 0 | 0 | (2) |
| | 0 | 0 | 1 | (0) |
| | 0 | 1 | 0 | (2) |
| | 0 | 1 | 1 | (0) |
| | 1 | 0 | 0 | (1) |
| | 1 | 0 | 1 | (0) |
| | 1 | 1 | 0 | (1) |
| | 1 | 1 | 1 | (0) |
| C | A | B | B | |

DIGITAL PRIVATE BRANCH EXCHANGE

This application is a continuation of our U.S. application Ser. No. 003,070, filed Jan. 12, 1979, now abandoned, which is a continuation of U.S. application Ser. No. 855,181, filed Nov. 25, 1977, also abandoned.

The present invention relates in general to telephone systems, and more particularly, to a digital private automatic branch exchange which employs modular concepts and distributed control techniques.

To meet ever-increasing customer demands, both for the present and the future, new system concepts of switching are continuously being introduced in the telephone industry. Over the last decade, a tremendously-increasing demand for new services has also been recognized. While conventional type systems could accommodate many new features to a limited extent and with rather high costs for additional hardware, the digital stored program concept, which offers the possibility of manipulating existing compact hardware by software control functions utilizing LSI and microprocessor applications, appears to provide the best practical solution to the realization of these goals.

In the PABX market segment, the individual requirements of the typical user, the operational environment for the system such as the place of installation, and the feature contents of the system lead to architectural differences, as well as to packaging and installation constraints, in the design of a system which will have universal application and acceptance. In such a universal system, major design parameters necessarily must include a highly modular expansion concept, cabinet sizes which fit into elevators and through standard doors for ease of shipping and transportation, software control for ease of maintenance and administration, and the provision of optional redundant controls as well as remote diagnostic and program administration. In addition, feature operation must be simple for attendants as well as station users, so as not to require an extraordinary skill in the operation of the equipment.

A further consideration in the design of present-day telephone systems relates to the fact that failures, although less frequent in stored program common control systems, more often lead to complete systems' failure than they did in direct controlled systems. In a time-divided system, not only is the common control highly integrated, but also the transmission paths become an integral part of the control circuitry. This sometimes leads to total redundancy requirements, which may be unacceptable from the standpoint of cost and size.

Conventionally, organized common control systems would make the attainment of all of the above-mentioned requirements economically unfeasible, since it is very difficult from a cost point of view to provide such a system in a significant range of sizes. In particular, the capacity of the processor in the system has to be considered. General microprocessors today have almost minicomputer capability and can economically be employed as main central processing units. However, they also limit the ultimate size of the system or subsystem, depending on through-put and memory capability. Commercial general purpose processors also require special preprocessing interfaces to handle the real time demands of the system.

In addressing itself to these basic requirements and concepts, the present invention provides a totally distributed control system in which preprocessing may be decentralized from the common control by employing several small microprocessors as slaves to the main CPU (central processing unit). Such decentralization improves the low-end, cost figures and in the case of programmable, front-end processing, allows for improved flexibility in implementing features. This is particularly valuable for PABX's with their ever-changing environment.

The effectiveness of the distributed control and simplicity of the system in accordance with the present invention is evidenced by the fact that only three subsystems are necessary to configure a working system. These subsystems are the CPU complex which represents the common control and auxiliary functions, the port group which directly services the system I/O circuits (ports), and an attendant complex which provides the system with attendant-interface, conference, and feature circuits.

The transmission network in the system in accordance with the present invention is a time-divided digital network which provides for the switching of data from port to port. All paths through the transmission network are established using cross-office time slots on cross-office highways with the ports being connected to the network via port group highways. Matrix switches handle the time slot interchange under the control of the central processing unit.

The system ports (line circuits, trunks, operator line keys, etc.) are associated in groups with individual preprocessor circuits capable of handling all of the real time processing of data associated with each port group. In this way, failure in any given port group or the associated preprocessor circuit has no effect on the remaining port groups and will in no way affect the continued operation of the remainder of the system. Such distributed control reduces redundancy requirements and ultimately the overall cost of the system.

The port circuits have little, if any, intelligence of their own. Only the circuitry necessary for interfacing the "outside plant" of the office in the applicable mode (E/M trunk interface, loop trunk interface, line circuit interface, etc.) is provided as well as the circuitry necessary to interface the real-time preprocessor in the port group. Initiation of line conditions (outgoing supervision) and response to line conditions (incoming supervision) of the port are made only under control of this preprocessor. For example, ringing generator is applied to, and removed from, a line under direct control of the preprocessor; furthermore, the cadence of the ringing cycle is controlled by the preprocessor and can be different for different lines. Essentially the preprocessor in each port group functions as a real-time-to-event converter.

Off-loading the "intelligence" of the ports into a centralized real-time preprocessor allows greater port density in a given volume than would otherwise be possible, leading to a larger number of ports for a given cabinet size. The real time preprocessor in turn is distributed such that like independent processing cabinets will be associated with a small number of ports so as to enhance the independence and reliability of such systems. A further advantage is flexibility wherein the operating parameters of one or more ports can be easily changed, if necessary, in the central location, without directly modifying the port itself. Thus, modification to ports can be provided at minimum cost easily and quickly; in the same manner, many new port features can be added.

Once the intelligence of the system port is centralized, it is but a next-logical-step to add to this intelligence in an effort to further lower the cost-per-port. For example, registers for dial-pulse analysis and digit-tracking, with associated senders for digit outpulsing, can be made implicit within the processor either on a per-port basis or on a "poll" basis. Traffic metering for the ports can also be provided by the preprocessor as can some deferred features such as Message Registration.

The real-time preprocessor is situated between the PCM port groups and the common control and consists of a number of microport control (MPC) circuits in a distributed control fashion. These MPC's are on a one-to-one correspondence with the PCM port groups in the I/O ports section and operate independently of each other. Each PCM port group in the system has been optimized in accordance with a preferred embodiment to forty-eight distinct ports by mechanical constraints and other system considerations; however, this should not be limiting to the application of smaller or larger groups. Consequently, each MPC, in turn, has also been optimized to work with forty-eight ports (although this is by no means a limitation). Each MPC is comprised of a standard off-the-shelf microprocessor, port interface and control circuitry, and call processing system interface circuitry.

Physically, one MPC is mounted with its associated forty-eight ports in a port group. From both electrical and mechanical points of view, this is the optimum configuration. Consequently, MPC's are added to the system only as the associated forty-eight port blocks are added, thereby supporting the cost-effectiveness of the approach. Since the number of ports controlled is relatively small, redundant MPC's are not provided. This adds to the cost-effectiveness of the approach.

To maintain efficiency of operation, the MPC's cannot communicate directly with one another, but do so only by way of the CPU residing in the common control. It is therefore the responsibility of the CPU to monitor and keep track of MPC status. Indeed, the MPC is not allowed to make transitions from one call state to another without the knowledge and permission of the CPU. This assures that the CPU has complete knowledge of all calls at all times as well as complete control. For example, if the MPC detects a release (abandoned call) in the midst of indialing on a particular port, it must so inform the CPU and receive instructions before responsive action can be taken.

The system provides for both DID and DOD traffic; while, signaling to and from the exchange may be by tone dial multi-frequency, dial pulsing, or toll multi-frequency as required by the connecting line equipment and associated network switching center. Only standard station instructions are required for use with the system to exercise features, assuring that the system will not inherently carry with it the limitation of operating only with specifically designed station equipment. Special system features can be activated under class-of-service control by dialed or keyed digits, hook-flash, or both. Multi-feature instruments such as key systems or electronic telephones can be connected as desired.

One of the advantageous features of the present invention resides in the fact that attendant consoles connect to the system by means of multiplexed data links thereby requiring a minimum of cabling. As a result, the consoles can be located any distance from the switching equipment and may derive their power either from the system power or from sources at the location of the attendant console. Only three pairs of wire, aside from power, are required to connect any given attendant console to the switching equipment. One pair is used for attendant-voice transmission while the remaining two pairs are used for data to and from the console. No special handling is required for routing the data lines to the consoles. Remote location of a console is, therefore, limited only by the power source, if carrier or similar transmission aids are employed.

The advantages of such remote location of the operator complexes are numerous. For example, the offices of different customers within an office building may be serviced by a single PABX system, with an operator complex being located in each customer office. In this way, a separate switching system would not be required for each customer, and by providing a PABX system of sufficient size within the building, the number of stations allocated to each customer could be specifically tailored to the needs of the customer. In addition, as a customer requires additional stations, such stations can be simply provided from the centrally located system. Of course, this concept can be expanded to a complex of buildings or to a given geographical area.

The electrical control portion of the operator console is divided into two parts consisting of a send control system and a receive control system. The send control system is provided for the multiplexing of data concerning key transitions for modulation by a modem and transmission on the link between the console and the switching system. The receive control system provides for decoding of messages from the common control received on the link to the operator console and demultiplexed by the modem. These messages include control signals for key lamp and alphanumeric display control as well.

In the send control system, each key function is scanned once every two milliseconds to determine its current condition (open or closed). Each time a key is addressed, its current condition is compared with a status readout of a random access memory (RAM) whose address is the scanner position. This status consists of three bits which combine with the current key condition to generate a new status, which is then stored in the RAM before the scanner advances. The algorithm which is used in the decoding of a key status information requires four consecutive same key conditions to be sensed after a change of state before the transition will be recognized as valid. If no transition is detected, the scanner advances to scan the next key.

If a transition is detected, the scanner stops and a message including the key transition data is formulated by a message serializer, which accepts the scanner position (key address) and an indication of the type of transition that has occurred (open to closed or closed to open).

However, the operator console is not an intelligent terminal insofar as the function of the keys thereof are concerned. Each key has an address and a condition (opened or closed) only, the function assigned to each key being known only to the common control of the system. These assigned functions are stored in memory in the common control, so that the function assigned to any key is not permanent, but may be easily changed by merely reversing the function data stored in memory in conjunction with that key. This permits key assignment on the console to be an option with the customer.

In providing a conference circuit within the system which most efficiently utilizes the available conference lines in providing a range of conference of sizes between three and ten parties, the available lines to the conference circuit are combined into groups of reasonable size which may be expanded in accordance with another feature of the present invention by combining groups to form conferences of larger or intermediate size. For example, by providing conference circuits having four or eight party capabilities, various combinations of these circuits can be effected to produce six and ten party conferences by merely joining groups of conference circuits in the same conference connection by simple time slot interchange within the system. In this way, smaller size conference circuits which may be more practical from the demands of the system are provided while also making possible less frequent conferences of larger size.

One of the further features of the present invention resides in the logic circuitry included in each port group or preprocessor which automatically senses the port type upon connection of the port circuit card thereto and communicates this information to the central processing unit. In this way, port type information is automatically provided to the common control thereby reducing otherwise necessary man/machine communications to provide this information and also serving as a verification on the man/machine inputs.

It is a general object of the present invention to provide a digital private automatic branch exchange which is based upon distributed control concepts and modular design.

It is a further object of the present invention to provide a system of the type described having a highly modular expansion concept.

It is a further object of the present invention to provide a system of the type described in which the preprocessing is implemented on a distributed basis, thereby providing improved flexibility in implementing features as well as accommodating, without significant redesign, the use of different central processing units.

It is still another object of the present invention to provide a system of the type described in which attendant consoles and port groups may be located at any distance from the common control and transmission switching equipment so as to make the system available to use by multi-offices or in multi-building complexes.

These and other objects, features, and advantages of the present invention will become more apparent from the following detailed description of various exemplary embodiments of the present invention, when taken in conjunction with the accompanying drawings, in which.

Figure 6:
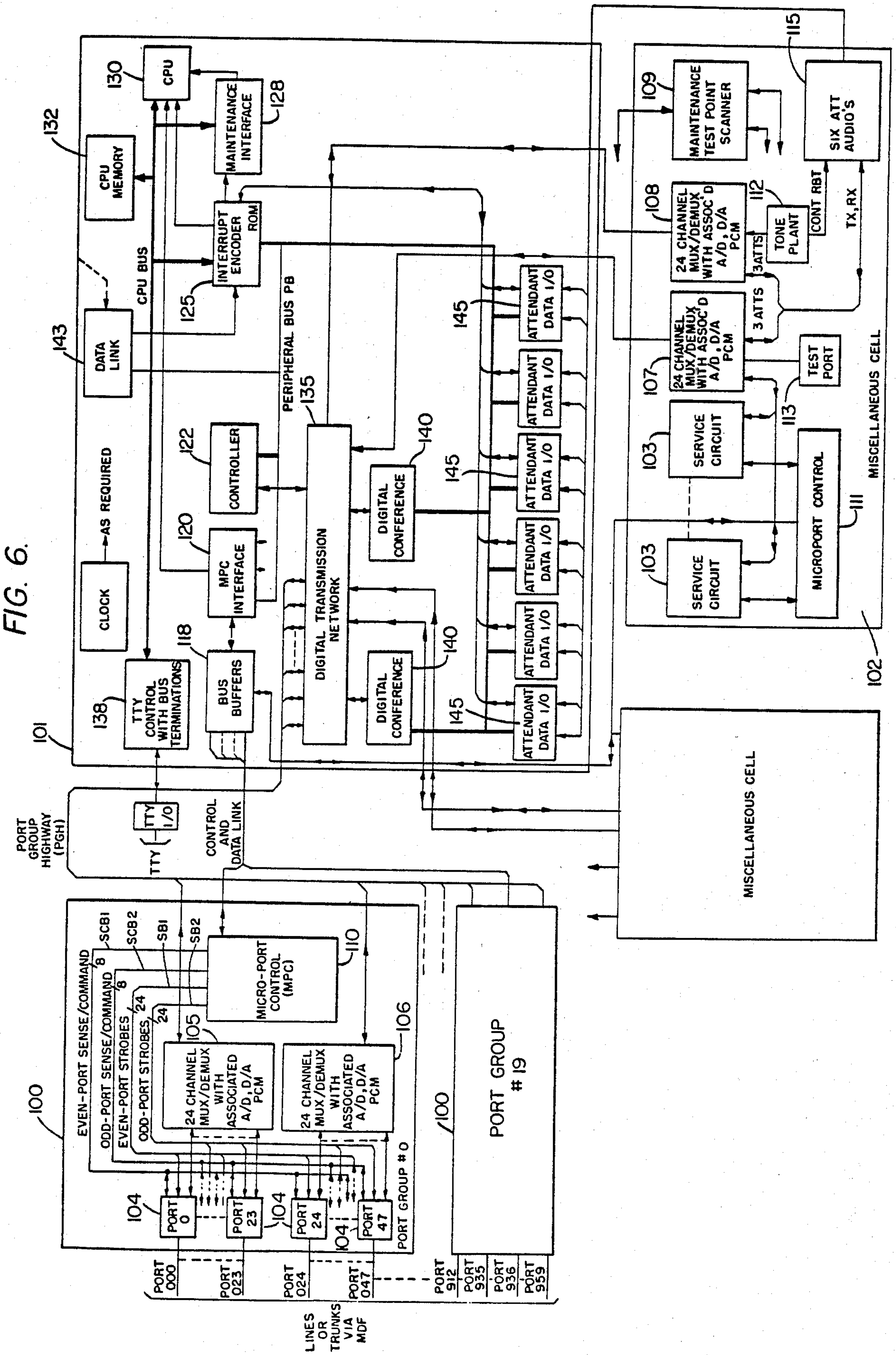
FIG. 6 is a schematic block diagram of a digital private automatic branch exchange forming a preferred embodiment of the present invention.
Figure 11A:
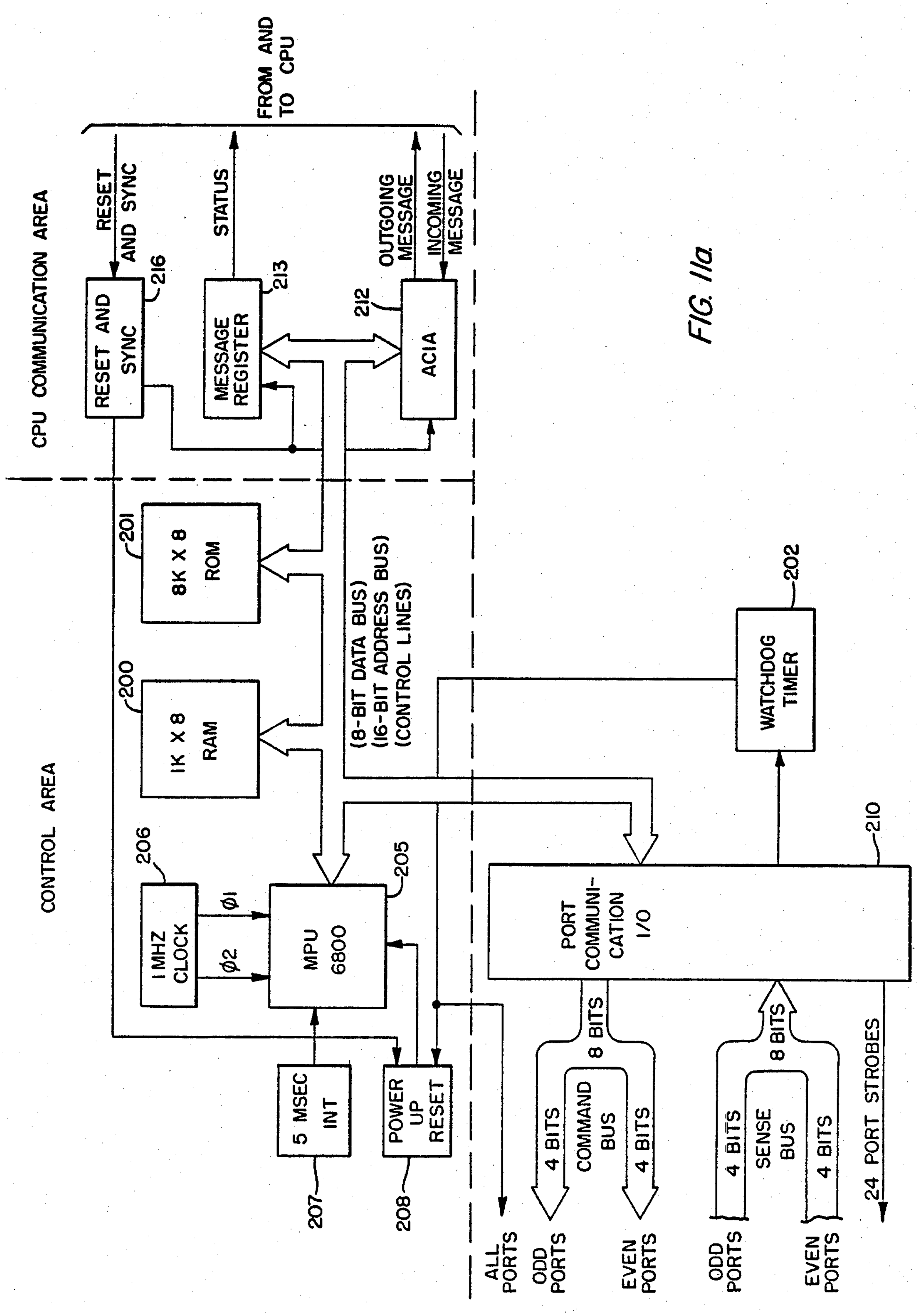
Figure 11C:
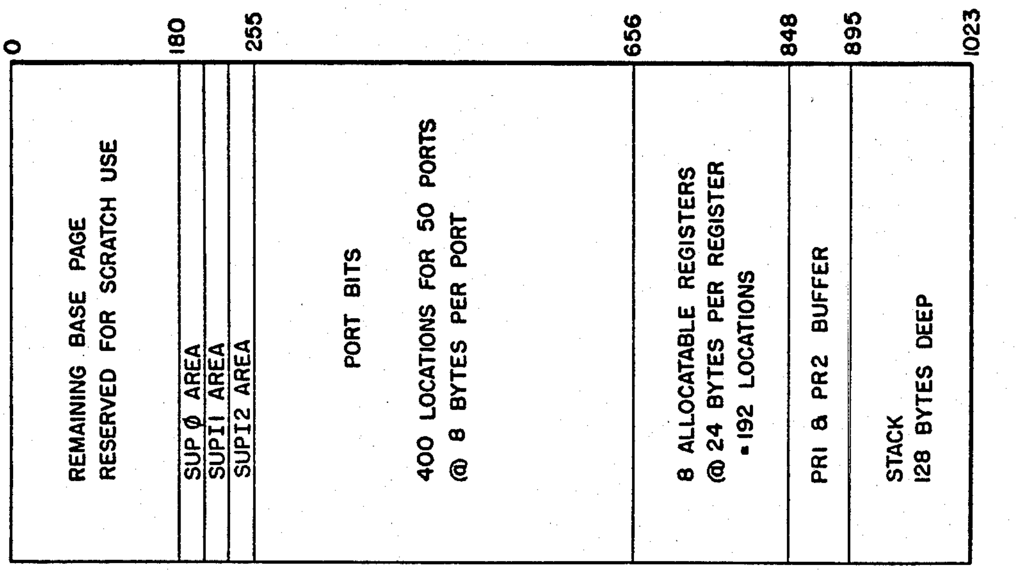
Figure 11B:
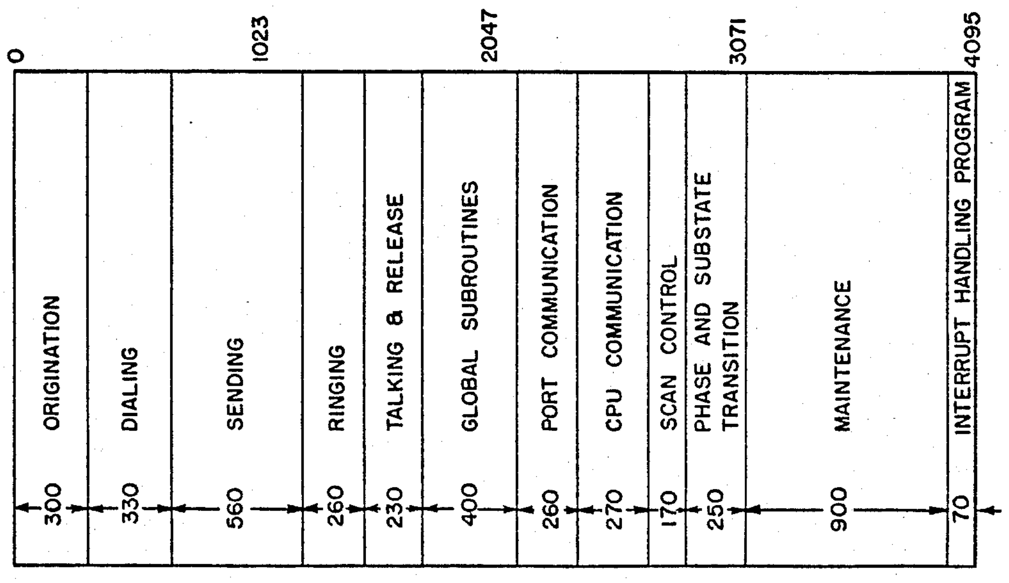
Figure 12:
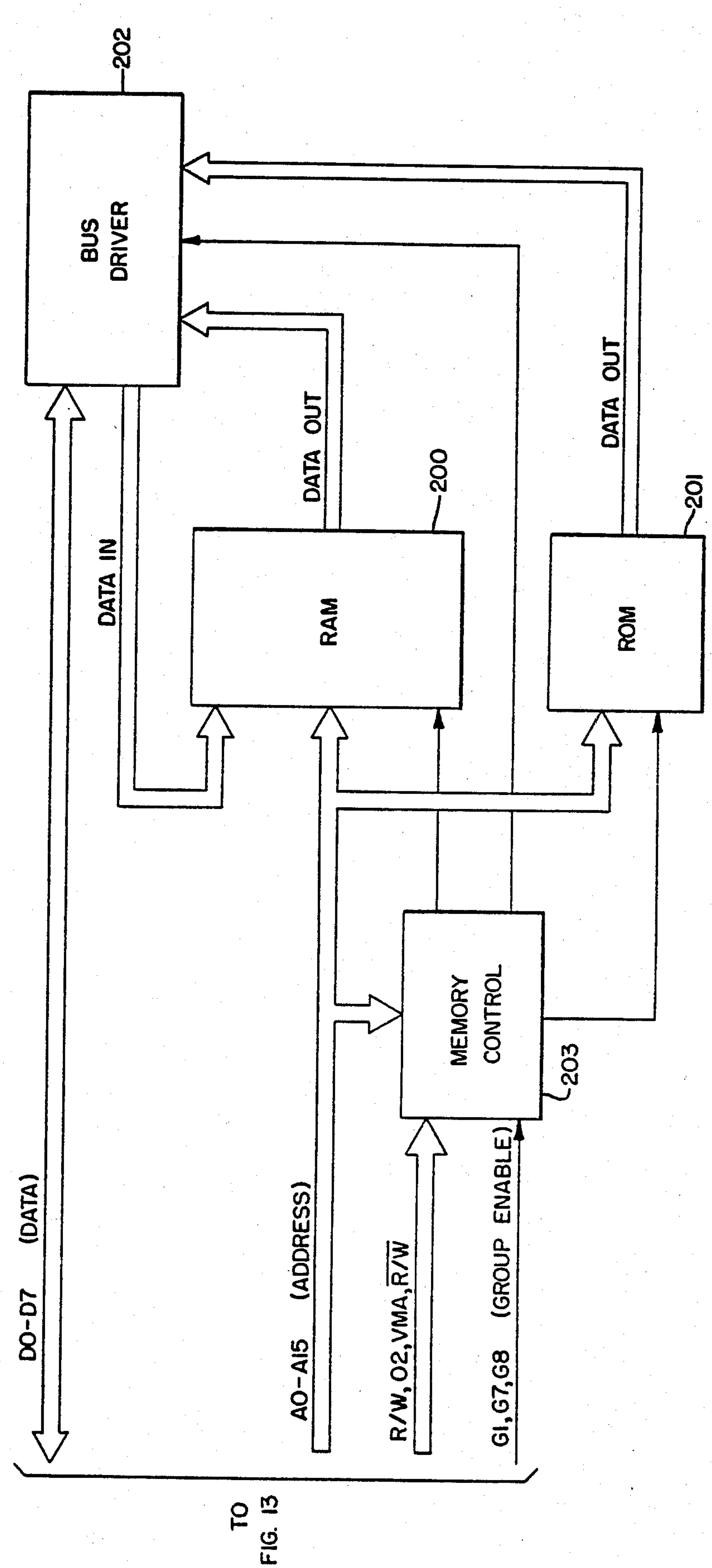
Figure 13:
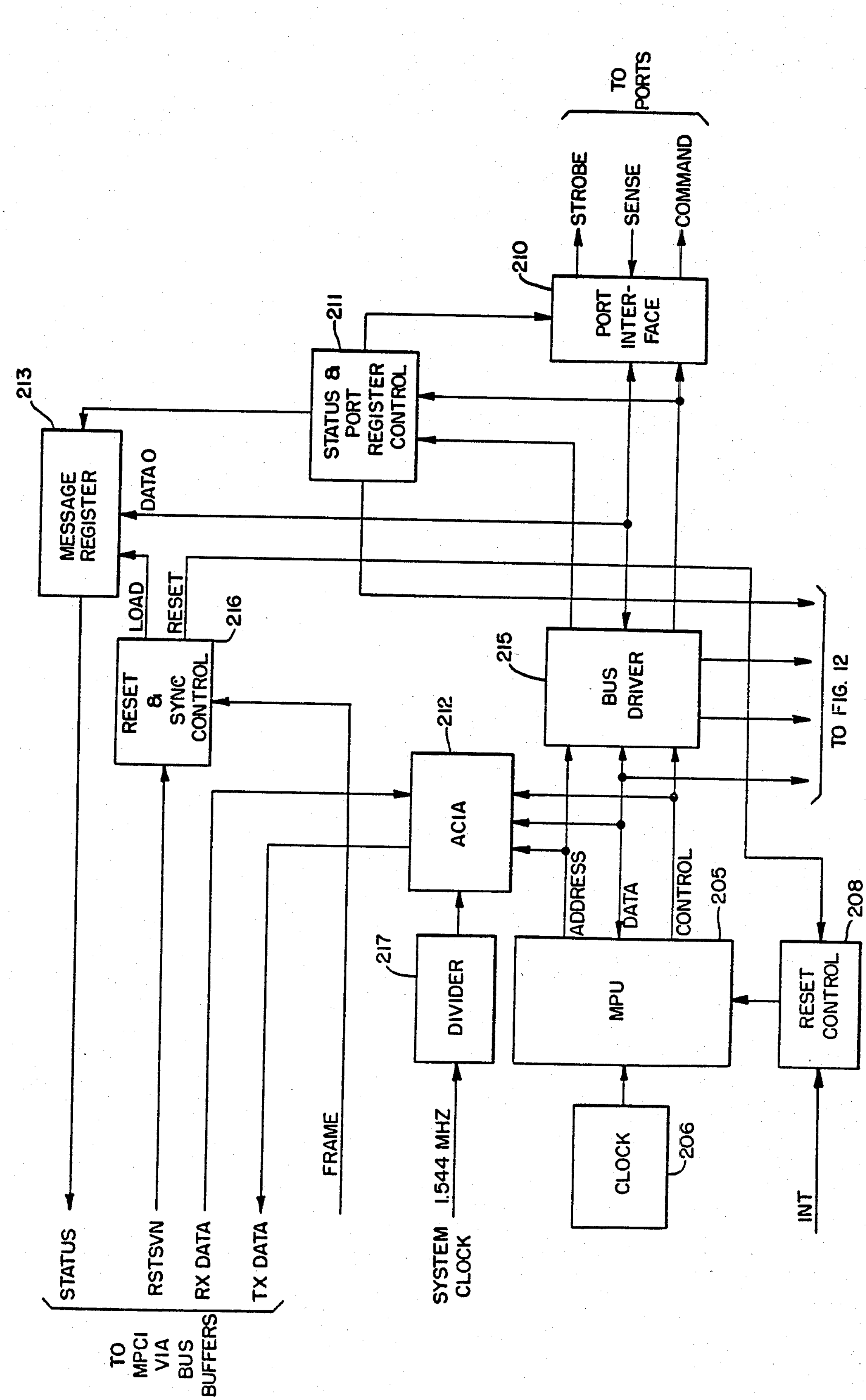
Figure 14:
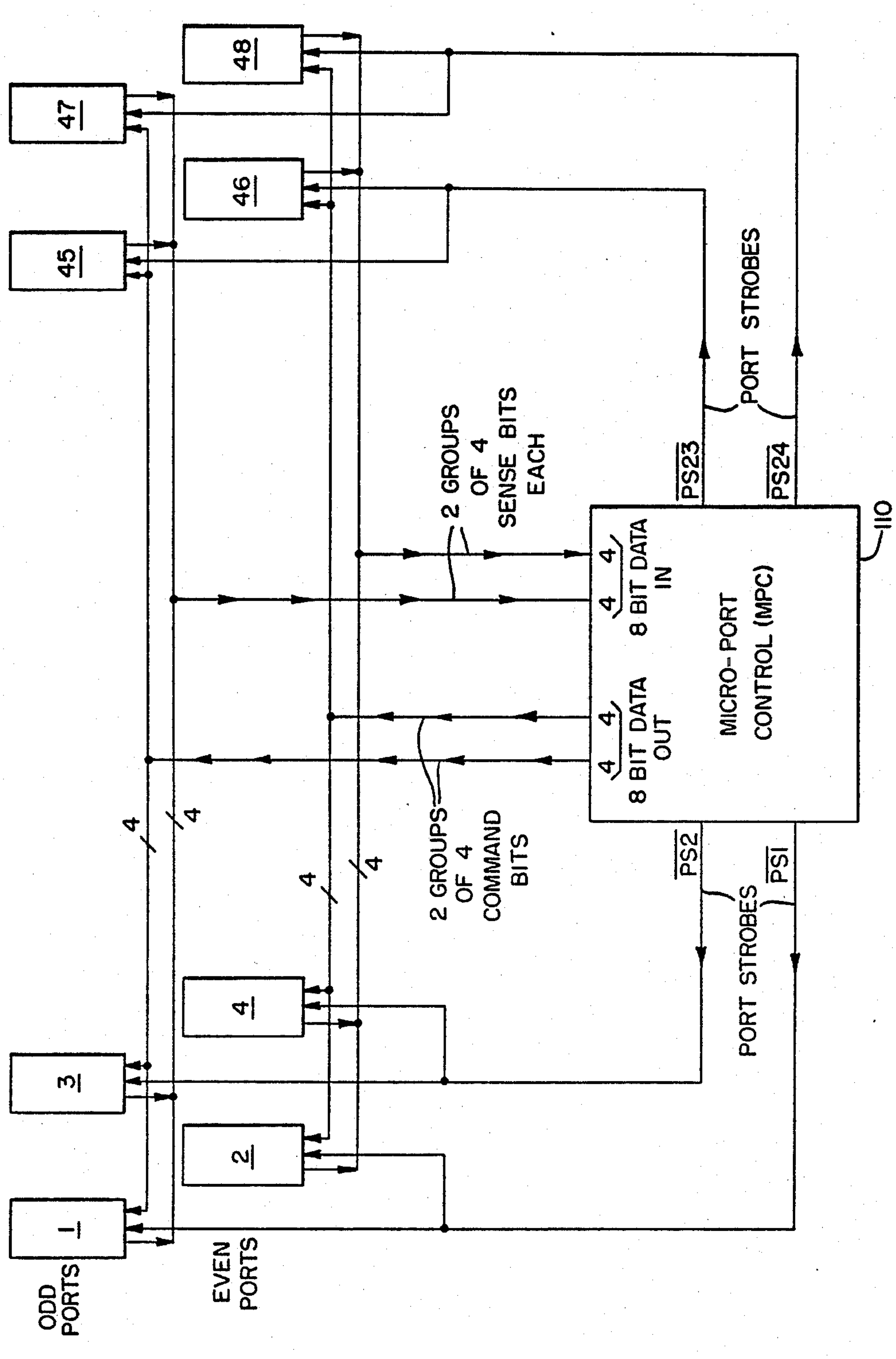
Figure 15:
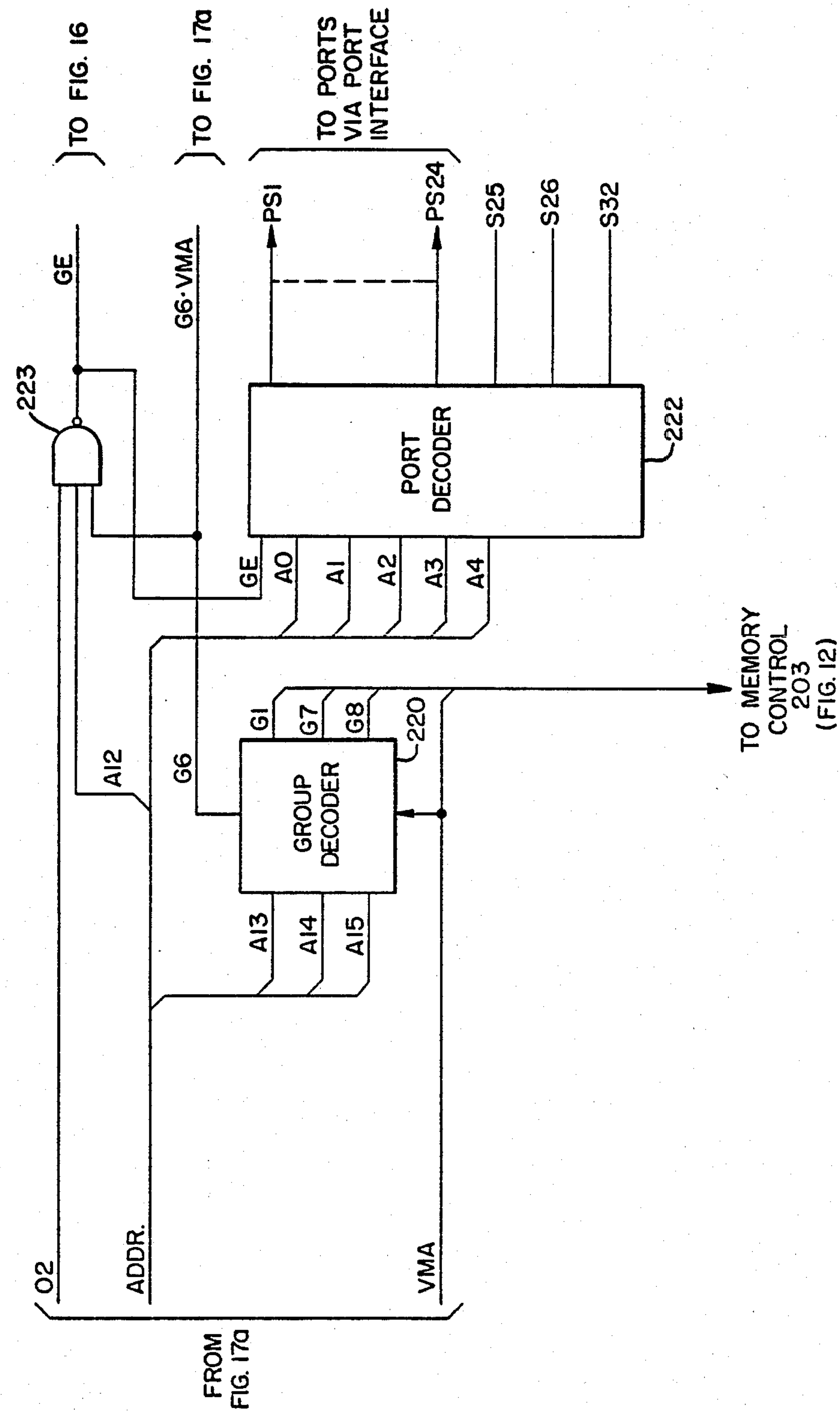
Figure 16:
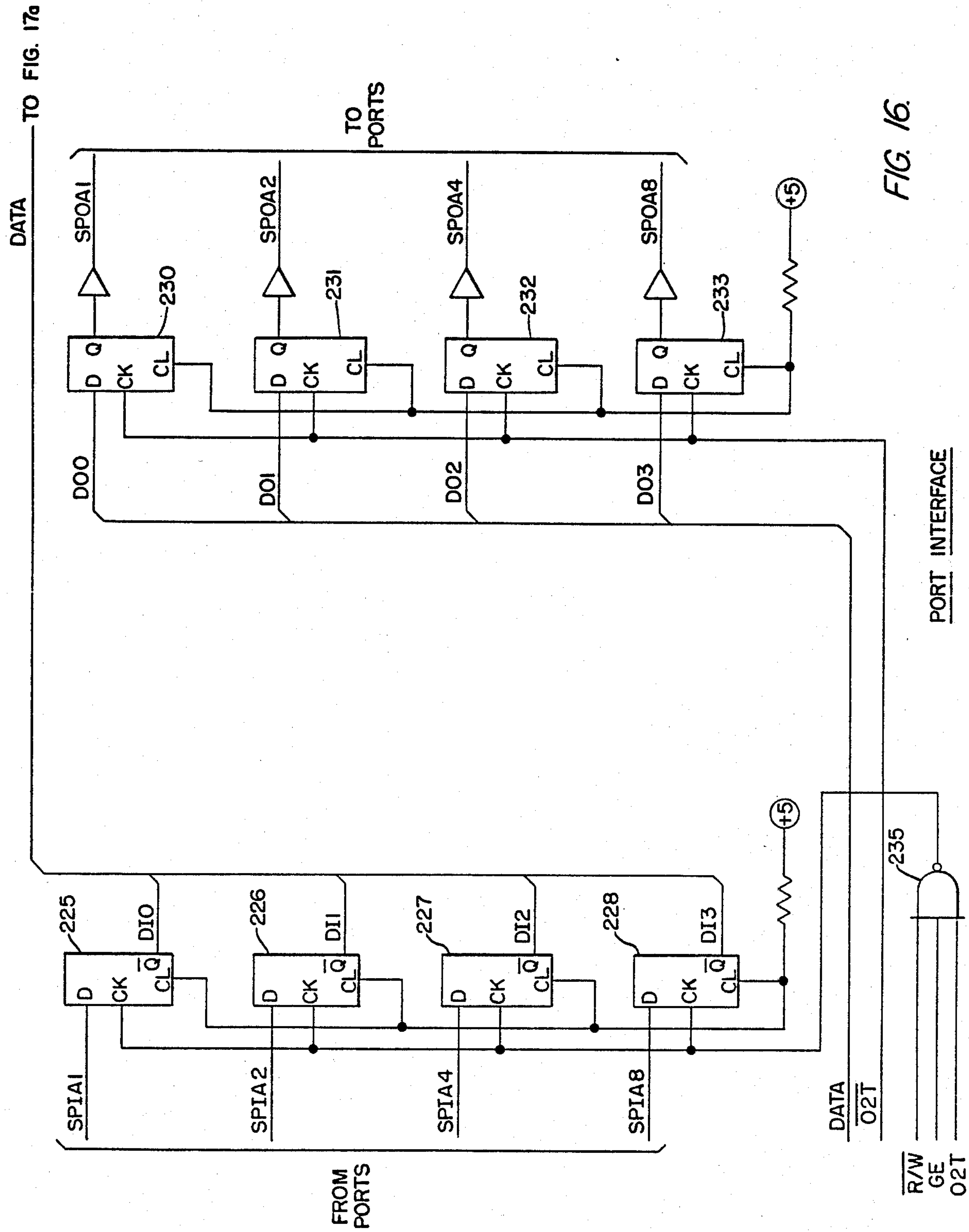
Figure 17A:
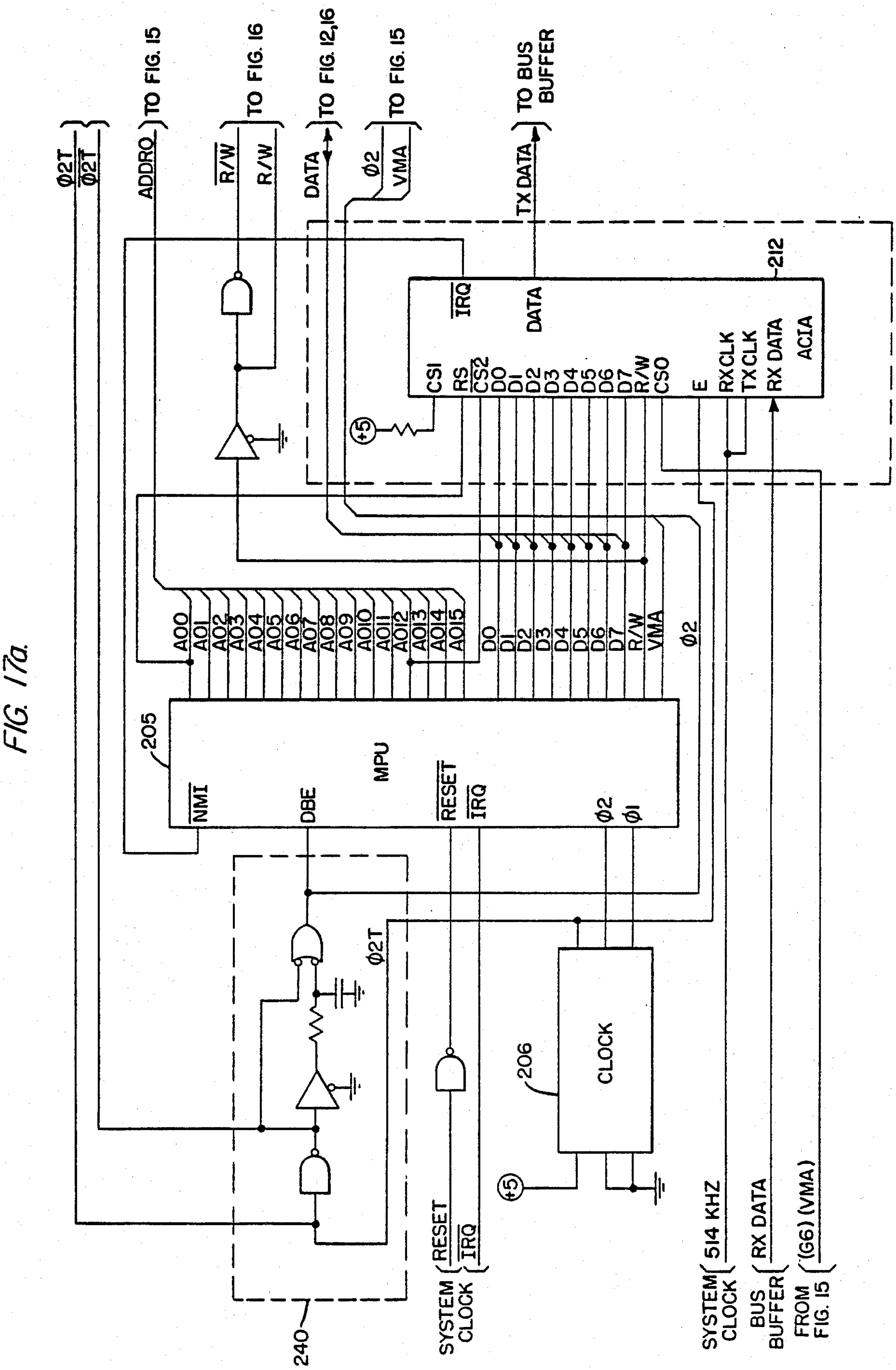
Figure 17B:
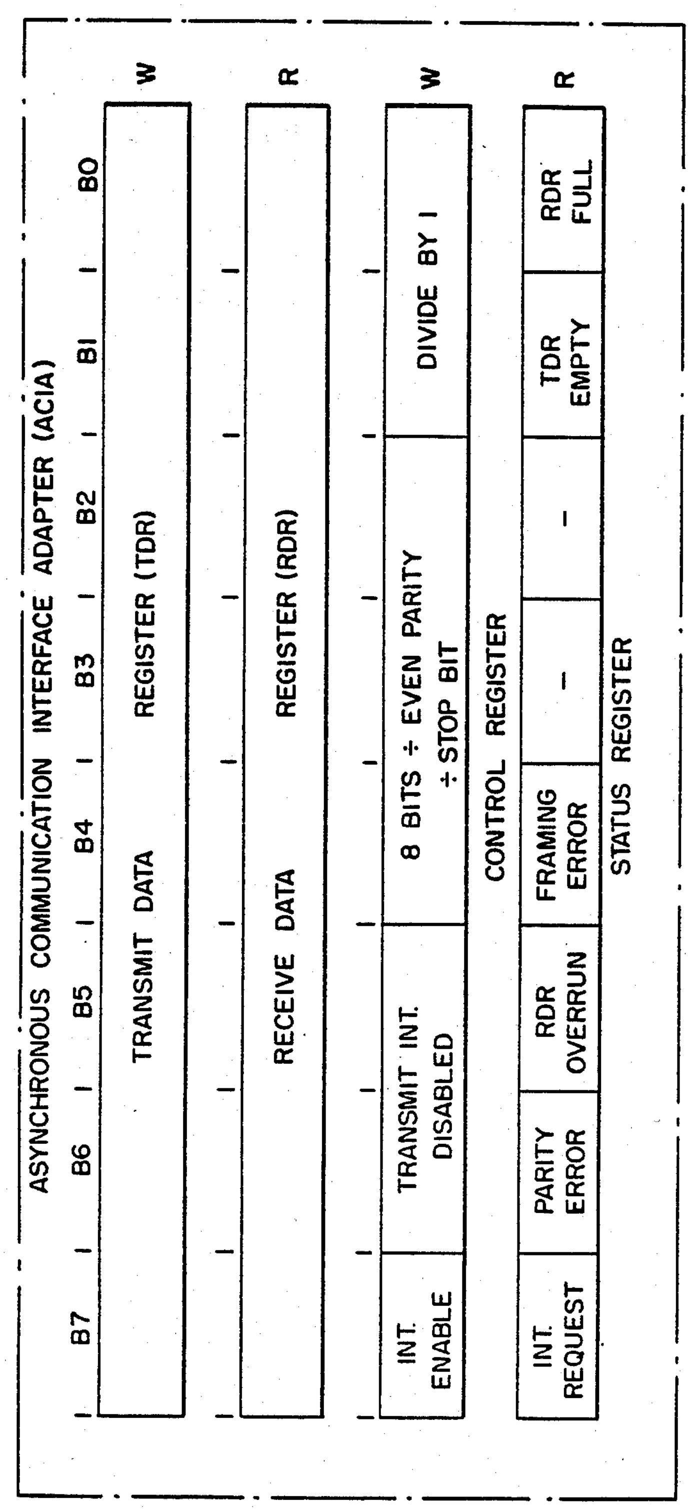
Figure 20:
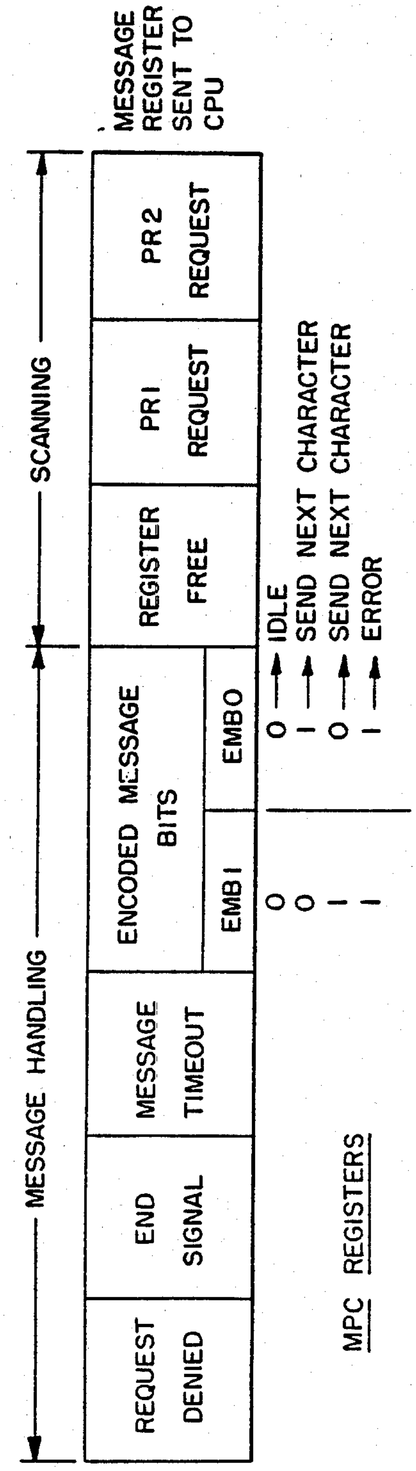
Figure 18:
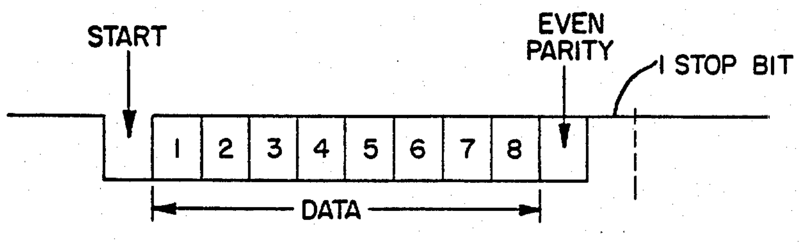
Figure 19:
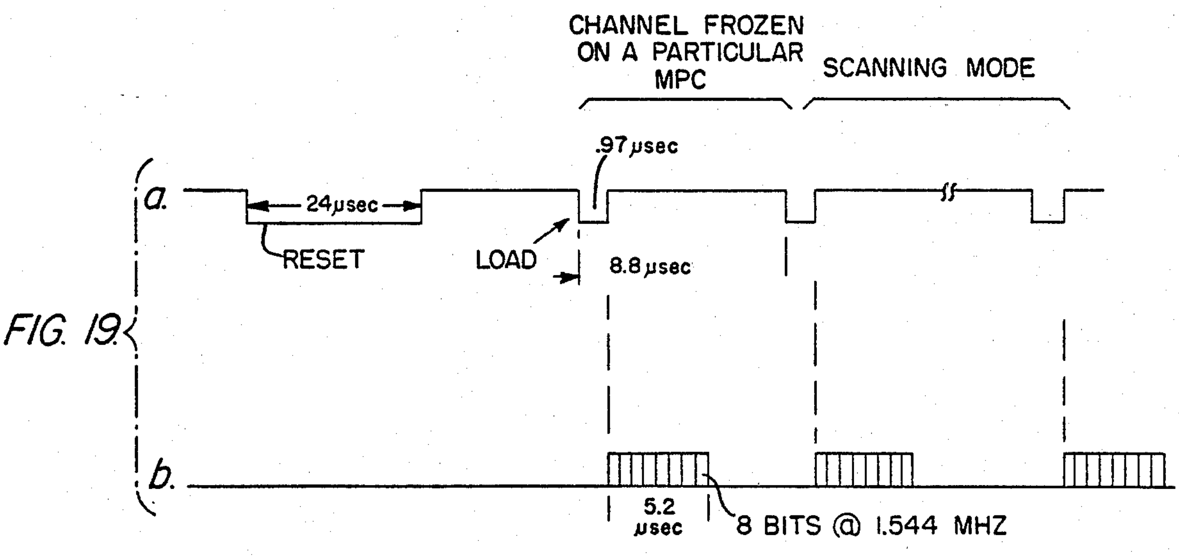
Figure 21:
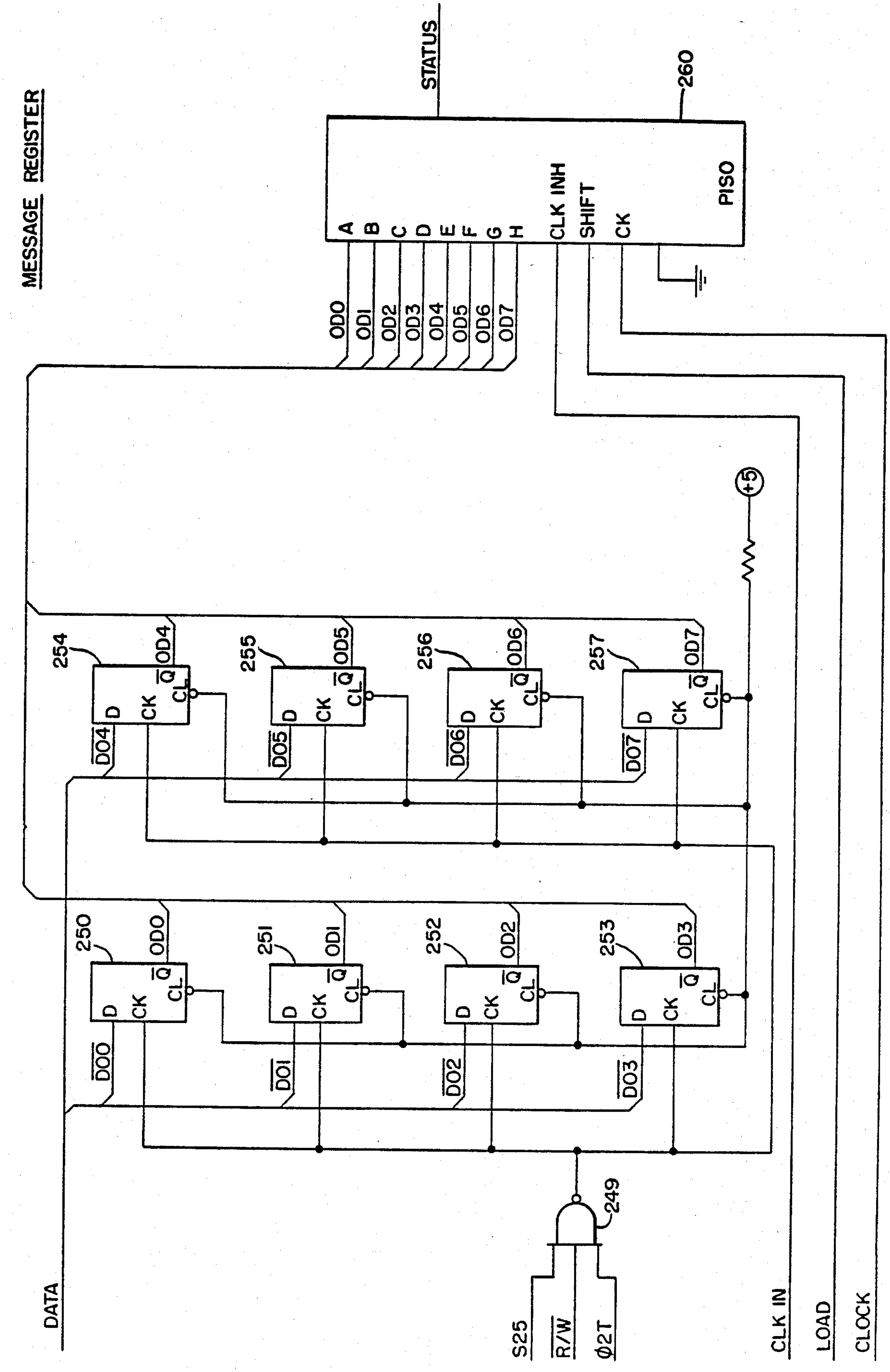
Figure 22:
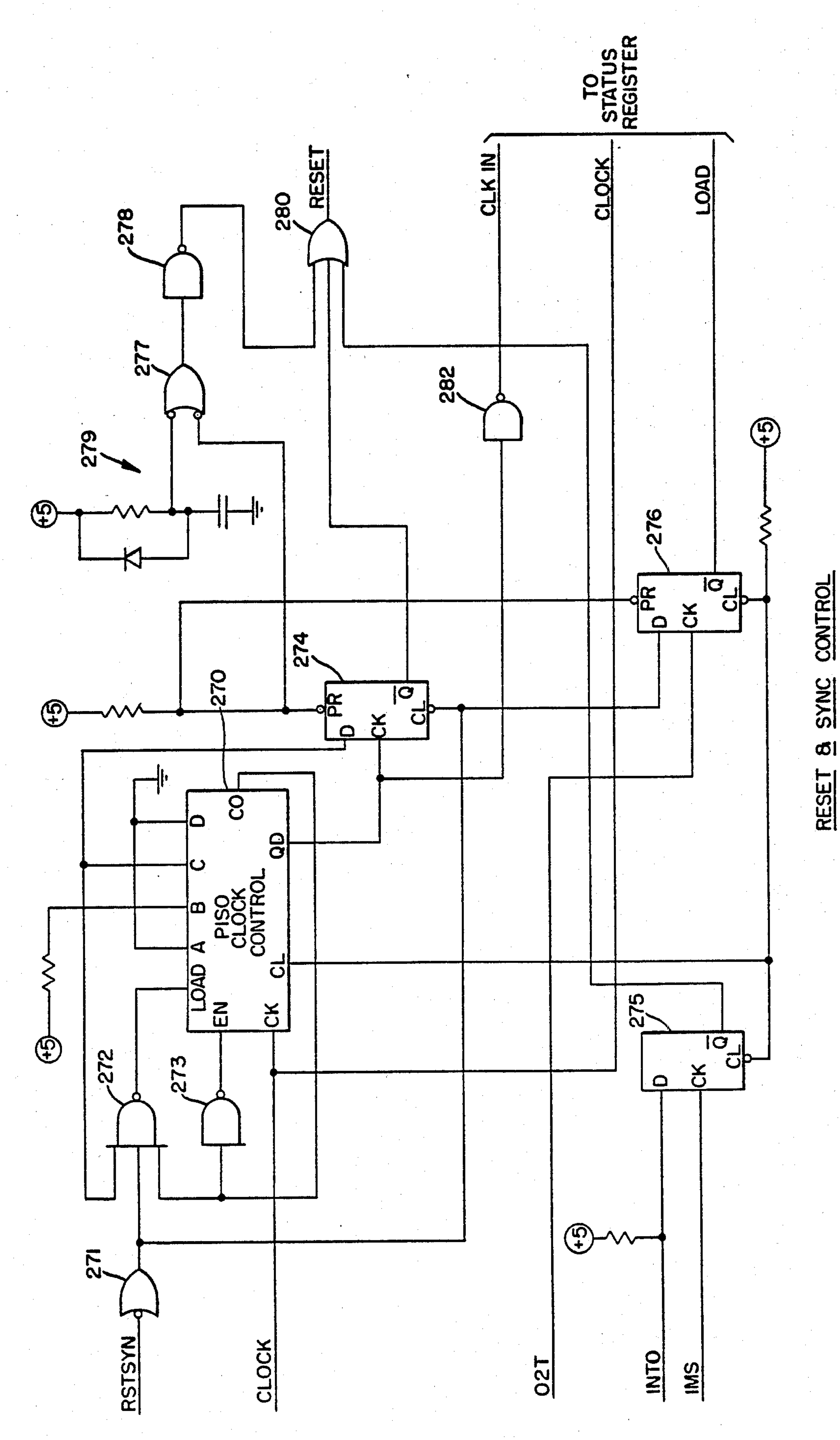
Figure 23:
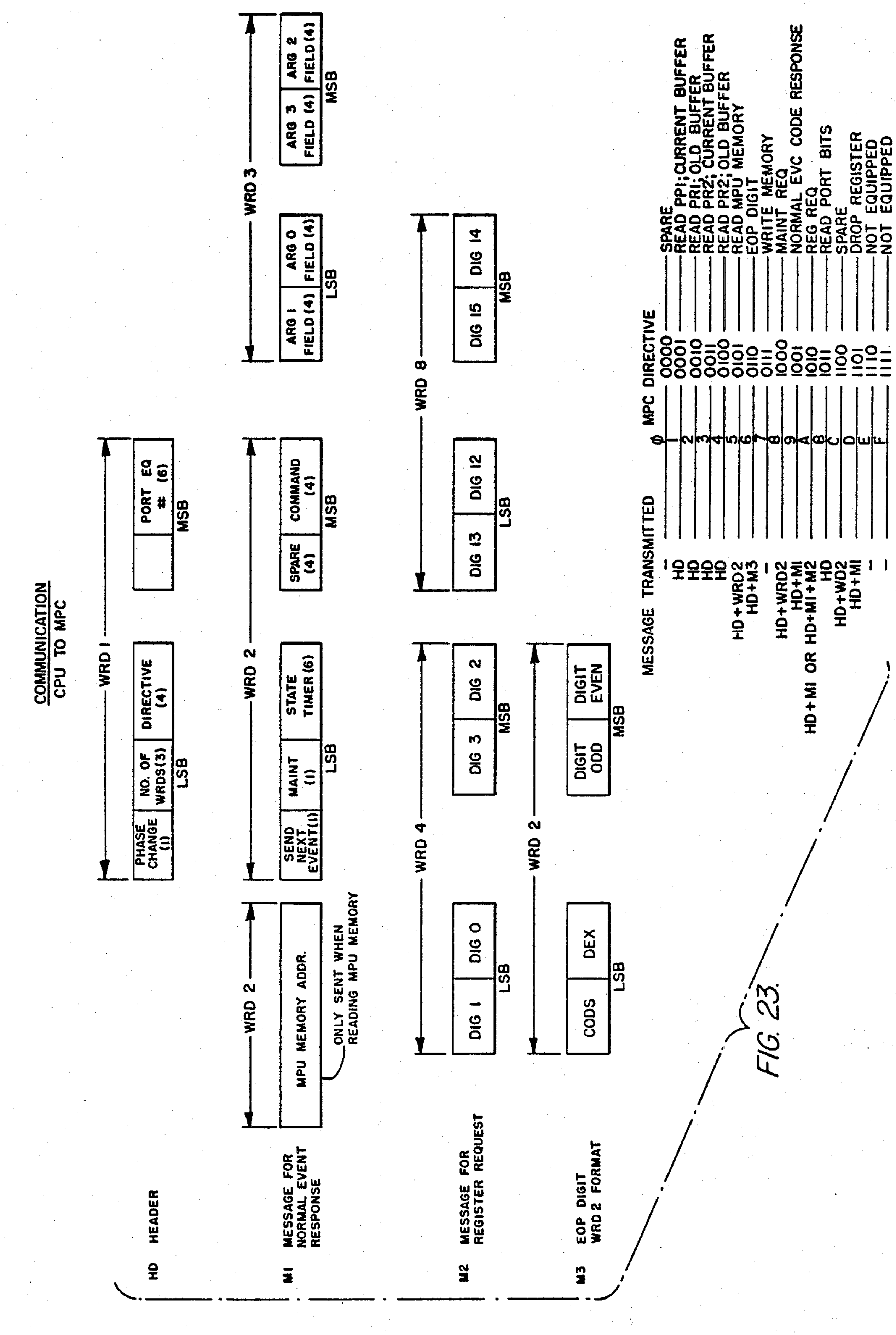
Figure 24:
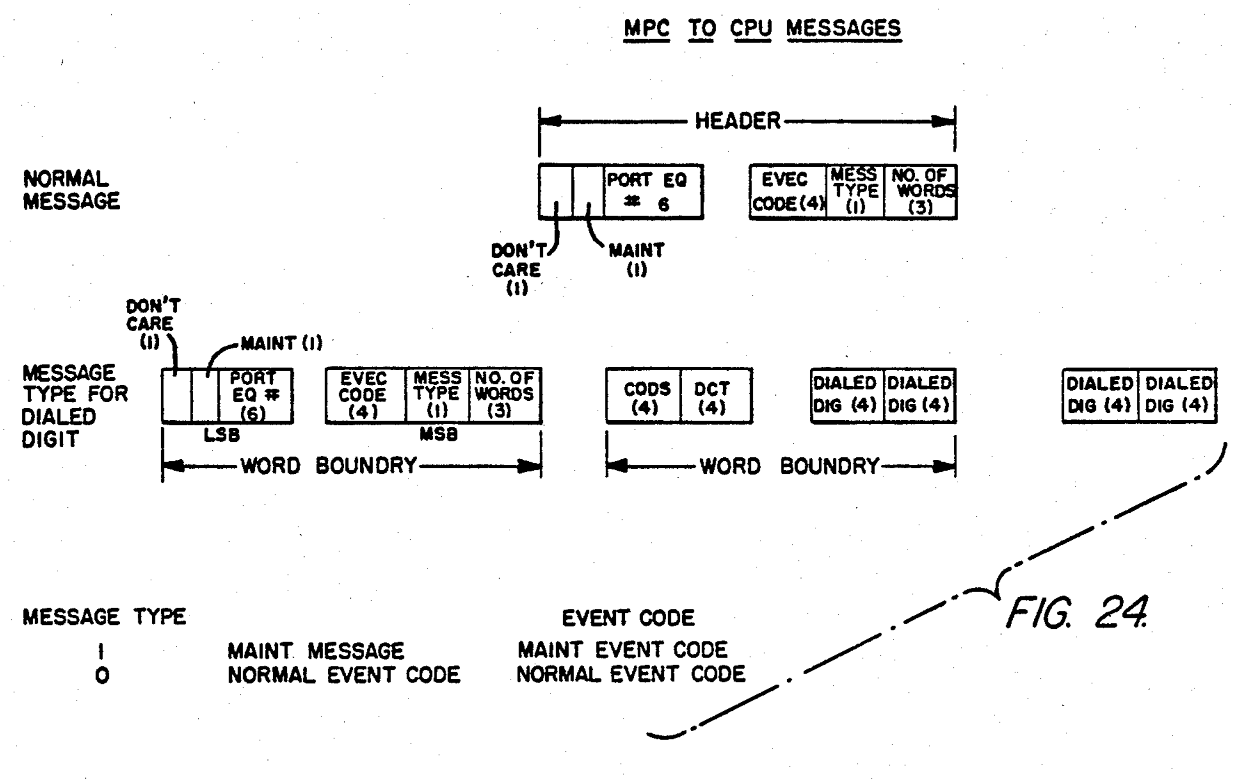
Figure 26:
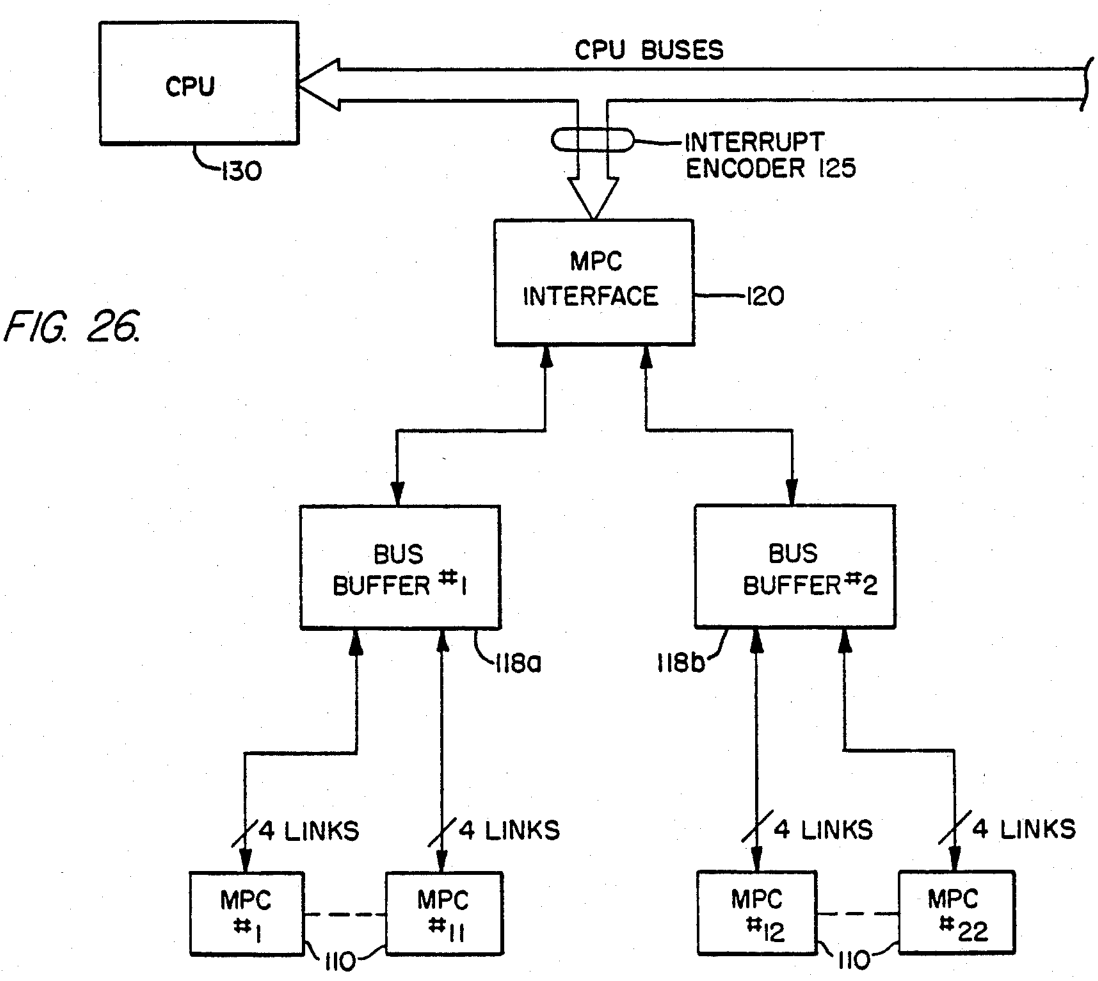
Figure 25A:
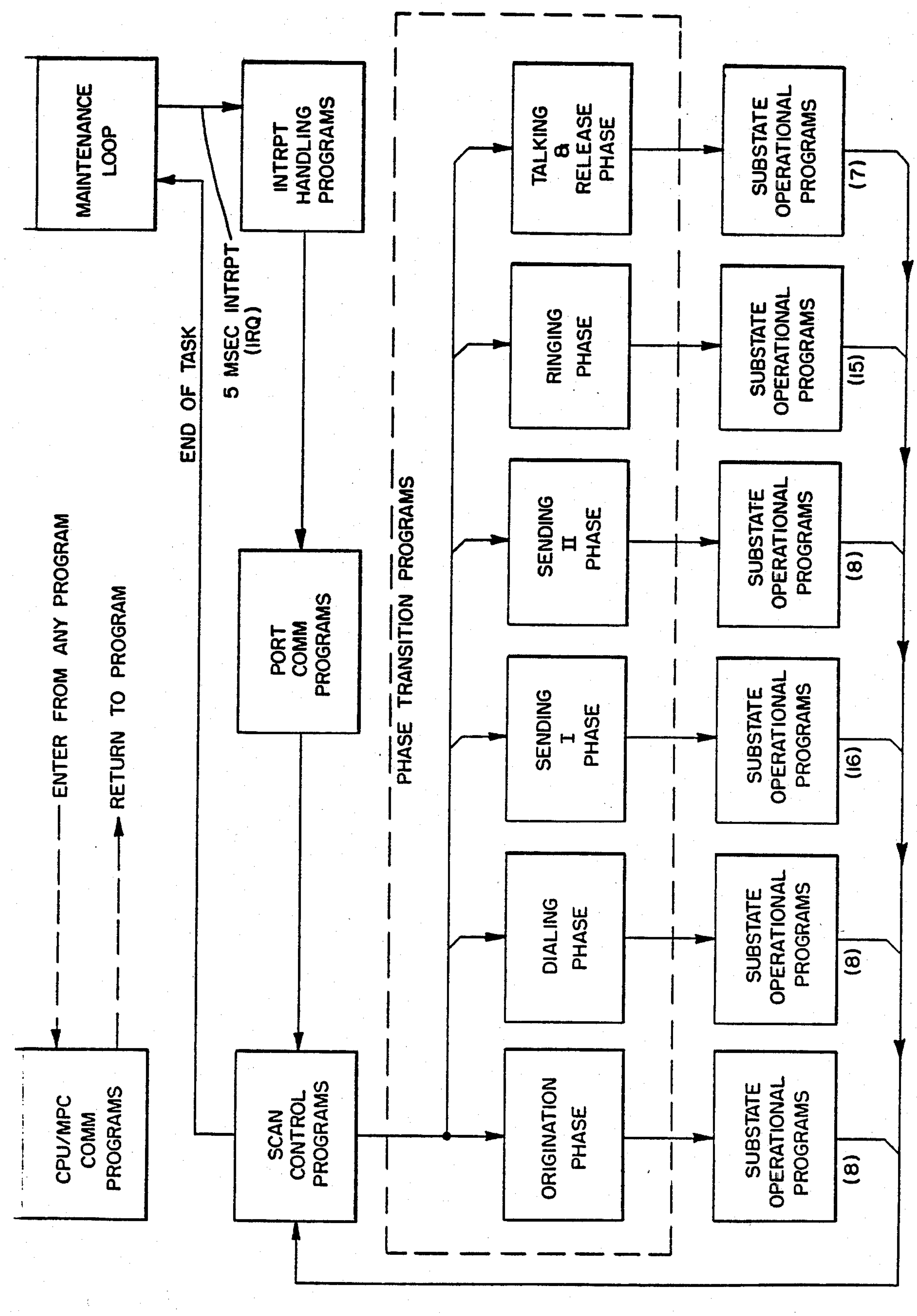
Figure 25B:
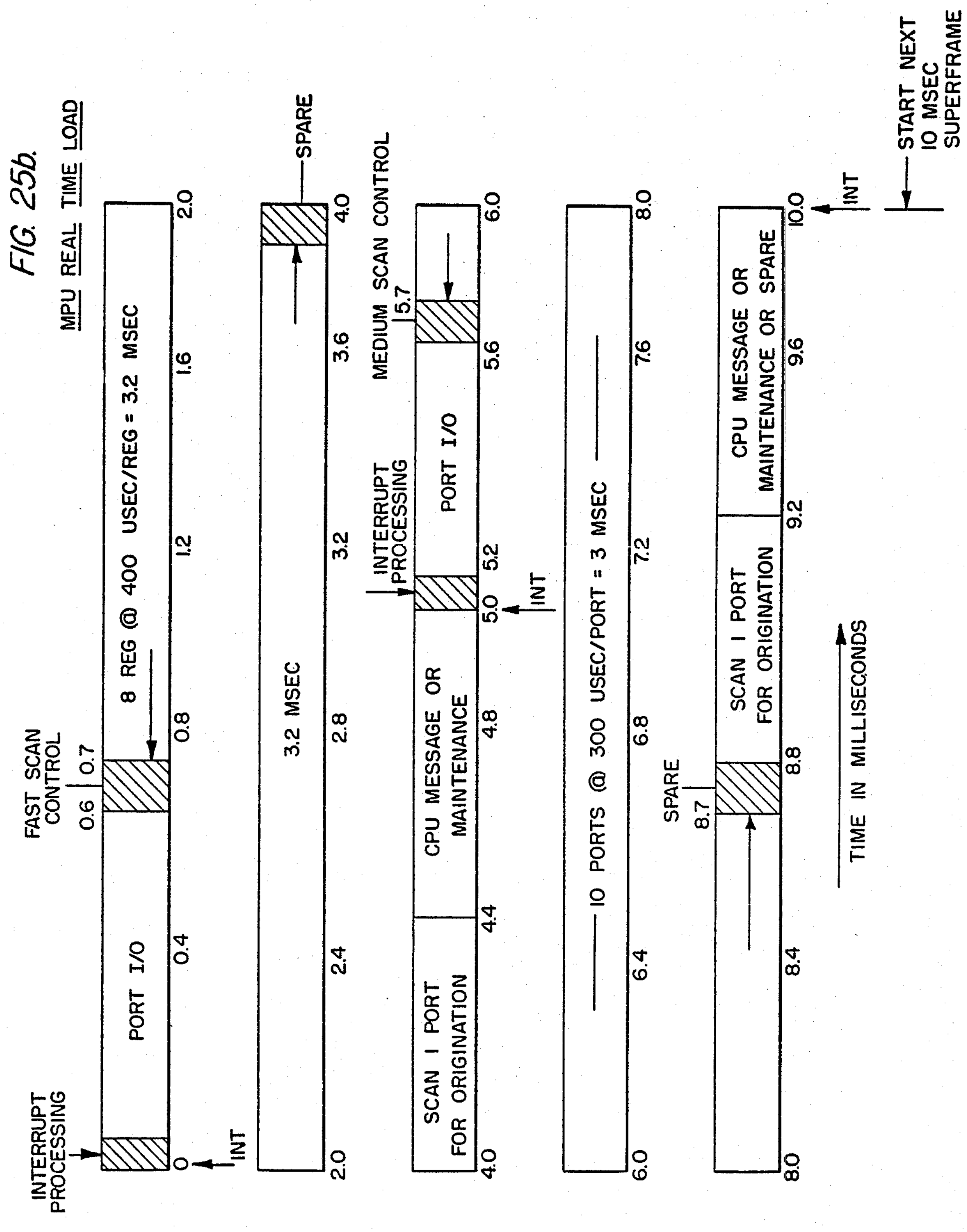
Figure 27:
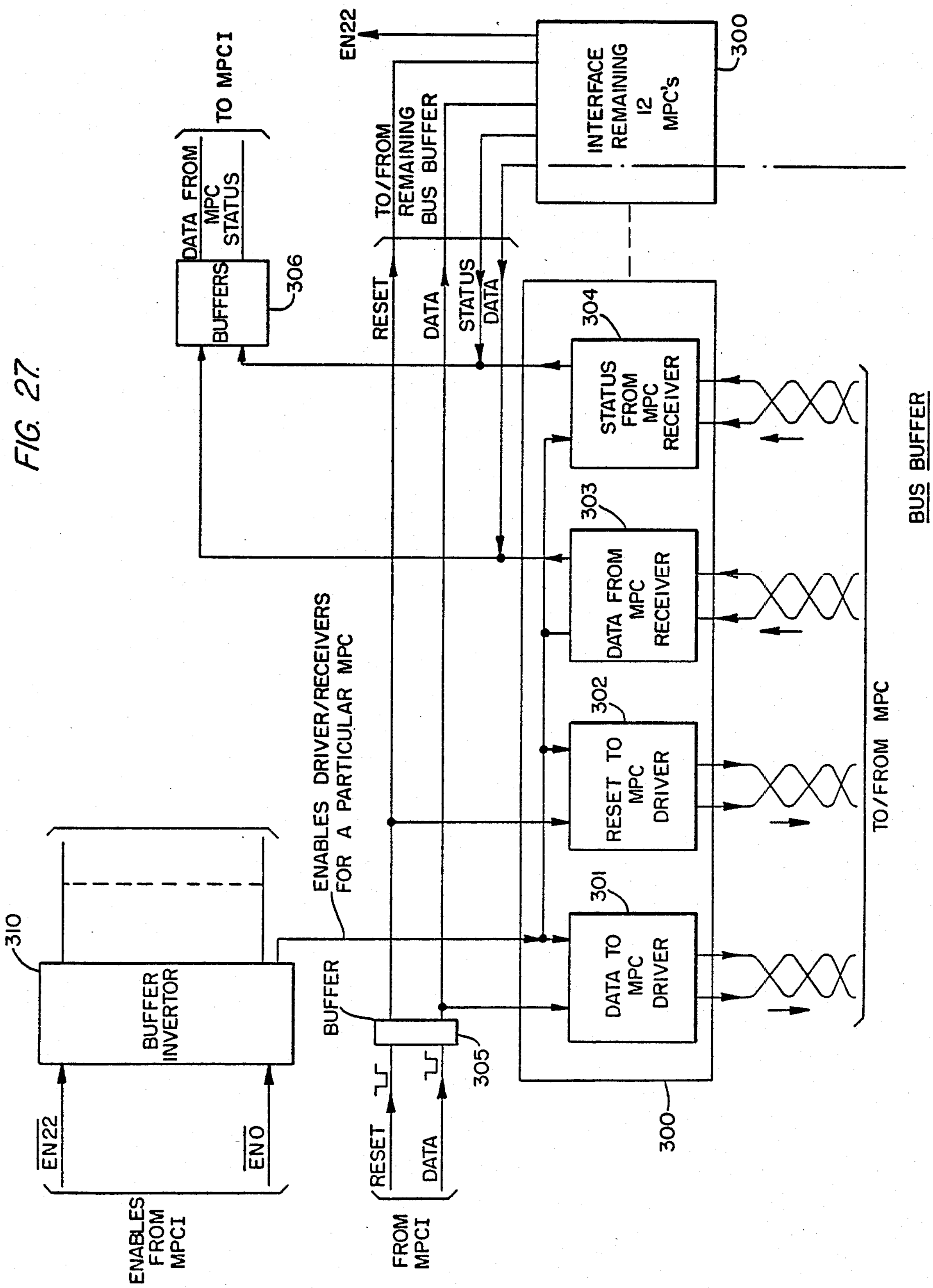
Figure 28:
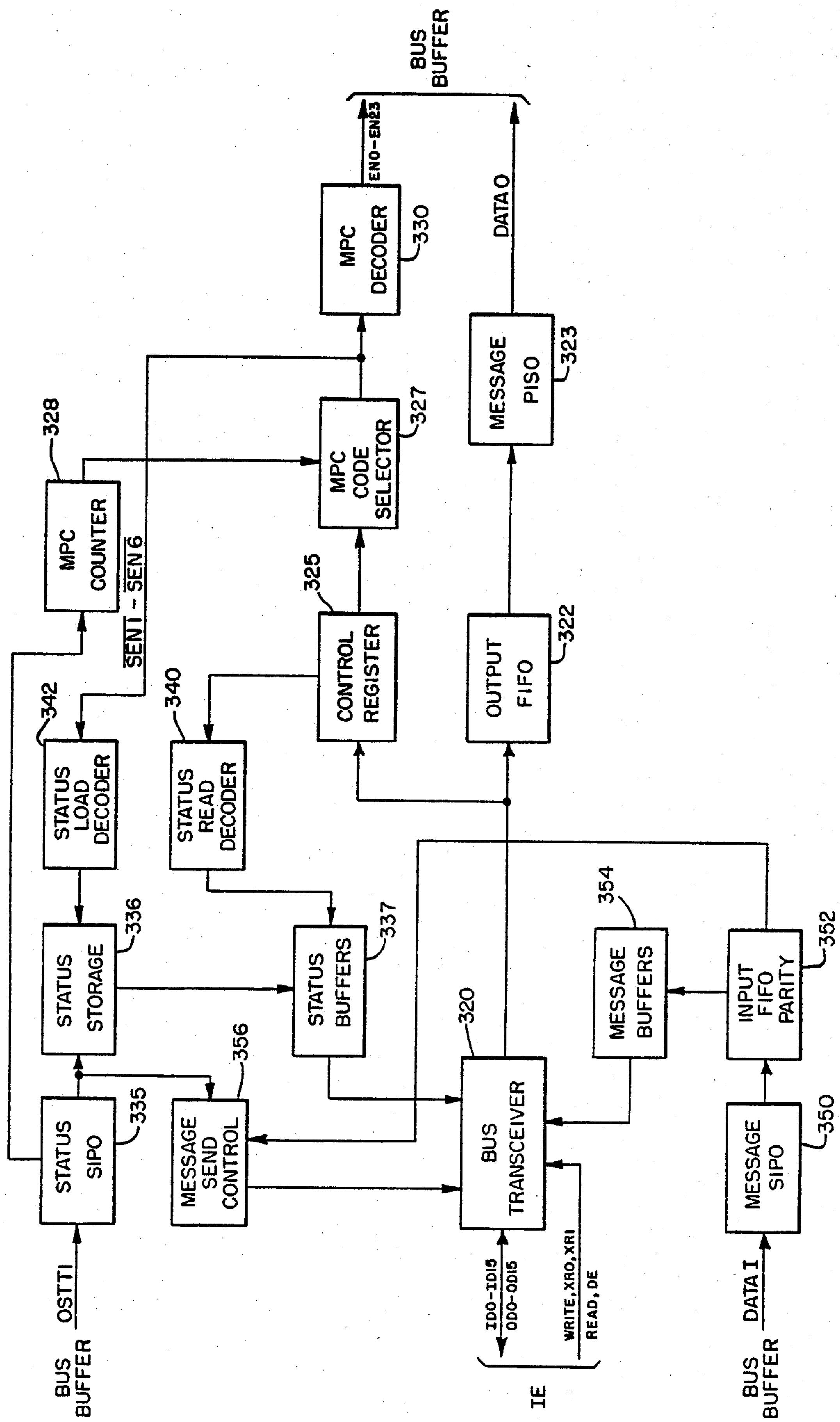
Figure 42:
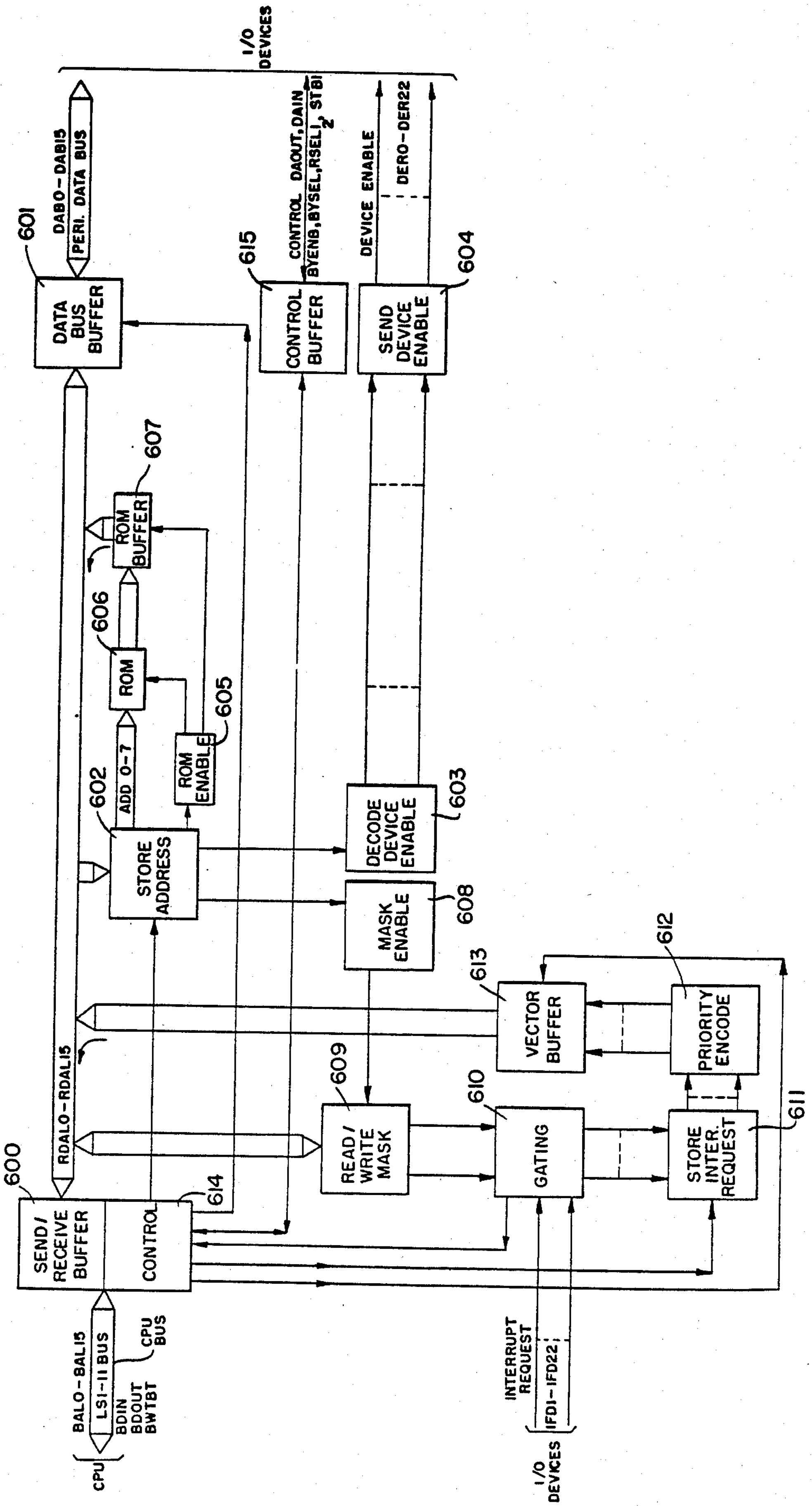
Figure 57:
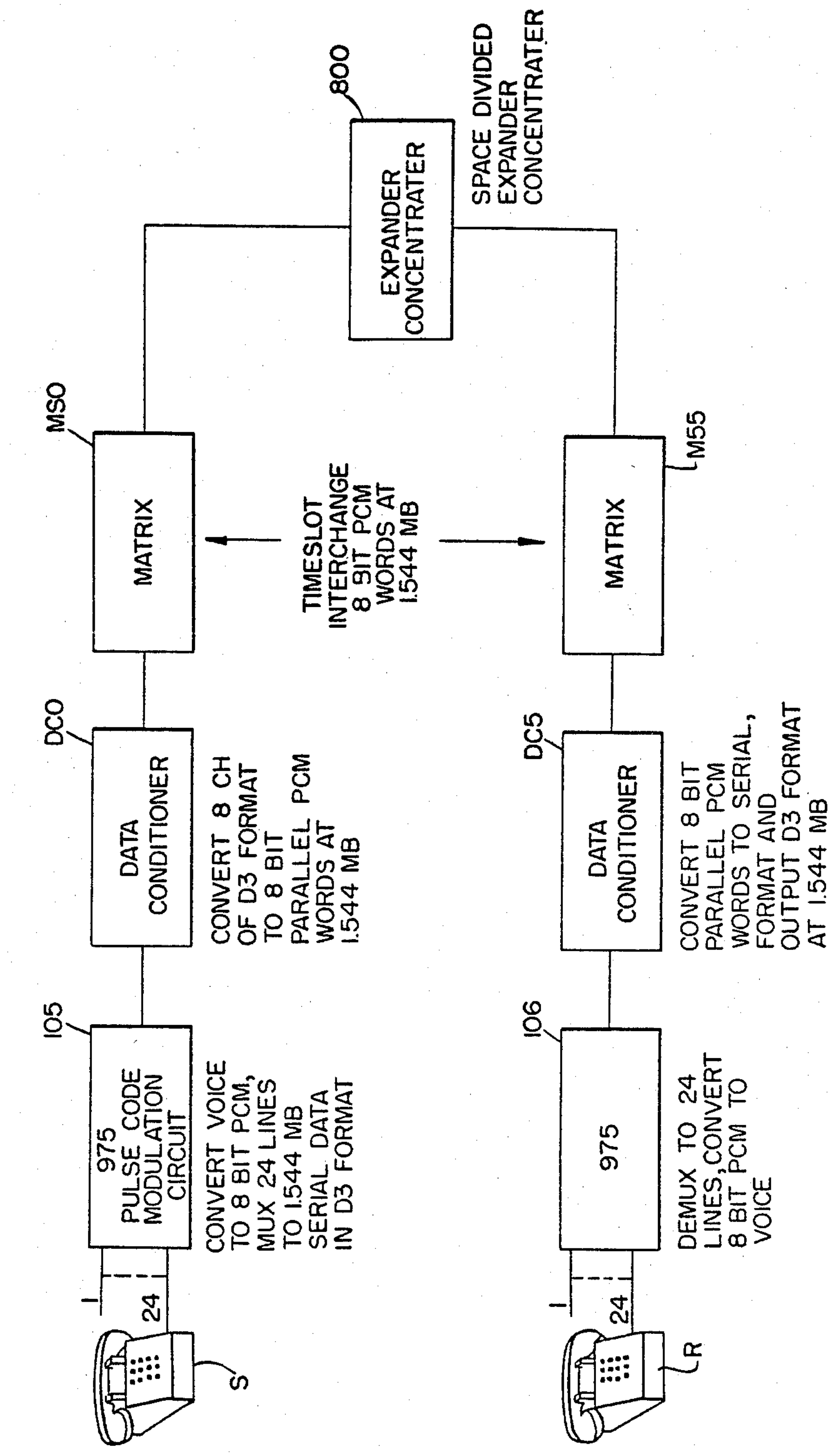
Figure 58:
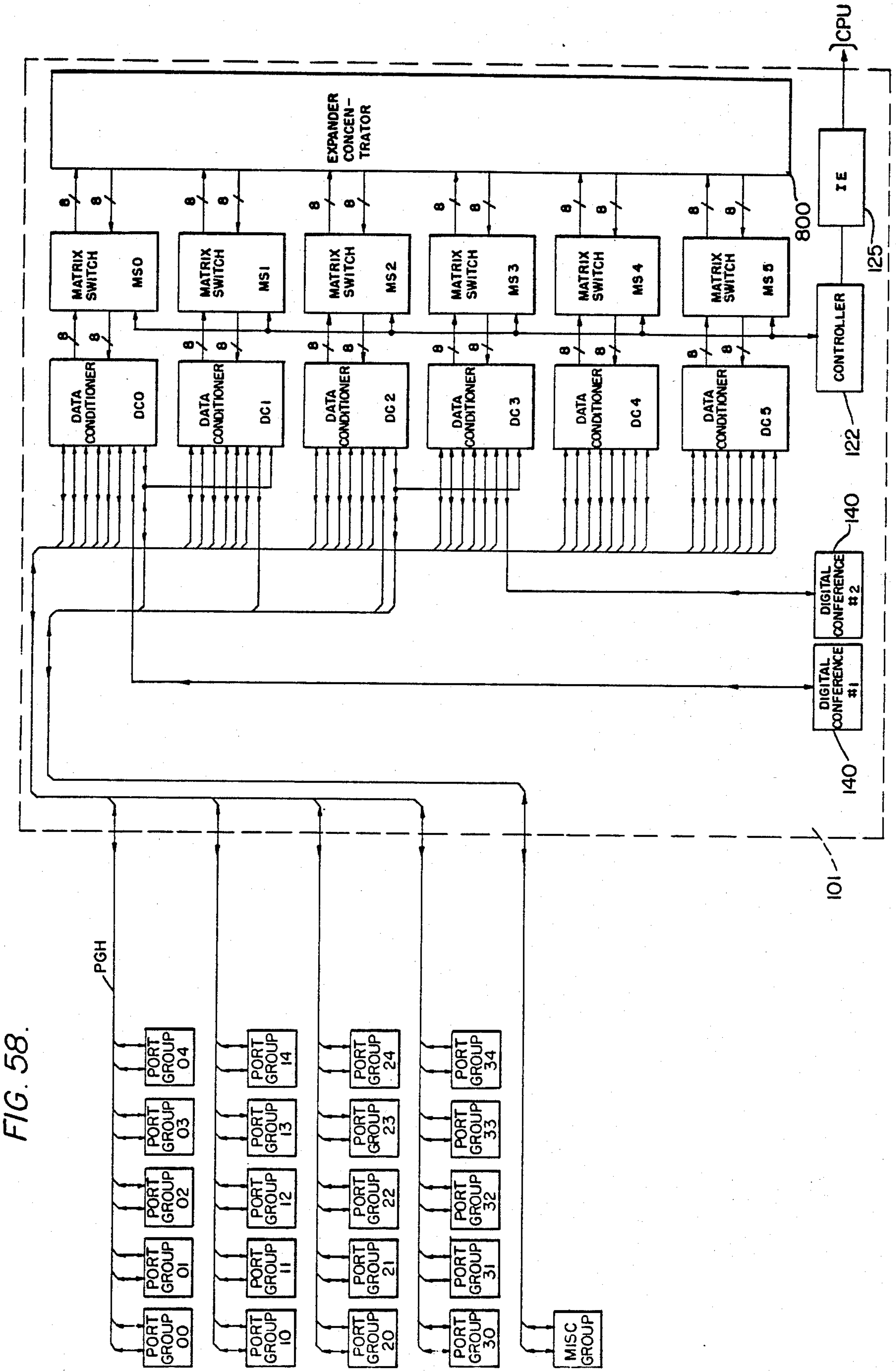
Figure 59:
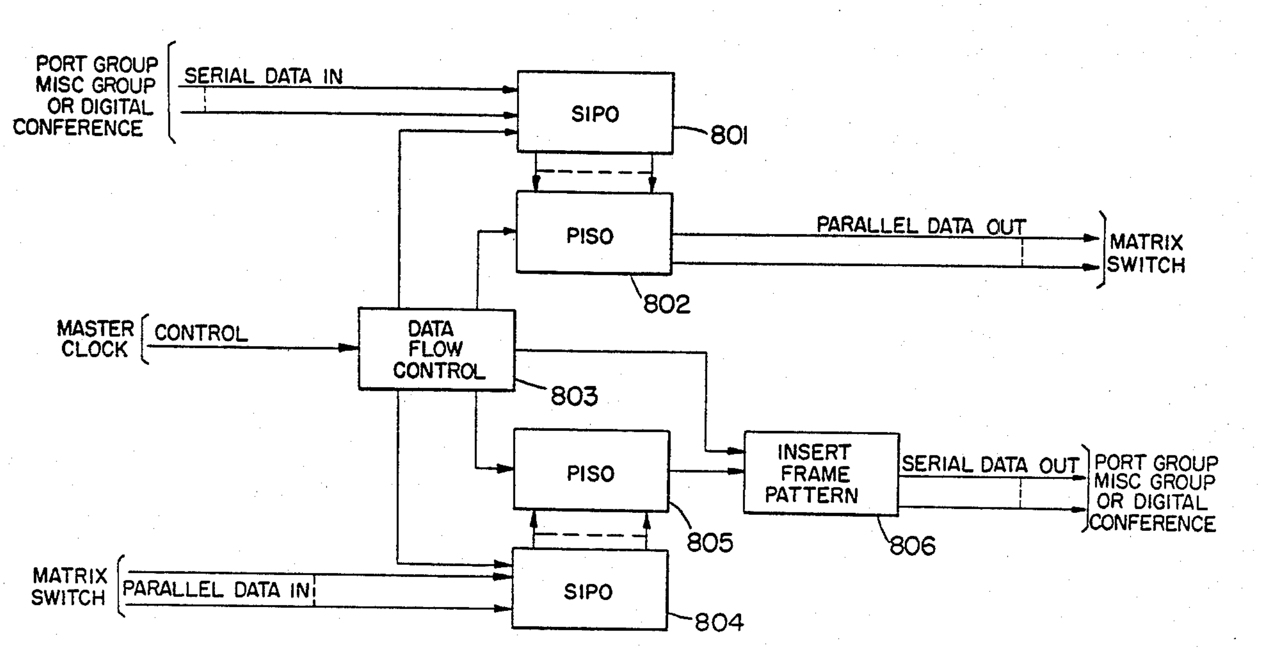
Figure 67:
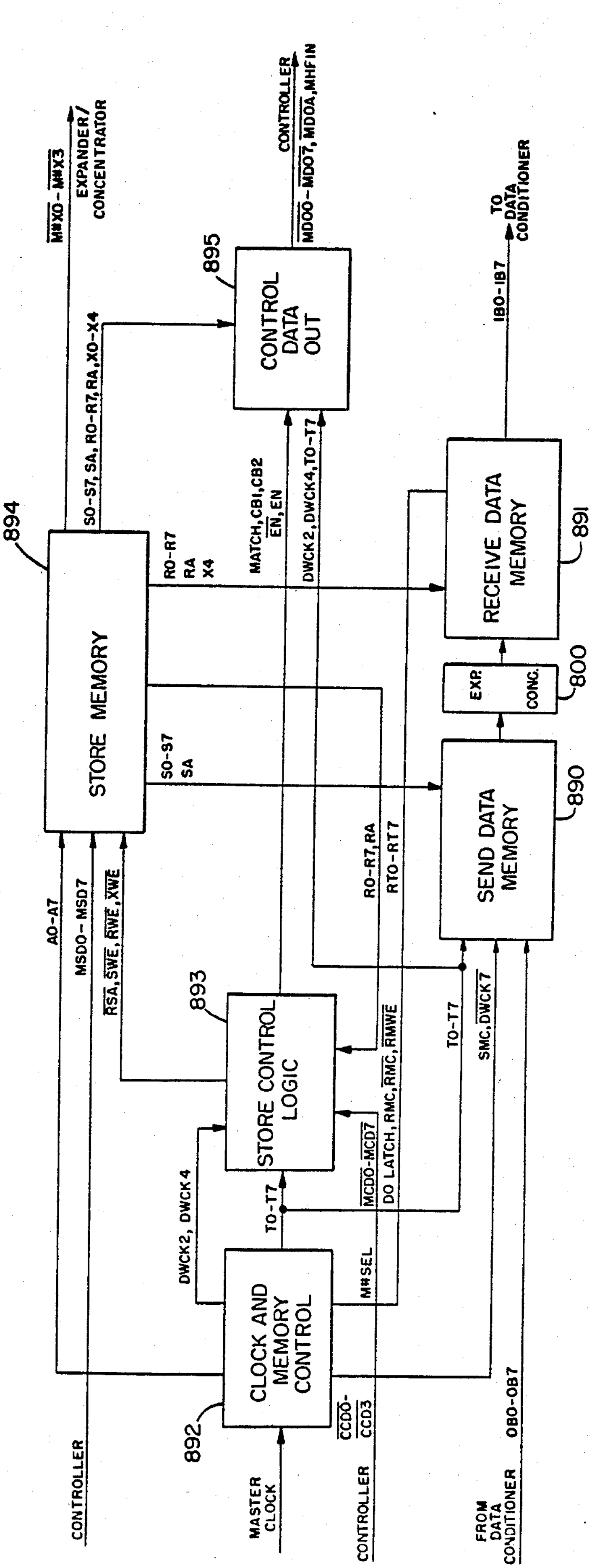
Figure 81:
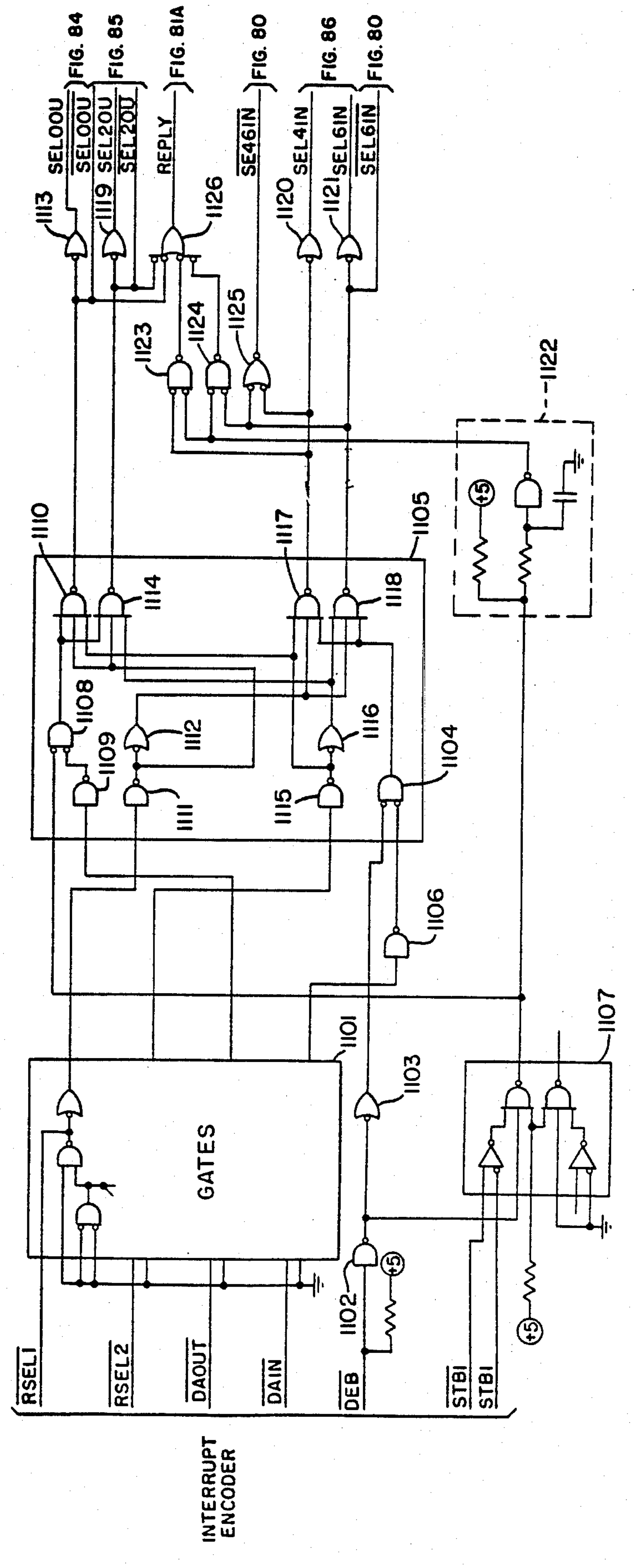
Figure 77:
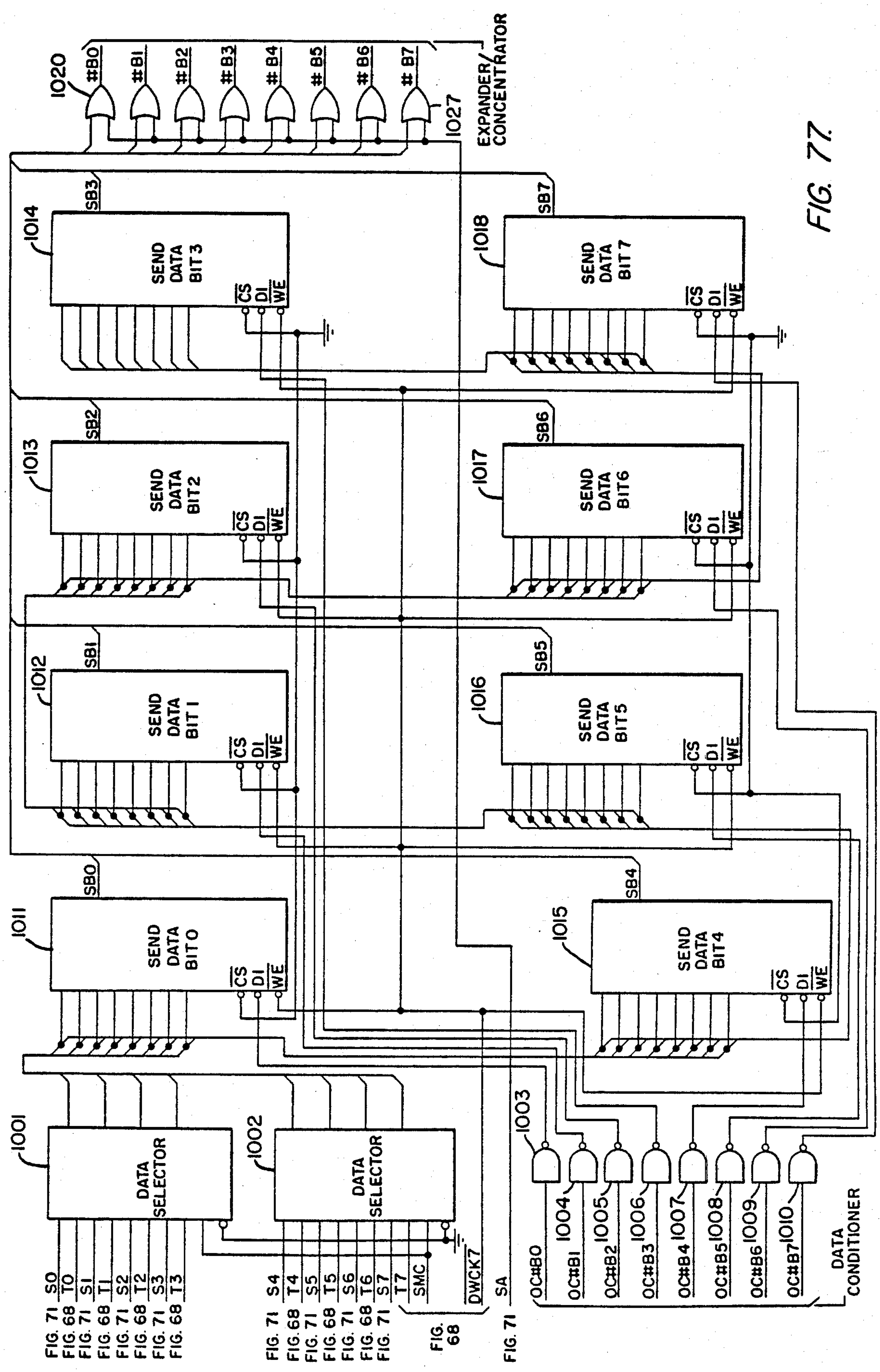
Figures 80, 81A:
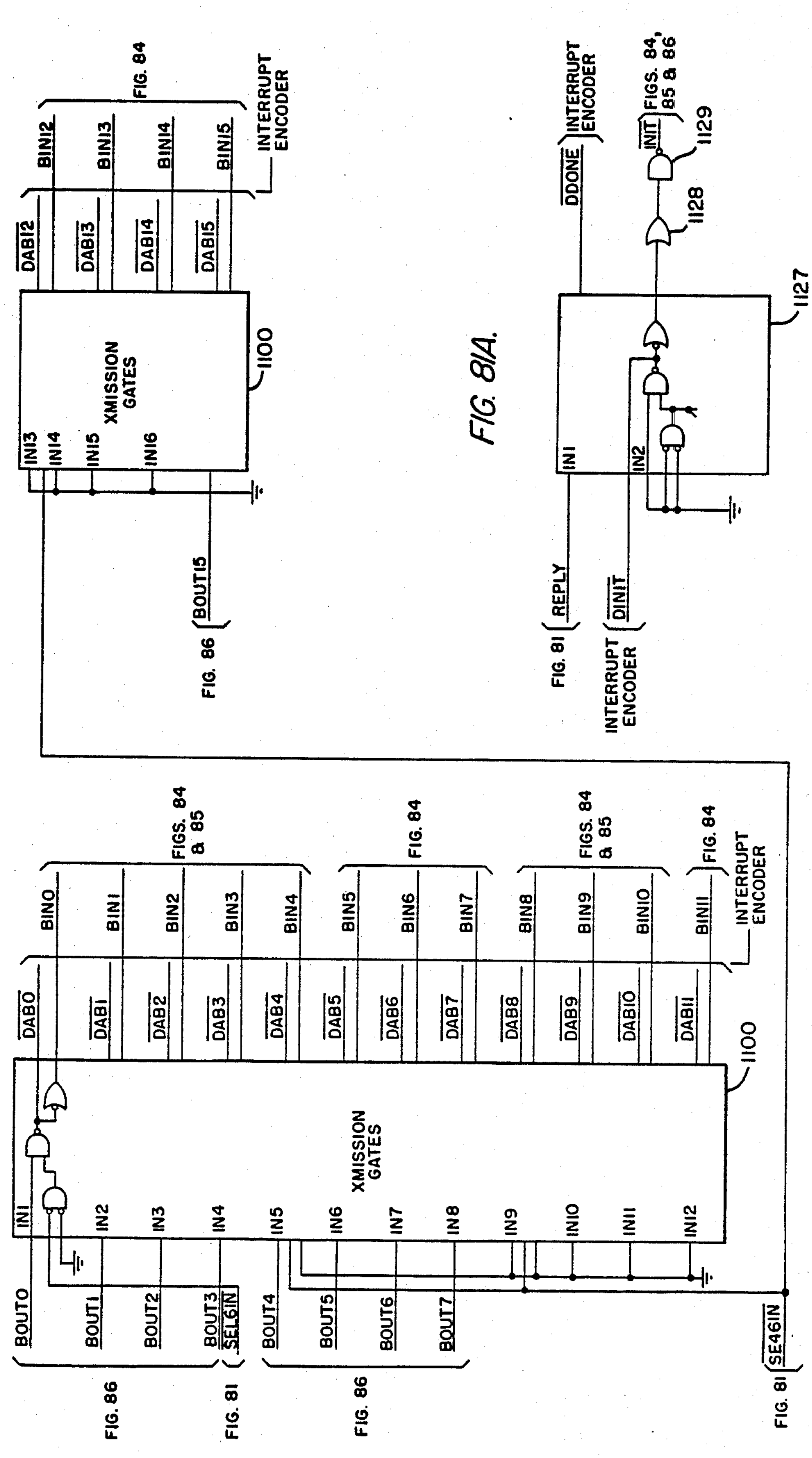
Figure 82:
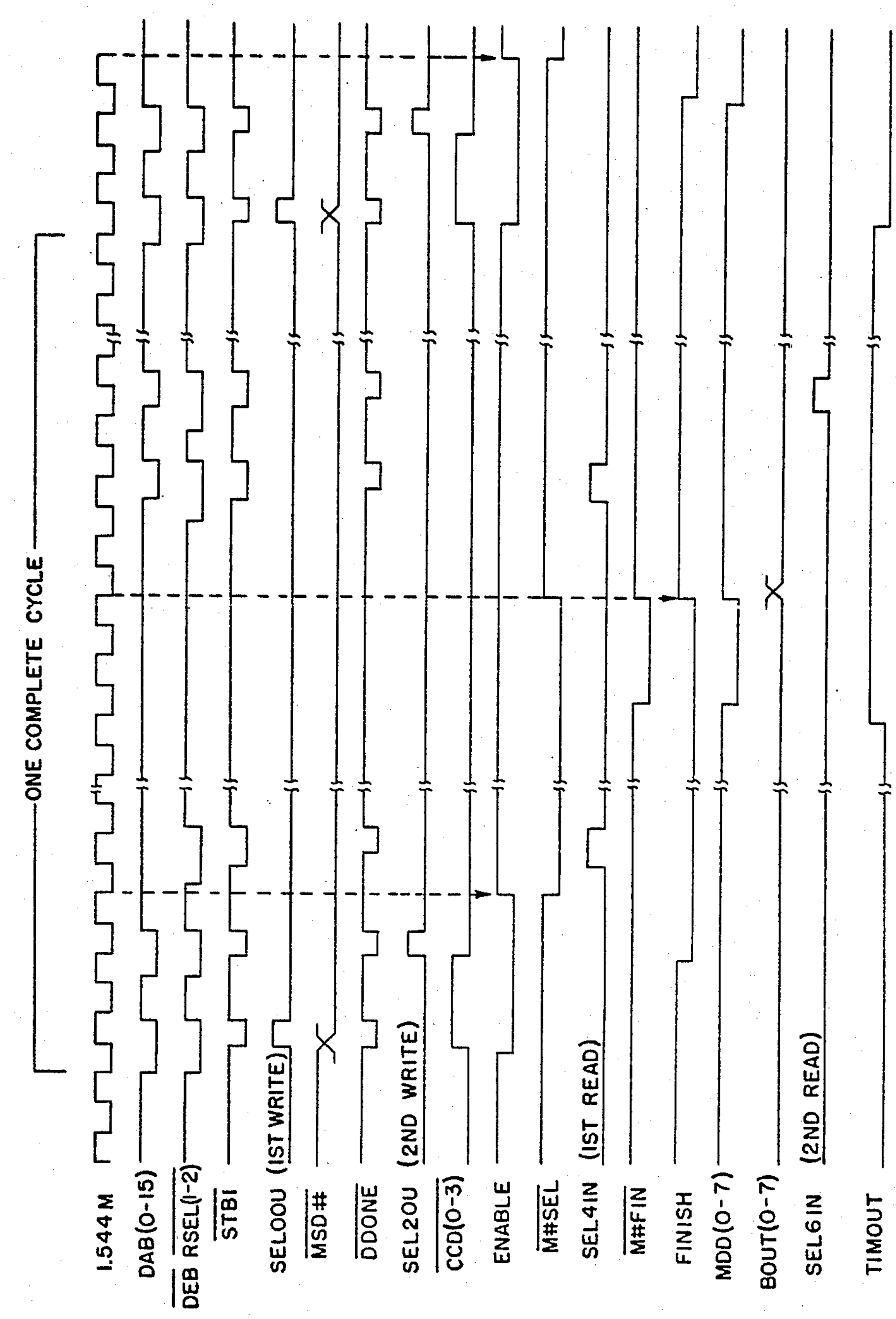
Figure 84:
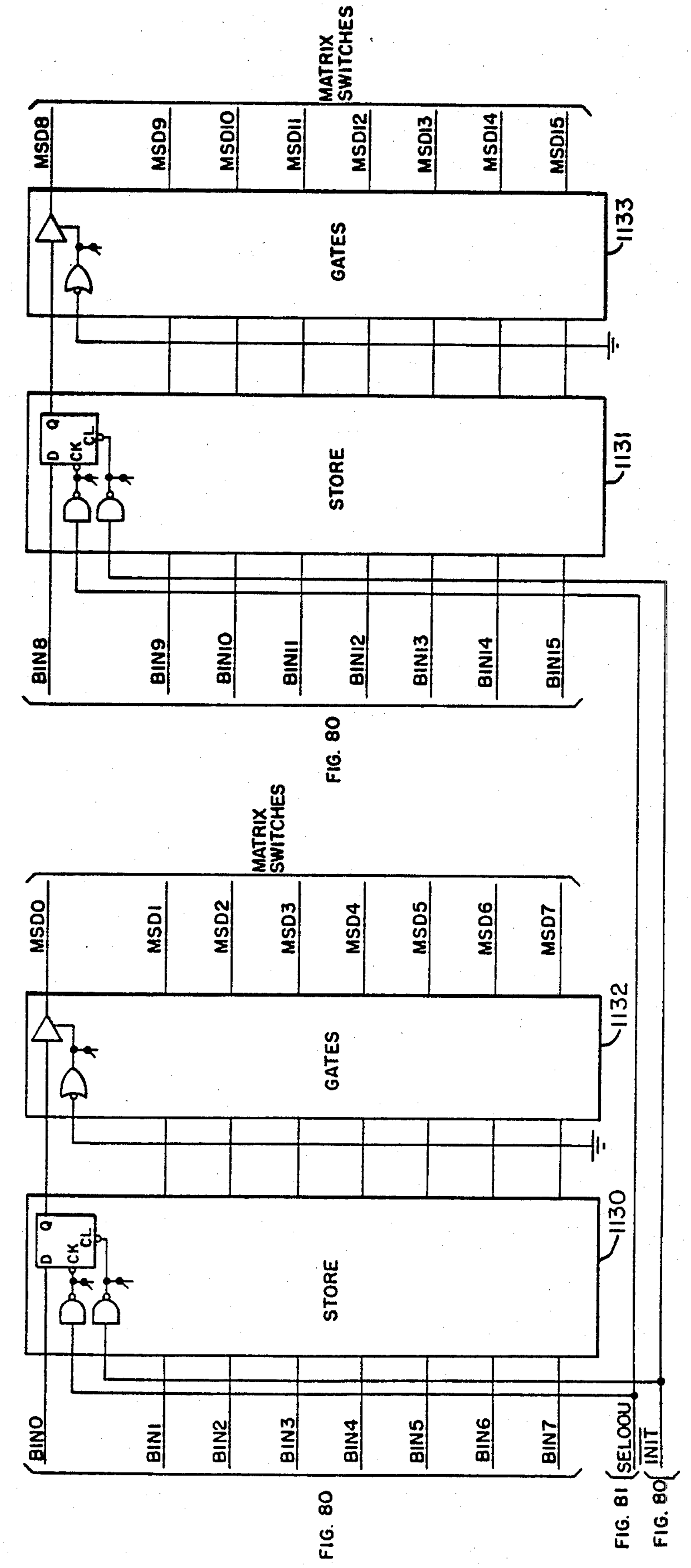
Figure 85:
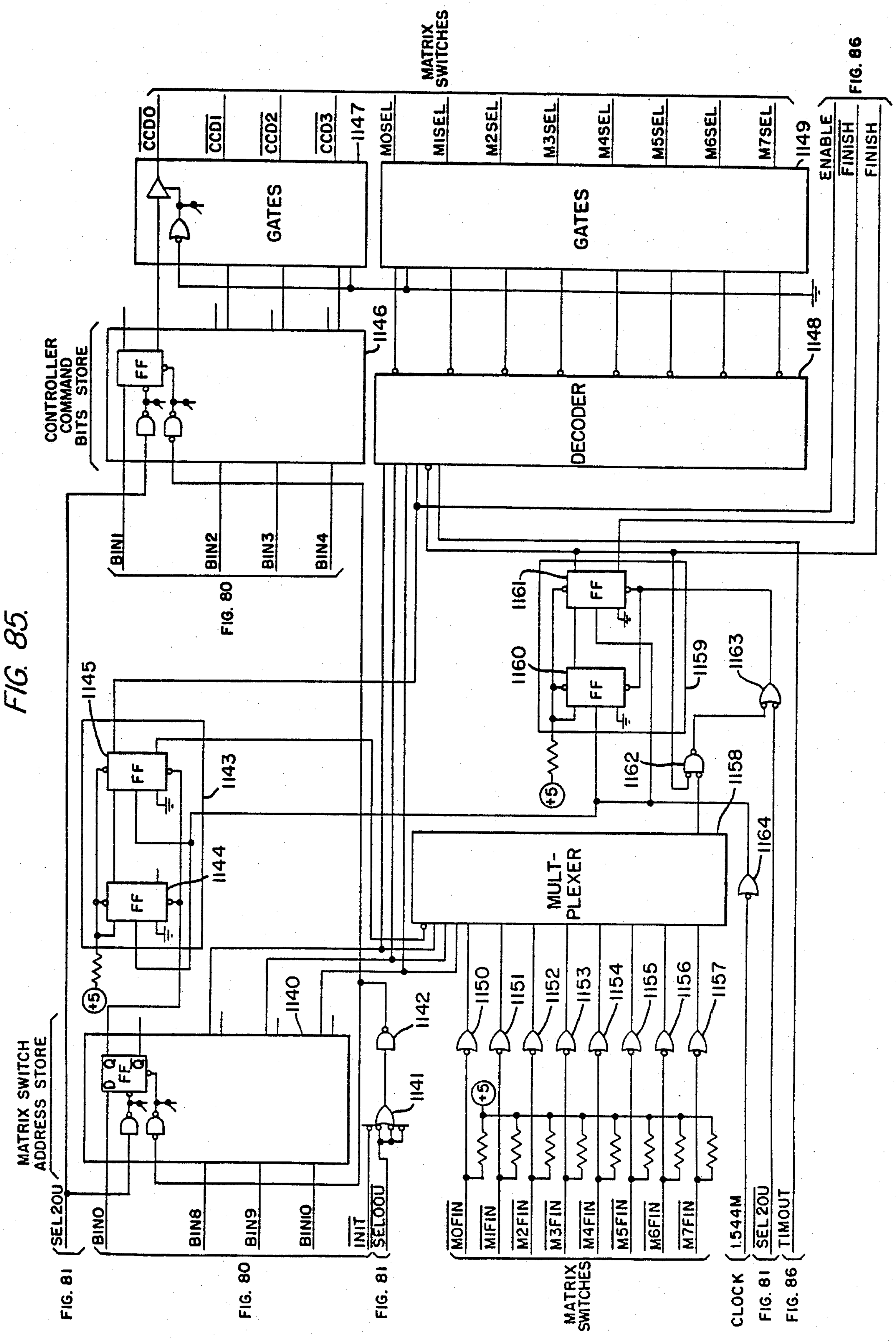
Figure 86:
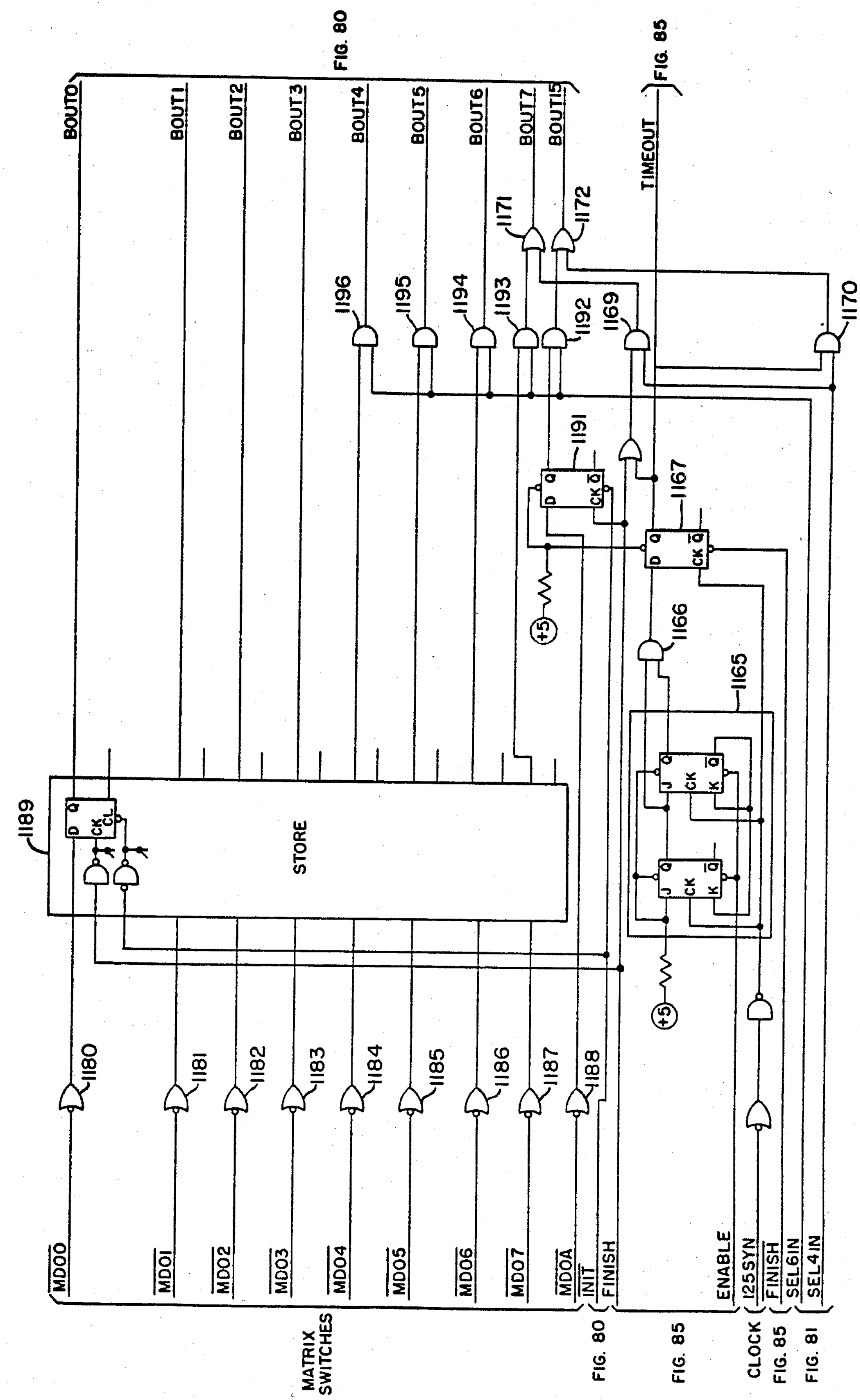
Figure 88:
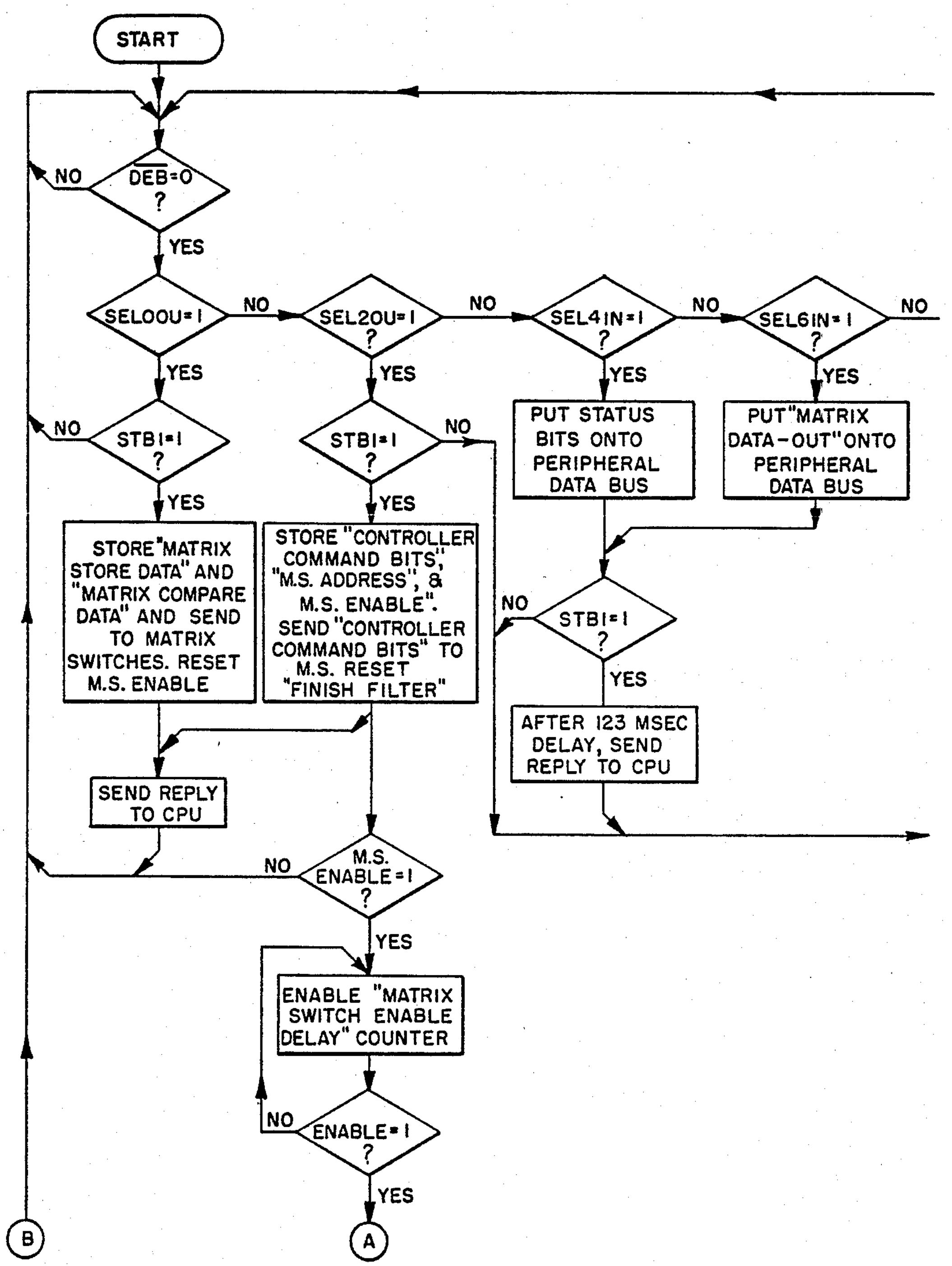
Figure 90:
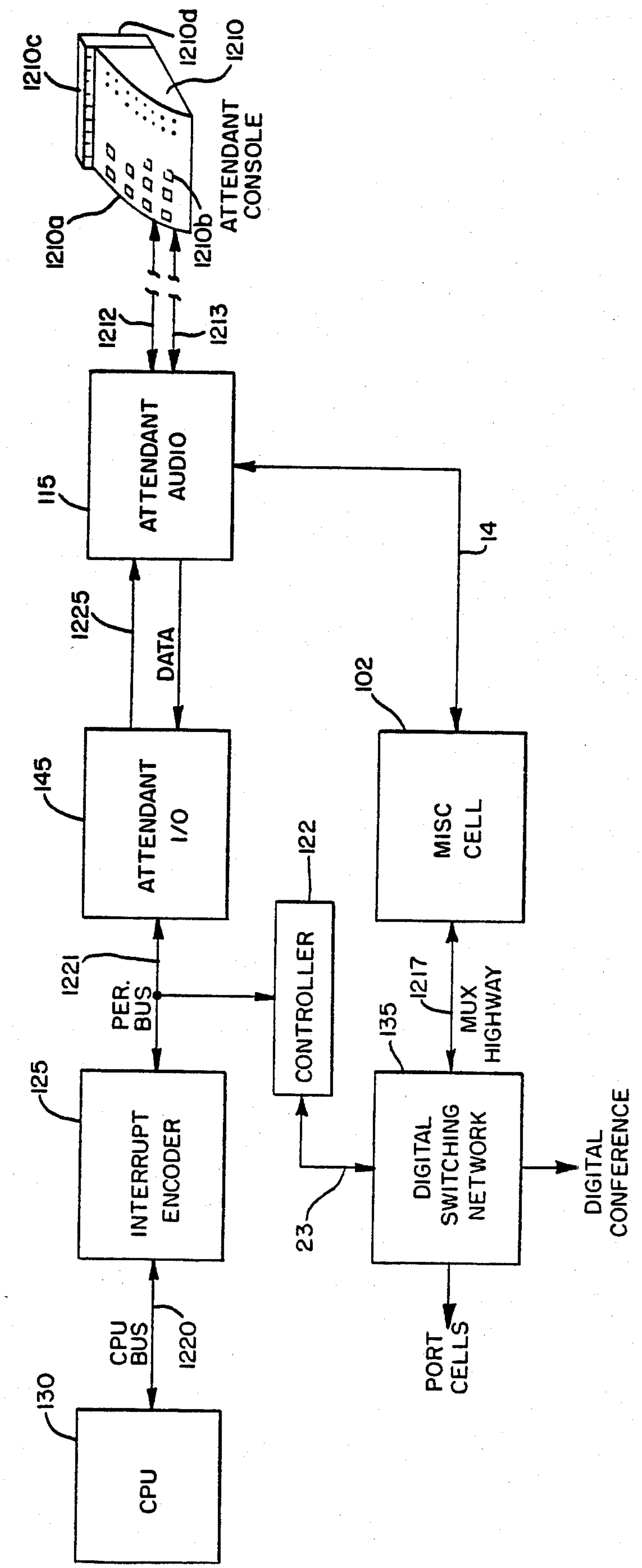
Figure 91:
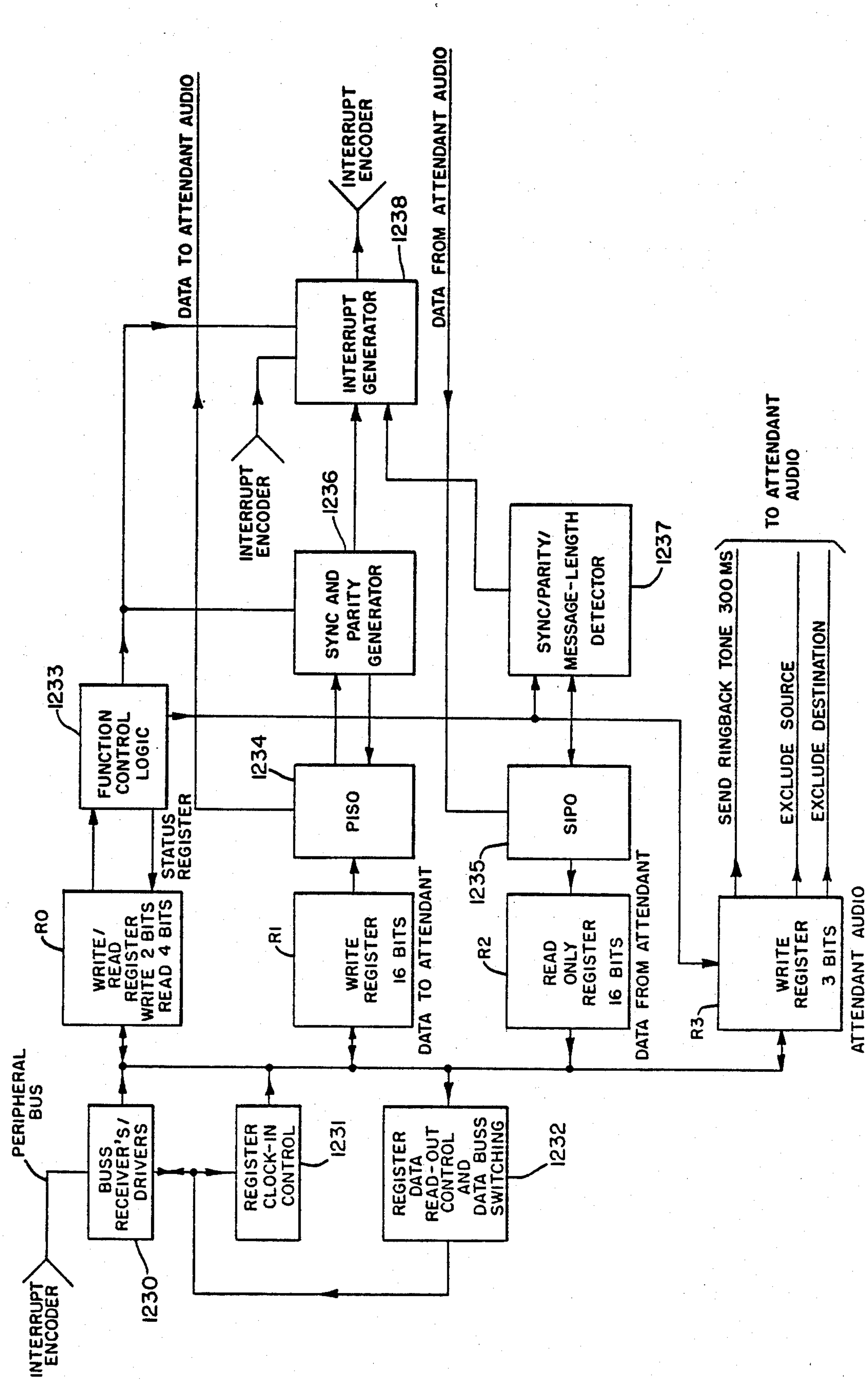
Figure 93:
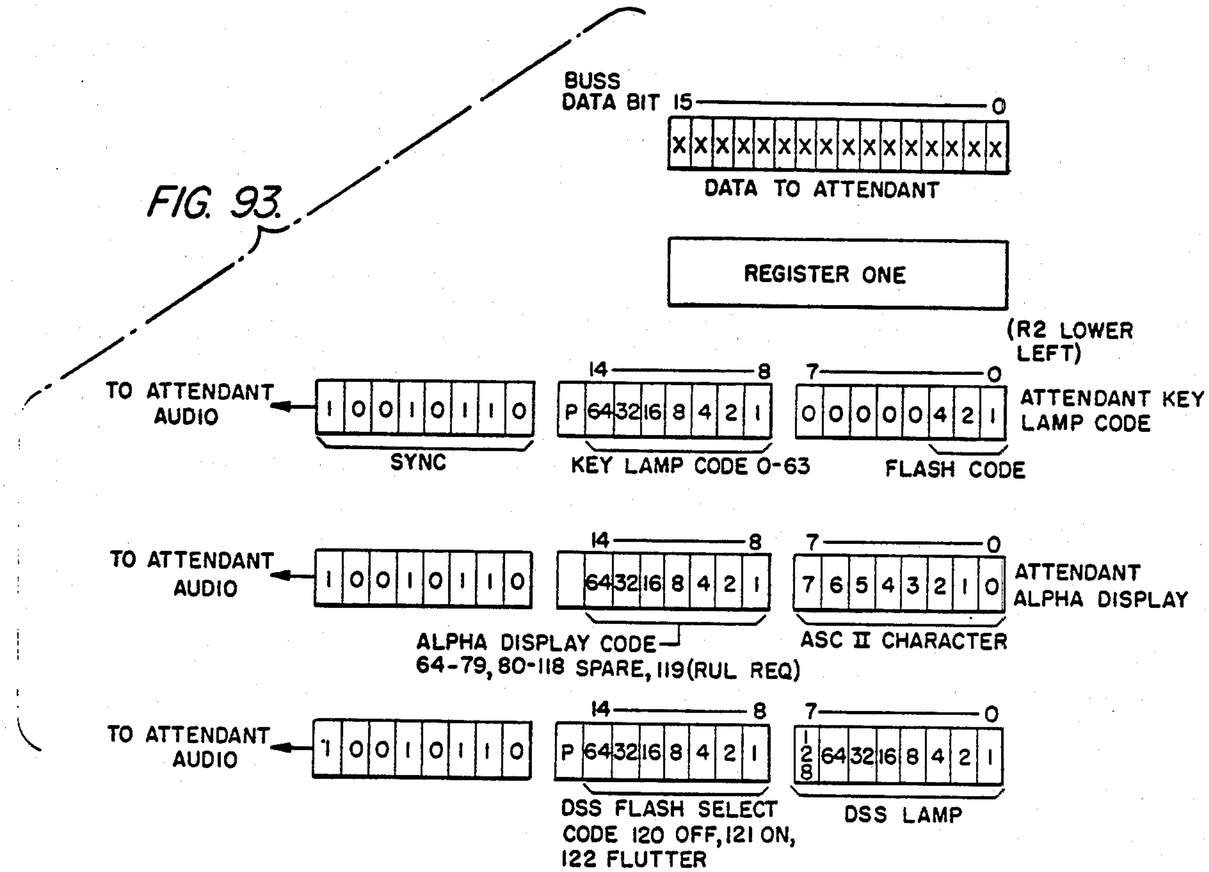
Figure 94:
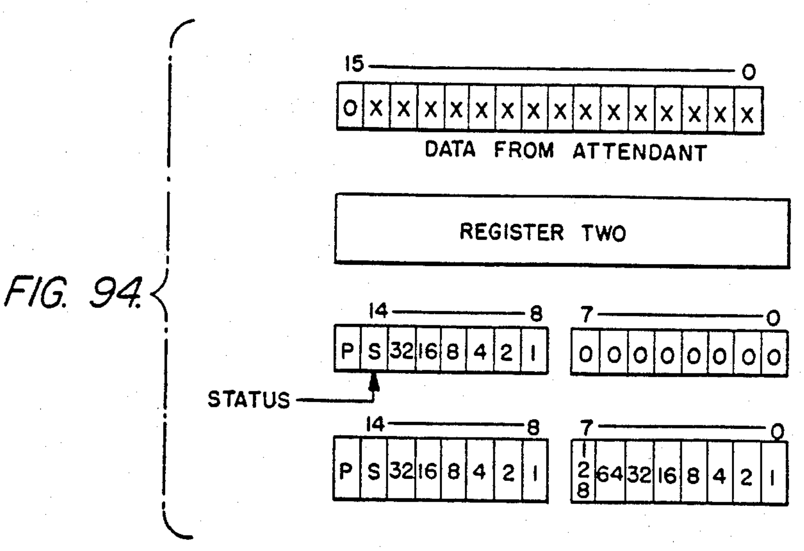
Figure 95:
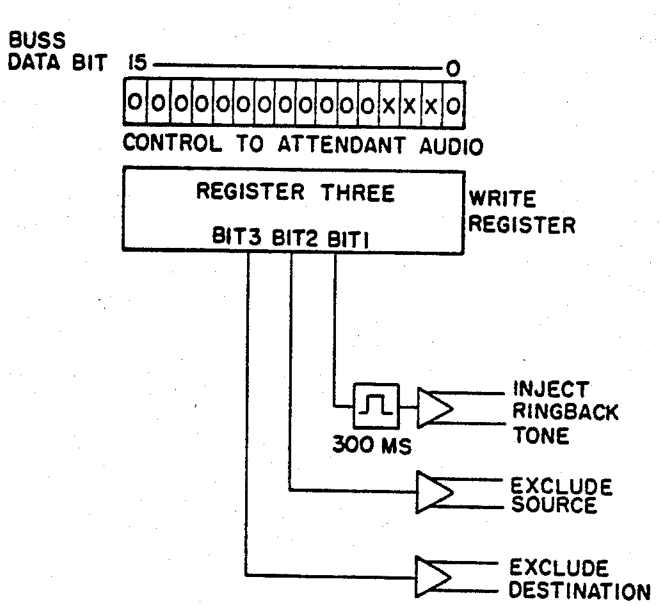
Figure 107:
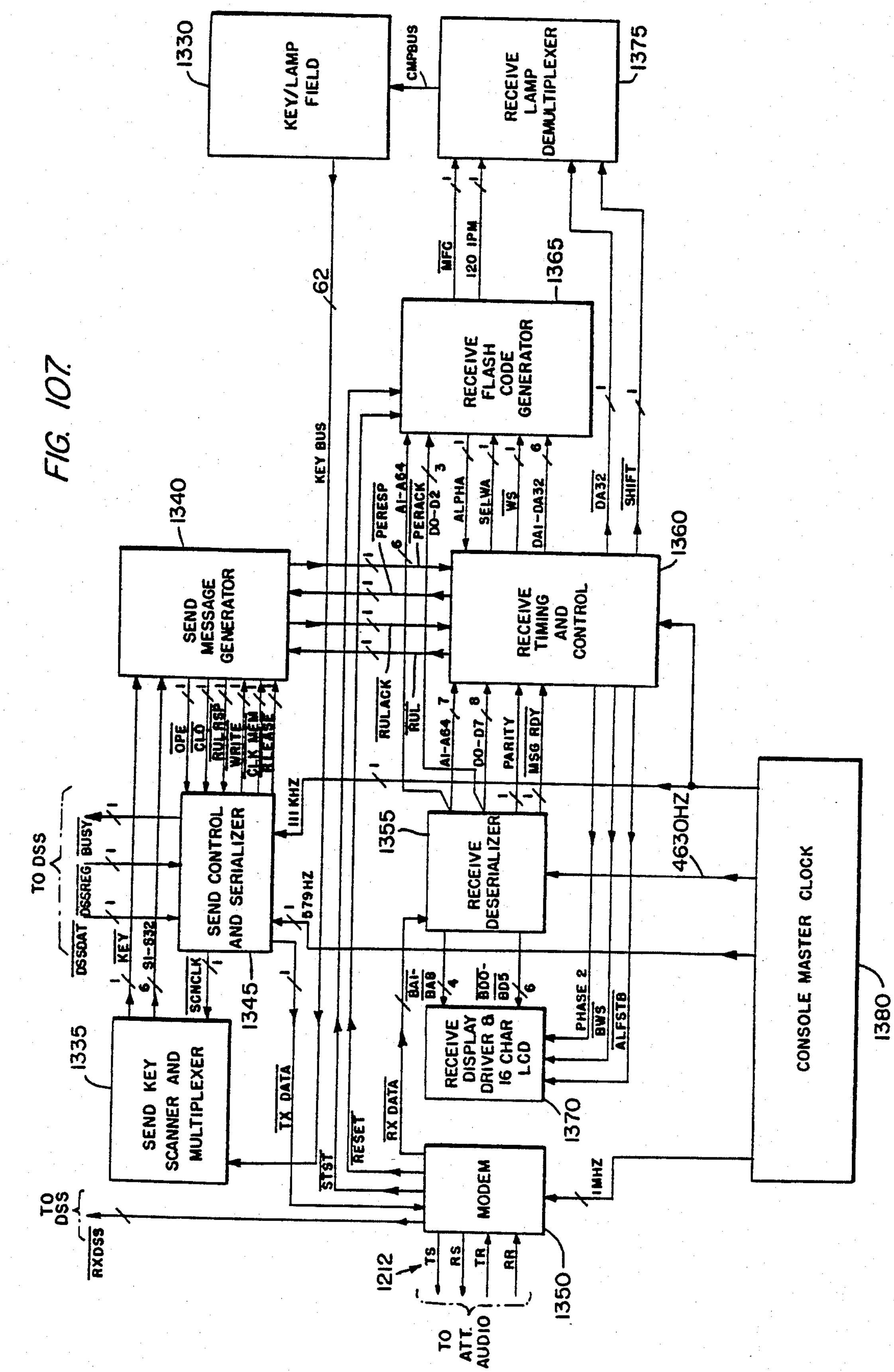
Figure 108:
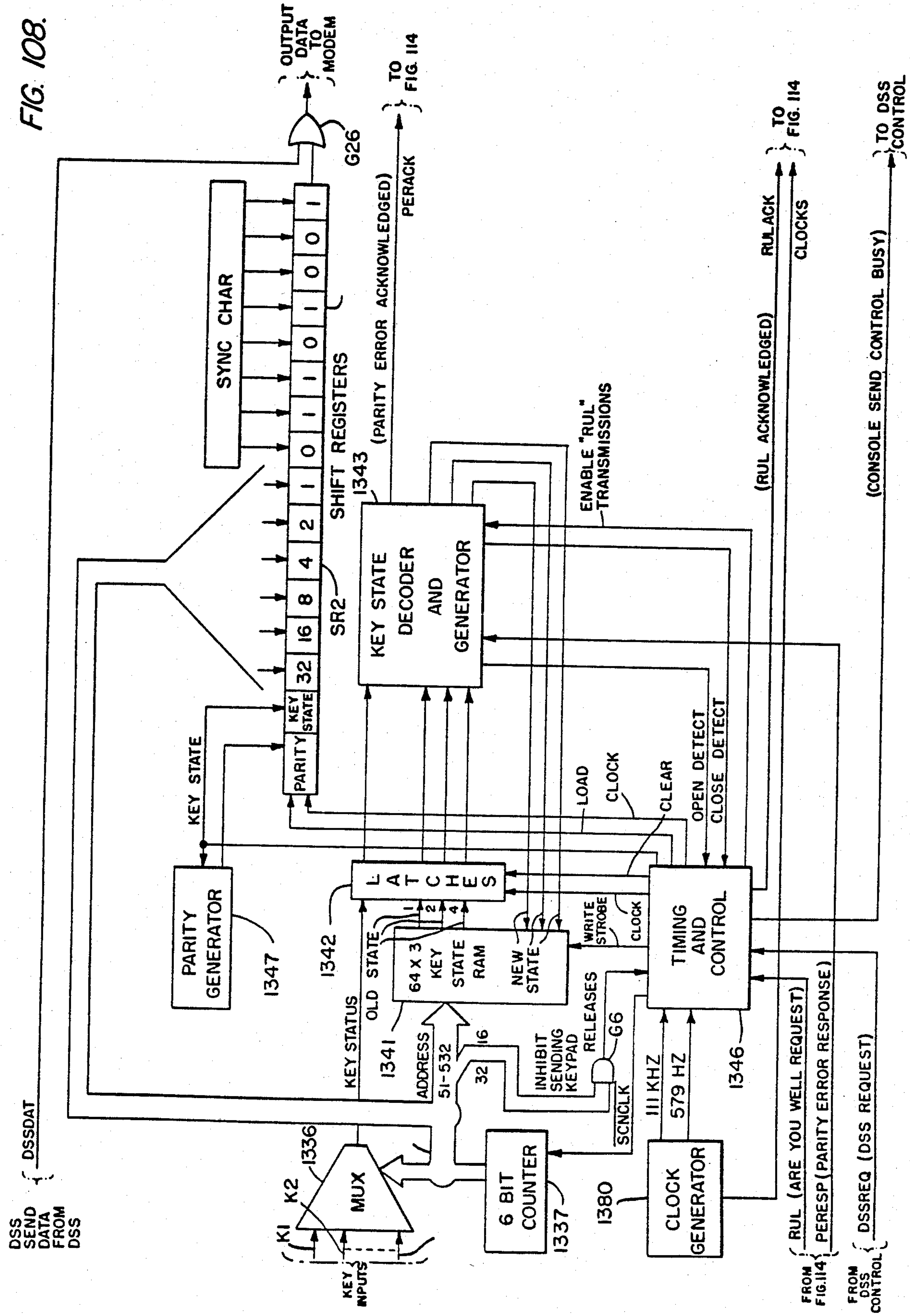
Figure 109:
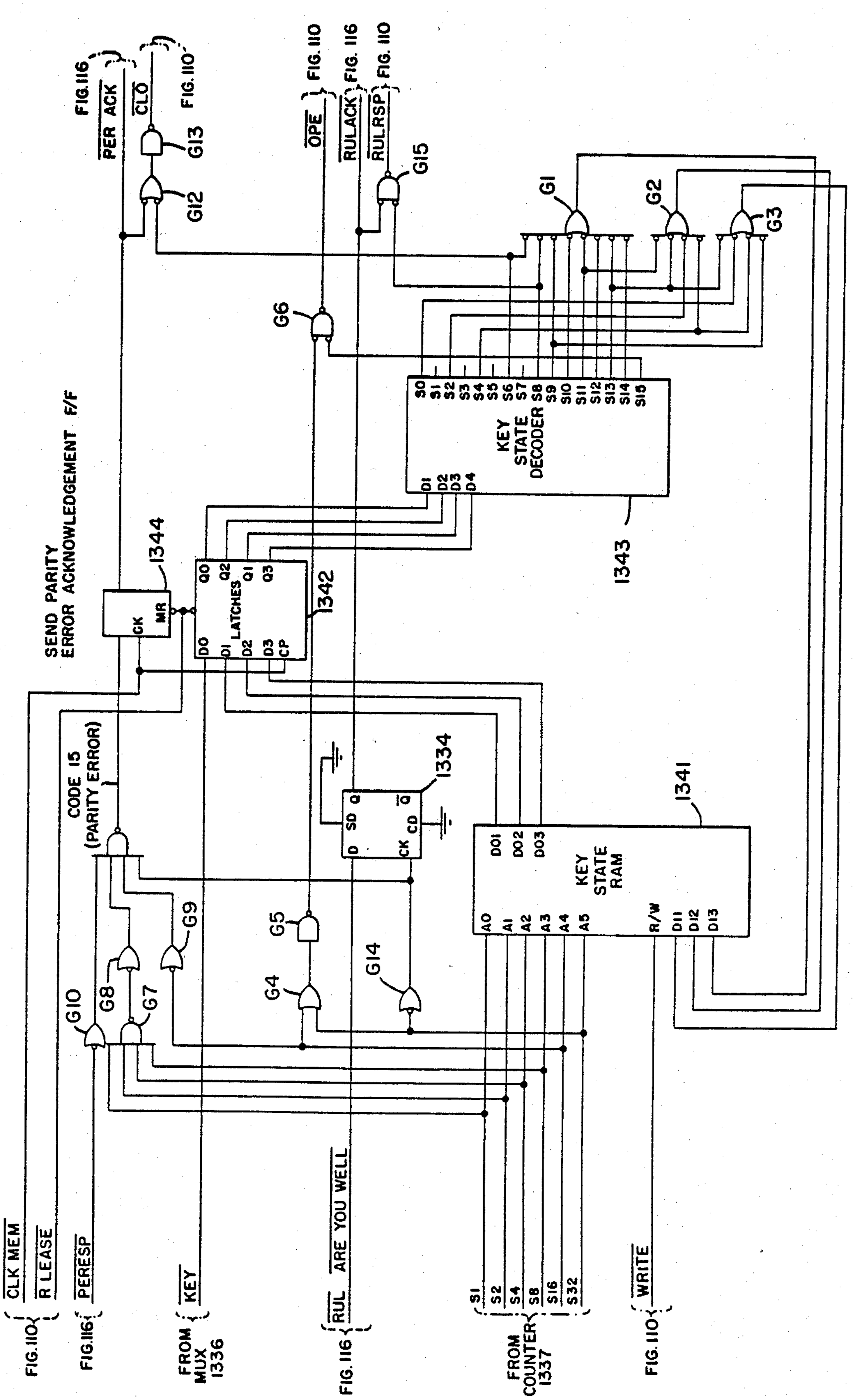
Figure 110:
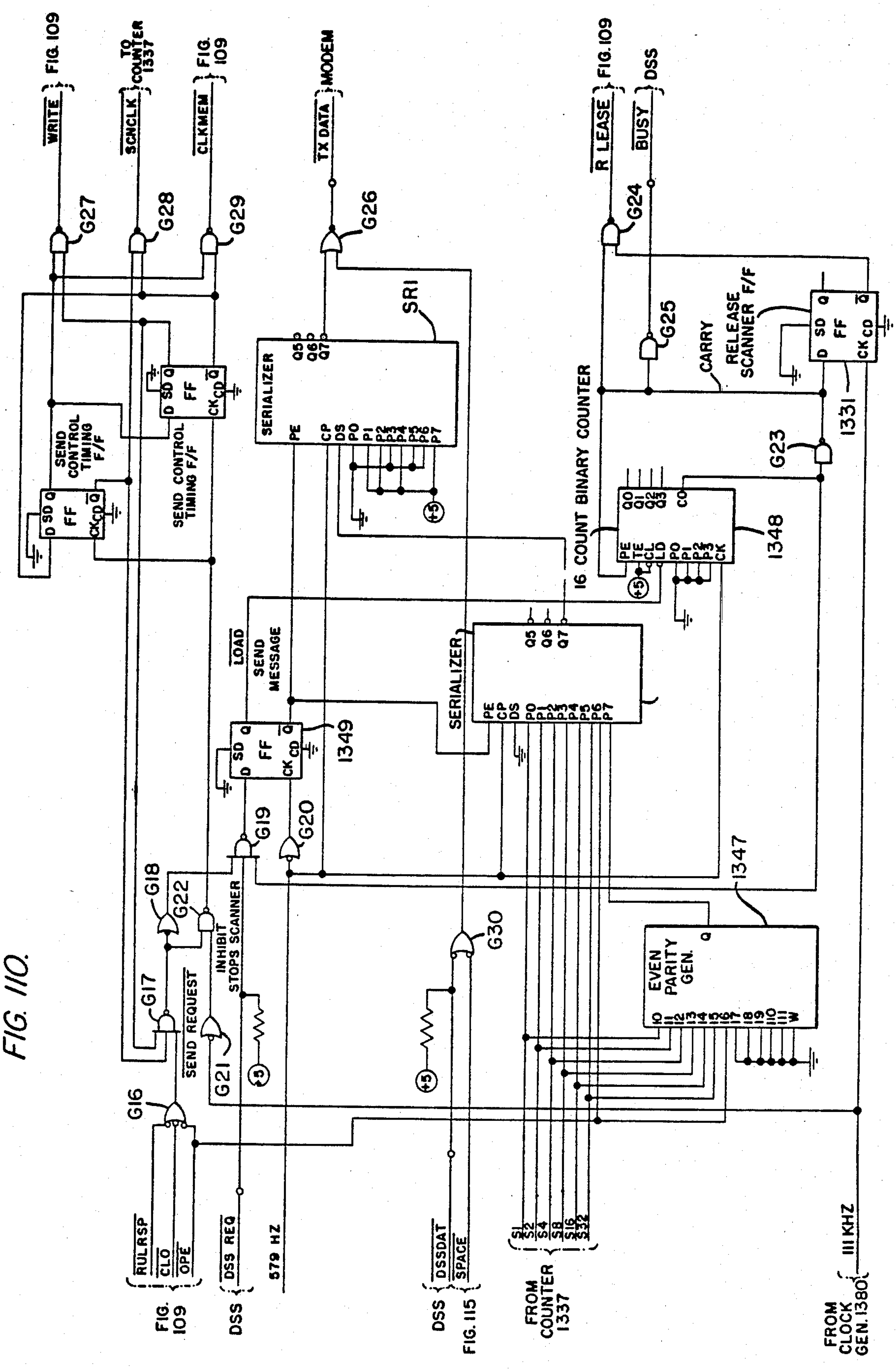
Figure 112:
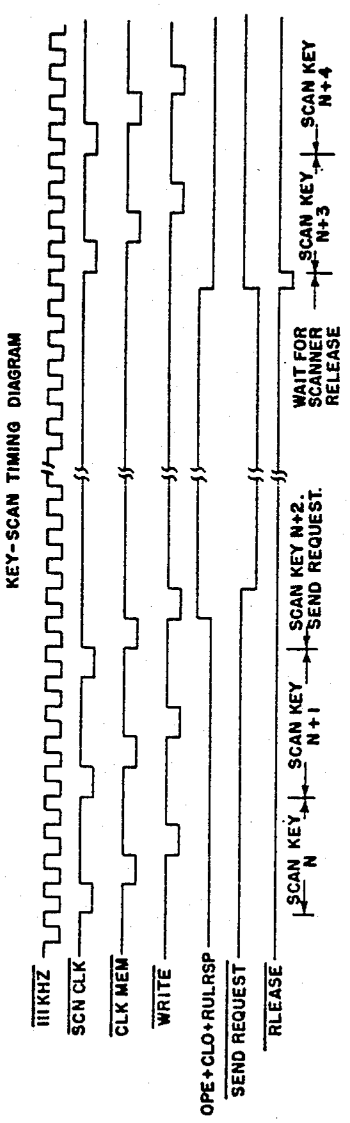
Figure 113:
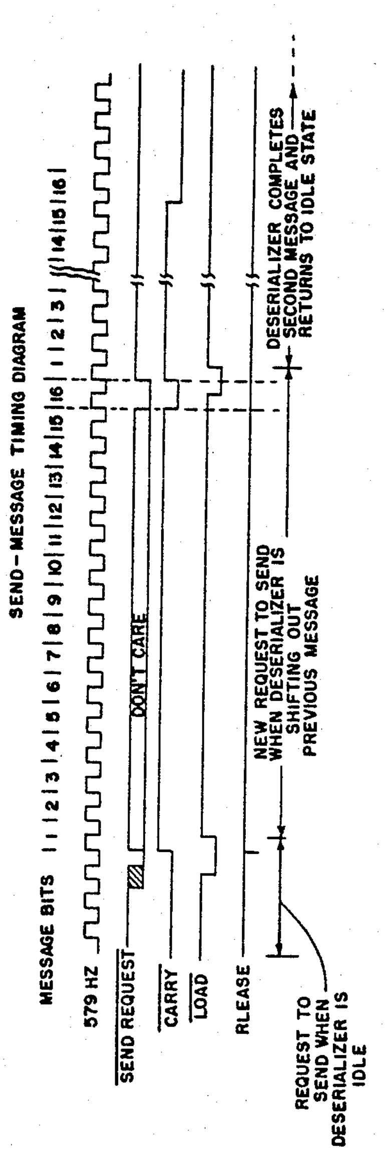
Figure 118:
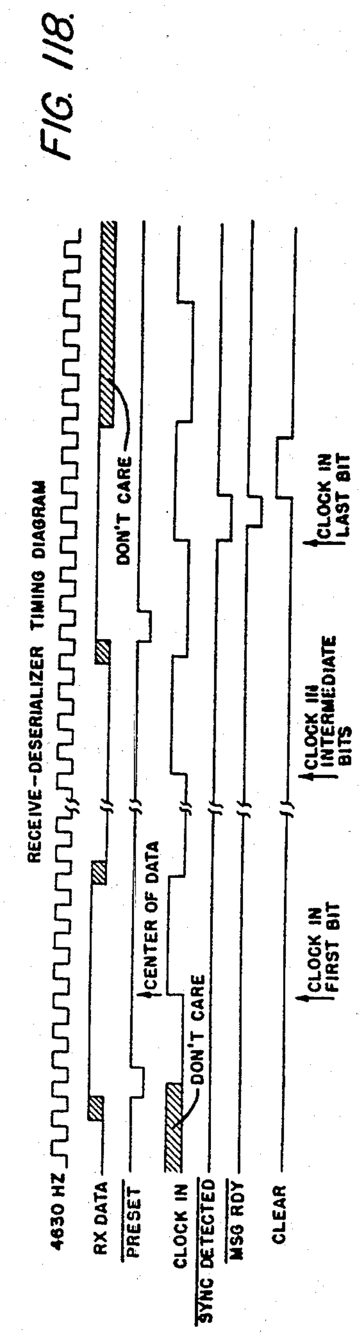
Figure 114:
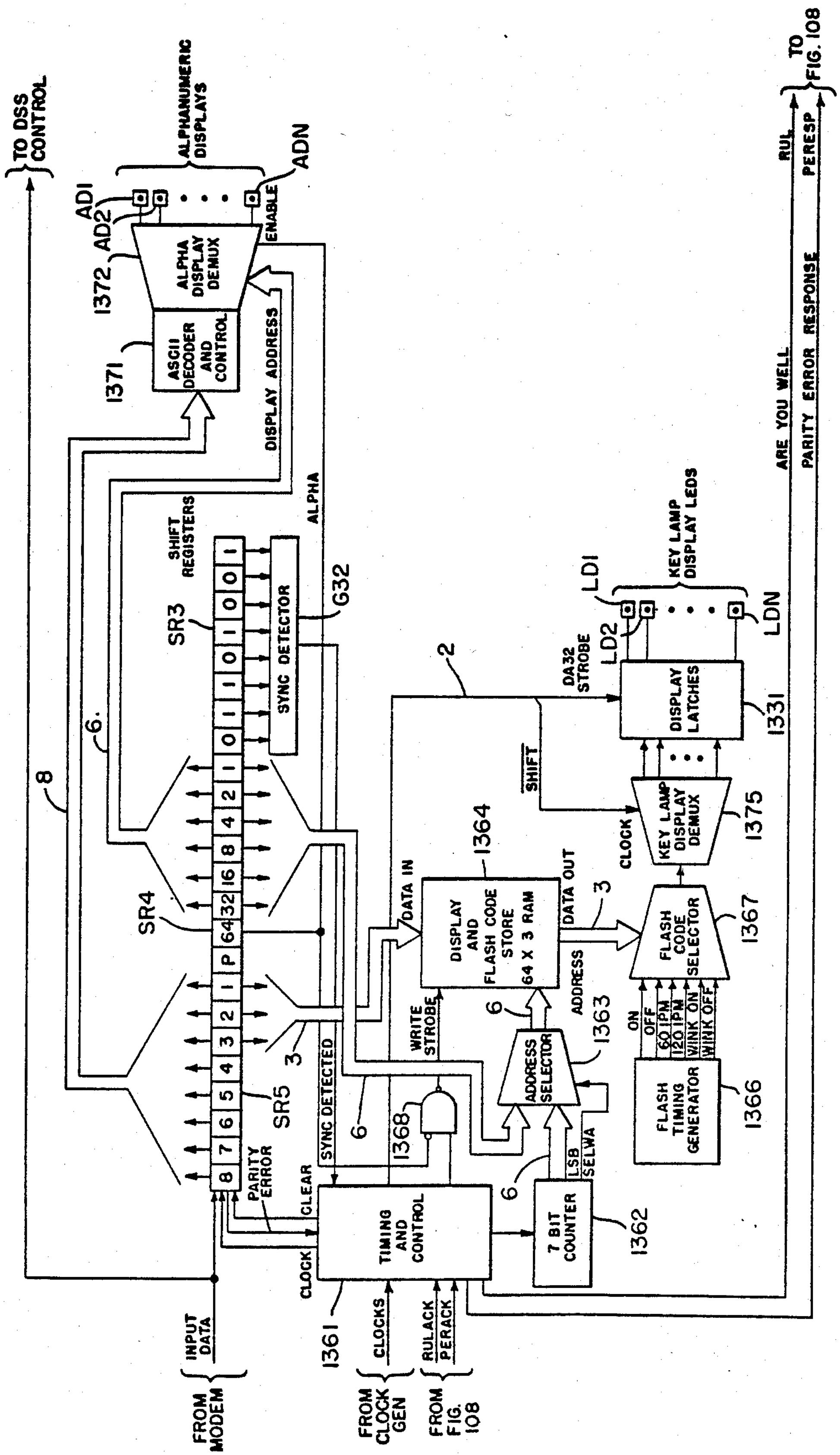
Figure 115:
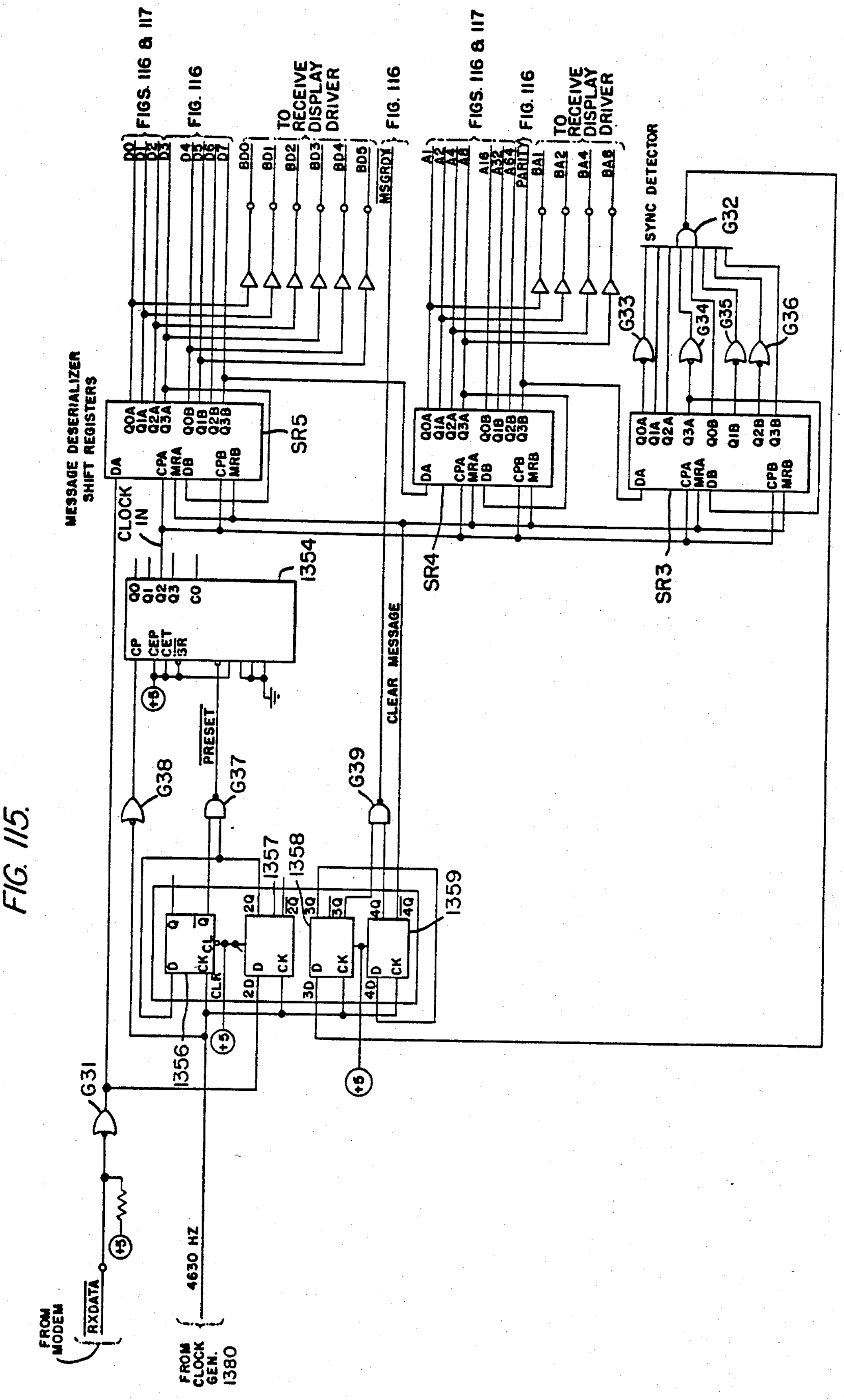
Figure 117:
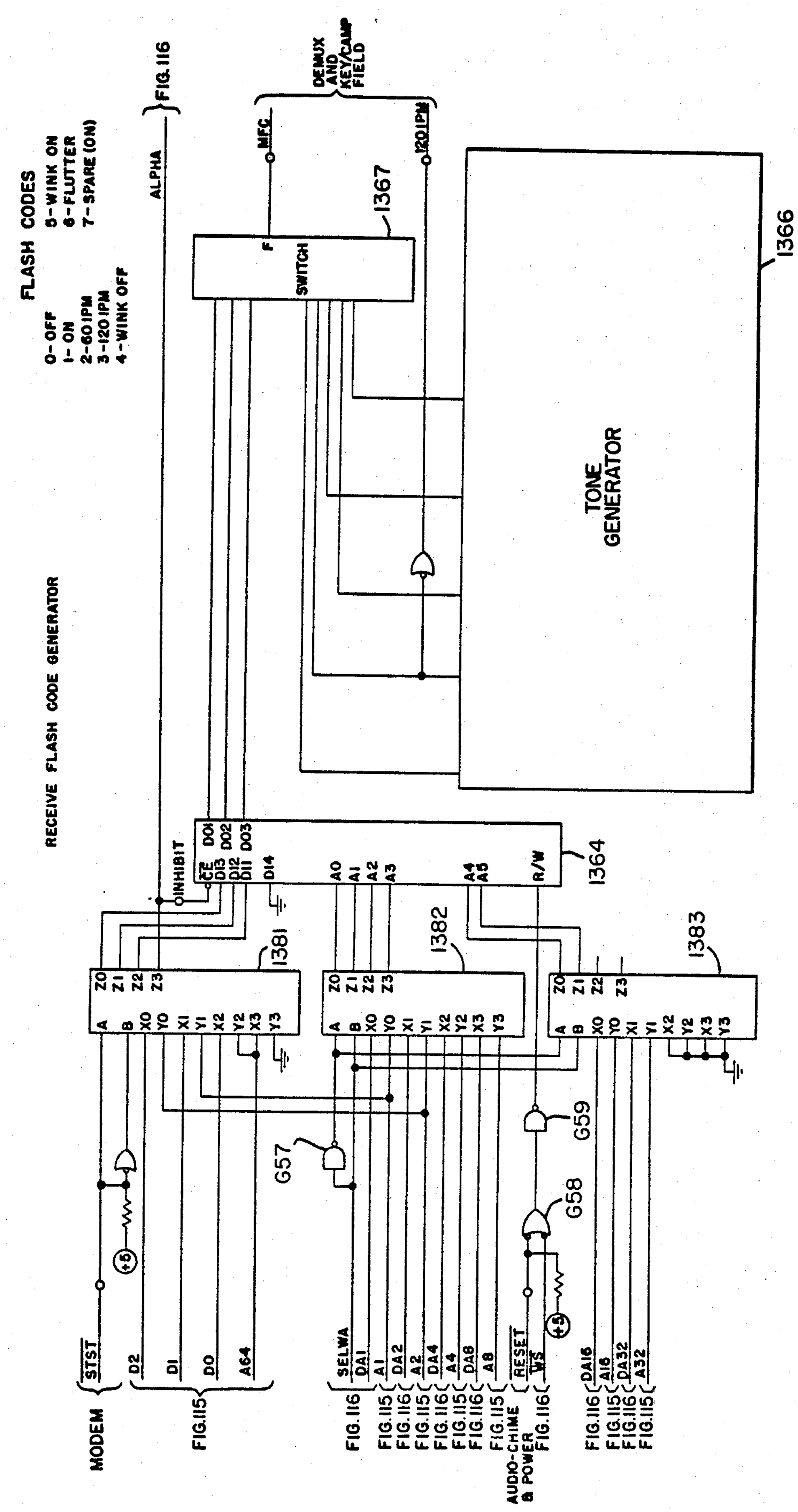
Figure 119:
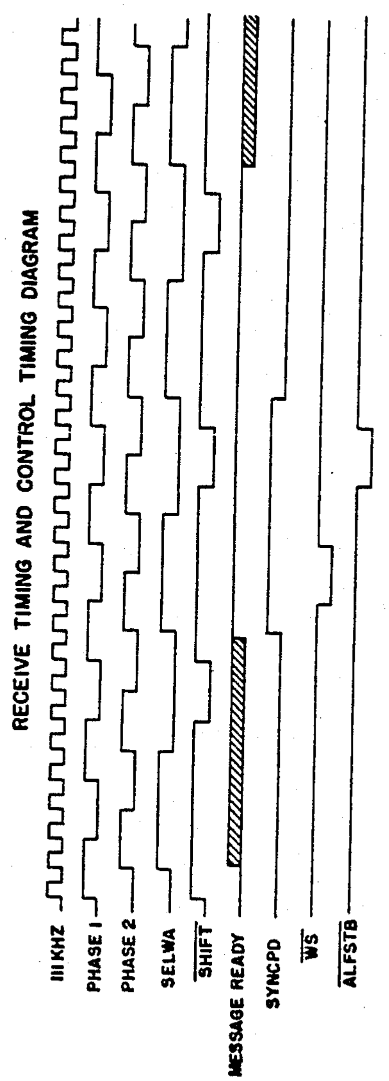
Figure 120:
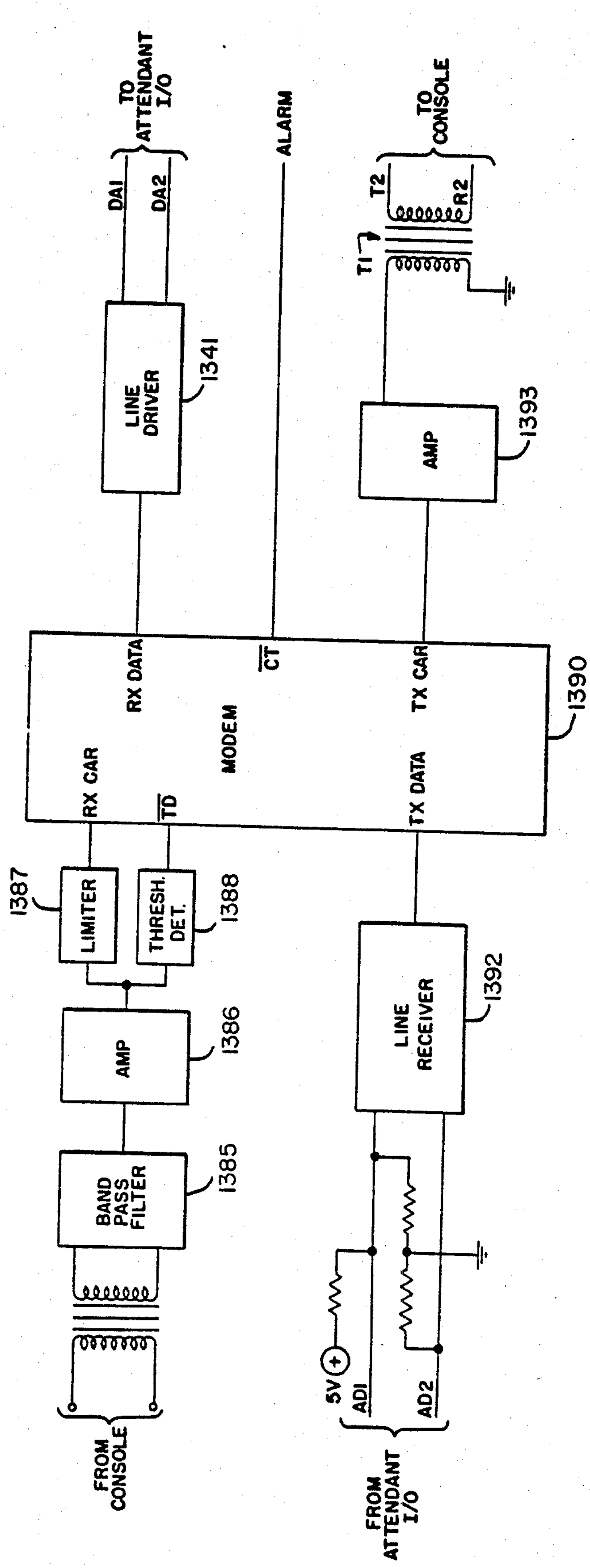
Figure 121:
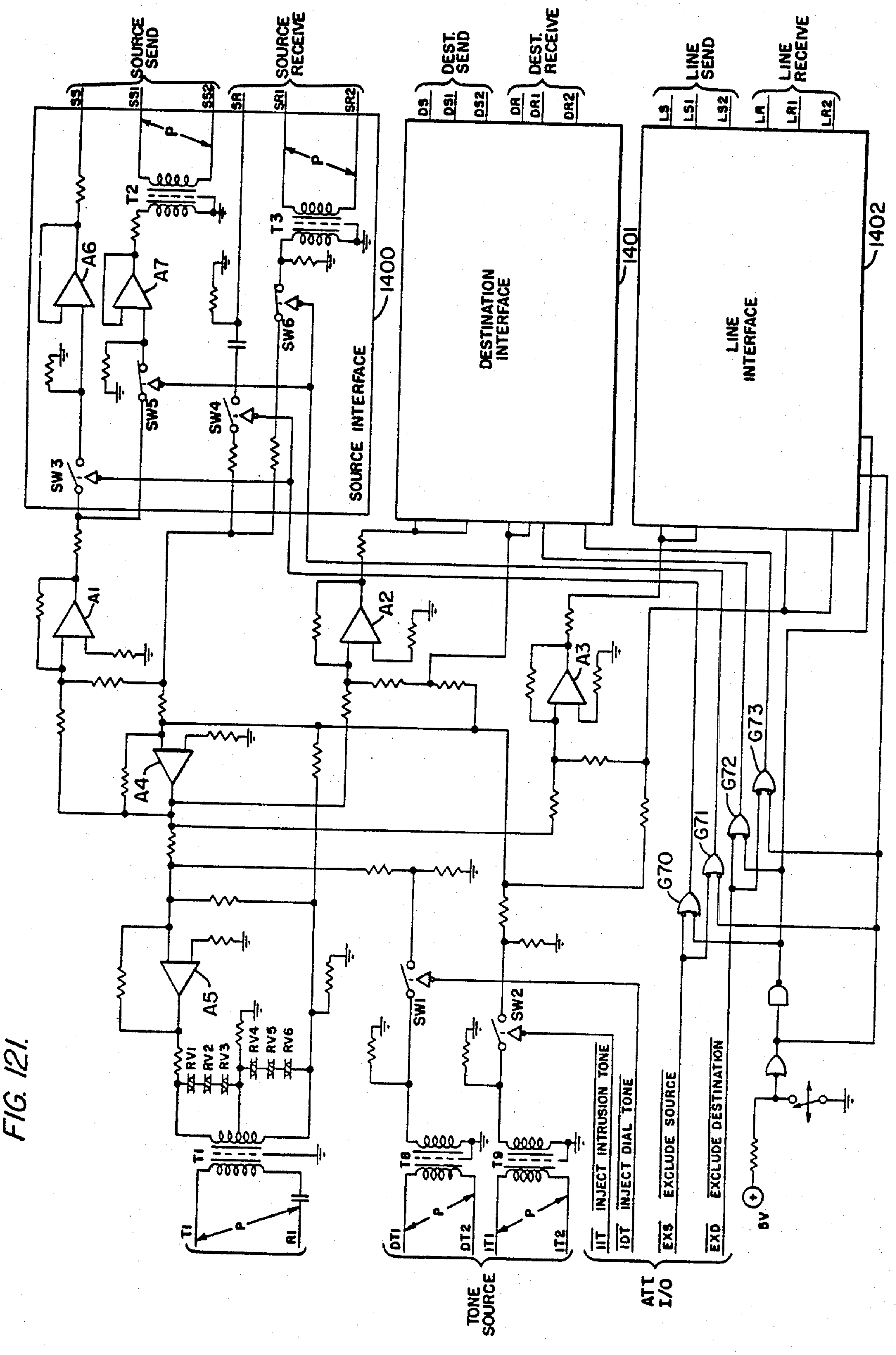
Figure 122:
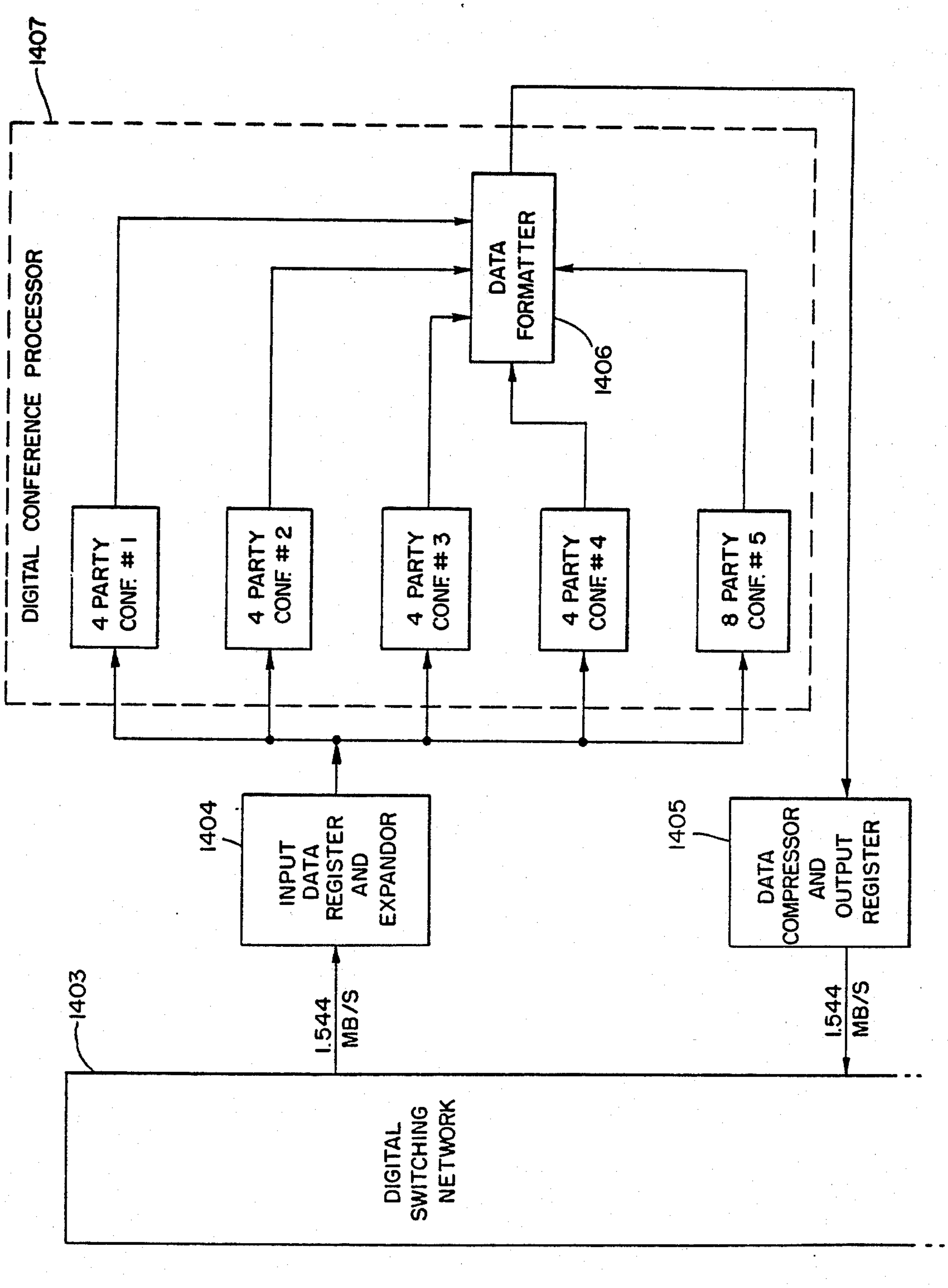
Figure 123:
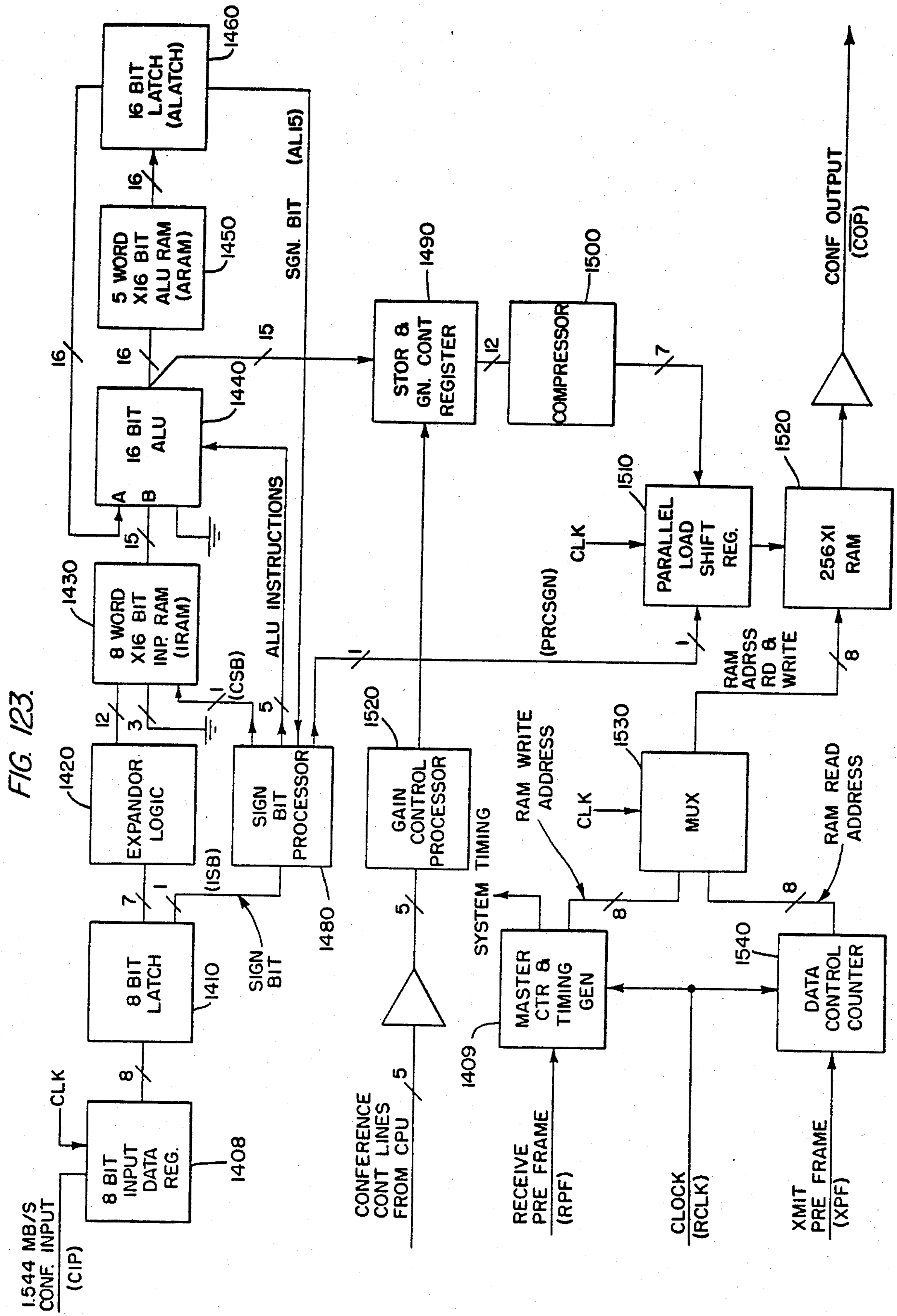
Figures 124A, 124B:
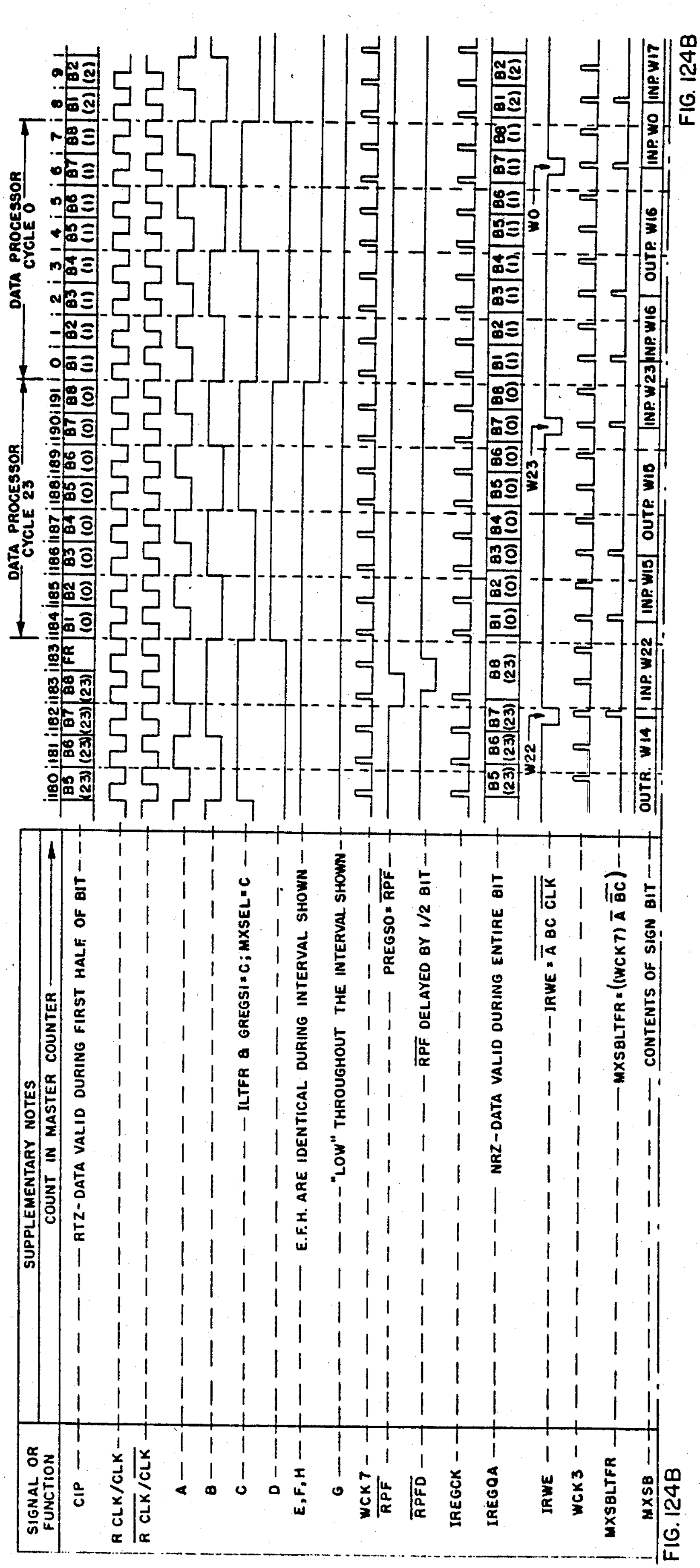
Figure 125:
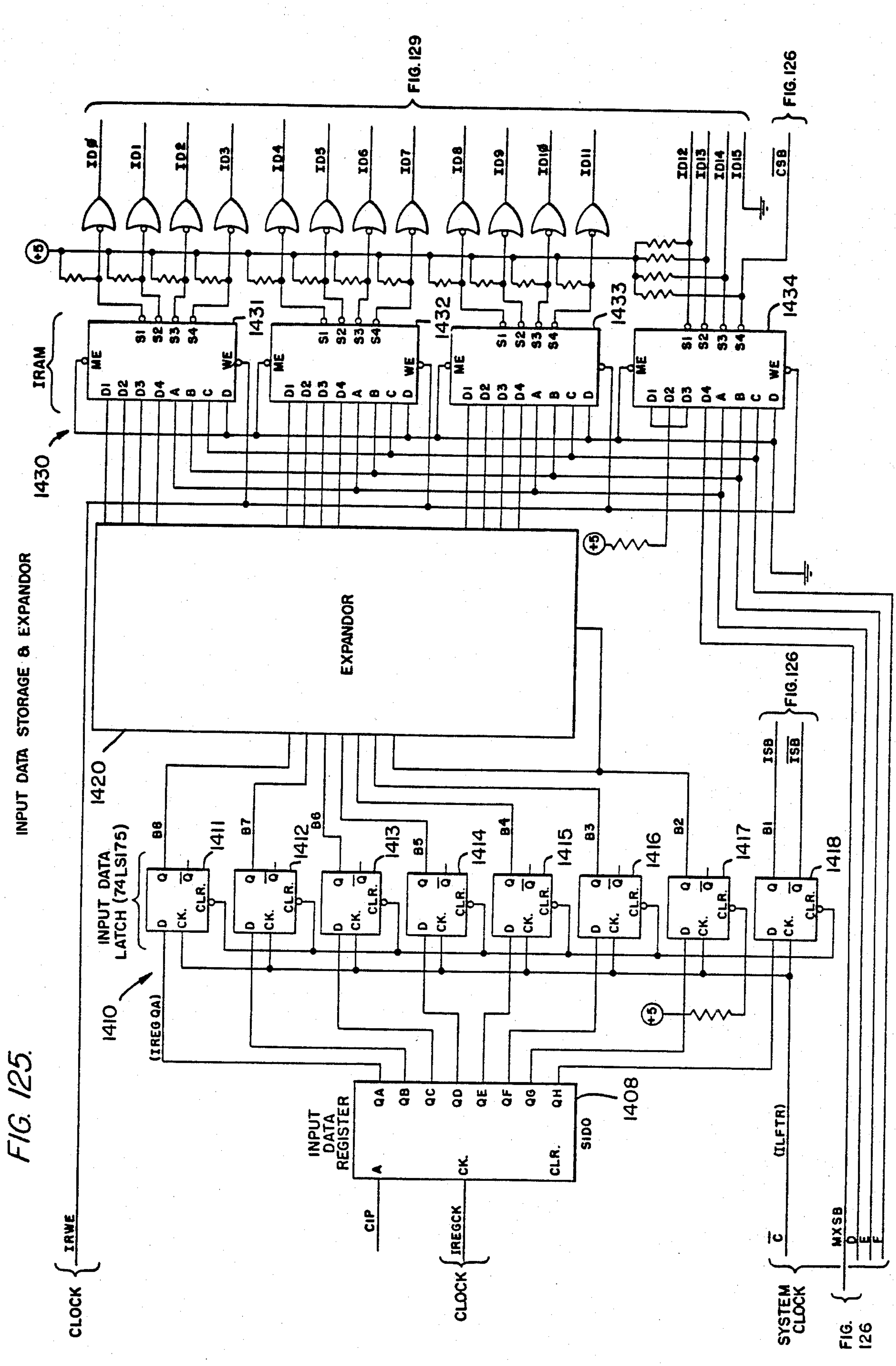
Figures 126, 127:
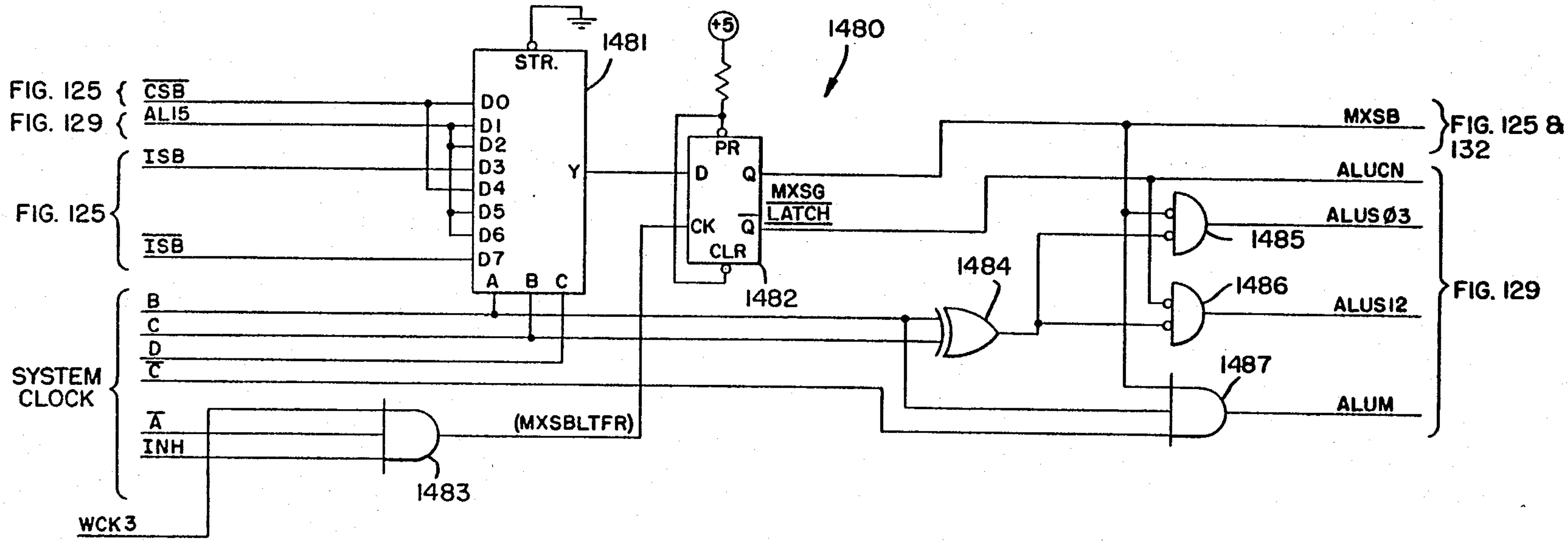
Figure 129:
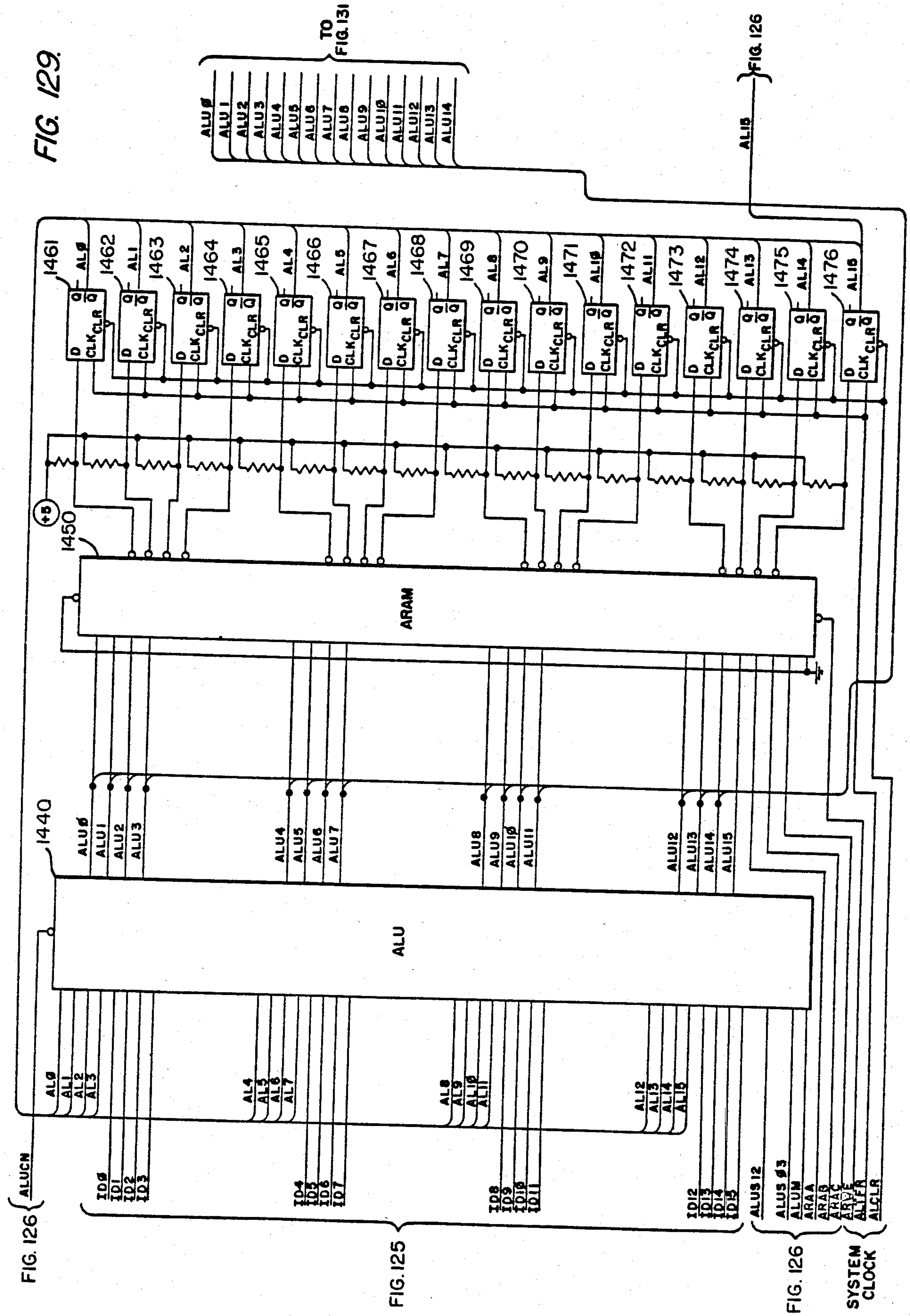
Figure 130:
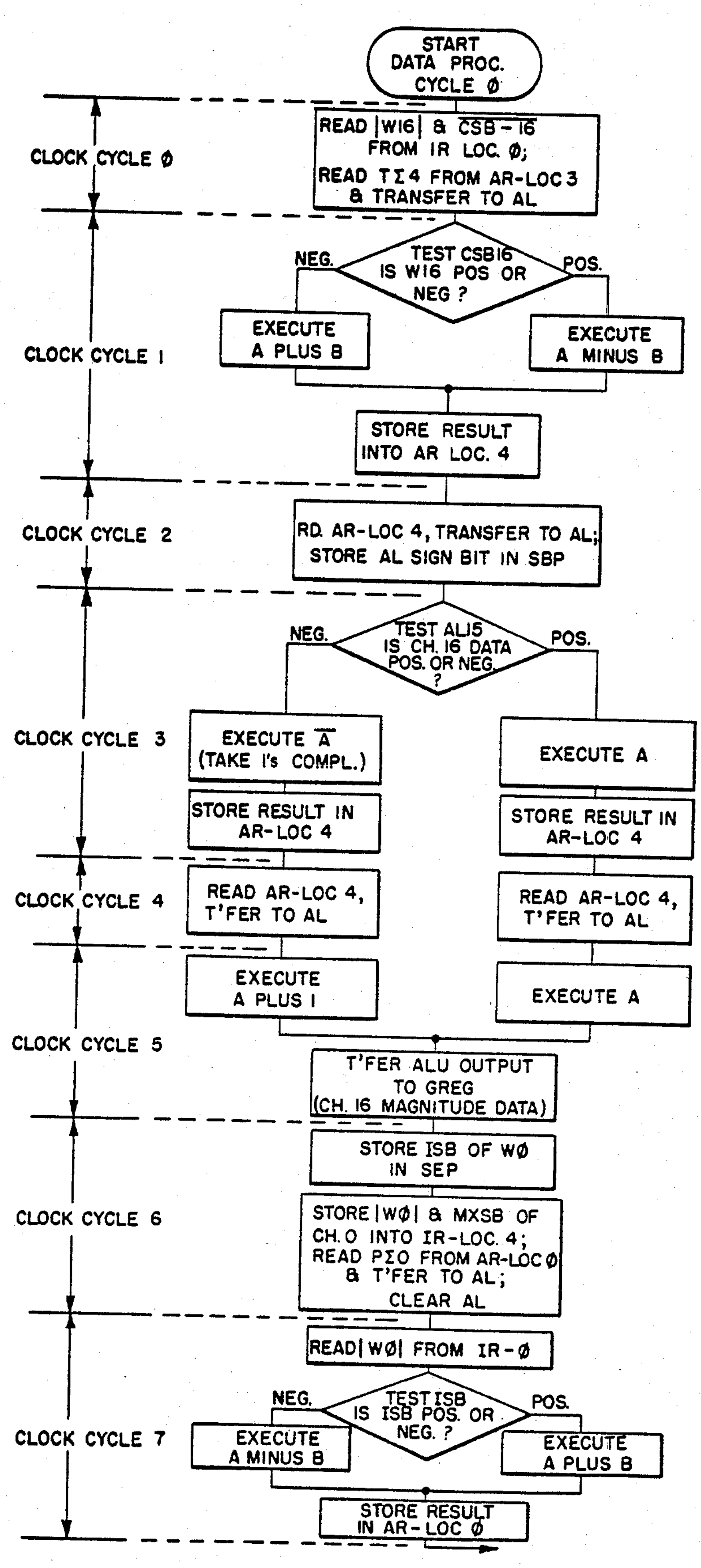
Figure 131:
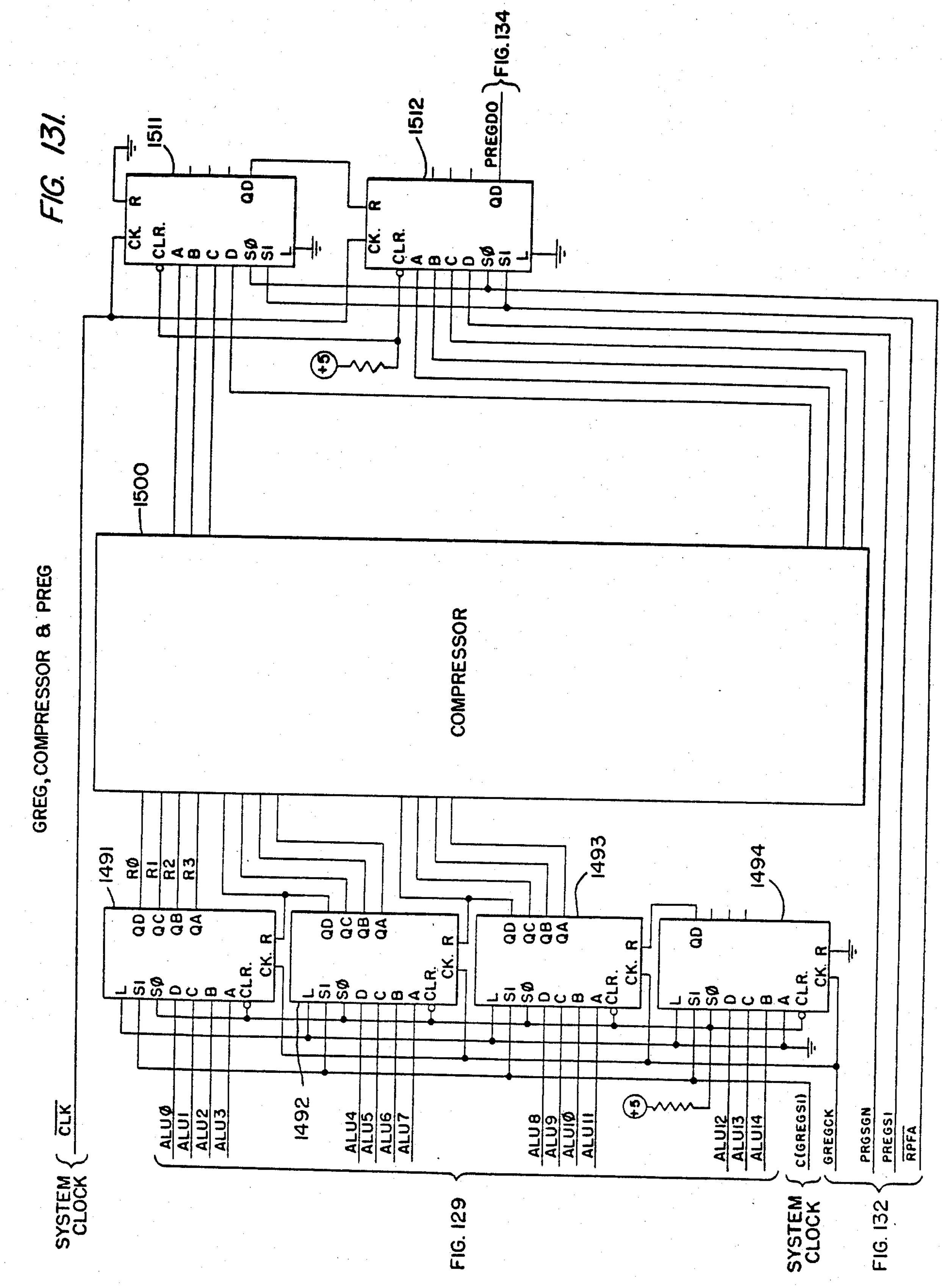
Figure 132:
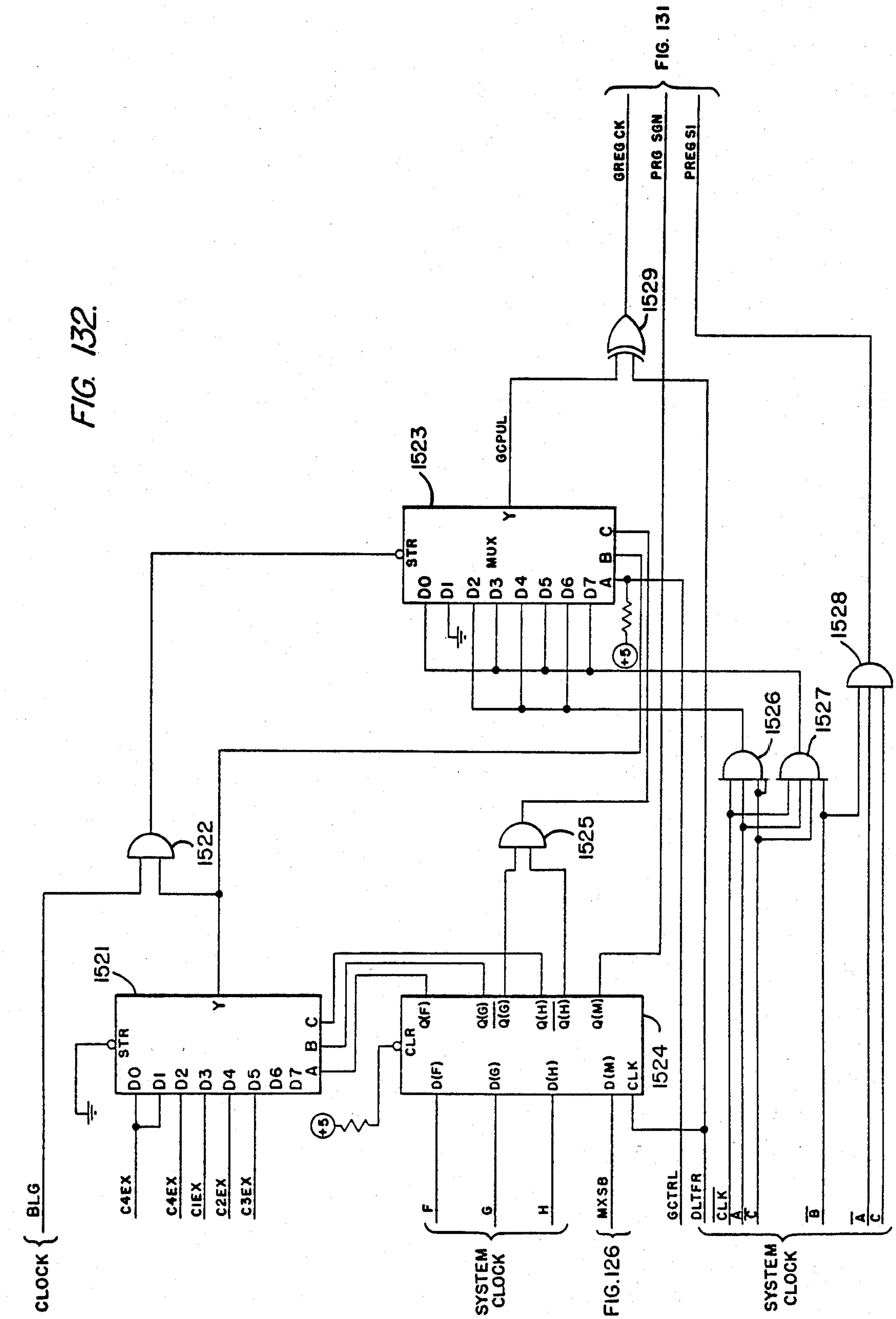
Figures 133, 135:
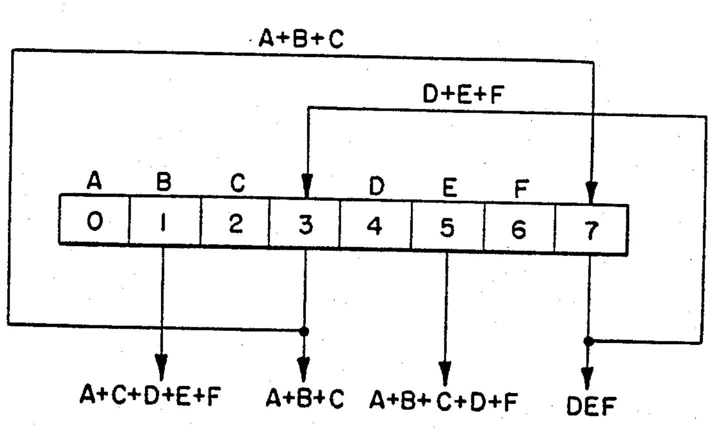
Figure 134:
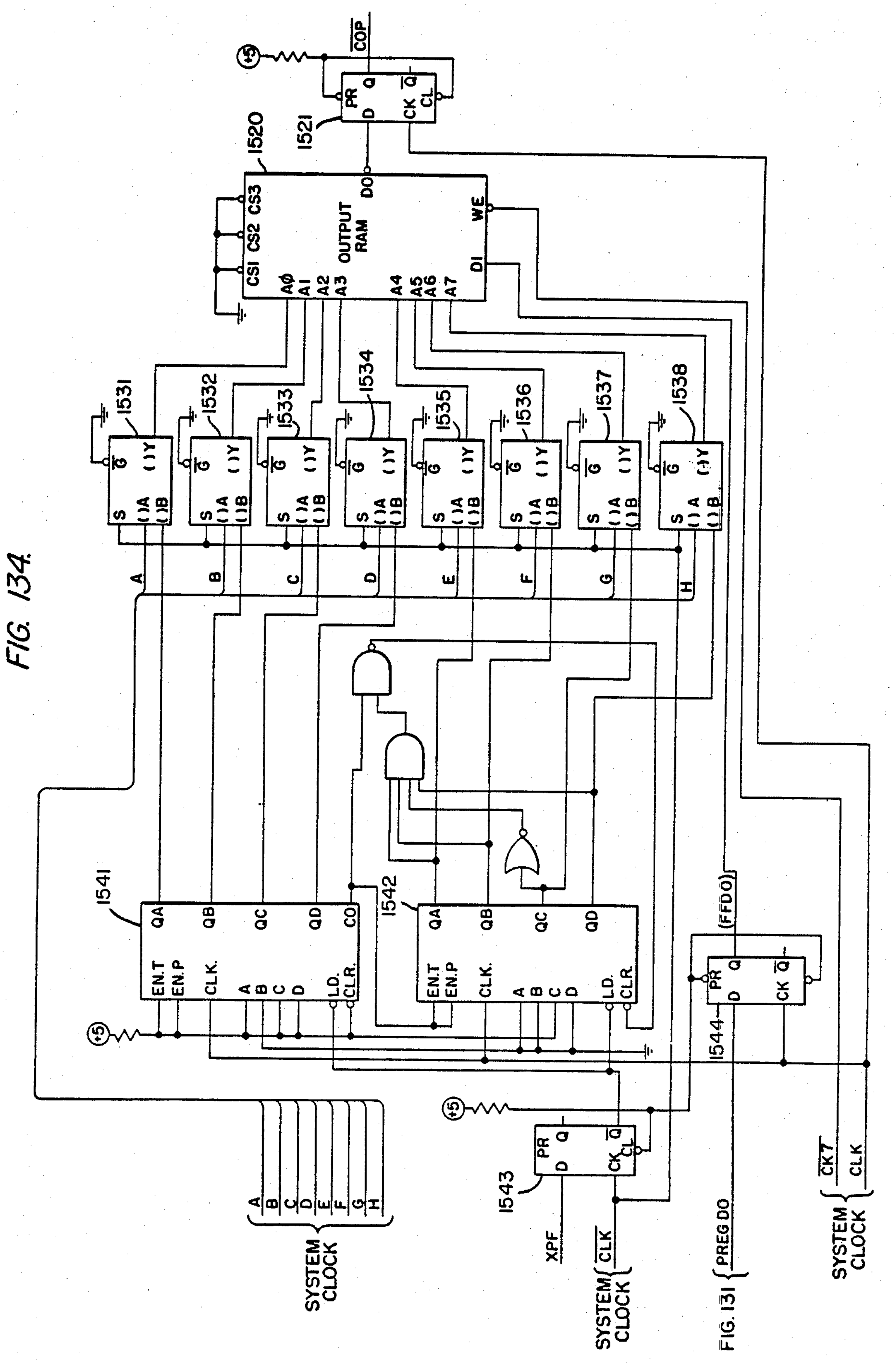

FIG. 11*a* is a schematic block diagram of the microport control;

FIGS. 11*b* and 11*c* are schematic diagrams of the memory layout of the ROM and RAM, respectively, in the microport control;

FIG. 12 is a schematic block diagram of the memory portion of the microport control;

FIG. 13 is a schematic block diagram of the control portion of the microport control;

FIG. 14 is a schematic diagram illustrating the communication between the microport control and the respective ports connected thereto;

FIG. 15 is a schematic circuit diagram of the status and port register control in the microport control;

FIG. 16 is a schematic circuit diagram of the port interface circuit in the microport control;

FIG. 17*a* is a schematic circuit diagram of the microprocessor unit and ACIA along with associated circuitry in the microport control;

FIG. 17*b* is a schematic diagram of the registers associated with the ACIA;

FIG. 18 is a schematic diagram of the transmission data forwarded to and from the microport control and the common control;

FIG. 19*a* is a schematic diagram of the reset and load signals received in the microport control;

FIG. 19*b* is a schematic diagram of the contents of the message register forwarded to the common control;

FIG. 20 is a schematic diagram of the message register in the microport control;

FIG. 21 is a schematic circuit diagram of the message register in the microport control;

FIG. 22 is a schematic circuit diagram of the reset and sync control circuit in the microport control;

FIG. 23 is a schematic diagram illustrating the format of the messages forwarded from the common control to the microport control;

FIG. 24 is a schematic diagram illustrating the format of the messages forwarded from the microport control to the common control;

FIG. 25*a* is a schematic diagram of the microport control software organization;

FIG. 25*b* is a schematic diagram of a typical operating superframe of the microport control;

FIG. 26 is a schematic diagram illustrating the relationship between the various microport controls and the microport control interface;

FIG. 27 is a schematic block diagram of the bus buffer;

FIG. 28 is a schematic block diagram of the microport control interface;

FIGS. 29 through 41 are schematic circuit diagrams of various circuits forming the microport control interface;

FIG. 42 is a schematic block diagram for the interrupt emcoder;

FIGS. 43 through 56 are schematic circuit diagrams of the various circuits which make up the interrupt encoder;

FIG. 57 is a schematic block diagram of the system TDM data transmission;

FIG. 58 is a schematic block diagram of the digital transmission network as embodied in the system of FIG. 6;

FIG. 59 is a schematic block diagram of the data conditioner;

FIGS. 60 through 66 are schematic circuit diagrams and waveform diagrams relating to the various circuits which make up the data conditioner;

FIG. 67 is a schematic block diagram of the matrix switch;

FIGS. 68 through 79 are schematic circuit diagrams, waveform diagrams, and schematic diagrams relating to the detailed circuits of the matrix switch;

FIG. 80 is a schematic circuit diagram of the differential transmission gates in the controller;

FIG. 81A is a schematic circuit diagram of a portion of the peripheral data bus buffer in the controller;

FIG. 81 is a schematic circuit diagram of the CPU command decoder in the controller;

FIG. 82 is a waveform diagram of the timing and control signals in the controller;

FIGS. 83*a*, 83*b*, 83*c* and 83*d* are schematic diagrams illustrating the format of the various messages transmitted between the controller and the central processing unit;

FIG. 84 is a schematic circuit diagram of the matrix data store;

FIG. 85 is a schematic circuit diagram of the matrix switch address and controller command store in the controller;

FIG. 86 is a schematic circuit diagram of the matrix data-out store;

FIG. 87 is a table illustrating the various commands from the controller which operate the matrix switch;

FIGS. 88 and 89 are flow diagrams illustrating the operation of the controller;

FIG. 90 is a schematic block diagram illustrating the operator complex and associated common control circuits;

FIG. 91 is a schematic block diagram of the attendant I/O circuit;

FIG. 92 is a schematic diagram illustrating the contents of the status register in the attendant I/O circuit;

FIG. 93 is a schematic diagram of the contents of the register and format of the messages supplied to the data-to-attendant register in the attendant I/O circuit;

FIG. 94 is a schematic diagram of the register contents and data format of the message supplied to the data-from-attendant register in the attendant I/O circuit;

FIG. 95 is a schematic diagram of the contents of the control-to-attendant audio register in the attendant I/O circuit;

FIGS. 96 through 106 are schematic circuit diagrams of the various circuits which make up the attendant I/O circuit;

FIG. 107 is a schematic block diagram of the control system of the operator console;

FIG. 108 is a schematic block diagram of the send control system in the operator console;

FIGS. 109 and 110 are schematic circuit diagrams of the send control system;

FIG. 111 is a table of key memory states and transitions;

FIGS. 112 and 113 are waveform diagrams of various signals appearing in the circuits of FIGS. 108 through 110;

FIG. 114 is a schematic block diagram of the receive control system of the operator console;

FIGS. 115, 116, and 117 are schematic circuit diagrams of the receive control system;

FIGS. 118 and 119 are waveform diagrams of various signals appearing in the circuits of FIGS. 114 through 117;

FIG. 120 is a schematic block diagram of the control portion of the attendant audio circuit;

FIG. 121 is a schematic circuit diagram of the audio portion of the attendant audio circuit;

FIG. 122 is a simplified conference diagram of the digital conference circuit;

FIG. 123 is a schematic block diagram of the digital conference circuit;

FIGS. 124A and 124B are waveform diagrams illustrating the various signals in the digital conference circuit;

FIG. 125 is a schematic circuit diagram of the input data register, intput data latch, expander and input RAM in the digital conference circuit;

FIG. 126 is a schematic circuit diagram of the sign bit processor in the digital conference circuit;

FIG. 127 is a logic truth table relating to the operation of the sign bit processor;

FIG. 128 is a table indicating the memory locations for the storage of the conference channels in the input RAM of the digital conference circuit;

FIG. 129 is a schematic circuit diagram of the arithmetic logic unit, ALU RAM and ALU LATCH in the digital conference circuit;

FIG. 130 is a flow diagram describing the operation of the arithmetic processing portion of the digital conference circuit;

FIG. 131 is a schematic circuit diagram of the gain control register, compressor, and parallel shift registers in the digital conference circuit;

FIG. 132 is a schematic circuit diagram of the gain control processor in the digital conference circuit;

FIG. 133 is a truth table explaining the operation of the gain control processor;

FIG. 134 is a schematic circuit diagram of the data control counter, multiplexer, and output RAM in the digital conference circuit; and FIG. 135 is a schematic diagram illustrating the manner in which conference groups are combined in accordance with the present invention.

TABLE OF CONTENTS

Title

A. General System Description
B. Exemplary Preferred Embodiment
  1. The Port Circuits
  2. The Microport Control
  3. The MPC Software
C. The Common Control
  1. The Bus Buffers
  2. The Microport Control Interface
  3. The Interrupt Encoder
D. The Digital Transmission Network
  1. The Data Conditioner
  2. The Matrix Switch 3. The Controller
E. The Operator Complex
1. The Attendant I/O Circuits
2. The Attendant Console
3. The Attendant Audio Circuit
F. The Digital Conference

A. GENERAL SYSTEM DESCRIPTION

Figure 1:
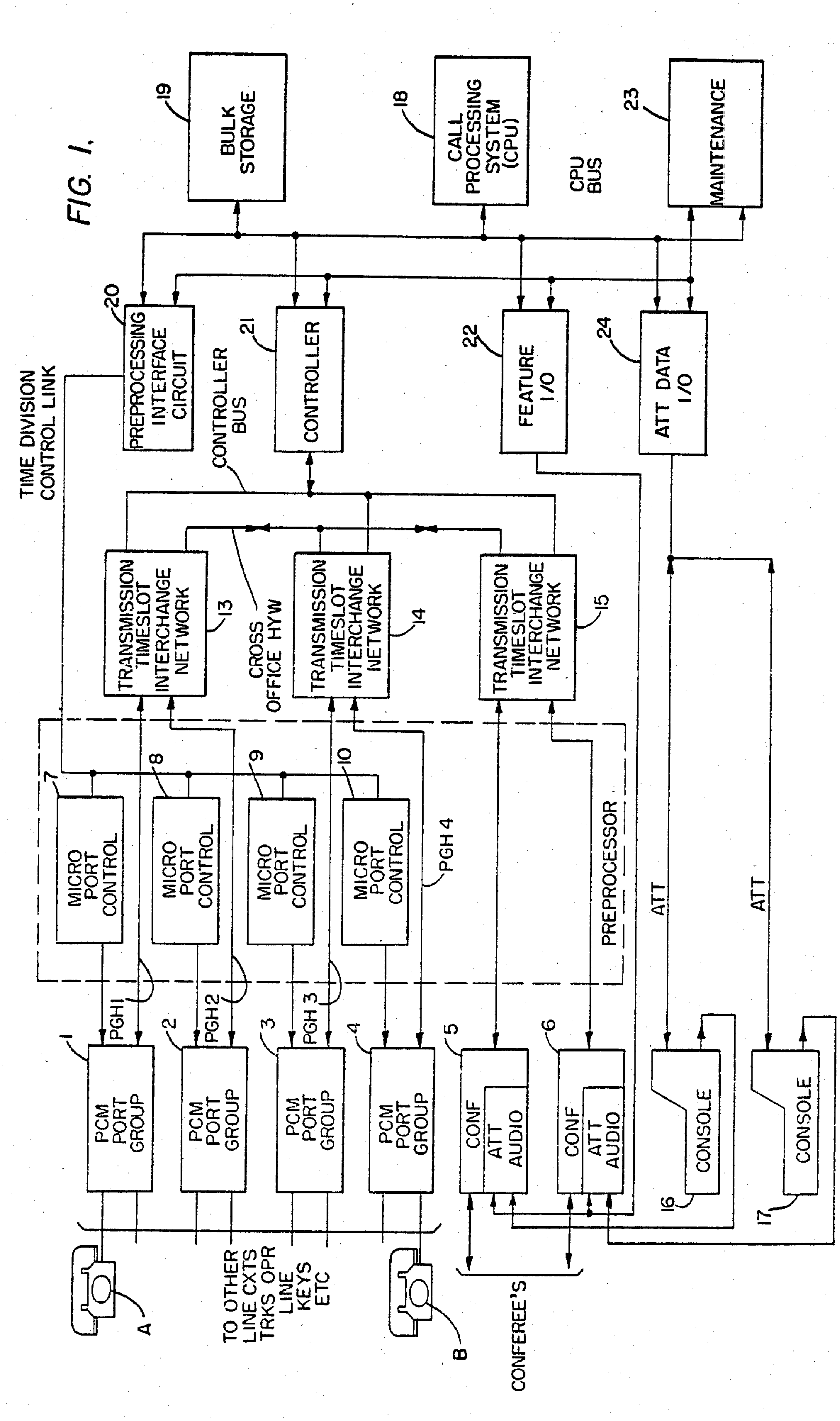
FIG. 1 is a simplified block diagram of a digital private automatic branch exchange embodying the principles of the present invention.

The basic principles of the present invention are illustrated in FIG. 1, which is a simplified block diagram of a digital private automatic branch exchange. As seen in this figure, the system includes a plurality of PCM port groups 1–4, each port group being formed by a plurality of ports, which may consist of line circuits, trunk circuits, operator line keys, etc. With each port group there is provided a pulse code modulation circuit which serves to convert voice signals to an eight bit PCM signal and also to multiplex signals received from the ports associated therewith for transmission on a multiplex highway as serial data. Multiplexed data in serial form received from the multiplex highway is also converted from eight bit PCM to voice frequency, demultiplexed, and applied to the appropriate port by the pulse code modulation circuit. Suitable filtering of signals to preserve quality of transmission for both outgoing and incoming data signals is also provided.

The system also includes one or more conference/attendant audio circuits 5 and 6 which permit the establishment of conference connections through the system and also provide an interface to the system for the operator consoles 16 and 17. Thus, the conference connections and attendant positions are provided as port appearances so as to appear similarly and be controlled in the same manner by the system as the line circuits and trunk circuits.

Associated with the port groups 1–4 is a preprocessor system comprising a plurality of individual microport controls 7–10 which handle all of the localized, real-time events for the respective port groups 1–4 including line administration, monitoring and control. Each microport control scans the ports of the port group with which it is associated, detecting line conditions and maintaining in memory an updated status of the condition of each port in the port group.

Interconnection between the ports, conference circuits, and attendant audio circuits are effected through a selected one of the transmission time slot interchange networks 13–15 to which the port groups 1–4 are connected by multiplex highways PGH1–PGH4 and which provide for time division digital switching under control of a call processing system 18, which may take the form of a conventional general purpose computer. All transmission paths are established by a time slot interchange using cross-office time slots on a cross-office highway based on conventional digital switching techniques. The call processing system 18 communicates with the transmission time slot interchange networks 13–15 via a controller 21 connected between the CPU bus and a controller bus extending to the respective transmission networks. On the other hand, communication between the call processing system 18 and the respective microport controls in the preprocessor system is effected by a preprocessing interface circuit 20, which is connected to the call processing system 18 via the CPU bus and with the microport controls 7 through 10 via a time division control link. Also associcted with the call processing system 18 via the CPU bus is a bulk storage 19 forming the main memory for the system 18 and a maintenance system 23, which performs the maintenance functions with the system.

The system includes various input/output interface circuits, such as the circuit 22, which provides for communication between the call processing system 18 and the conference/attendant audio circuits 5 and 6 for controlling conference functions. In addition, an attendant data input/output interface circuit 24 provides for communication between the call processing system 18 via the CPU bus and the respective attendant consoles 16 and 17.

In describing the operation of the system of FIG. 1, it will be assumed that subscriber A is seeking to communicate with subscriber B, who is also within the same system; however, the same procedure applies to connection of subscriber A to a trunk circuit for calls going out of the system.

The microport control 7 scans the various ports associated with port group 1 on a continuous basis looking for off-hook conditions, monitoring dial pulses and line conditions and storing these signals as well as the status of each port. Thus, the various ports of the port group 1 may be inactive, in a dialing condition or in a talking state at the time subscriber A goes off hook. When the off-hook condition is detected, dial tone is returned to subscriber A through the port group 1 and the subscriber may then commence dialing. By monitoring the line conditions of the ports associated with port group 1, the microport control 7 detects the dialing signals generated by subscriber A, stores the accumulated signals and converts them to dialed digits identifying the destination of the call.

These dialed digits are to be forwarded to the call processing system 18 over the time division control link and through the preprocessing interface circuit 20 to the CPU bus. In this regard, the microport control 7 may wait until all dialed digits have been received, or it may forward digits to the CPU 18 as they are received individually or in combinations. How this is done is determined by the CPU based on its availability. The preprocessing interface circuit continually scans the microport controls 7–10 and serves as a demultiplexer of the signals received on the time division control link from these circuits as well as an interface for the control signals and data forwarded from the CPU 18 to the microport controls.

Based on the dialed digits received from the microport control 7, the CPU 18 performs the necessary translation to determine the equipment number of the port to which subscriber A is to be connected. That destination port may be a line circuit for an internal call, a trunk circuit for an outgoing call, or an attendant via an attendant audio circuit; however, in the present example, the port is the line circuit of subscriber B. Ringing is applied to B's line by the called microport control 10 at this point and ringback tone is returned to party A. The CPU 18 assigns a cross-office time slot to the call and forwards this assignment via the CPU bus and the controller 21 to the time slot interchange networks 13 and 14, which then interconnects port group 1 with port group 4 over the cross-office highway at the assigned times within the recurring time frame according to conventional digital switching techniques. In this regard, it should be noted that the particles are not interconnected until all supervisory tasks have been completed.

The port group 1 converts the voice signals from subscriber A to eight bit PCM and multiplexes this data on the port group highway PGH1 along with voice PCM data from other ports forming part of port group 1. The data from subscriber A is then switched through the time slot interchange networks 13 and 14 and applied on port group highway PGH4 to port group 4 where the data is demultiplexed, converted to voice frequency and applied to the subscriber B line.

The bulk storage 19 connected to the CPU 18 via the CPU bus, in addition to providing the memory necessary to store program instructions and data for CPU operation, serves as a program backup where a volatile memory is used, providing for memory loading and program interchange.

As can be seen from FIG. 1, the present invention provides a stored program system which uses time division digital switching networks as the transmission medium with control being centered on a two-level hierarchal network of digital processors. Common control functions including control over transmission switching, all necessary translation of data and regulation of general system features is effected by the call processing system 18 which is provided in the form of a central processing unit of the general purpose computer type. On the other hand, satellite microprocessors provide for all preprocessing of localized, real-time events for port and service circuits with a microport control being associated on an individual basis with each port group and service group. Such a division of control within the system provides the advantage of eliminating total system failure upon failure of the preprocessing circuitry associated with any given port group, and thereby also eliminates total redundancy requirements in the common control portion of the system. A further advantage of this two-level hierarchal approach to control functions is that the central processing system may be of a general purpose type while relatively inexpensive microprocessors are utilized for the microport controls. In addition, this arrangement allows one microprocessor group to be programmed differently from the other groups for special features providing increased flexibility in the system.

The microport controls 7 through 10 operate completely independently of one another, communicating only with the call processing system 18. In this communication with the call processing system 18, the microport control acts as the slave and the call processing system operates as the master. Thus, when access to the central processing unit is desired, the microport control indicates its status to the preprocessing interface circuit 20 so that the call processing system 18 in its surveilance of the status of the microport controls 7–10 can determine that its services are required and selectively authorize the transfer of data from the microport control to the CPU bus. In this regard, the preprocessing interface circuit 20 continuously scans the microport controls 7–10 and stores the status information received from each microport control for the information of the call processing system 18. The call processing system 18 may then communicate with the microport control through the preprocessing interface circuit 20 to obtain information therefrom concerning the ports in the port group associated therewith and to initate control functions as necessary to effect time slot interconnection of selected ports or service circuits through the transmission time slot interchange networks 13–15. In this regard, the controller 21 controls and monitors the digital transmission network in accordance with the call processing system commands and provides feedback of network status to the call processing system upon request.

Figure 2:
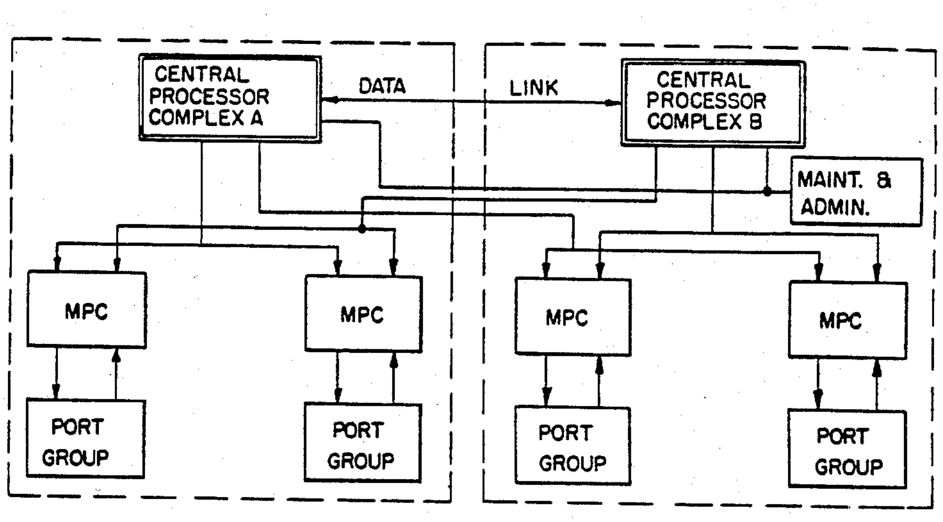
FIG. 2 is a block diagram illustrating a distributed centralized control system.
Figure 3:
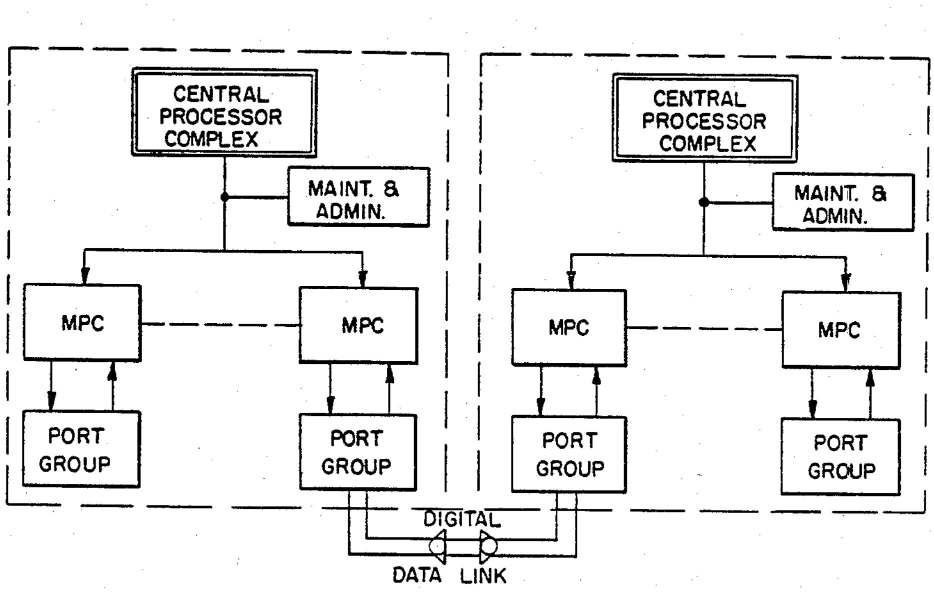
FIG. 3 is a block diagram illustrating a distributed decentralized control system.

The use of a preprocessing system for handling real-time events for port and service circuits lends itself to the type of distributed control which can effectively provide at low cost relatively small systems as well as large systems. The control system for distributed control can be implemented in two ways, as seen in FIGS. 2 and 3. FIG. 2 illustrates a distributed centralized control system in which a data link interconnects the central processor complex of a pair of subsystems permitting interchange of the control data, as well as interconnection of the respective transmission highways. On the other hand, FIG. 3 illustrates a distributed decentralized control arrangement in which the respective subsystems are interconnected through selected port groups by a digital data link. Both applications employ the same basic concept and only differ in their interconnection with each other. Therefore, greater modularity is obtained without sacrificing the low-cost advantage of the system and the feature capability.

Since each microport control has decision-making capability, all minor decisions with respect to the ports are made by the microport control. All decisions that have to do with the system network, as well as translation and the data base, are handled by the call processing system 18. The microport control works with the real-time data so that the main central processing unit is thus relieved of the harsh real-time demands it would normally face if it were to control a large switching system. Each microport control gets a real-time interrupt spaced five milliseconds apart and uses this clock interrupt to schedule its workload. The microport control software essentially requires programs in sequence and includes an interrupt-handling program which decides what type of work is due in the current five millisecond time frame. After this decision is made, control is transferred to a port-group input/output program to update the port. Once the port group input/output program is completed, the control is advanced to a scanning program. The control thus keeps transferring to various programs as required by the state of the ports. With the next five millisecond interrupt after the last program is executed, the control is returned to the interrupt handling program.

The software structure in a switching system is intimately interwoven into the hardware design and it is the hardware which recognizes the stimulus from the environment. A call originates when a port circuit recognizes an off-hook or seizure condition. This fact is immediately known by the hardware, directly connected to the port, and relayed to the mechanism which has control of connecting stations to stations. When a microport control finds a supervisory event requiring action, the equipment number corresponding to the port and the event code are entered into a hardware queue. Thus, off-hook is recorded in the microport control. Processing the call from this point on requires the software contained within the call processing system 18.

The attendant has access to the call processing system 18 via a data link which is separate from the network. It is, in effect, a direct link to the call processing system software, passing from an attendant hardware interface to an internal software queue, using an interrupt technique. From one of the two sources, station or attendant, all call-related internal stimulii is made available to the software for processing.

Figure 4:
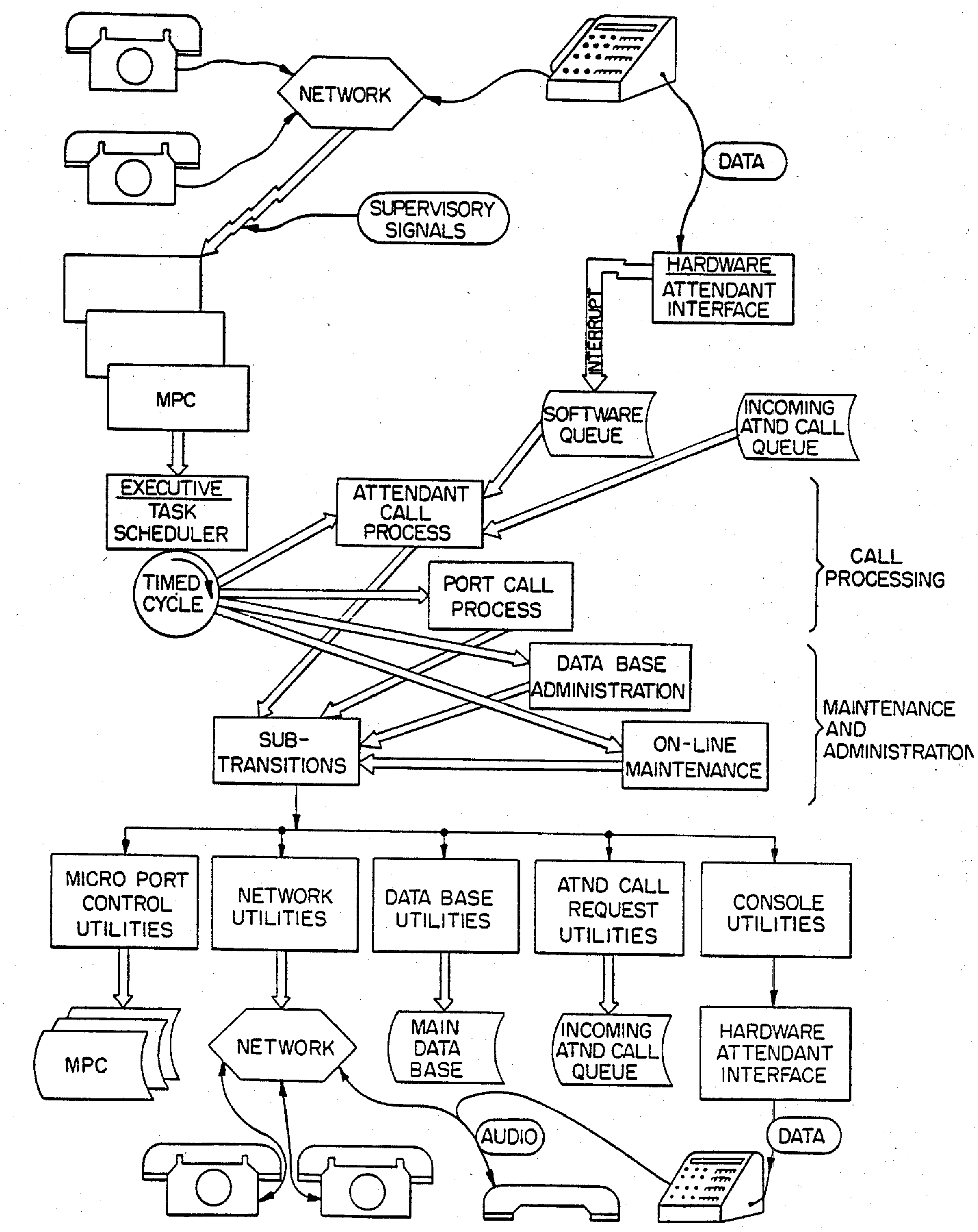
FIG. 4 is a schematic diagram of the call data flow illustrating the interrelations between hardware and software in the system of FIG. 1.

The call data flow in FIG. 4 shows the interrelations between hardware and software in the system. All software is organized around this processing structure. The software within the call processing system is organized under an executive program controlling the various functions under it in a set timed cycle. The function of the executive program is to perform system loading, system initialization, file management, memory management, process interrupts, process input/output functions and schedule paths.

When the system is initialized, a boot strap routine loads the executive program which in turn loads the rest of the system. Once the system is loaded, an initialization module puts the system in a known state after which call processing may commence. An interrupt control and processing is handled by the executive program. A real-time clock interrupts the system at periodic intervals to increment the main schedule-loop timer. When the timer reaches the limit for the main schedule loop, the executive program can reinitiate the task scheduler.

The executive program gives control to the functions in the following order. First, the attendant call process (ACP) is allowed to process until it completes its work. Second, the port call process (PCP) is given control and attempts to complete its work; however, if time runs out, the control may pass back to the attendant call process at an appropriate point. The last function scheduled by the executive program is either on-line maintenance or data-base administration, if there is any time remaining in the timed cycle. The on-line maintenance function is the function normally scheduled while database administration is scheduled, on demand only. Regardless of the function scheduled, it runs to completion but is suspended at the end of the timed cycle and remains in a suspended state until all attendant call process and port call process work has been completed, in the newly initiated timed cycle.

To continue processing the call, the port call process requires access to three basic elements of the system. These elements are the microport control, where some transient information about the call is stored, the network memories, where current network setup information is stored, and the translation data where semipermanent station information is stored. The procedures used to access these elements are software "calls" to the utilities shown. The more complex, but common uses of these elements involve both an intermediate level, which is shown in FIG. 4 as a subtransition level, and the utilities to decide which must be done for the call and to cause the required action to be performed. The port call process always places the network-microport control combination in a stable (although possibly temporary) state before it allows control to pass back to the executive program. Control is passed between the executive program and the port-call process until the hardware queues are empty. During the course of completing a call, the port call process will be called upon to move the call from one stable state to another many different times.

Figure 5:
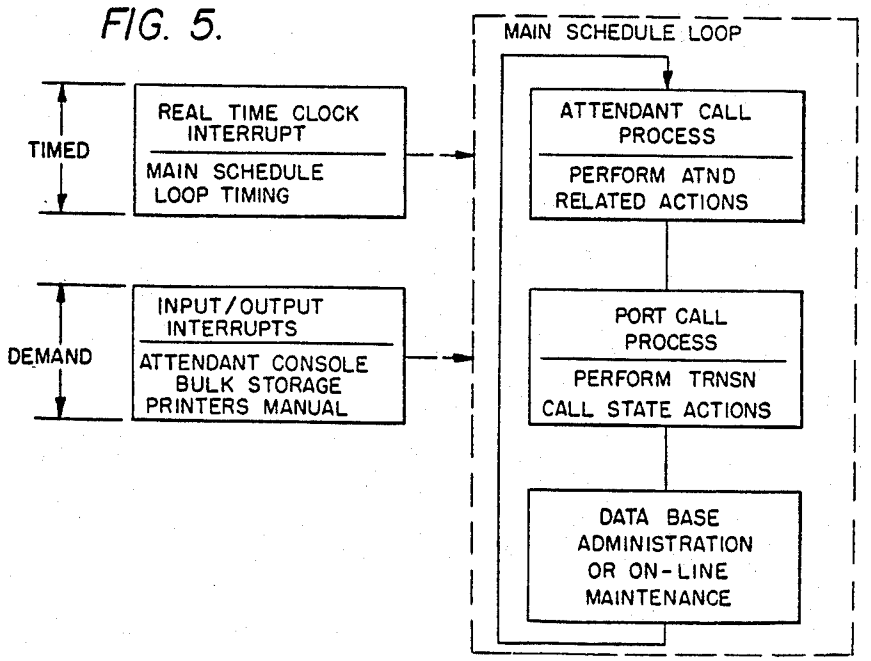
FIG. 5 is a schematic diagram illustrating the program control plan for the program controlling operation of the microport control in the system of FIG. 1.

In the course of processing a call, the port call process may determine that an attendant is required for the completion of the call. To provide this service, the port call process transitions the call to a stable state and places the equipment number of the station in the incoming attendant call queue for processing later by the attendant call process. To properly schedule event action, a program control plan, as seen in FIG. 5, is implemented. Processes are incremented each time a realtime clock interrupts the system. Each time the timer reaches a predetermined limit, scheduling reinitiates the highest priority job. The main schedule loop time is selected to minimize the processor time required to scan for nonexistent events while not introducing an unacceptable delay in the processing of an event. The number of events processed during a loop through the main schedule loop at peak hours can provide a measurement of system efficiency while excessive overloading could indicate either a hardware fault or indicate the need for selective shutdown of equipment.

The highest priority job scheduled in the main schedule loop is the attendant call process. This task performs all processing of console or port initiated attendant related features. On completion of the attendant call process, the port call process is scheduled. The port call process determines if port related events have occurred, and if so, performs the appropriate translation routine to move the call record to the next transition state. Any time remaining in the main schedule loop is allocated to data base administration or on-line maintenance tasks.

The general system scheme of the present invention has been described in connection with FIGS. 1-5. However, for a more complete understanding of the many detailed features of the present invention, description will now be made of an exemplary embodiment which impelements this basic system scheme.

B. EXEMPLARY PREFERRED EMBODIMENT

FIG. 6 illustrates an exemplary preferred embodiment in which the modular concept of the present invention is prominent. The working system at its minimum configuration requires only three basic elements. First, a port group 100 which contains the system input-/output circuits designed to accommodate up to forty-eight universal ports. Second, a common control cell 101 which contains the central processing unit and auxiliary common control circuits, peripheral circuits, and interfacs. Third a miscellaneous cell 102 which contains service circuits and a maintenance controller.

In the system of FIG. 6, there are provided twenty port groups 100 each accommodating forty-eight universal ports 104 which may be provided as line or trunk circuits in any combination, as required. The only restriction in accordance with one aspect of the present invention being that they must be equipped in multiples of common type, for reasons which will be described in greater detail hereinafter in connection with description of the line and trunk circuits. The port group 100 further provides two twenty-four channel PCM carrier circuits 105 and 106, and a microport control 110.

The universal ports 104 accept a line or trunk circuit which separates supervision data from the transmission path and isolates the line or trunk by use of a hybrid which converts the two-wire transmission path to a four-wire path. The PCM carrier circuits 105, 106 each perform continuous duplex processing on the voice transmission paths of a respective group of twenty-four associated ports in each port group 100. The port group highway PGH routes the duplex twenty-four channel PCM carrier signals to and from the common control cell 101 at the clock rate, for example, of 1.54 MHz.

The microport control 100 may be provided with a conventional microprocessor, such as the MC 6800 microprocessor manufactured by Motorola, Inc., of Chicago, Ill. The function of the microport control 110 is to administrate supervision data for all forty-eight ports which are accessed sequentially one pair at a time by twenty-four strobe lines extending from the microport control 110 to the ports 104, odd and even ports 104 having separate sense and command data buses to the microport control 100, which supervises all critical real-time events and only communicates with the central processing unit when system level processing is involved.

The common control 101 is dominated by the central processing unit 103 with its control programs and data base stored in random access memory 132. The central processing unit 130, which may comprise the PDP 11/40 of LSI-11 general purpose computers manufactured and sold by Digital Equipment Company of Maynard, Mass., or other general purpose computers with applicable cross assembling techniques, communicates with nearly every device in the common control by way of the CPU bus, an interrupt encoder 125 and a peripheral bus PB. The CPU bus and peripheral bus include parallel data/addresses, device control, and interrupt lines. The interrupt encoder 125 implements the interrrupt organization of the peripheral bus and thereby minimizes the number of devices directly connected to the CPU bus. In this way, the central processing unit 130 may be replaced by any other general purpose computer, without requiring major changes to the peripheral circuits by which the central processing unit interfaces with the remainder of the common control and with the microport controls 110 in the port groups 100.

The interrupt encoder 125 establishes the priorities for access to the central processing unit 130 and generates vectors for peripheral interrupts to the CPU. The interrupt encoder 125 also provides the real-time clock and a short program for boot strap loading of the software program, the boot strap program being stored in a read only memory that will not be erased by a system outage. The maintenance interface 128 handles the input and output of data and controls for maintenance control in the system. A TTY control 138 terminates the CPU bus and converts data on the bus to TTY compatible signals and vice-versa in the well-known manner.

The peripheral bus interconnects various devices to the CPU bus by way of the interrupt encoder 125. One such device is the data link 143 which handles the exchange of call data between redundant common controls in a distributed centralized control arrangement of the type described in conjunction with FIG. 2. The MPC interface 120 is also connected to the peripheral bus and handles communication between each microprocessor in the microport controls 110 of the respective port groups 100 and the central processing unit 130. Bus buffers 118 serve to buffer the communication between the common control 101 and the port group 100 and miscellaneous cell 102.

A plurality of attendant data input/output circuits 145 are provided in the common control to handle the data transfer between the CPU 130 and the attendant consoles. The input/output circuits 145 provide direct access from the attendant console to the common control and the CPU software. The common control also includes digital conference circuits 140 which provide for conference connections in association with the attendant data input/output circuits 145.

The digital transmission network 135 is a time divided, digital switching network in which transmission paths are established by time slot interchange using cross-office time slots on cross-office highways to effect interconnection between the ports 104 and between ports 104 and service circuits 103 in the miscellaneous cell 102. Data interchange through the digital transmission network 135 is effected under the control of a controller 132 which controls the digital transmission network 135 in accordance with the central processing unit 130 commands and provides feedback of network status of the CPU in response to requests.

The miscellaneous cell 102 is similar to a port group 100, but the PCM channels of the miscellaneous cell are dedicated to internal service functions of the system and the operator complex. The microport control 111 in the miscellaneous cell 102 supervises the service circuits 103. Such service circuits may be any required combination of dial tone multi-frequency sender, dial tone multi-frequency detector, multi-frequency sender, multi-frequency detector, etc. In addition to the service circuits in the miscellaneous cell, a number of ports associated with each PCM carrier circuit are designated as attendant audio ports. Other ports are used by the tone plant 112 which provides necessary tones and a test port 113 for maintenance control.

Also included in the miscellaneous cell 102 is the attendant audio circuit 115 which provides an interface for the data and audio input/output from the attendant console. The attendant audio circuit 115 has a special four-way conference capability with source, destination and line port appearances at the pulse code modulation circuit 107, 108 in the miscellaneous cell 102.

In operation of the system of FIG. 6, the microport controls 110 in each port group 100 scan the ports 104 in pairs by applying strobes simultaneously to an even port and an odd port over the strobe buses SB1 and SB2, each comprising twenty-four lines. In return, the states of the pair of ports being strobed is provided to the microport control 110 of the sense/command buses SCB1 and SCB2, which states are stored and compared with the previous state of the ports to detect off-hook, dialing, flash, release, and other line conditions. In addition, various command, such as ring trip, etc., may be forwarded to the ports of the buses SCB1 and SCB2 from the microport control 110 under control of the CPU in the common control 101.

As the microport control 110 detects line conditions or accumulates dialing signals in connection with the ports associated with its particular port group 100, as a result of its regular scanning operation, which conditions and signals are to be forwarded to the common control 101 to initiate action by the CPU, it indicates in one of its registers that such data is available for transfer to the common control. Each of the twenty microport controls 110 is scanned in a repetitive sequence under control of the MPC interface 120 to determine if a priority request has been generated within the microport control 110 indicating that communication with the CPU is desired for some reason, such as the transfer of this data thereto. If such a priority request has been detected by the MPC interface, it temporarily stops its scan and signals the microport control which generated the request to transmit data over the control and data link to the bus buffers 118. This data may comprise, for example, a dialed subscriber number or an off-hook condition, which is received by the MPC interface, converted from serial to parallel form, and stored in preparation for forwarding to the CPU.

The CPU periodically scans the MPC interface applying a shift out and a strobe signal thereto to effect a parallel transfer of the data stored therein through the interrupt encoder 125 onto the CPU bus to central processing unit 130. Assuming the data is an off-hook condition requiring connection of a service circuit 103 to the originating port, the CPU will forward to the controller 122 time slot assignment for switching the port 104 through the digital transmission network 135 to a service circuit 103 in the miscellaneous cell 102 for Touchtone application, for example. Dial tone will then be forwarded to the originating port 104 from the service circuit 130 and the subscriber may commence dialing.

The dialing signals will be detected by the microport control 110 and forwarded to the CPU via the control and data link, bus buffer 118, MPC1 interface 120, peripheral bus PB, interrupt encoder 125, and the CPU bus. The CPU will translate the received dialing signals to an equipment member, which may identify a port, conference circuit or attendant, for example, and assign a cross-office time slot to effect connection of the originating port through the digital transmission network to the proper destination under control of the controller 122.

Figure 7:
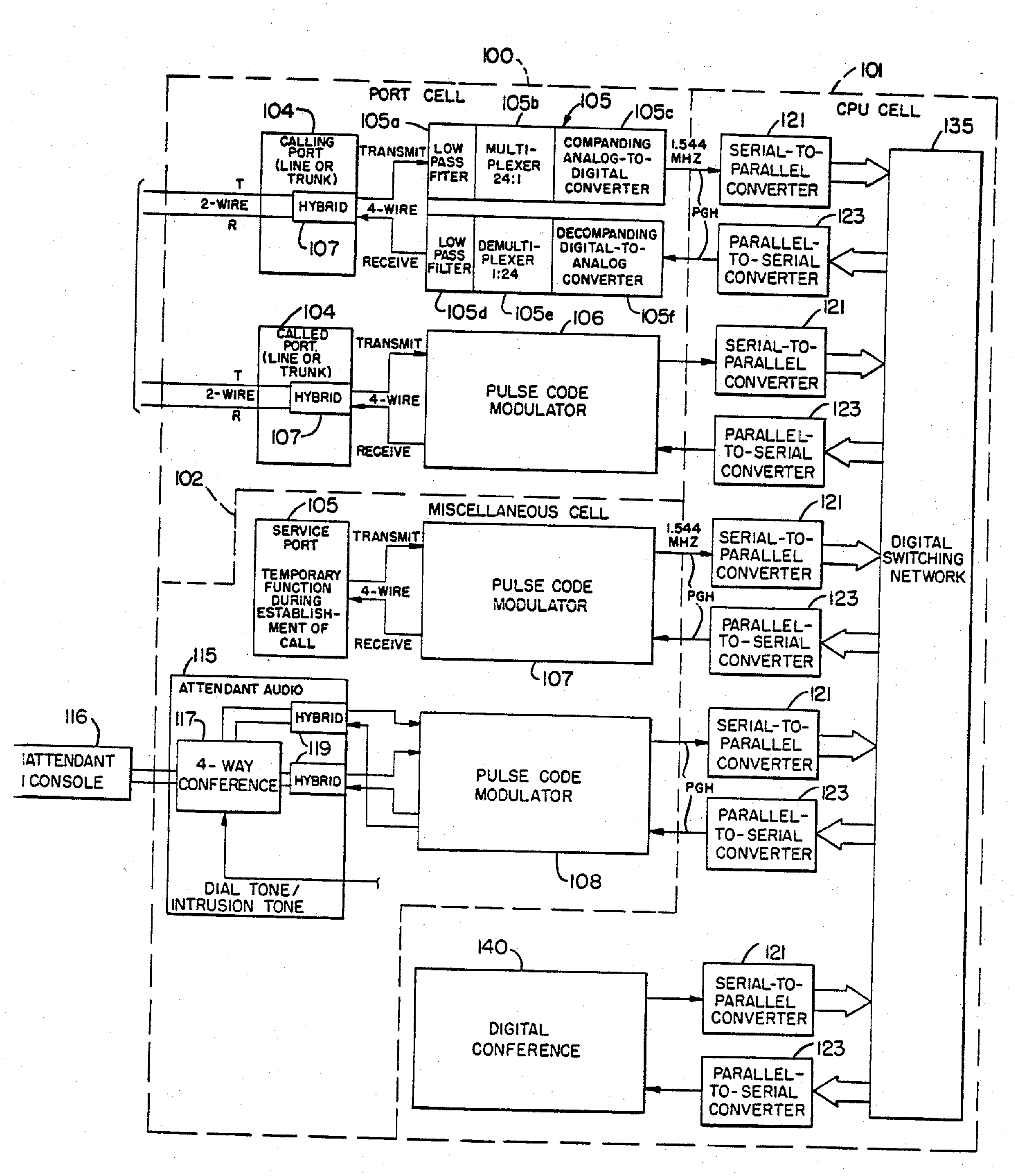
FIG. 7 is a simplified block diagram of the audio transmission path in the system of FIG. 6.

The transmission channel for audio and supervisory information can be extended from port-to-port, port-to-service, port-to-attendant, or port-to-conference circuit, as seen in the simplified block diagram of the transmission path in FIG. 7. In connection with this figure, a port is understood to mean a line or trunk circuit.

Referring to FIG. 7, the transmission channel operates in duplex mode in that simultaneous but separate sending and receiving paths are established through the system for every two-way connecting. Port circuits 104 are equipped with hybrid networks 107 to convert two-wire talking paths (tip/ring) to the four-wire paths (send/receive) required by the pulse code modulation converter 105, 106. The send and receive paths of a transmission channel are parallel but funtionally reciprocal. The send path of the calling party is connected to the receive path of the called party and vice-versa.

As can be seen from FIG. 7, a port-to-port transmission channel is the time divided equivalent of the conventional talking path through the system. The transmit portion of the path through the pulse code modulator 105, 106 includes a low pass filter 105*a* which limits the audio frequency signal to less than 3200 Hz, the effective range of the normal voice band. The twenty-four channels are then sampled sequentially at 8000 times per second to generate a pulse-amplitude-modulated multiplex signal in the multiplexer 105*b* connected to the output of a low pass filter 105*a* and the multiplexed signal is then supplied to an analog-to-digital converter 105*c* wherein each pulse of the analog PAM signal is quantized to a serial eight-bit digital word. A nonlinear digital code conforming to the standard U-225 logarithmic companding low is used to optimize transmission quality. The digital information is then placed on the transmit side of the port group highway PGH to the common control 101.

In the common control, the PCM information words are converted from serial format to parallel format by a converter 121. The digital switching network 135 then effects the necessary time slot interchange by switching the information word through a time-divided matrix. A duplex transmission path provides sixteen parallel bits (send word plus received word) in two separate paths to be interchanged per time slot. Parallel-to-serial conversion is then effected so that the parallel format of the information word is converted back to the original PCM serial format by a converter 123 and placed on the receive side of the associated pulse group highway PGH.

In the receive channel of the pulse code modulator 105, 106, the digital PCM information is restored to an analog pulse amplitude modulated signal by a digital-to-analog converter 105*f*. This converted signal is then applied to a demultiplexer 105*e* wherein the individual PAM pulse is gated out on the receive side of the designated transmission path. Low pass filtering by filter 105*d* at the output of the demultiplexer provides a cut-off frequency of approximately 3600 Hz, so that the sampling frequency and pulse frequencies of the system are blocked. The original voice messages are thereby received by the port circuit.

A port-to-service circuit transmission channel is also extended temporarily during the establishment of a call as seen in FIG. 7. Service circuits 103 are connected when application of supervisory tones is required. The transmit side of a channel can broadcast to any number of other ports in the system. This means that any number of independent transmission paths from ports to transmitting services, such as the tone plant can exist simultaneously.

A port-to-attendant transmission channel is a port-to-port transmission channel extended by way of the attendant audio circuit 115 in the miscellaneous cell 102. The attendant audio circuit 115 is basically a four-way conference network which provides access to source, destination, and line ports from the attendant console 116. The conference network is controlled by analog gates commanded by the associated attendant data input/output circuit 145 in the common control.

A port-to-conference circuit transmission channel is shown in FIG. 7 as including the elements of the basic port-to-port transmission channel, but each conference party is interfaced with the appropriate channel of the digital conference circuit 140. The voice information transmitted by the conference parties is added digitally, and echos and oscillation are prevented by subtracting each party's voice information from the conference information they receive. The twenty-four channels of the digital conference circuit 140 are arranged into four 4-party and one 8-party conference. As will be described in greater detail in connection with the digital conference circuit 140, the conference circuits can be interconnected for larger conferences.

1. The Port Circuits

The port circuits serve to terminate a subscriber's line or a central office line (trunk) at the system and provide the means of connecting the telephone instrument or central office equipment with common switching equipment, enabling a subscriber to either originate or receive a call through the system.

Figure 8:
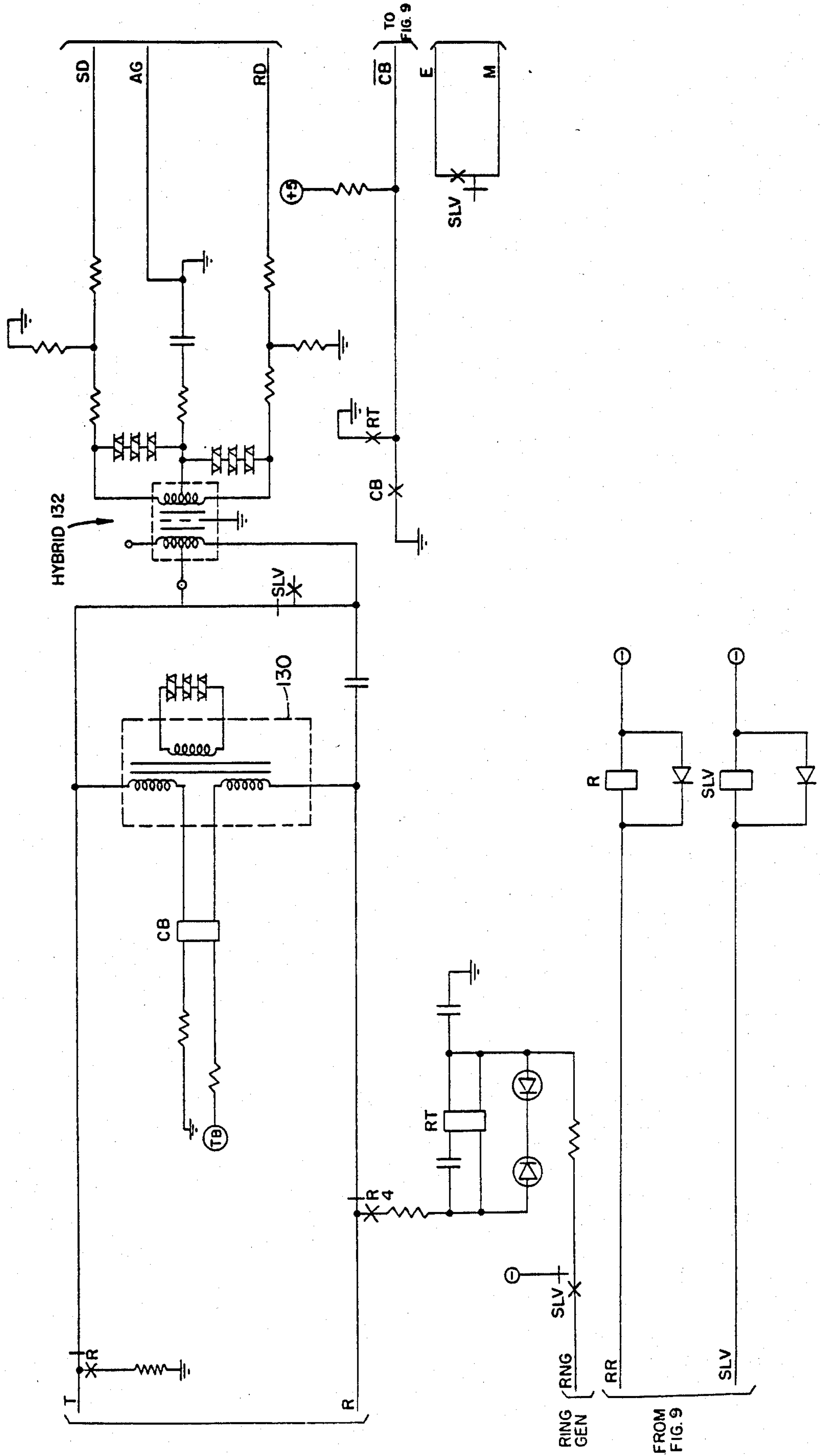
FIGS. 8 and 9 are schematic circuit diagrams of an exemplary line circuit embodying principles of the present invention.
Figure 9:
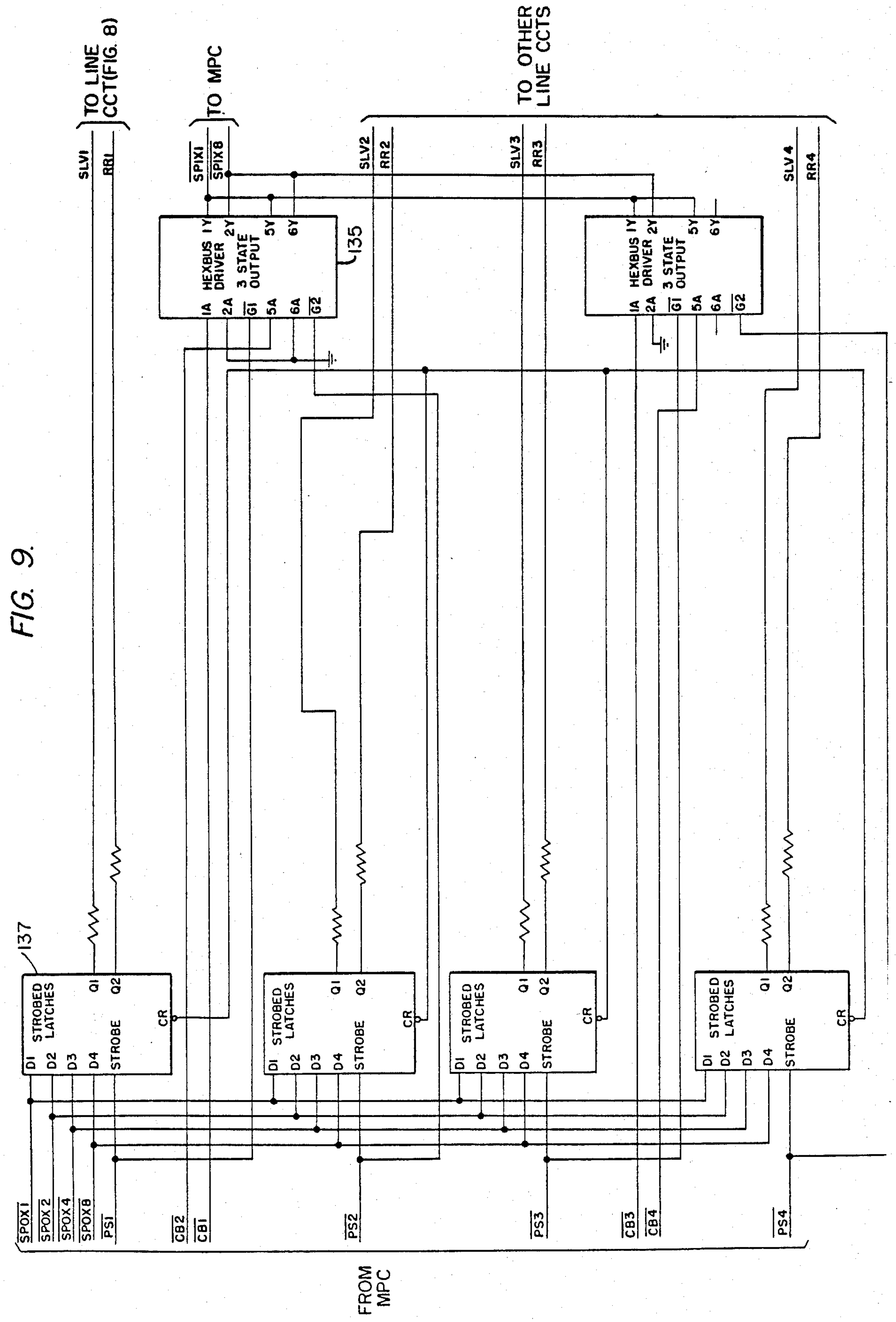

FIG. 8 illustrates a typical line circuit which forms the interface between the subscriber's line and the digital branch exchange. It includes all of the standard features which allow a subscriber to either originate or receive calls through the system and operates under the control of the microport control by means of a logic interface, such as illustrated in FIG. 9.

Thus, as seen in FIG. 8, the line circuit includes a ringing relay R, a sleeve relay SLV, a ring trip relay RT, and a bridge relay CB, which are part of every line circuit. In addition to providing a path for normal call data through the line circuit, the ringing and sleeve relays, together, are used to apply and interrupt ringing voltage to the line. The sleeve relay SLV also has a contact which may be used as a busy indication for traffic monitoring. The ring trip relay RT is used to detect ring trip.

After being switched through the ringing relay R, the tip T and ring R leads are terminated in the basic audio interface circuit which allows signals on the bidirectional tip T and ring R leads to be transferred to unidirectional transmit and receive lines SD and RD to and from the associated filter circuits in a time-division multiplex circuit 105, 106 to which the line circuit is connected. As seen in FIG. 8, the basic audio interface comprises a typical two-to four-wire hybrid circuit 132.

Figure 10:
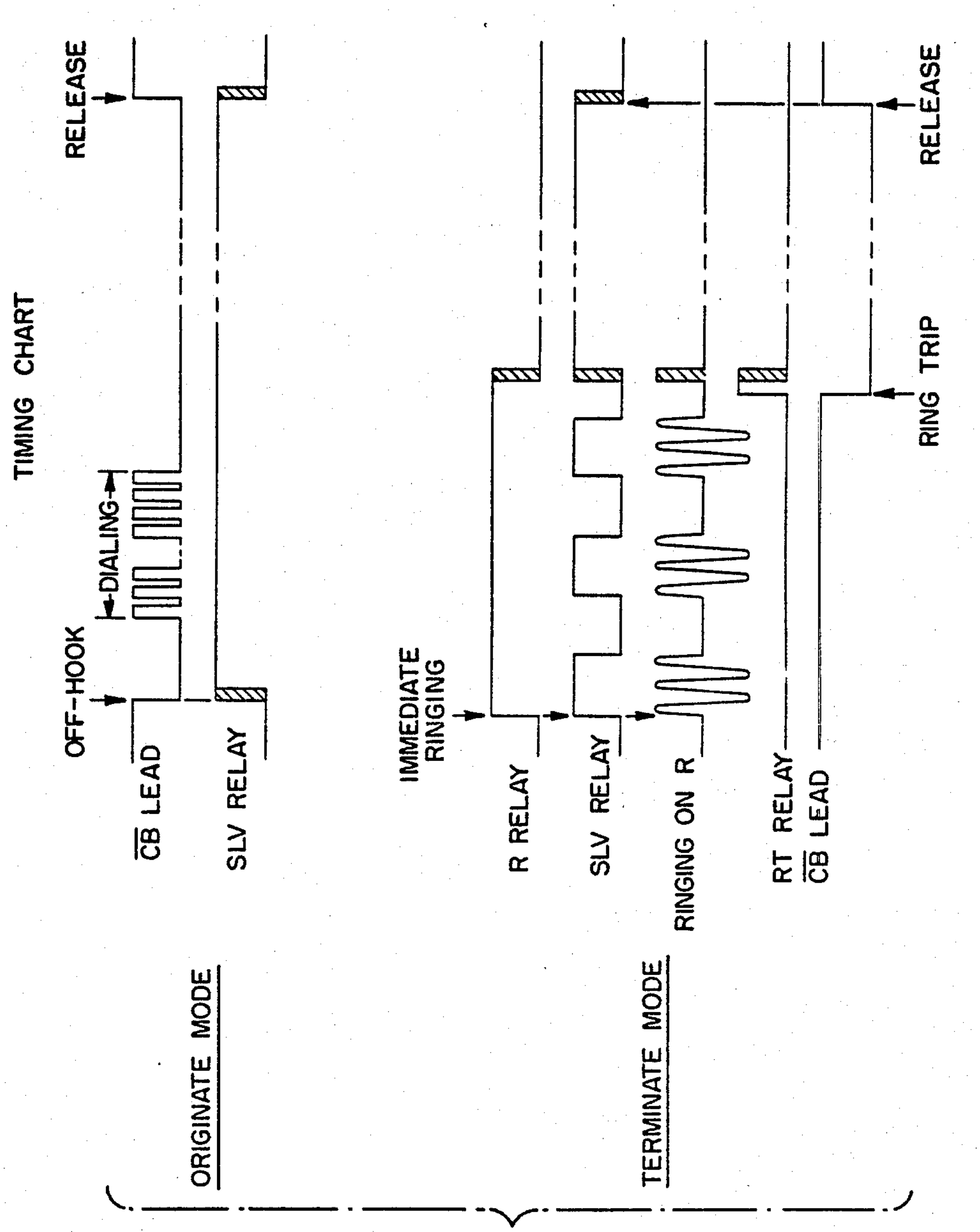
FIG. 10 is a timing diagram illustrating various signals occurring in a typical line circuit during the originating and terminating modes of operation.

The CB relay in the battery feed section of the line circuit performs the standard loop sensing and dial pulse repeating functions in the originating mode of operation which are characteristic functions of the line circuit. Thus, talking battery TB is connected through the CB relay to the tip T and ring R leads to form a loop to the subscriber equipment, so that with sufficient loop current as an indication of an off-hook condition, the CB relay operates, applying ground through its closed contacts to the $\overline{\text{CB}}$ lead which is otherwise at 5 volts positive potential. As seen in FIG. 10, operation of the CB relay produces signal indications on the $\overline{\text{CB}}$ lead representing off-hook conditions, dialing and release.

The ring trip relay RT is connected between ground and the ring lead R through contacts of the ring relay R. The RT relay provides a pair of windings B-D and A-C which are connected differentially. In addition, a capacitor is connected in series with the B-D winding so that DC loop current will be allowed to flow only through the A-C winding of the RT relay.

The SLV relay is activated by a supervisory command from the microport control 110 via the logic interface circuit (FIG. 9), and when operated, serves to transfer the input of the ring trip relay RT from negative battery to ringing voltage on negative battery. The basic function of the SLV relay is to interrupt ringing upon command when the R relay is operated. In addition, operation of the SLV relay serves to connect the E and M outputs together as a busy indication which may be used by the customer for traffic monitoring. In this regard, during ringing of the line, the busy indication provided for the customer will follow the interruption of ringing.

The R relay is also activated by a supervisory command received from the microport control 110 via the logic interface circuit (FIG. 9) and when operated, serves to transfer the incoming tip T and ring R leads from the battery feed and basic audio interace sections to a resistance ground on the tip lead T and to the output of the ring trip relay on the ring lead R. This allows ringing to be applied to the line, which is interrupted by the operation of the SLV relay.

As seen in FIG. 8, with the line circuit in the idle state, the input of the hybrid circuit is shorted to provide a loop-around for maintenance testing of the matrix paths. This loop is controlled by contacts of the SLV relay, which serve to remove the loop-around short circuit across the primary side of the hybrid when the line circuit is in the active state.

In accordance with one feature of the present invention, four identical line circuits occupy a single line card and the line circuits on adjacent line cards are scanned in pairs by strobe signals generated in the microport control, which is connected to the odd numbered and even numbered ports by a separate four-bit sense bus and a four-bit command bus. By this arrangement, scanning is speeded up by strobing two ports at a time, and the resulting eight-bit sense and command words are handled more efficiently by the microprocessor with its eight-bit data bus. Thus, with each even and odd port pair having an individual strobe line to the microport control, when one of the twenty-four strobe lines is activated, the bus drivers on the associated port pair sends the port state and circuit type of the associated sense buses. At the same time, the data on the associated command buses is set into control latches associated with the port pair.

These logic control features are disclosed more particularly in connection with the logic interface circuit illustrated in FIG. 9. As seen in the figure, the $\overline{\text{CB}}$ lead from the line circuit is applied to a hex bus driver 135 which produces a pair of outputs of 1Y and 2Y which are connected to the leads $\overline{\text{SPIX1}}$ and $\overline{\text{SPIX8}}$ forming a part of the four-bit sense bus extending to the microport control 110. The hex bus driver is enabled by the strobe pulse $\overline{\text{PSI}}$ received from the microport control so as to enable the hex bus driver 135 and thereby apply on the sense leads to the microport control 110 the information provided by the $\overline{\text{CB}}$ lead.

The logic interface circuit associated with each line circuit also includes a strobed latch 137, which is connected to the command bus consisting of leads $\overline{\text{SPOX1}}$–$\overline{\text{SPOX8}}$ from the microport control 110 and is enabled by the strobe pulse $\overline{\text{PS1}}$. Thus, the command signals from the microport control 110 to the line circuit received on the command bus are strobed into the latch 137, whose outputs Q1 and Q2 are thereby enabled in accordance with the commands received from the microport control 110 to enable the leads SLV1 and RR1 which extend to the line circuit to control the sleeve SLV and ring R relays therein.

In the originating mode of operation, an off-hook condition at a subscriber line will effect operation of the CB relay in the associated line with a result that ground will be applied through the closed CB contacts to the $\overline{\text{CB}}$ output line in FIG. 8 extending to the logic interface circuit in FIG. 9. When the strobe pulse $\overline{\text{PS1}}$ assigned to the first line circuit is received in the logic interface circuit, it is applied to the associated hex bus driver 135 along with the $\overline{\text{CB1}}$ output from the line circuit so as to produce at the output of the hex bus driver the sense signals $\overline{\text{SP1X1}}$ and $\overline{\text{SP1X8}}$ to the microport control 110. In response thereto, after it is determined that a free register is available in the MPC, the microport control 110 will apply a supervisory command signal SPOX1 to the latch 137 in the logic interface circuit to place ground on the lead SLV1, thereby operating the sleeve relay SLV in the line circuit. This opens the short circuit across the primary side of the hybrid in the basic audio interface and completes a connection between the E and M output leads to provide busy indications for customer traffic monitoring. The microport control 110 will then signal the central processing unit CPU to effect connection of the line circuit to a broadcast port 103 in the miscellaneous cell 102 through the transmission network 135 thereby providing dial tone to the subscriber. The microport control 110 will then continue to monitor the condition of the CB relay to detect the forthcoming dialing pulses.

In the terminating mode of operation, the microport control will provide supervisory command signals $\overline{\text{SPOX1}}$ and $\overline{\text{SPOX2}}$ to the strobed latch 137 in the logic interface circuit along with the strobe pulse $\overline{PS1}$ to place ground on the leads SLV1 and RR1, thereby operating both the ring relay R and the sleeve relay SLV in the line circuit. As already indicated, operation of the sleeve relay SLV serves to transfer the ring trip relay input from negative battery to ringing voltage on negative battery, complete a connection between the E and M output leads for busy indication, and open the short circuit across the primary side in the basic audio interface. Operation of the ring relay R serves to transfer the incoming tip T and ring R leads from the battery feed and basic audio feed interface sections to a resistance ground on the tip lead T and to the output of the ring section on the ring lead R. Ringing will then be applied to the line from the ringing generator connected to lead RNG, the ringing being interrupted by the intermittent operation of the sleeve relay SLV under the control of the microport control 110 as the command signal $\overline{SPOX1}$ is intermittently applied to the logic interface circuit associated with the line circuit. The sequence of operation of the ring lead R and sleeve relay SLV to effect application of intermittent ringing to the subscriber line is indicated in FIG. 10.

When the subscriber goes off-hook in response to the ringing of his telephone, the ring trip relay RT is operated in response to the presence of a DC loop current. As already indicated, the detection of the DC loop current by the RT relay is accomplished because the two windings of the relay are connected differentially. Thus, during the silent period of ringing, DC current will operate the RT relay through the A-C winding thereof; while, during the ringing period, the fields generated by the two windings will cancel if there is no DC current. However, extra current in the A-C winding of the relay provided by an off-hook condition will operate the relay, which then provides the ring trip indication by connecting ground to the $\overline{CB}$ lead extending to the hex bus driver 135 in the logic interface circuit. Thus, the sense signal $\overline{SP1X1}$ will be generated upon receipt of the next strobe pulse $\overline{PS1}$. In this way, ring trip is indicated to the microport control, which then signals this condition to effect release of the ring relay R and continuous operation of the SLV relay, while also instructing the central processing unit CPU to control the transmission network to effect interconnection of the parties by appropriate time slot interchange.

As already indicated, several line circuits are provided on each line card along with the associated logic interface circuits. However, since ports typically consist of line circuits or trunk circuits, a card may typically consist of either all line circuits or all trunk circuits. Thus, using the $\overline{SPIX8}$ leads from the hex bus drivers 135 in the four logic interface circuits on each card, an indication can be provided to the central processing unit 130 via the microport control 110 of the type of port associated with that particular card. As seen in FIG. 9, which illustrates the logic interface circuits associated with a line card of four line circuits, it is noted that the $\overline{SPIX8}$ leads from logic interface circuits 1, 2, and 3 are interconnected, while the $\overline{SPIX8}$ lead to the logic interface circuit 4 is not connected to the sense bus. Thus, as the four line circuits on the card are scanned by the microport control 110 upon generation of the successive strobe pulses $\overline{PS1}$, $\overline{PS2}$, $\overline{PS3}$, and $\overline{PS4}$, and SPIX8 lead to the microport control will provide the successive binary signal indications 1110, which serves to identify the ports associated with that card as line circuits rather than trunk circuits.

On a card including trunk circuits, a different connection of the SPIX8 leads from the respective hex bus drivers 135 in the logic interface circuits can be effected to provide an indication that the ports associated with the cards are trunk circuits. For example, all of the SPIX8 leads may be connected to the sense bus for a card including trunk circuits to provide the binary indication 1001 to the microport control, thereby identifying to the central processing unit that the card which has been plugged into the system provides trunk circuits. The indications on the SPIX8 leads not only identify the type of port associated with the card, but also indicate to the system the presence of the card, i.e., that a card has been plugged in at that particular location.

Trunk circuits are controlled in the same manner as line circuits, each being provided with a logic interface circuit to interface the trunk circuit with the command and sense buses extending to the microport control 110. Like the line circuits, four trunk circuits are provided per card and are strobed in pairs by strobe pulses applied from the microport control 110. Also, the $\overline{SPIX8}$ leads are utilized for trunk circuit identification and indication of presence of the trunk circuits to the central processing unit 130 in the manner described in connection with line circuits. However, different types of trunk circuits may also be distinguished by this particular feature by merely varying the binary code designation supplied on the SPIX8 leads in accordance with the trunk type. In this way, not only line circuit identification and trunk circuit identification is possible, but further distinguishing of the various types of circuits can be accomplished automatically by the central processing unit as soon as the line card or trunk card is plugged in.

2. The Microport Control

The microport control (MPC) 110 in each port group 100 consists primarily of a microprocessor unit 205 associated with a random access memory 200 and a read only memory 201, as generally illustrated in FIG. 11*a*. Various control and interface circuits and registers, such as the port communication 210, asynchronous communication interface adapter 212, reset and sync circuit 216, and message register 213, are associated with the microprocessor unit 205 to control the timed transfer of data and control signals to the ports or the central processing unit 130 in the common control 101 under control of a clock 206, interrupt circuit 207, the reset control circuit 208. The three basic functional areas of the microport control are the control area, the port communication area, and the CPU communication area.

The microport control 110 serves as a link between the ports 104 and the central processing unit 130 in the common control 101, providing not only the logic interface between the port groups 100 and the common control 101, but also serving to relieve the central processing unit 130 of some of its duties by executing all of the real time processing in connection with the ports 104. In this regard, although some decision-making capabilities are assigned to the microport control 110 giving it the ability to operate as an intelligent terminal, the microport control 110 in each port group 100 is always secondary in its command authority to the central processing unit 130, which is the prime decision maker in the system.

The general functions performed by the microport control 110 include the scanning of each of the ports 104 at predetermined selected rates to detect request for service, ring trip, disconnect supervision, and impulse analysis, as well as to forward dialed digits to the common control 101 for further processing in the establishment of a communication connection through the transmission network 135 under control of the central processing unit 130. These functions performed by the microport control 110 are implemented by software stored in the read only memory 201, a typical ROM memory layout being as shown in FIG. 11*b*, with the random access memory 200 forming the storage area for port bits, supervisory data, priority control, and register storage in addition to memory allocation for scratch pad use, as typically shown in FIG. 11*c*.

Each microport control 110 receives a real time interrupt every five milliseconds applied from circuit 207 to the microprocessor unit 205 to schedule the above workload, including the scanning of up to forty-eight ports by generation of twenty-four strobe pulses in addition to register updating, communication with the CPU, and maintenance functions all within the five millisecond CPU frame rate.

This sets the timing frame of reference so that the microport control operation is characterized by a series of five millisecond timing frames of program execution. Two consecutive five millisecond frames constitute a ten millisecond superframe which is repetitive.

The microprocessor gains access to the ports by means of the port communication area thereof, which, under program control, generates twenty-four port strobe signals, each of which is associated with two ports. Information is passed between the ports and the microport control by means of four-bit sense and command buses. By addressing two ports simultaneously (odd and even ports as referenced to the MPC scanning), the four-bit port buses are mapped onto the eight-bit microprocessor data bus with the additional advantage that the ports are scanned at twice the rate they would otherwise be if addressed singly.

The watchdog timer 202 performs a monitor function. In this regard, the timer 202 is excited by one of the port strobe signals (of which thirty-two are generated, twenty-four for port use), and, if this strobe fails to occur within a given time period, the timer 202 will reset the microprocessor and force all forty-eight ports associated therewith to the idle state.

The CPU communication area of the microport control performs three basic functions, namely, status control, incoming/outgoing messsage control and reset/-sync control. The status control link is a high speed channel which extends status information concerning the microport control to the CPU. It is by means of this link that the CPU first is informed of the MPC's desire to communicate. The incoming and outgoing message control data lines are two separate one-way links controlled by the asynchronous communication interface adapter 212. The reset/sync control 216 provides a one-way link to the microport control from the CPU and serves a two-fold function. Load pulses on this lead synchronize transmission of data from the status register of the MPC. In addition, if a reset pulse (a pulse of much longer duration than a load pulse) is received, the microprocessor is reset. Thus, the CPU does have absolute control over the microport control.

FIG. 11*b* is a detailed map of the memory layout of the ROM 201, which stores the programs for microport control operation some of the details of which will be addressed in the following description of microport control software.

FIG. 11*c* is a detailed map of the memory layout of the RAM 200. There are eight bytes of RAM set aside for each port so that four hundred bytes are required for fifty ports (in the described system there are forty-eight actual ports and two dummy memory areas for maintenance-test functions). The command (SUPO) and sense data storate (SUP1 and SUP2) areas of the RAM 200 are specially treated to conform to the nature of the external command and sense buses. When, for example, an eight bit command word is read out from a RAM SUPO location, it is extended over both the odd and even command buses, four bits to one port and four bits to the other. It is clear, therefore, that these particular RAM addresses (SUPO) represent data for two ports and, as far as the RAM map is concerned, would be provided four bits on the left and four bits on the right. The SUP1 and SUP2 RAM areas are used for sense information from the ports. The SUP1 area represents data collected during one scan of the ports, while SUP2 includes data collected during the next scan. The remaining eight bytes per port are used for other data, such as port type (line circuit, E/M trunk, etc.), special class of service, event codes, scratch areas, and the like.

In order to preserve space in the RAM 200 and accommodate the five millisecond frame time, a pool of eight registers is provided in the RAM 200 instead of providing one register per port. These registers function in the same manner as their hardware counterparts in conventional systems. If a port is seized and requires a register for dial pulse in dialing, a register in the RAM 200 is allotted by the microport control. A register is likewise allotted on outgoing calls (trunks) which require outpulsing and detection of certain port timing signals. Once a port has no further use for a register, it is relinguished and returned to the pool.

FIG. 12 illustrates the basic arrangement of the memory section of the microport control 110 including the random access memory 200 and the read only memory 201. Data to and from the random access memory 200 is supplied via a data bus including leads D0–D7, which are applied through a bus driver 202 to the memory 200. In a similar manner, data from the random access memory 200 and read only memory 201 are supplied to the data bus through the bus receivers 202.

The memories 200 and 201 are addressed via an address bus carrying leads A0–A15 from the microprocessor unit 205. Control over the reading of data from the memories 200 and 201 as well as writing data into the memory 200 is performed by a memory control 203 in response to read/write control signals R/W and $\overline{R/W}$, a timing signal Ø2 and a synchronizing signal VMA supplied from the microprocessor unit 205. Group enable signals G1, G7, and G8, which provide both timing and synchronization, are also supplied to the memory control 203, which operates to control the read and write operations of the memories in accordance with the following combination of control signals:

| | | R/W | Ø2 |
|---|---|---|---|
| RAM 200 | G1 | | |
| read | 0 | 1 | 1 |
| write | 0 | 0 | 1 |
| ROM 201 | G7 or G8 | | |

-continued

| | | R/W | Ø2 |
|---|---|---|---|
| read | 0 | 1 | 1 |

The leads G1, G7, and G8 are part of the group enable leads G1–G8 which serve to coordinate the accessing of various memory locations within the system, and thereby coordinate and control the timing of the operation of various elements associated with the respective memory areas. The lead VMA is derived from the microprocessor unit 205 and indicates that a valid message address is being received. This is basically a timing signal which prevents the system from acting during an address change period when the address data would be incorrect or unintelligible. Thus, the signal VMA will be generated by the microprocessor unit 205 when a valid address which can be acted upon is being transmitted from the microprocessor unit 205.

The addressing of the read only memory 201 by the microprocessor unit 205 under control of the memory control 203 retrieves from the memory the various programs necessary to implement the funtions to be performed by the microport control 110. These programs may include origination, dialing, sending, ringing, talking and release, global subroutines, port communication, CPU communication, scan control, phase and substrate transition, maintenance and interrupt handling, as seen in FIG. 11*b*.

The register and control portion of the microport control 205 is generally illustrated in FIG. 13. As seen in the figure, supervisory communication with the ports 104 is effected through the port interface 210, which provides the strobe pulses and command signals to the ports 104 and receives the sense signals to be forwarded to the microprocessor unit 205 through a bus drivers 215. The strobe pulses are generated in the status and port register control circuit 211 in response to address signals received from the microprocessor unit 205 via the bus drivers 215, which also supplies the control signals from the microprocessor unit 205 to the port interface 210 for forwarding to the ports 104, as described in conjunction with FIGS. 8 and 9.

The asynchronous communication interface adapter 212 associated with the microprocessor unit 205 is a conventional circuit, such as manufactured by Motorola, Inc., under the designation MC6850 and basically provides a parallel-to-serial and serial-to-parallel conversion of data transmitted to and from the common control 101. The unit 212 also includes separate read only and write only registers as well as control registers for storing the data received from and forwarded to the common control of the serial time division multiplex highway. It handles the task of insertion and detection of start, stop, and parity bits, in addition to indicating error conditions and the status of the transmit and receive registers. The unit 202 operates at 514 KHz in response to the output of divider 217 which receives its synchronizing clock pulses from the system clock.

The message register 213 provides the means by which the status of operation of the microport control 110 is supplied to the central processing unit 130 in the common control 101 to indicate that the CPU is needed to perform certain tasks, to indicate the status of registers in the microport control 110, to control the communication of data between the microport control 110 and the central processing unit 130, indicate errors in the transmission of data, and identify message time-outs and the end of signal communications. Status information is supplied from the microprocessor unit 205 through the bus buffer 215 to the message register 213 which then forwards the status information to the common control 101.

The reset and sync control 216 receives reset information from the common control 101 under various conditions to effect a resetting of the operation of the microport control 110, such as during power-up, subsequent to disconnection between the various elements within the system and other conditions which require the microprocessor control 205 to initialize its operation. In addition to performing resetting or initializing of the microport control 110, the control circuit 216 also controls the loading of the message register 213. Thus, the signals received on the channel RSTSAYN from the common control may be of two types. Depending upon the duration of the signal, it can indicate either a reset or initialization of the microport control 110, or it may consist of selectively timed sequential load pulses for control over transmission of status information from the message register 213 to the common control 101.

Communication between the ports 104 and the microport control 110 is effected in response to the generation of twenty-four port strobes which are applied to two ports at the same time, in the manner generally illustrated in FIG. 14. The ports are strobed in odd and even groups so that with each strobe signal the microport control 110 is able to process the supervisory information relating to two ports. The ports and the microport control 110 are interconnected by way of separate four bit sense buses and four bit command buses. Thus, when one of the twenty-four strobe lines is activated, the bus drivers on the associated port pair send the status of events and circuit type on the associated sense buses to the microport control 110, and at the same time, the data on the associated command buses is set into the control latches on the port pair, as described in connection with FIGS. 7 through 9.

As seen in FIG. 15, which illustrates the status and port register control 211, address signals from the microprocessor unit 205 are applied to a port decoder 222 which decodes the address signals A0–A4 to generate the port strobe signals PS1–PS24 to be applied to the ports for scanning each of the ports in the process of sensing the line conditions. The port decoder 222 in the course of its cycle also produces the scan signals S25, S26, and S32. The signal S25 serves to enable the status register, the signal S26 senses the carrier loss associated with the attendant audio circuit and the signal S32 enables reading of the data bus, in the manner to be described more fully hereinafter.

The address signals derived from the microprocessor unit 205 are also applied to a group decoder 220 which decodes the address signals A13–A15 to obtain the group enable signals G1, G7, and G8 to be supplied to the memory control 203 in FIG. 12. The decoder 220 is controlled by the valid memory address signal VMA, generated by the microprocessor unit 205, and generates a group enable signal G6 which is supplied to the ACIA for control thereof. A general group enable signal GE is also generated by gate 223 in response to address signal A12, group enable signal G6, and the timing signal T2. This signal is applied to the port interface in FIG. 16 to control transfer of data to the ports.

As seen in FIG. 16, the port interface 210 comprises a plurality of input registers 225–228 which receive data on leads SPIA1–SPIA8 from the ports 104 and supply this data on lead DATA to the microprocessor unit 205. The port interface 210 also comprises a plurality of output registers 230–233 which receive data on lead DATA from the microprocessor unit 205 and supply this data on leads SPOA1–SPOA8 to the ports 104. The registers 225–228 are controlled by the output of gate 235 which is responsive to the signal $\overline{R/W}$, the general group enable signal GE from FIG. 15, and the timing signal Ø2T. The output registers 230–233 are controlled by the timing signal $\overline{\text{Ø2T}}$.

Referring to FIG. 17*a*, the microport control 205 may take the form of any commercially available microprocessor unit, such as the microprocessor manufactured and sold by Motorola, Inc., under the designation MC6800. The unit 205 is provided in the form of a monolithic eight-bit microprocessor with a bidirectional data bus and sixteen bit addressing. The internal structure and functioning of the microprocessor unit 205 will not be described in detail since they are inherent characteristics of the MC6800 which are not necessary to an understanding of the present invention. Thus, description will be provided only of the inputs and outputs of the unit 205 and the functional effect of these signals as applicable to the operation of the present invention.

Sixteen outputs provide address signals forming an address bus A0–A15 and eight outputs provide data forming a data bus D0–D7. The data bus is bidirectional and serves to transfer data to and from the memory and peripheral devices. The read/write (R/W) output of the microprocessor unit 205 serves to signal the peripheral devices and memory devices as to whether the unit 205 is in a read (high) or write (flow) state. In this way, the peripheral devices and memory devices can determine when data will be transferred from the microprocessor unit 205 to them and when data may be transferred from them to the microprocessor unit.

An enable signal generated by the trailing edge delay circuit 240 is applied to an input DBE to the microprocessor unit 205 and serves as a clock signal Ø2 to enable the data bus drivers to output data during the write cycle. During the read cycle, the bus drivers are disabled.

An interrupt request IRQ is supplied to the microprocessor unit 205 by the system clock to initiate an interrupt sequence every five milliseconds. The microprocessor unit waits until it completes the current instruction that is executed before it recognizes the request. At that time, if the interrupt mask bit in the condition code register within the memory of the microprocessor unit 205 is not set, the machine begins an interrupt sequence. The index register, program counters, accumulators, and condition code register are provided in the microprocessor unit 205 as memory locations. The microprocessor unit 205 responds to the interrupt request by setting the interrupt mask bit so that no further interrupts may occur. At the end of the cycle, a sixteen bit address is loaded that points to a vectoring address which is located in memory locations which causes the microprocessor unit 205 to branch to an interrupt routine in the memory.

The NMI input of the microprocessor unit represents a nonmaskable interrupt derived from the ACIA 212 as provided from the central processing unit 130 in the common control 101. For such functions, the interrupt mask bit in the microprocessor unit 205 is ignored since the interrupt is of high priority. The present position of the microprocessor control in its sequence is stored in the random access memory 200 on the stack and the interrupt is then performed immediately. The microprocessor unit 205 can thereafter go back to its previous place in the program as determined from the data previously stored before the interrupt. Thus, if a non-maskable interrupt is received from the ACIA 212 under the control of the central processing unit 130, the processor will complete the current instruction that is being executed, transfer control to a specified interrupt handling program and eventually the interrupt mask bit in the condition code register of the memory will have no effect on this non-maskable interrupt request.

The microprocessor unit 205 also includes a RESET input which is used to reset and start the microprocessor unit 205 from a power-down condition, resulting from a power failure or an initial start-up of the processor. A signal detected at this input causes the microprocessor unit 205 to begin the restart sequence comprising execution of a routine to initialize the processor from its reset condition. During the restart routine, the interrupt mask bit is set and must be reset before the microprocessor unit 205 can be interrupted by an interrupt request.

The microprocessor unit timing is controlled by a two-phase non-overlapping clock 206 which generates the signals Ø1 and Ø2. These timing signals are used to control the start of various functions performed by the microprocessor unit 205 including the read and write operations, as well as interrupt routines.

As already indicated, the asynchronous communication interface adapter 212 is basically a parallel-to-serial and serial-to-parallel converter. Internally, the ACIA provides four registers, as seen in FIG. 17*b*, consisting of two read only registers and two write only registers. The read only registers are the status register SR and receive data register RDR; while, the write only registers are the control register CR and transmit data register TDR. Access to these four registers is determined by the status of the two control signals RS and $\overline{R/W}$ from the microprocessor unit 205. Thus, data may be written into the transmit data register of the ACIA 212 in response to the two signals RS and R/W; while; data may be read from the receive data register in response to the signals RS and R/W. Control data may be read into the control register of the ACIA 212 in response to the signals $\overline{RS}$ and $\overline{R/W}$, and the status register may be read in response to the signals $\overline{RS}$ and R/W.

Bidirectional data lines D0–D7 allow for data transfer between the ACIA 212 and the microprocessor unit 205. The transmit clock input is used for the clocking of transmitted data; the transmitter initiates data on the negative transition of the 514 KHz clock. The receive clock input is used for synchronization of received data. The clock and data must be synchronized externally, and the receiver samples the data on the positive transmission of the 514 KHz clock. The enable input E is the input that enables the bus input/output data buffers and clocks data to and from the ACIA 212. This signal is a derivative of the Ø2 clock signal provided by the circuit 204.

As already indicated, the read/write input R/W is used to control the direction of data flow through the ACIA input/output data bus interface. When the R/W input is high indicating a read cycle, the ACIA output drivers are turned off and the microprocessor unit 205 writes into a selected register. Therefore, the read/-write signal is used to select read only or write only registers within the ACIA. The CS0, CS1, and $\overline{CS2}$ input lines are used to address the ACIA, which is selected when the CS0 and CS1 leads are high and the $\overline{CS2}$ is low. Transfers of data to and from the ACIA are then performed under the control of the enable signal E, the read/write signal R/W, and the register select signal RS.

The register select line RSis the least significant bit of the address. A high level is used to select the transmit/-receive data registers and a low level the control/status registers, in the manner already indicated above.

In transmitting data from the microprocessing unit to the CPU and in receiving data from the CPU in the microprocessing unit, the various registers of the ACIA 212, as seen in FIG. 17*b*, are used for storage and control. Referring to FIG. 17*b*, which schematically illustrates the four registers in the ASCIA, and FIG. 18, which indicates the format of the transmit and receive data which passes back and forth between the microport control 110 and the central processing unit 130 in the common control 101, a word may be written into the transmit data register TDR of the ACIA by the microprocessor unit 205 if the status read operation notes from bit B1 of the status register SR that the transmit data register TDR is empty. The word written into the transmit data register TDR by the microprocessor unit 205 is then transferred to a shift register (not shown) in the ACIA where it is serialized and transmitted from the transmit data output preceded by a start bit and followed by a stop bit, as seen in FIG. 18. Internal parity is added to the word and occurs between the last data bit and the first stop bit.

After the first word is written into the transmit data register TDR, the status register SR can be read again to check for a transmit data register empty condition and current peripheral status. If the register TDR is empty, as indicated by bit B1 thereof, another word can be loaded for transmission even though the first word is still in the process of being transmitted from the shift register in the ACIA. Once the first word has been completely transmitted, the second word will be automatically transmitted into the shift register, and this sequence continues until all words have been transmitted.

As data is received from the common control at the data input to the ACIA 212, even parity is checked and the error indication is available in the status register SR at bit B6, as seen in FIG. 17*b*. In addition, framing error is indicated by bits B4 and overrun error is indicated at bit B5. The status of the receive data register RDR is indicated by bit B0.

In a typical receiving sequence, the status register is read by the microprocessing unit 205 to determine if a byte has been received from the common control by checking bit B0 in the status register SR. As soon as the receive data register RDR is full, indicating that a byte has already been loaded into the receive data register RDR from the common control, that word will be placed on the eight bit ACIA data bus to the microprocessing unit 205 when a read data command on the R/W lead is received from the microprocessing unit. The status register ST in the ACIA can continue to be read again to determine when another word is available in the receive data register RDR. This register is also double buffered in the same manner as the transmit data register TDR so that a word can be read from the data register as another word is being received in the shift register. Byte transfer from the CPU to the MPC are interleaved with send next byte messages from the MPC to the MPCI on the status link. This sequence continues until all words have been received.

The exchange of data between the microport control 110 and the central processing unit 130 in the common control 101 can be effected under different circumstances; however, the primary consideration under all conditions is that the central processing unit 130 is the master and the microprocessing unit 205 in the microport control 110 is the slave. Thus, when the microport control 110 reaches a point in its operation where it needs the services of the central processing unit 130, it places a request in the message register 213 which is periodically scanned by the common control 101 indicating to the central processing unit 130 that it requires its services. The central processing unit 130 scans the content of the message register 213 in each microport control 110 in a sequential manner and will recognize the request stored therein. This ultimately results in the central processing unit 130 sending a communication to the microport control 110 via the RX data lead to the ACIA 212 to initiate communication between the microport control 110 and the central processing unit 130.

As indicated in FIG. 13, the microport control 110 is linked to the common control by way of four signal channels: STATUS, RSTSYN, RX data and TX data. The RX data and TX data leads carry the serial data to and from the ACIA 212 in a manner to be described more particularly in connection with the transmit and receive data operations. However, the RSTSYN lead is used by the central processing unit 130 both to scan the message register 213 in the respective microport control 110 and also effect a resetting to initialize a microport control 110 under certain conditions. As illustrated in FIG. 19*a*, the signal on the RSTSYN lead may comprise a twenty-four microsecond reset pulse which serves to reset and initialize the microport control 110 or a series of load pulses of 0.97 microsecond duration which serve to enable the message register to transmit its contents (FIG. 19*b*) to the central processing unit 130 in the common control. The STATUS channel carries the data from the message register 213 in eight bit bursts to the common control 101 at a repetition rate directly related to the basic clock frequency of 1.544 MHz already distributed to the port groups for digital transmission purposes.

The status word extended from each MPC 110 to the MPCI 120 is eight bits long and is formatted such that bits 0, 1, and 2 are used for scanning control and bits 3 through 7 are used for message control, as seen in FIG. 20. The rate of transmission on this link is the same as that used for the PCM data transmission in the digital network (1.544 MHz). This allows the MPCI 120 to use the synchronization signals of the digital network for the status link, thus making them serve double duty. The MPC's are constantly scanned by the MPCI 120 at a 114 KHz rate for status information. During the 8.8 microsecond that an MPC 110 is selected by the MPCI 120, the eight bits of status information are received; the three scan bits are routed to a three-bit scan register for that MPC; while, the remaining five bits are temporarily held in a common message-handling control register in case they are required.

Transmission of MPC-to-CPU event messages is strictly under control of the CPU 130 to assure orderly processing of call information. If an MPC 110 wishes to extend a message, it so informs the CPU 130 via the status link using either the PR1 (priority 1) or PR2 (priority 2) scan bit. The CPU processes all PR2 message requests before PR1 message requests since these are the ones associated with events requiring relatively fast response. The CPU extends a command to transmit to the selected MPC 110. Then, as long as the CPU-to-MPC or MPC-to-CPU transmission persists, the MPCI circuitry is devoted to that MPC and no other MPC's are scanned. Selection of an MPC 110 by the CPU, for whatever reason, causes the MPCI to immediately step to that MPC; the message-handling-control register of the MPCI 120 then contains valid message-handling-control information for that MPC 110 which is completely updated every 8.8 microsecond.

The bit B2 in the message register 213 is a register-free indication to the CPU that a free register is available in the microprocessing unit 205 so that the CPU may terminate outgoing calls in an orderly manner.

Since the ACIA 212 can work with 8-bit bytes only, and since messages on the data links are always greater than 8 bits, the message-handling bits B3-B7 are very important. The bits B3 and B4 are encoded message bits designated EMB1 and EMB0 in FIG. 20. These encoded bits convey the following message:

00 idle
01 send next character
10 send next character
11 error

The 00 condition of the encoded message bits indicates that the microport control is in a condition where the microprocessing unit 205 is not ready to receive a message from the CPU. The encoded message combination 01 indicates to the central processing unit 130 to send the next character as data is being transmitted from the common control to the microport control. The encoded message combination 10 also refers to sending a character of data from the common control to the microprocessing unit. In this regard, the combinations 01 and 10 in the encoded message bits EMB1 and EMB0 will occur alternately as data is transmitted from the common control to the microport control until the full message is received. The encoded message bit combination 11 indicates that a parity error has been detected in the transmission indicating that the data should be retransmitted.

The bit B5 of the message register 213 represents message time-out and indicates that there is something wrong with the message. For example, a complete message may not have been received in the microprocessing unit 205 in that all of the words which the common control indicated would be sent had not been received. Under such circumstances, the microprocessing unit 205 will ignore the message.

The bit B6 in the message register 213 indicates an end of message. As far as the microprocessing unit 205 is concerned, a bit in the position B6 indicates to the CPU that the microprocessing unit 205 is through sending the message.

Bit B7 in the message register represents a request denied, indicating that the microprocessing unit 205 cannot serve the request due to some undesirable characteristic of the transmission, such as a glare condition.

As seen in FIG. 21, the message register 213 consists of flip-flops 250-257 which serve to store the eight bits representing the status conditions of the microport control 110 to be forwarded to the common control 101.

The status data provided in the message register 213 from the microprocessing unit 205 is updated at the end of each port scan with the generation of scan signal S25, as seen in FIG. 15, when signal $\overline{R/W}$ is equal to 1 and upon receipt of the timing signal Ø2T, which serves to enable the gate 249 clocking the data from the microprocessing unit 205 received on lead DATA into the flip-flops 250-257.

The status data as stored in these flip-flops 250-257 is applied via leads 0D0-0D7 to a parallel-in serial-out circuit 260, which serves to convert the status data into serial form and forward it to the common control on the STATUS channel in response to receipt of the LOAD pulse (FIG. 19*a*) from the common control, which pulses are received on leads RSTSYN by the RESET and SYNC control 216, as seen in FIG. 13, and forwarded to the message register 213. If the clock inhibit lead CLK IN is not enabled from the RESET and SYNC control 216, the LOAD signal will enable the circuit 260 to send out the serial status data at the system clock rate.

The RESET and SYNC control 216 is illustrated in FIG. 22 and serves not only to effect a reset to initialize the microport control 110, but also controls the operation of the message register 213 in response to receipt of the load pulses from the common control, which is applied to the clock control 270 via the gates 271 and 272 which is initially set at state 15.

When lead RSTSYN goes low, state 6 is loaded into the clock control 270 and flip-flop 274 is enabled by the output of OR gate 271 applied to the CL input of the flip-flop 274. Flip-flop 276 also sets upon receipt of the next Ø2T clock pulse to generate the signal LOAD applied to the message register 213 to effect a loading of the parallel data from the message register into the PISO shift register 260, as seen in FIG. 21.

The clock control 270 advances with receipt of each clock pulse on lead CLOCK subsequent to RSTSYN going low. If RSTSYN stays low for eight clock pules, the QD output of the clock control 270 will reset the flip-flop 274 to generate a reset pulse through gate 280 and also will generate a clock inhibit signal on lead CLK IN via gate 282, which is applied to the PISO 260 in FIG. 21 to inhibit transfer of the data from the message register 213 to the common control. In other words, if RSTSYN remains low for more than eight counts of the clock, it is an indication that a reset signal has been received from the common control rather than a load signal.

On the other hand, if the pulse on RSTSYN goes higher prior to eight counts of the clock, the inhibit lead CLK IN will be disabled after eight clock counts and the load signal LOAD to the message register 213 will enable the PISO 260 to shift the data serially from the message register 213 to the common control at the clock rate. The clock then continues to advance the counter 270 to the state 15 in preparation to monitor the next pulse on RSTSYN.

In addition to receiving a reset pulse from the common control, resetting for initialization of the microport control can be effected by the RESET and SYNC control circuit 216 under two other conditions. The microprocessing unit is reset at power-on by an RC network 279, as seen in FIG. 22, connected to the system power, which enables one of the inputs to the OR gate 280 via a Schmitt trigger circuit 277 and an inverter 278. In this way, a reset signal is generated at the output of the gate 280 and applied to the microprocessing unit 205.

A second condition which results in generation of a reset operation occurs when an interlock between the microport control 110 and the common control is opened to generate a signal on line INTO to the flip-flop 275 in FIG. 22. Upon receipt of the clock signal IMS from the system clock, the flip-flop 275 is reset, thereby enabling the third input to the OR gate 280, generating a reset to the microprocessing unit 205. The reset condition will be maintained until the interlock is restored.

All transmissions, whether from CPU to MPC or from MPC to CPU, have as their initial data block a sixteen bit word called a "header" which is extended into two 8-bit bursts due to the restrictions imposed on the message link by the ACIA 212 in the MPC 110. The header contains the information necessary for intelligent communications as follows:

a. Port equipment number (as referenced to the MPC);
b. Number of 16-bit words to follow the header (up to 7 max.);
c. A directive code (CPU-to-MPC only) to command the MPC;
d. An event code (MPC-to-CPU only) to instruct the CPU; and
e. A message type code (MPC-to-CPU only) to indicate a "true" message or a maintenance message.

Up to six additional sixteen bit words can follow the header depending upon the particular communication; that is, a given transmission can consist of a minimum of one 16-bit word (the header) or a maximum of seven 16-bit words (including the header). Therefore, the message and its content determine how long the MPCI 120 will remain devoted to a given MPC 110. At the conclusion of the transmission, the MPCI 120 resumes its scanning of the MPC's message register 110. Hardware timing is provided to assure against a failed MPC 110 hogging the MPCI 120, as will be described hereinafter. The CPU 130 remains associated with the MPCI 120 for the duration of the transmission since there is insufficient time to see to other business.

Since the message link between the MPC and the CPU operates at approximately 500 BAUD, there are 2 microseconds per bit transmitted. Each eight bit message burst also has associated a start bit, a parity bit, and a stop bit, as seen in FIG. 18 for eleven bits total or 22 microseconds per eight bit byte.

The typical format of the communications between the central processing unit 130 in the common control 101 and the microprocessor unit 205 in the microprot control 110 is illustrated in FIGS. 23 and 24. As seen in FIG. 23, the communication between the central processing unit 130 and the microprocessor unit 205 consists at least of a header HD and possibly also a message M1 for normal event response and/or a message M2 for register request. The CPU is a word machine and therefore operates on the basis of a sixteen bit word; whereas, the MPU is a byte machine operating on the basis of eight bit bytes. Thus, each word in a communication between the CPU and the MPU will consist of a word comprising two bytes. The header HD which forms the first word of any communication from the CPU to the MPU provides three bits to indicate the number of words in the message to be forwarded to the MPU, four bits for a directive to the MPU to perform a particular function, and six bits to indicate the port equipment number to which the message is directed. Word three in message M1 provides two bits for maintenance, six bits to indicate the state of the timer, and four command bits. Word four and subsequent words in the message M1 provides various four bit argument fields indicating the content of the message. The message M2 for register request provides four bits to indicate the count of the digit shift from the CPU to the MPU as well as four bits for digit count. Various digits to be forwarded to the MPU make up the remainder of the message M2.

Messages sent from the MPU to the CPU are of two general types, i.e., maintenance messages and normal event codes FIG. 24 indicates the format of the normal message which provides a first byte including six bits to designate the port equipment number of the port to which the message relates, and a second byte which includes four bits designating the event code, one bit indicating the message type (maintenance or normal event) and three bits indicating the number of words in the message. The first word represents the header and is always sent with the message. The remaining words in the message will designate the count of the digit shift CODS and include the dialed digits to be forwarded to the CPU. Any number of dialed digits up to a maximum of sixteen digits can be sent per message. Thus, the MPU can store dialed digits in its receivers and forward all to the CPU after all dialed digits have been received, or the MPU can send one or less than all of the dialed digits to the CPU as permitted by the CPU while dialing still is underway.

The sequence of steps involved with an MPC-to-CPU transmission begin when the CPU detects the MPC's desire to transmit via the PR1 or PR2 scan bits of the message register 213, as seen in FIG. 20. In response to such detection, the CPU causes the MPCI 120 to stop its scan at that MPC 110. The first eight bits forming the header of the CPU message are then forwarded to the ACIA 212 and stored in the receive dat register therein (FIG. 17*b*).

The MPC is interrupted by this transmission from the CPU and responds by loading the first eight bits forming the header of a response message in the transmit data register of the ACIA 212 (FIG. 17*b*), and this response message is forwarded to the MPCI 120. While the transmission of the first eight bits is being accomplished, the microport control begins shifting the next eight bits of the header into the transmit data register of the ACIA 212.

Once a communication has been completed, the MPCI steps off that microport control 110 and resumes its scanning. The CPU then checks the PR1 and PR2 scan bits of the message register for the next MPC to be serviced.

3. The MPC Software

The organization of the MPC software is graphically shown in FIG. 25*a*. There are presently seven broad categories of programs which have to do with port operation and control. Additional feature programs which would operate in the port area are not shown and would constitute an eighth category. The programs are configured around a 10 millisecond superframe made up of 5 millisecond frames (FIG. 25*b*). Consequently, one pass through the programs of FIG. 25*a* must be done within 5 milliseconds in accordance with the configuration of FIG. 25*b*. The IRQ (interrupt request) signal marks the start of each 5 millisecond frame.

The purpose of the interrupt-handling programs is to process interrupts in a logical manner. It is through these programs that the IRQ interrupt is processed to start a 5 millisecond frame. The CPU communication program is accessed via the nonmarkable interrupt (NMI). This allows the MPC to "talk" properly with the CPU and to decipher incoming codes. Power-up and reinitialization of the MPC is accessed via the reset link, power being applied, or by watchdog timer time-out. In this routine, not only are proper port parameters loaded for the ports, but the MPC also interrogates the ports for their identification (port type such as E/M trunk, line circuit, etc.).

The port-communications programs are structured using straight-line programming for conversion of speed. All forty-eight ports are accessed for I/O in 0.6 microseconds of each 5 microsecond frame. It is to be noted that these programs operate on the SUP0, SUP1, and SUP2 areas of the RAM (FIG. 11*c*) which are within the base page of the memory. Each bit of the SUP0 is a relay (or circuit) in the associated port so that setting the bit to a "1" activates the associated circuit of the port. Thus, any other program of the MPC which wishes to control a port circuit can do so by simple memory operations with full assurance that the mechanics of port control will be handled by the port communications programs. The SUP1 and SUP2 area store the sense information picked up from the ports in successive 5 millisecond frames for use by the registers which are functional every 10 milliseconds. By these areas, the MPC can "look" 5 milliseconds into the past for a given port.

Access to the CPU communications programs is instituted through the nonmarkable interrupt (NI) since the CPU, running asynchronously to the MPC, can start communications at any time. In all communication protocol, the CPU is the absolute master while the MPC is the slave. Hence, as pointed out above, if the MPC wishes to communicate with the CPU, it requests CPU service by marking the appropriate bits in the MPC message register 213.

The scan control programs determine the sequence of operation in the MPC. Since these programs also decide which program is to be executed, they form a very basic MPC system executive. There are three scan control programs which are interrelated for processing the port data stored in the RAM SUP1 and SUP2 areas and for controlling the port command bits stored in the SUP0 area. The programs are as follows:

a. Slow-Scan Control. This is the slowest scan rate and is used for seizure of ports identified as line circuits. In every 5 millisecond frame, only one port is scanned in this mode. For forty-eight ports (and two dummy ports for maintenance), the slow-scan frame is 250 milliseconds.

b. Medium-Scan Control. The medium scan rate is 50 milliseconds. In each 10 millisecond superframe, ten ports are scanned; thus, for five superframes (50 milliseconds) all ports are scanned. There is no medium scan list, but a bit in the port-bit area of RAM tells the program that a port is in medium scan. Normally, all trunks are always in medium scan. This is so that there is a minimum delay-to-service upon seizure. Under certain conditions, some lines may also be medium scanned.

c. Fast-Scan Control. This program transfers control to the fast-scan list. This is a list identifying ports associated with a (RAM) register. Up to eight ports can be assigned to this list at any given time. The fast scan rate 5 millisecond. This high rate is required by the registers for effective indialing pulse analysis and control and/or outpulsing control.

The phase transition programs are used to transfer control to operational programs. For each MPC state, there is a corresponding program. The MPC status for a given port are determined by the port type and its condition; as inputs to the port change, the MPC state for that port also changes.

The substrate operational programs are those which actually do all the work on a port. Control is transferred to this set of programs by the phase transition program. A jump table is used to transfer control to those programs. Subroutine programs are not shown in FIG. 25*a* but are used heavily in the MPC to save programming effort. These perform routine functions such as equipment-number-to-hardware-address conversion, deletion of dialed digits from the register area, detection of wink start, enter event codes for transmission to the CPU and the like.

Maintenance programs perform a variety of operations. Included are such features as traffic-metering (wherein peg counts and the like are kept on the ports and registers for transmittal to the CPU), port-type identity (to automatically identify a port card type when it is plugged in), maintenance calls, etc. The maintenance programs have two dummy ports which can originate and terminate test calls as though they were real ports. Their type, of course, can be changed as required. These test calls communicate with the CPU in the normal manner although they carry a "maintenance" designation. This guarantees that if a failure occurs in the hardware links, or in the MPC, the CPU will eventually find it.

C. THE COMMON CONTROL

The relationship of the MPC's 110 to each other and to the CPU 130 is shown in FIG. 26. The MPC Interface 120 (MPCI) functions as a message center for communications to and from the CPU 130 and MPC 110. It appears as an I/O device to the CPU 130 and is treated as such. The bus buffers 118*a* and 118*b* are simply hardware necessities to interface the MPC buses, to provide MPC steering under MPCI control, and to provide the necessary fanouts to the MPC's. The functions required to be performed by the MPCI complex are as follows:

a. Provide temporary storage for data to/from the CPU 130 and each MPC 110. It provides the proper parallel bus interface to the CPU 130 and a serial interface to the MPC 110.

b. Provides even-parity generation for data extended to the MPC 110 and even-parity checking on data received from the MPC 110.

c. Storage, updating, and monitoring of the status signals from the various MPC's 110.

d. MPC selection is provided. The MPC cannot communicate with the CPU without the CPU's permission. By means of the status link, the MPC 110 indicates its desire to transmit. The CPU responds to this and causes the MPCI 120 to devote itself to the MPC 110. A message is then sent to the MPC 110 to commence its transmittal. The MPCI 120 remains devoted to the MPC 110 as long as required. The same operation takes place if the CPU 130 wishes to send to the MPC 110.

e. MPC reset function is implemented. When commanded by the CPU, the MPCI 120 can reset any (or all) MPC's 110 by extending a signal over the "reset" link which is greater than eight MPC clock pulses (greater than 8 microseconds).

f. Synchronization of transmission between the MPCI 120 and the MPC's 110 is performed. Synchronization pulses are extended over the "reset" link to control the ACIA 212 in the MPC 110. These signals have a repetition rate of 114 KHz and a duration of 0.977 microseconds. They are extended to an MPC 110 only when required.

1. The Bus Buffers

As seen in FIG. 6, the bus buffers 118 form the basic link between the respective microport controls 110 in each of the port groups 100 and the microport control interface 120 in the common control. In addition to serving as a distribution center for all signals to and from the microport control interface 120 and the various microport controls 110, the bus buffer 118 also performs a multiplexing and line selection function for control purposes.

FIG. 27 is a basic block diagram of the bus buffer 118, which includes a plurality of driver-receiver circuits 300, each associated with a respective microport control 110. The circuits 300 each include a data-to-microport control driver 310, a reset-to-microport control driver 302, a data-from-microport control receiver 303, and a status-from microport control receiver 304. The driver and receiver circuits 301–304 provide the interface with the control and data links to the respective ports groups 100.

The data and reset lines from the microport control interface 120 are connected to the data driver 301 and reset driver 302 in each driver circuit 300 via buffer circuit 305; while, the data and status information from each microport control 110 is supplied to the microport control interface 120 from the receivers 303 and 304 via the buffer circuit 306. In order to control the receipt and transmission of data and control signals between the common control 101 and the respective port groups 100, the common control 101 scans the respective port groups 100 by selectively enabling the associated driver circuit 300 in the bus buffer 118 which connects to the particular microport control 110 in the selected port group 100. In this regard, the microport control interface 120 supplies to the bus buffer a plurality of enabling signals EN0–EN22 which are connected through a buffer inverter 310 to the respective driver-receiver circuits 300. Thus, each of the enable leads EN0–EN22 represents one of the microport control circuits 110 attached to the bus buffer 118. When activated by the microport control interface 120, a particular enable lead allows a two-way means of communication to be established between the microport control interface 120 and the selected microport control 110.

The leads to and from the microport control interface 120 are all single-ended and use a low level signal as the active state. On the other hand, the leads between the bus buffer 118 and the various microport controls 110 are all differentially driven. Thus, the drivers 301 and 302 serve to receive the single-ended information from the microport control interface 120 and differentially drive it to the MPC. In a like manner, the receivers 303 and 304 differentially receive information from the microport control 110 and send it single-ended to the microport control interface 120.

2. The Microport Control Interface

The microport control interface 120 performs various functions as an interface circuit between the port groups 100 and the peripheral bus extending to the CPU 130 via the interrupt encoder 125. The principal function consists of temporary storage for the data which is transmitted to and from the central processing unit 130, as well as storage and update for the microprocessor control status signals from the MPC. However, the microport control interface 120 also performs the microport control selection function by generating the enabling signals EN0–EN23 to the bus buffer 118, parity check for the data received from the microport control 110 and the provision of even parity for the data supplied to the microport controls 110. In addition, the microport control interface 120 provides for the scanning of the status of the various microport controls 110 relating to the priority one and priority two requests and the register-free status. Message length monitoring is also performed by the microport control interface 120 to indicate to the central processing unit 130 when a complete message has been received.

The microport control interface 120, as seen in FIG. 28, provides sixteen bi-directional single-ended lines carrying data to and from the interrupt encoder 125 as well as six unidirectional lines from the interrupt encoder 125 designated register select 1 and 2, write, read, device enable and strobe. All data transferred between the microport control interface 120 and the interrupt encoder 125 is in parallel form. The microport control interface 120 receives data on lead DATAI and status information on lead OSTTI from the bus buffer 118 in serial form and supplies data to the bus buffer 118 in serial form on lead DATAO. The microport control enable signals EN0–EN23 are also supplied to the bus buffer 118 from the microport control interface 120.

Data and control signals are received from the interrupt encoder 125 at a bus transceiver 320. The data signals ID0–ID15 are supplied to an output FIFO 332 which temporarily stores the data and provides it on a first-in, first-out basis to a message PISO (parallel-in serial-out) 323 where the data is converted from parallel to serial form and supplied to the bus buffer 118 on lead DATAO. The control signals WRITE, READ, DE, XR0 and XR1 received by the bus transceiver 320 from the interrupt encoder 125 are provided in part to the control register 325 to indicate a particular microport control 110 to which the data is to be transmitted. The control register 325 in turn controls a microport control code selector 327 which is driven by a microport control counter 328. The selector circuit 327 in turn supplies its output to the MPC decoder 330 which generates the enable signals EN0–EN23.

During normal scanning of the microport controls 110, the MPC counter 328 will drive the MPC code selector 327, whose output is decoded by the MPC decoder 330 to sequentially generate the enable signals EN0–EN23 supplied to the bus buffers 118 for purposes of scanning the respective microport controls 110 in the various port groups 100. In this way, as already described in connection with the microport control, load pulses provide for the transfer of status information from each microport control 110 to the microport control interface 120, where it is received on lines OSTTI from the bus buffer 118 at status SIPO (serial-in parallel-out) circuit 335. The serial status information received from the bus buffer 118 is converted into parallel form by the circuit 335 and the bits relating to priority 1 and priority 2 requests and register-free status are stored in storage latches 336 where this information may then be supplied via status buffers 337 and the bus transceiver 320 to the central processing unit 130 via the interrupt encoder 125. Thus, the interrupt encoder 125 can periodically scan the status of each of the microport controls 110 as stored in the status storage circuit 336 via the control register 325 and a status read decoder 340, whose output serves to control the status buffers 337 which transfer the status information to the central processing unit 130 via the bus transceiver 320.

When the CPU 130 detects a request for service from a microport control 110 in one of the status bits relating to priority 1 or priority 2 requests, a directive will be sent from the CPU, as described in connection with FIG. 23, and the CPU will at the same time provide the microport control number to the control register 325 to lock the microport control interface 120 to a single designated microport control 110 by locking onto one of the enable signals EN0–EN23 associated with the particular microport control 110. The microport control 110 may then forward data to the CPU which is received in serial form on lead DATAI at the message SIPO (serial-in parallel-out) circuit 350. The serial data is converted to parallel form by the circuit 350 and forwarded to the input FIFO and parity circuit 352 which provides temporary storage for the data and provides it on a first-in first-out basis through the message buffers 354 to the bus transceiver 320 for transmission to the interrupt encoder 125. The message send control circuit 356 monitors the number of words sent to the microport control 110, and when all words are sent and the CPU has read all messages sent to it by the MPC (if any), this information is then forwarded to the interrupt encoder 125 via the bus transceiver 320.

Any communication between the central processing unit 130 and a microport control 110 must be initiated by the central processing unit which is the master in all cases. Thus, before any message can be forwarded from the microprocessor unit 205 to the CPU, the CPU must send one word to the MPC to initiate the transmission of this message, as already described. In this regard, the central processing unit 130 continuously scans the message register 213 in each microport control 110 and will detect a priority 1 or priority 2 request when it appears. The central processing unit 130 then will contact the microport control 110 to indicate that it is is prepared to receive a message.

Figure 29:
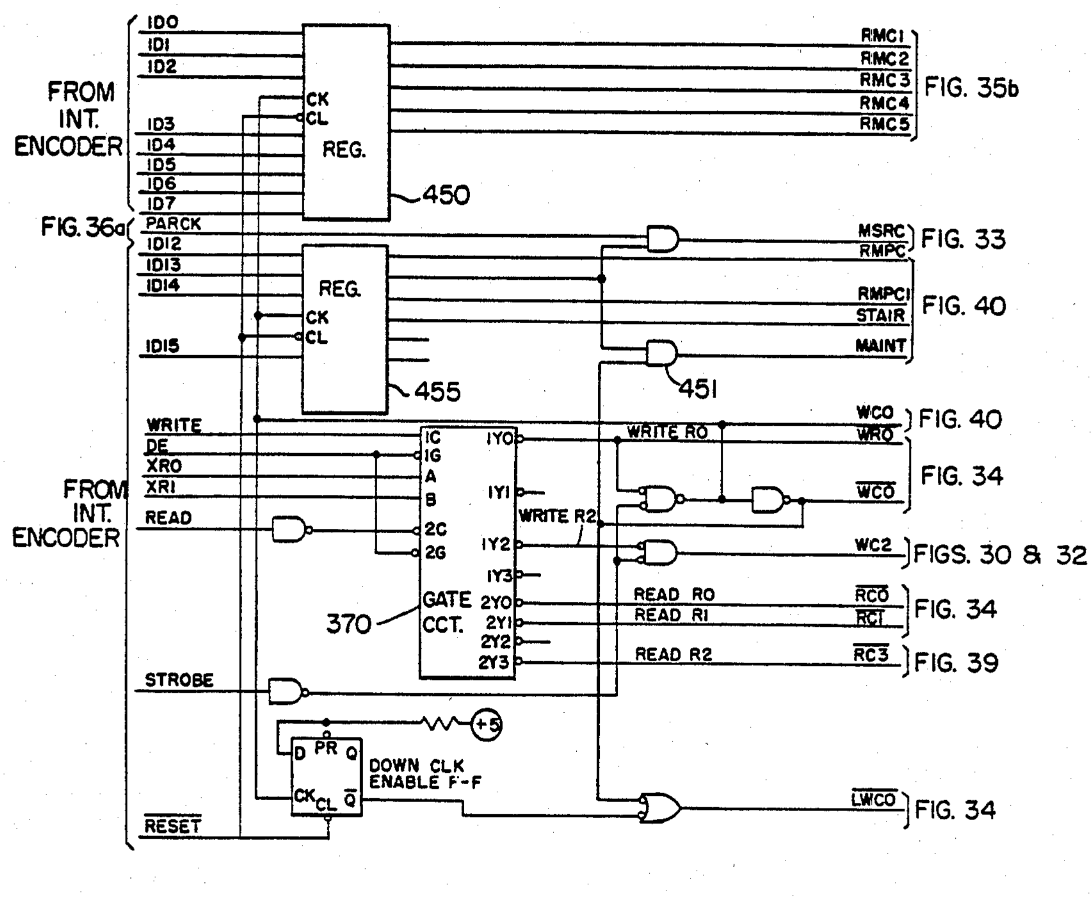

Referring to FIG. 29, which illustrates details of the control register 325, the interrupt encoder 125 first obtains access to the microport control interface 120 by pulsing the device enable lead DE to the gate circuit 370. Depending upon whether a read or write operation is to be effected, either the WRITE lead or the READ lead will be also enabled. The leads XR0 and XR1 designate the register select 1 and register select 2 control leads from the interrupt encoder 125. In response to enabling of the WRITE lead and depending upon the condition of the XR0 and XR1 leads, the gate circuit 370 and its associated output AND gates will produce the write command signals $\overline{\text{WCO}}$, $\overline{\text{WRO}}$, and $\overline{\text{WC2}}$. The STROBE lead provides a strobe pulse from the interrupt encoder 125 a short time after enabling of the DE lead and serves to ensure that the data is accurately received within the microport control interface 120.

In a similar manner, upon enabling of the READ lead from the interrupt encoder 125 to the gate circuit 370 and depending upon the condition of the leads XR0 and XR1, the read control signals $\overline{\text{RCO}}$, $\overline{\text{RC1}}$ and $\overline{\text{RC3}}$ will be generated. Again, the strobe lead STROBE controls the timing to ensure that the lead operation is effected at a time when proper data can be read.

Figure 30:
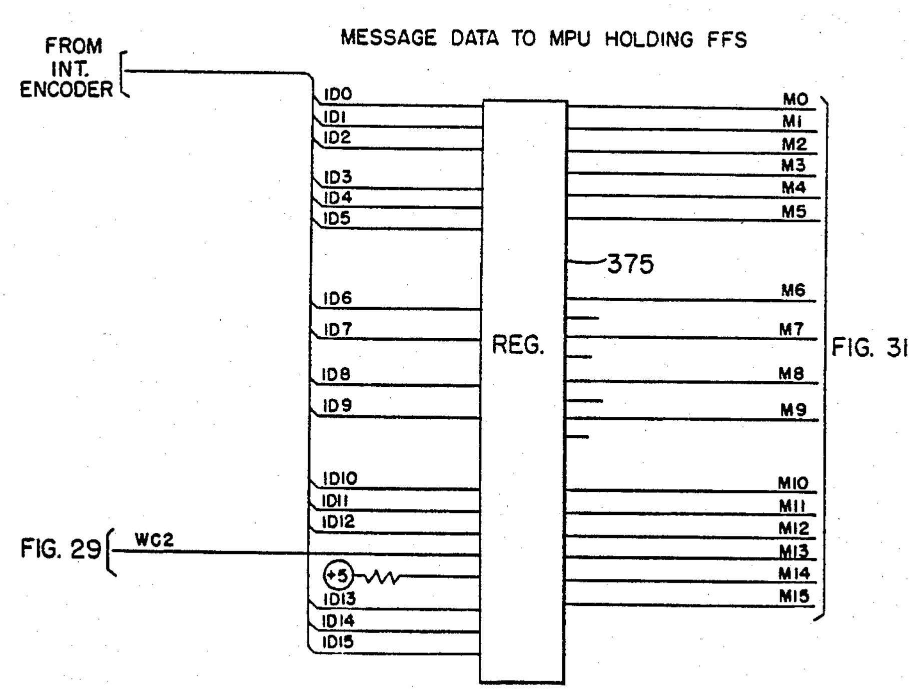

As already indicated, the central processing unit 130 operates on the basis of sixteen bit words while the microport control 110 operates on eight bit bytes. Accordingly, the microport control interface 120 serves as a means for converting between words and bytes in the messages which are transmitted between the central processing unit 130 and the microport control 110. As seen in FIG. 30, a sixteen bit message from the interrupt encoder 125 is received on leads ID0–ID15 and this data is stored in a register 375 upon receipt of the write control signal WC2 from FIG. 29. The two bytes stored in register 375 are then provided on output lines M0–M15 to respective gates 377 and 378 in FIG. 31, from which they will be sequentially applied to the output FIFO 322 under control of the FIFO load control 380, illustrated in FIG. 32. The FIFO load control 380 generates three timing signals in response to the write control signal $\overline{\text{WC2}}$ and the clock signal MPCK1 (1.544 MHz) to control the gates 377 and 378 as well as the shifting data into the FIFO 322. FIG. **32*a* is a timing diagram providing an indication of the relative timing of the signals SIA, $\overline{\text{ENM0}}$, and $\overline{\text{ENM1}}$. As can be seen from the drawings, the first eight bits on lead M0–M7 first pass through the gate 377 in response to the enable signal $\overline{\text{ENM0}}$ going low, and the next leading edge of the timing signal SIA, the first byte is shifted into the FIFO 322. The second byte which appears on leads M8–M15 passes through gate 378 when the enable signal $\overline{\text{ENM1}}$ goes low and this byte is shifted into the FIFO at the leading edge of the next timing pulse SIA. Thus, the sixteen bit word from the central processing unit is converted into successive eight bit bytes in the FIFO 322**.

Figure 31:
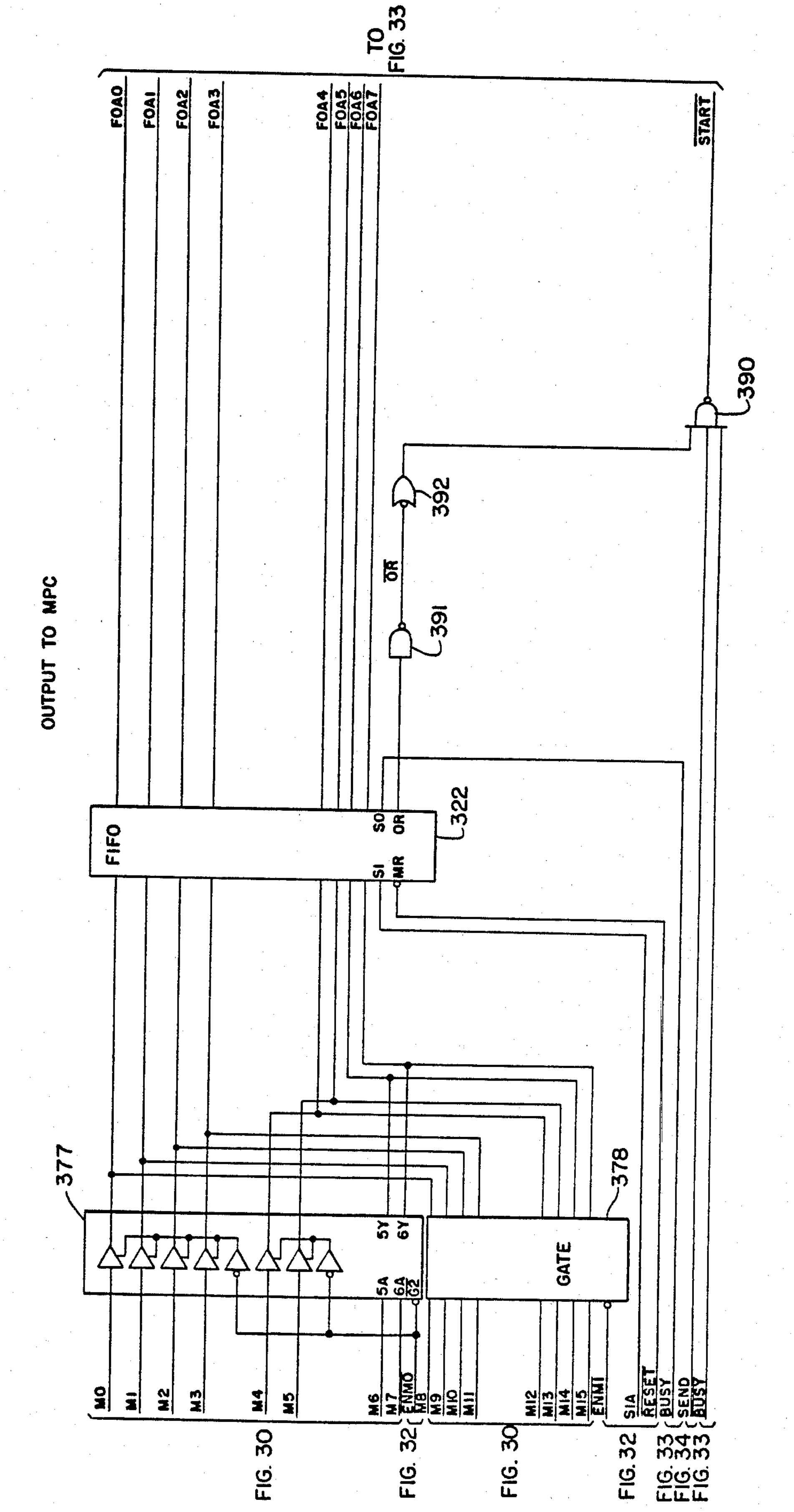
Figure 32:
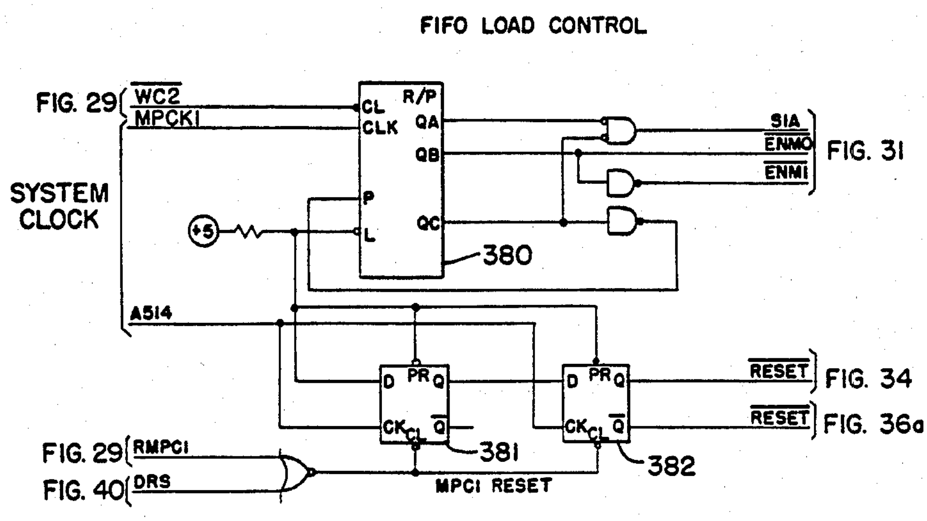
Figure 32A:
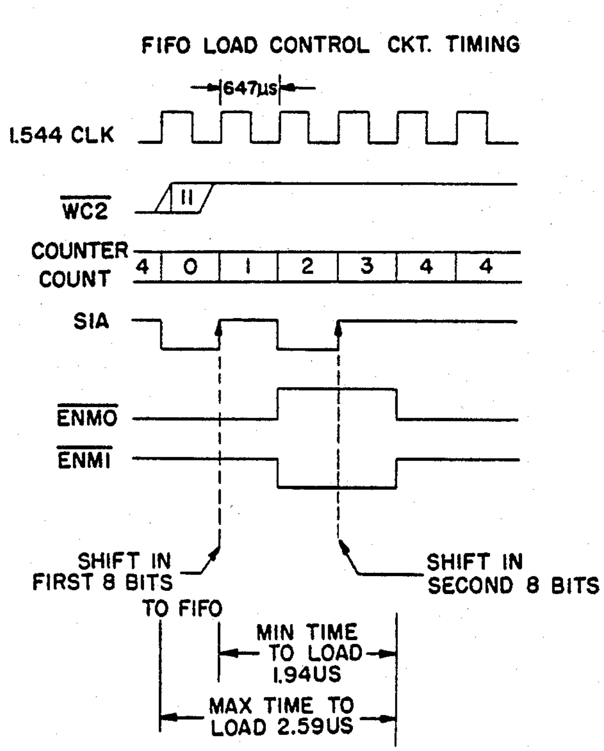
Figure 33:
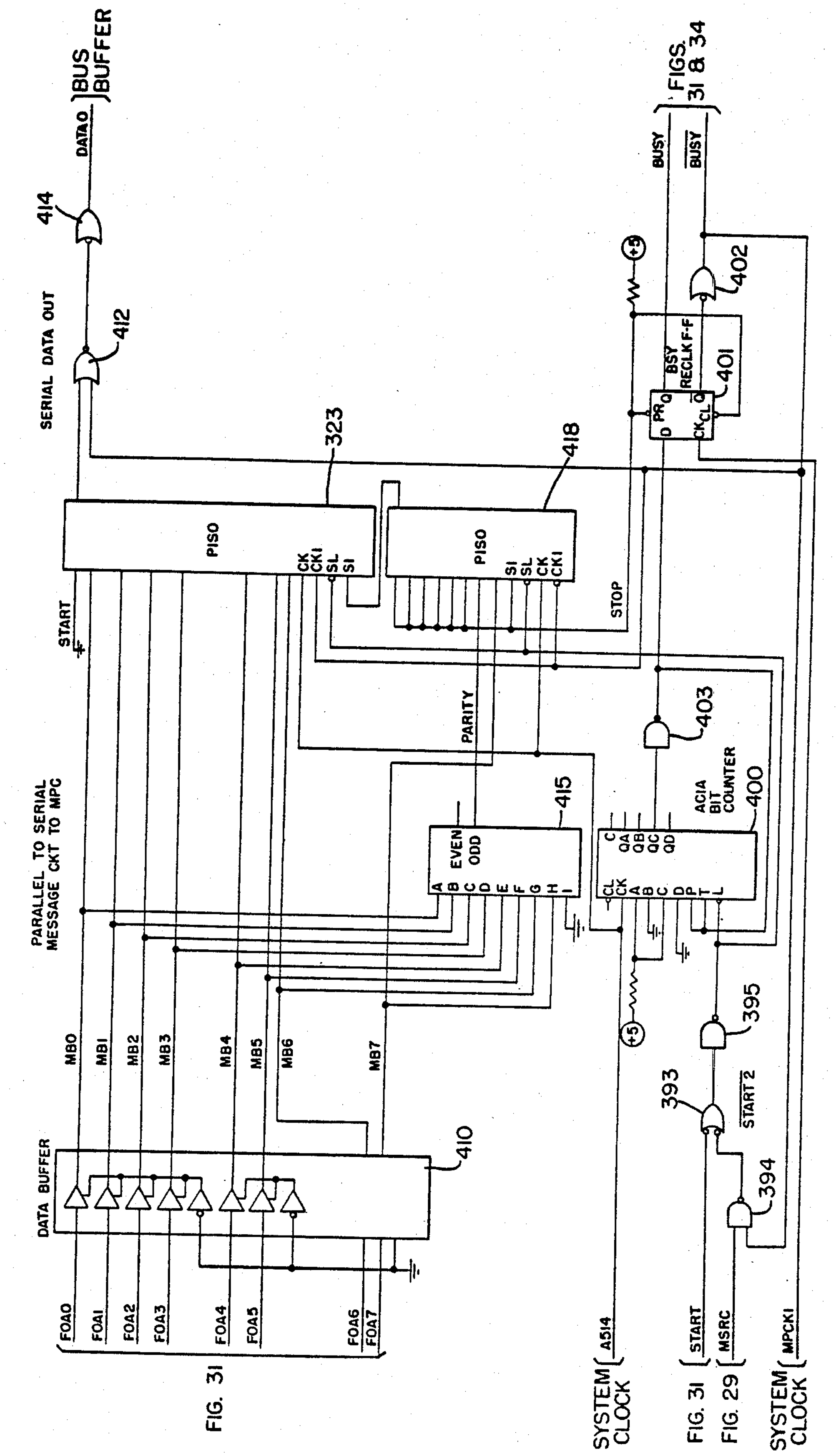

When the data appears at the output of the FIFO 322 in FIG. 31, one input of AND gate 390 will be enabled via inverter 392 and OR gate 391. The other inputs to AND gate 390 are the SEND control lead and the $\overline{\text{BUSY}}$ control lead. When all three inputs to the AND gate 390 and enabled, the output produces a $\overline{\text{START}}$ signal to initiate shifting the data out of the FIFO 322. As seen in FIG. 33, the $\overline{\text{START}}$ signal passes through OR gate 393 and inverter 395 to the ACIA bit counter 400, which is initialized by the $\overline{\text{START}}$ signal. At this time, the busy reclock flip-flop 401 is reset so that the $\overline{\text{BUSY}}$ output is enabled via OR gate 402 and this signal forms one of the inputs to the AND gate 390 in FIG. 31. The counter 400 is then driven from the clock pulse A514, and the counter provides an output via gate 403 to set the flip-flop 401, enabling the BUSY lead. The FIFO 322 in FIG. 31 is controlled by the BUSY output from the flip-flop 401 to shift out the byte appearing at its output through a gate circuit 410 in FIG. 33 to the input of the message PISO 323, where the data will be shifted in in parallel and shifted out in serial form through gates 412 and 414 on lead DATAO to the bus buffer at the clock rate of 514 KHz.

The data which is applied through the gate circuit 410 in FIG. 33 on leads NB0–NB7 to the PISO 323 is also applied to a parity circuit 415 which determines whether the parity of the byte is odd or even. If the parity is odd, the output of the parity circuit 415 is applied to a parity generator 418 which adds to the message the proper parity bit to provide even parity of the data. When the shift counter 400 reaches the end of its count indicating the presence of the stop bit in the message, the busy reclock flip-flop 401 is reset once again providing an output on $\overline{\text{BUSY}}$ via gate 402 to the input of the gate 390 in FIG. 31 thereby permitting another start signal to be generated as soon as another byte of information appears at the output of the FIFO 322.

As seen in FIG. 31, the transfer of data from the FIFO 322 to the PISO 323 and then to the bus buffers is controlled by the SEND lead which controls the shifting of data out of the FIFO 322. Each time the SEND lead is pulsed, data appearing at the output of the FIFO 322 is shifted out, converted from parallel to serial form in the PISO 323, and transmitted to the bus buffer on lead DATAO. The SEND control signal is generated in the message send control illustrated in FIG. 34.

As indicated in connection with FIG. 23, the first word or header of any message from the CPU to the microport control 110 includes the length of the message in terms of the number of words comprising the message. This information forms bits 8, 9, and 10 of the message data received from the interrupt encoder 125 on leads ID8, ID9, and ID10 at the input of a message length counter 425, which is preset by the count represented by bits 8, 9, and 10 of the message in conjunction with the timing signal $\overline{WRO}$ from the control register in FIG. 29. The message length counter 425 is then incremented via gate 426 each time the $\overline{BUSY}$ lead is enabled from the output of the busy reclock flip-flop 401 in FIG. 33 so that the counter 425 counts down with each word shifted out from its present count until it reaches zero. This indication that all words of the message have been transmitted is indicated by enabling of the gates 427 and 428 at the output of the counter 425 thereby providing an output $\overline{SDONE}$ from AND gate 429 to be forwarded to the CPU.

Figure 34:
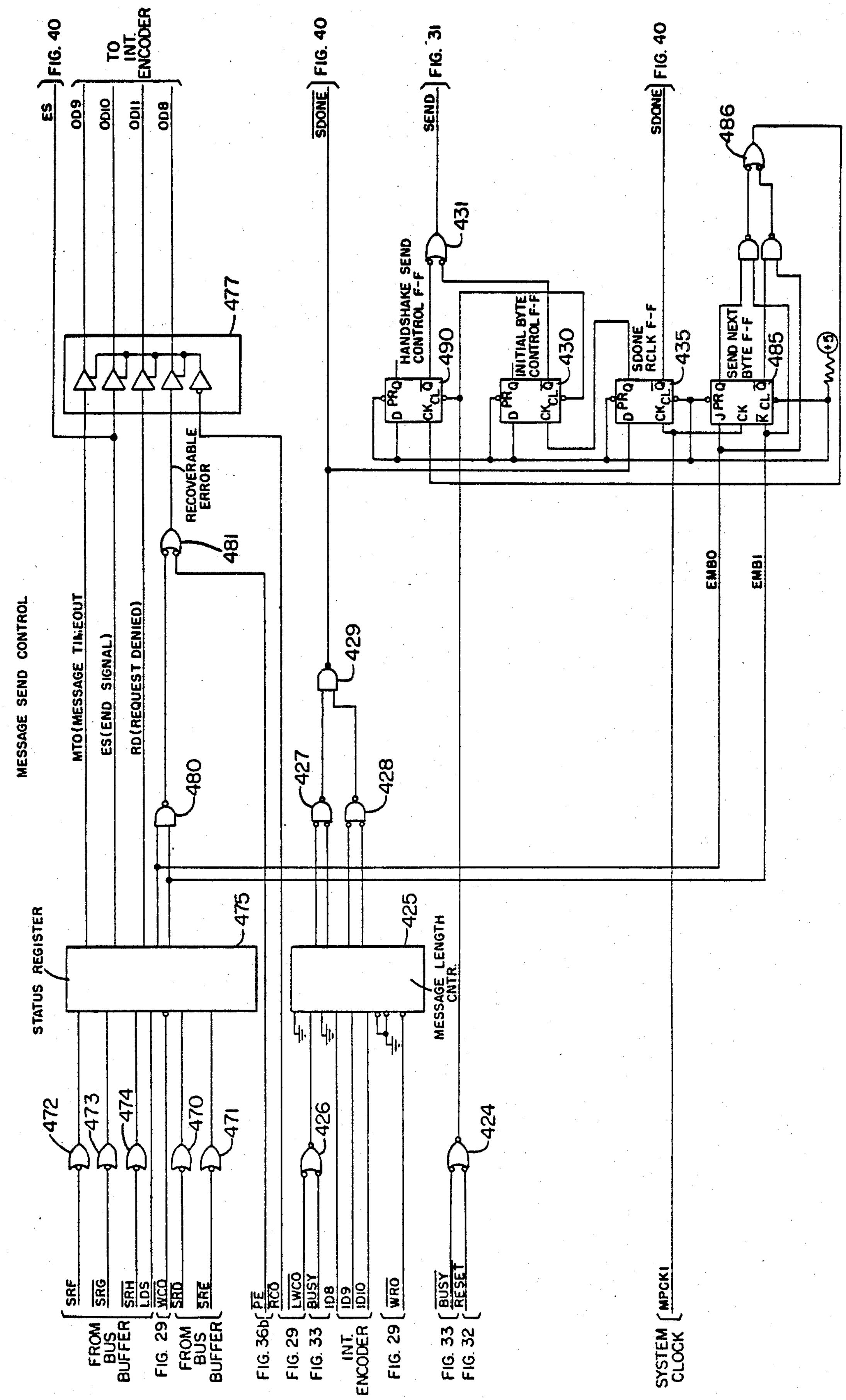

The SEND lead which controls the transmission of data from the interrupt encoder 125 through the microport control interface 120 to the bus buffer 118 is provided at the output of gate 431 in FIG. 34 from the reset outputs of the handshake send control flip-flop 490 of the initial byte control flip-flop 430, which is cleared from the output of gate 424 after the first byte is sent. When the signal $\overline{SDONE}$ at the output of gate 429 goes high, the SDONE reclock flip-flop 435 sets on the next clock pulse MPCK1. This causes the initial byte control flip-flop 430 to set and the output of gate 431 goes low. After the first byte has been sent, the message bits EMB0 and EMB1 from the message register 213 in the microport control 110 control generation of the SEND output from gate 431 by switching the send next byte flip-flop 485 to produce an output from gate 486 which sets the handshake control flip-flop 490 with each alternation of the bits EMB0 and EMB1.

In addition to data, the message from the CPU to the microport control includes the address of the MPC to be accessed. In this regard, the first eight bits of the sixteen bit word relate to the address of the microport control and the second eight bits relate to data. Returning to FIG. 29, it is seen that the address bits from the interrupt encoder 125 appear on leads ID0–ID7 and are stored in register 450. These address bits appear on leads RMC1–RMC5 and are applied to the MPC code selector 327 (FIG. 28) and then to the MPC decoder 330 where the proper enable signal is provided to the bus buffer to effect connection to the selected microport control 110.

The control register 325 also includes a register 455, as seen in FIG. 29, to which is applied the reset MPC bit 12, the maintenance bit 13, and the reset MPCI bit 14 of the message on leads ID12, ID13, and ID14 from the interrupt encoder 125. The outputs from the register 455 therefore include a lead RMPC which instructs resetting of the microport control 110, a lead RMPCI which instructs resetting of the microport control interface 120, and a maintenance lead MAINT which is enabled via the gate 451 in conjunction with the write control signal $\overline{WCO}$. The status read bit 15 of the message is also applied to the register 455 on lead ID15 and produces the output STATR to the status read decoder 340 for controlling the gating of status information from the status storage 336 through the status buffers 337 to the interrupt encoder, as seen in FIG. 28.

Figure 35A:
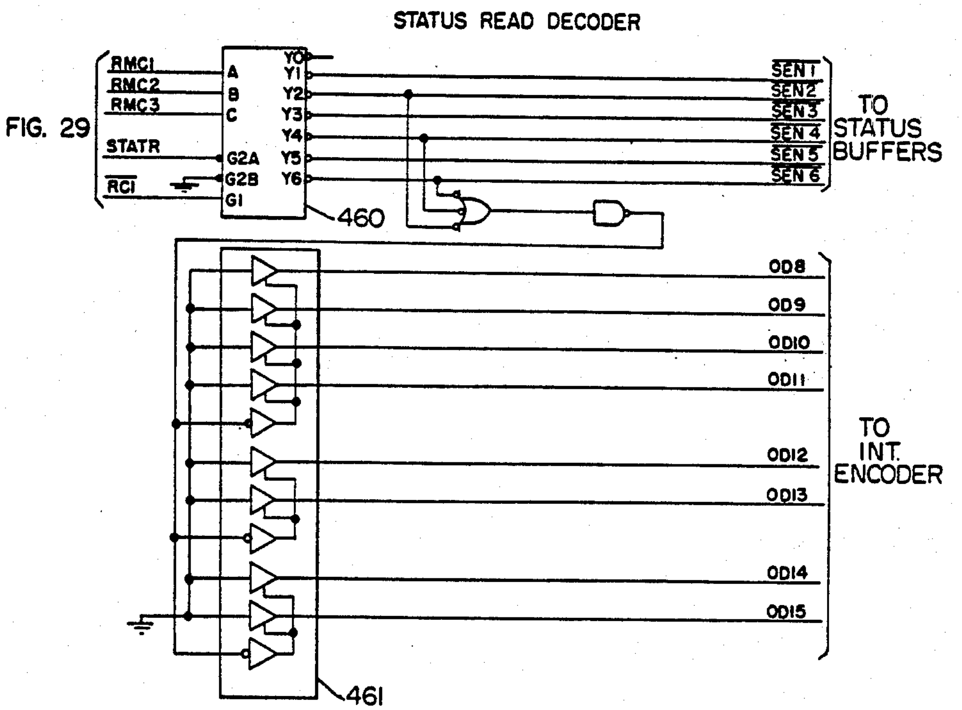
Figure 35B:
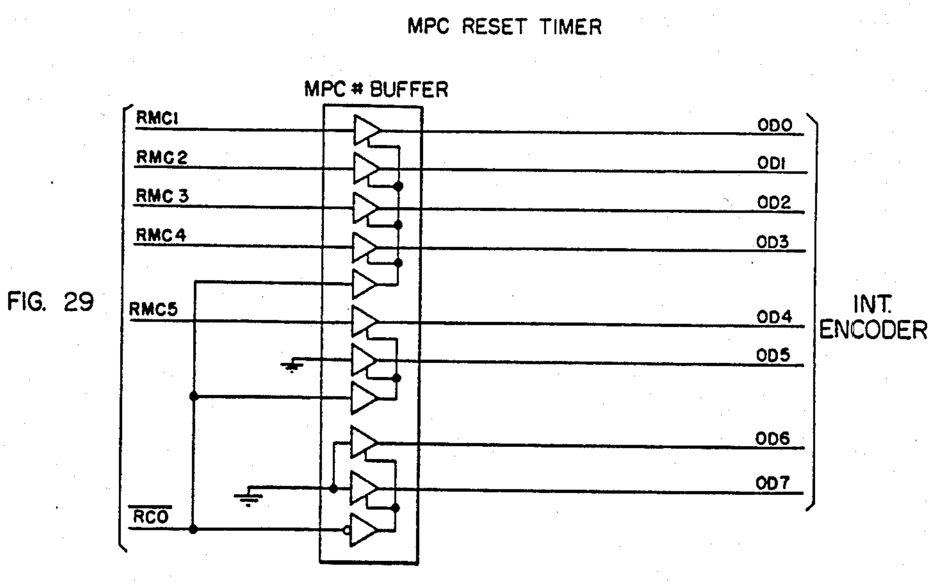

The status read decoder is illustrated in FIG. 35*a*, and comprises a decoder 460 which receives the first three bits of the address received from the interrupt encoder on leads RMC1, RMC2, and RMC3 and is enabled by the status register lead STATR to provide the sense signals $\overline{SEN1}$–$\overline{SEN6}$. These sense signals are the signals which are forwarded to the status buffer 337 to enable these buffers permitting the stored status information in the status storage 336 to be forwarded through the bus transceiver 320 to the interrupt encoder.

As already indicated, the status storage 336, as seen in FIG. 28, merely stores the three bits of the status from each microport control relating to priority request 1, priority request 2, and register-free, data which the central processing unit 130 continuously scans to detect requests from each microport control 110 and indications of the availability of a register therein. The remaining status data which is message related is received in the message send control 356, as seen in FIG. 34, being applied on leads $\overline{SRD}$, $\overline{SRE}$, $\overline{SRF}$, $\overline{SRG}$ and $\overline{SRH}$ via gates 471–474 to the status register 475. The status register 475 is controlled by the timing signals LDS and $\overline{WCO}$ and provides the message time-out bit MTO, the end signal bit ES and the request denied bit RD through gates 477 upon receipt of the read control signal $\overline{RCO}$ from the control register in FIG. 29. These three bits are then applied on leads OD9, OD10, and OD11 to the interrupt encoder 125.

The message bits EMB1 and EMB0 which control the sending of the characters from the central processing unit 130 to the microport control 110 are received from the output of the status register 475 at the input of AND gate 480. As already indicated, these bits from the message register 213 in the MPC alternate zero and one in the sending of successive characters; however, if both bits equal one, it is an indication of recoverable error, and this is provided by enabling of the output of gate 480 through gate 481 and the gates 477 to provide an indication to the interrupt encoder 125 on lead OD8.

Figure 36A:
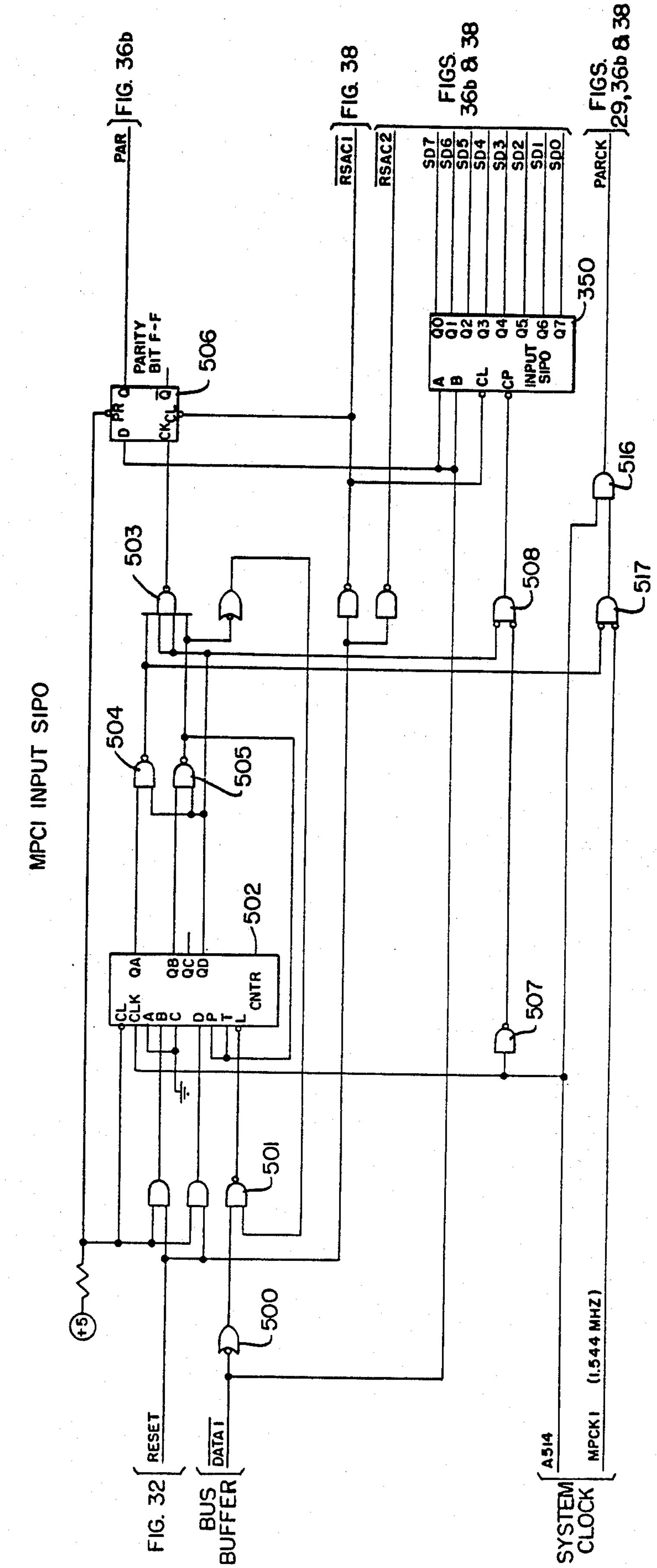

The receipt of a message from a microport control 110 is basically the opposite operation to the transmission of a message from the central processing unit 130 to the microport control 110. As seen in FIG. 36*a*, the data is received from the bus buffer 118 in serial form on lead DATAI and is clocked into the SIPO circuit 350 by the A514 clock signal applied through gates 507 and 508. The data is then converted from serial to parallel form and provided on the leads SD0–SD7. The data is also applied through gates 500 and 501 to a counter 502 which forms part of the parity checking arrangement. The counter 502 counts the bits which are received on the lead DATAI and its outputs enable the AND gate 503 via the gates 504 and 505 at the time the parity bit is received. The output of AND gate 503 clocks the parity bit flip-flop 506 to set the flip-flop or allow it to remain reset depending upon the parity of that bit. The output of flip-flop 506 is applied along with the data outputs SD0–SD7 to the parity generator 510 in FIG.

36*b* where the odd or even parity of the data is determined.

Figure 36B:
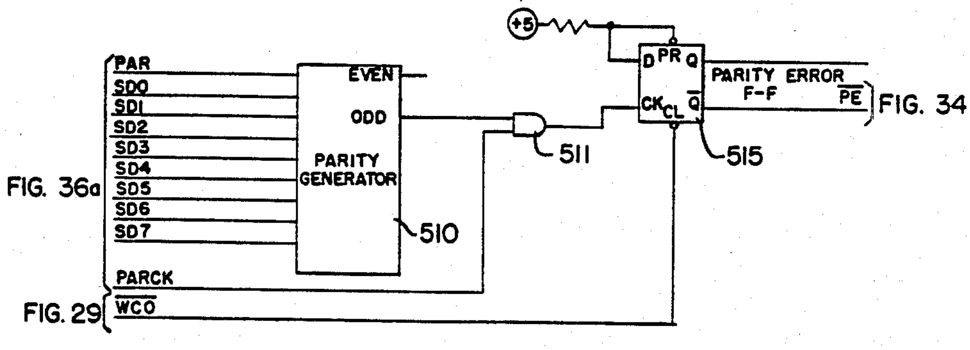

Upon receipt of the parity check signal PARCK at the input of gate 511 in FIG. 36*b*, the parity of the data is supplied to the parity error flip-flop 515 which then determines whether a parity error exists by either setting or remaining reset to provide the $\overline{PE}$ output. The flip-flop 515 is reset by receipt of the write control signal $\overline{WCO}$. The parity check signal PARCK is generated in FIG. 36*a* from the output of AND gate 516, whose one input receives the clock signal A514 and whose other input is enabled by another AND gate 517. The AND gate 517 is enabled by the output of gate 504 upon receipt of the next clock pulse signal on lead MPCK1.

Where a parity error exists, as indicated by enabling of the output $\overline{PE}$ from parity error flip-flop 515 in FIG. 36*b*, OR gate 481 in FIG. 34 is enabled to provide an indication to the interrupt encoder 125 on lead OD8 of the recoverable error. The central processing unit 130 receiving this information can then indicate to the microport control 110 that the data was insufficient and will be ignored, and that the message should be sent once again.

Figure 39:
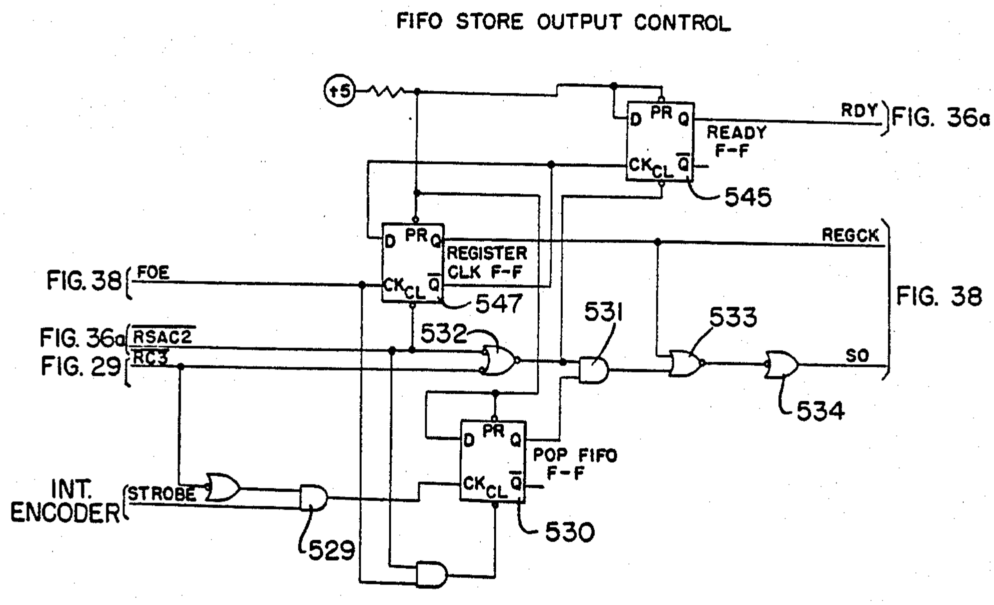

Barring an error in the received data, the data stored in the input SIPO 350 (FIG. 36*a*) is applied to the input FIFOs 520 and 522 in FIG. 36 with the bits SD0–SD3 being applied to the FIFO 520 and the bits SD4–SD7 being applied to the FIFO 522 upon receipt of the parity check signal PARCK from FIG. 36*a*. As already indicated, the central processing unit 130 is capable of receiving sixteen bits, and therefore, the eight bit bytes provided by the microport control 110 are to be combined into sixteen bit words under control of the input FIFO circuits 520 and 522. Each byte of the message is shifted into the FIFOs 520 and 522 in the manner indicated until data appears at the output of these FIFOs. At this point, the OR gate 528 is enabled from the output of gate 525 and/or gate 526 to set the output ready flip-flop 525, which is closed by the lead SO. Since the central processing unit 130 will not receive data until it is ready, it is for the CPU to indicate to the MPCI that it is ready to receive data by proper instruction. In this regard, as seen in FIG. 39, a read control signal $\overline{RC3}$ is generated in the control register in response to instructions from the interrupt encoder 125 and the strobe pulse STROBE also received from the interrupt encoder 125 sets the POP FIFO flip-flop 530 via gate 529. With the flip-flop 530 set, gate 531 is enabled from the output of gate 532 with receipt of the read control signal RC3, the output of AND gate 531 being applied through gates 533 and 534 to enable the SO lead extending to the flip-flop 525 in FIG. 37.

Figure 37:
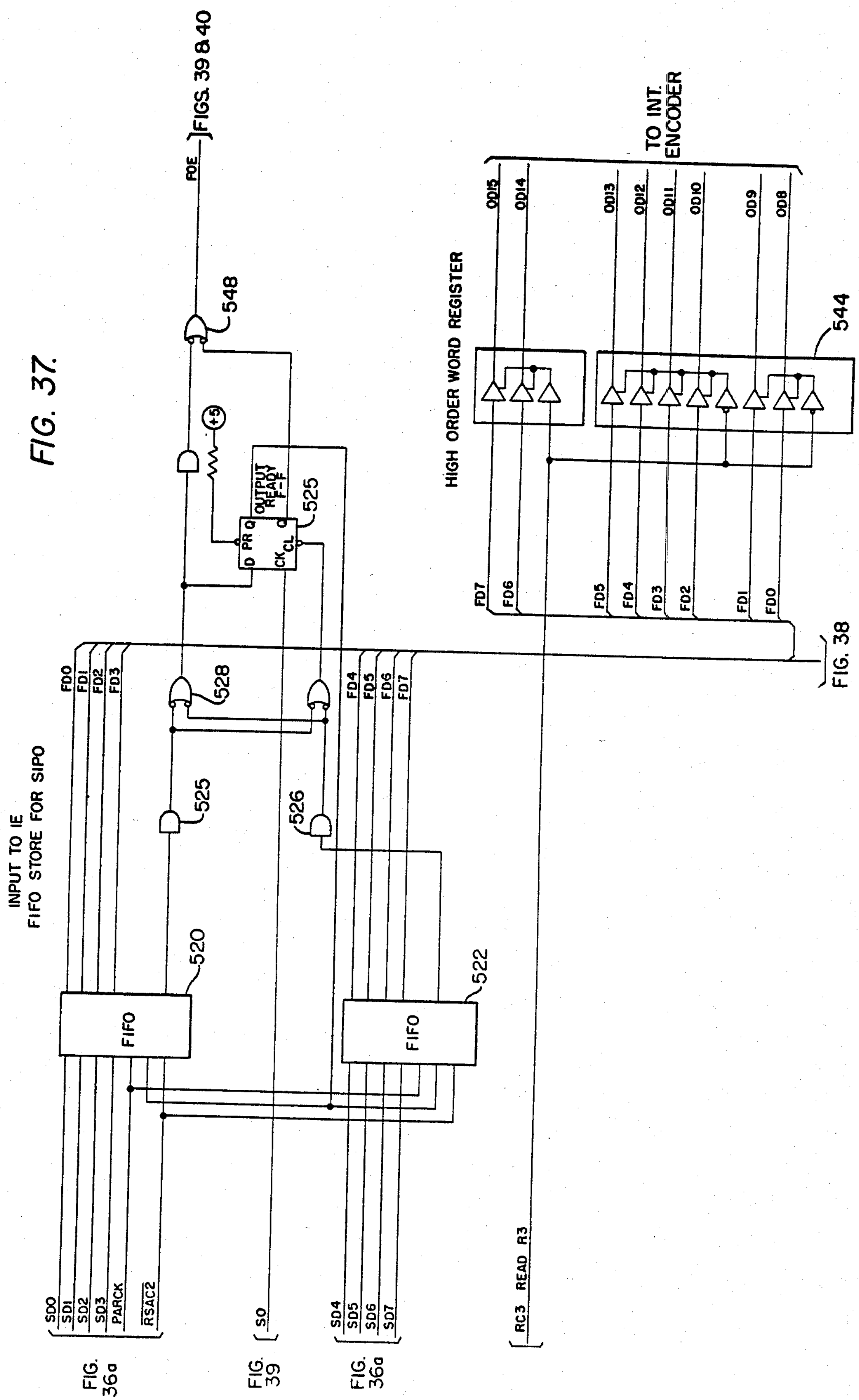
Figure 38:
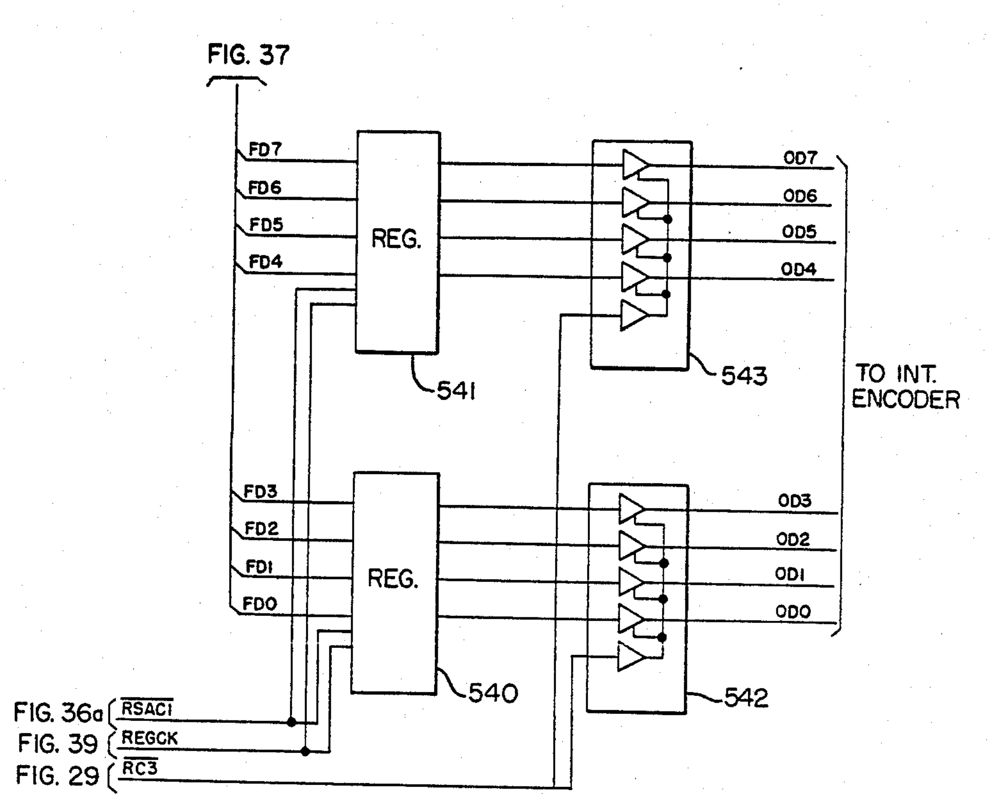

When the output ready flip-flop 525 (FIG. 37) is set, the FIFOs 520 and 522 are enabled to shift the data out to a pair of registers 540 and 541, as seen in FIG. 38. The second byte of the message is then allowed to propagate to the output of the FIFOs 520 and 522 so that the full sixteen bits are available at the outputs of the registers 540 and 541 and FIFOs 520 and 522. With data ready to be transmitted to the CPU, the FIFO store output control in FIG. 39 provides a ready output from the ready flip-flop 545 on lead RDY which is applied through the gate circuit 550 in FIG. 40 on lead OD14 to the interrupt encoder 125 indicating that data is ready to be read. The interrupt encoder 125 will then provide a read instruction via signal $\overline{RC3}$ through the control register when the CPU is ready to enable the gate circuits 542 and 543 (FIG. 48) associated with the registers 540 and 541 to gate out the first byte; while, the second byte appearing at the output of the FIFOs 520 and 522 is gated through gate circuit 544 to the interrupt encoder 125.

As seen in FIG. 37, when no data appears at the output of the FIFOs 520 and 522, the output ready flip-flop 525 will be in a reset condition thereby enabling gate 548 to provide the signal FOE indicating that the FIFO is empty. This signal is supplied to FIG. 39 and serves to clock the flip-flop 547 thereby generating the signal REGCK, which clocks registers 540–541. In this way, each time the REGCK flip-flop 547 is set, an indication is forwarded to the central processing unit 130 from the ready flip-flop 545 indicating that data is ready to be transmitted. The central processing unit then provides an instruction via the control register to effect a reading of this data thereby setting the POP FIFO flip-flop 530 and the register clock flip-flop 547 in FIG. 39 to generate the signals REGCK and SO to transfer data from the FIFO to the registers for subsequent transfer upon receipt of the read control signal $\overline{RC3}$ to the interrupt encoder 125.

Figure 40:
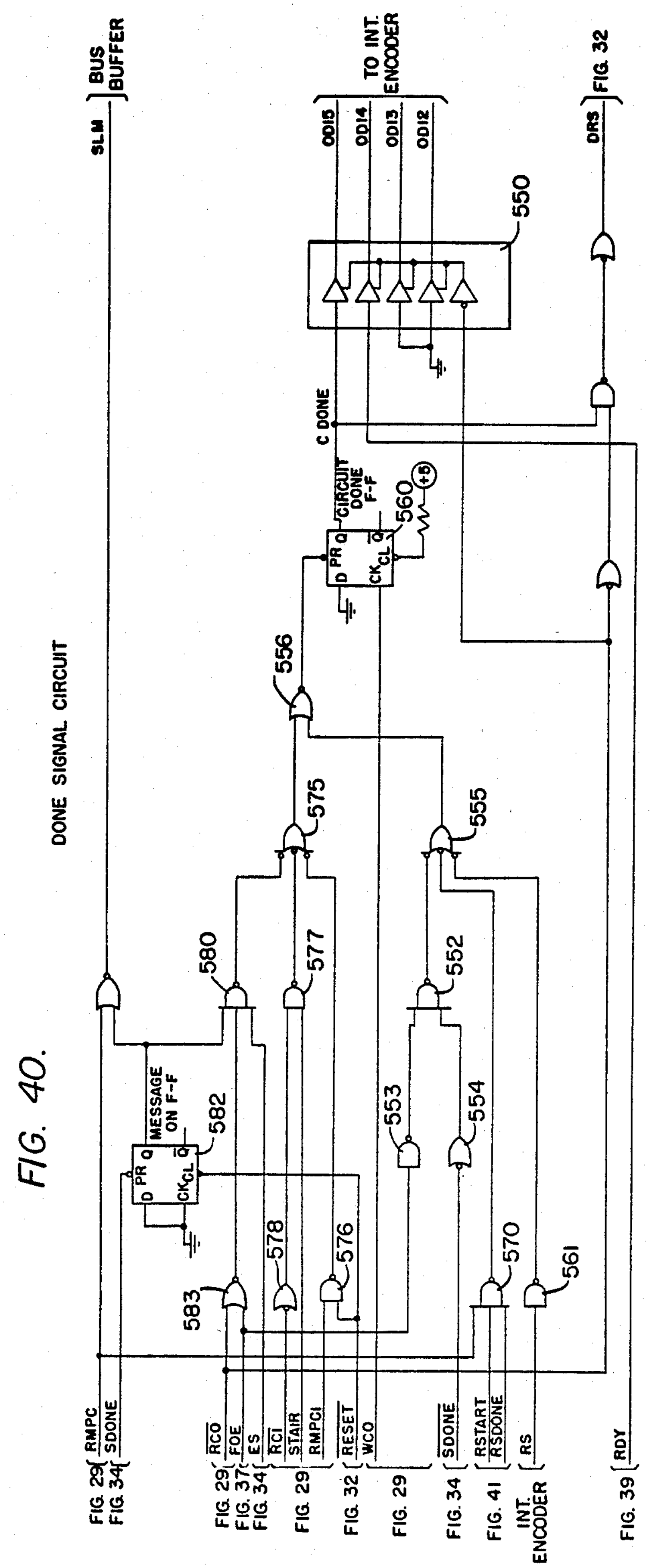
Figure 41:
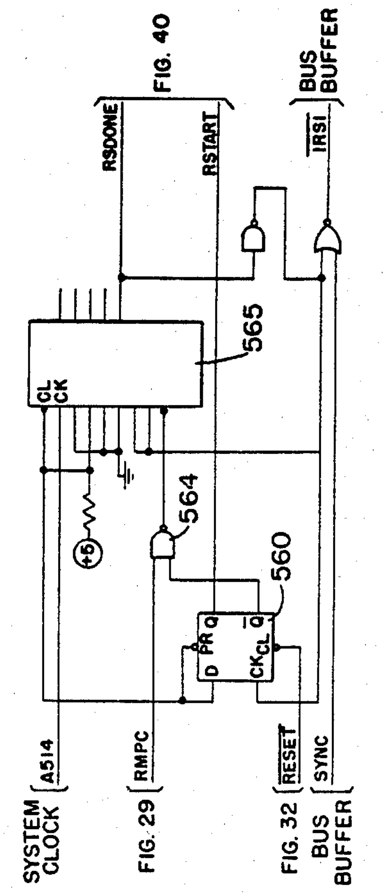

FIGS. 40 and 41 illustrate the DONE control circuit which serves to indicate to the interrupt encoder 125 when a complete message has been transmitted from the microport control 110. In FIG. 40, gate 552 receives the FOE (FIFO empty) signal via gate 553 at one input thereof and the $\overline{SDONE}$ signal from the output of gate 429 in FIG. 34 via gate 554 at the other input thereof. Thus, gate 552 will be enabled when the FIFO is indicated as empty and the message length counter 425 indicates that all words have been received in accordance with the message length indicated in the header of the message. Enabling of AND gate 552 via OR gates 555 and 556 result in a setting of the circuit DONE flip-flop 560 to provide an output through gate circuit 550 on lead OD15 to the interrupt encoder 125.

The gate 555 in FIG. 40 can also be enabled directly from the reset signal RS provided from the interrupt encoder 125 via gate 561.

As indicated in connection with FIG. 29, the interrupt encoder 125 may instruct both a resetting of the microport control 110 or a resetting of the microport control interface 120 via bits 12 and 14. The resetting of the microport control is effected by generating the signal RMPC which is forwarded to gate 564 in FIG. 41, the output of which is applied to the counter 565 to which the clock signal A514 is connected. When the output RSDONE is generated from the counter 565, it also sets the flip-flop 566 to produce the signal RSTART. These two signals are applied to gate 570 in FIG. 40 along with the RMPC control signal to enable gate 555 and thereby provide an indication to the interrupt encoder 125 that the operation has been completed.

In FIG. 40, gate 575 will also effect a setting of the circuit DONE flip-flop 560 under various conditions. On the one hand, receipt of the reset microport control interface signal RMPCI from the control register in FIG. 29 along with the reset signal $\overline{RESET}$ from the reset flip-flops 381 and 382 in FIG. 32 will enable gate 576 to enable gate 575. A second condition results when gate 577 is enabled by receipt of the status register signal STATR and the read control signal RC1 via the gate 578. A third condition exists when the gate 580 is enabled by receipt of the end signal ES from the status register 475 in FIG. 34 and the set output of the message on flip-flop 582 along with either the FIFO empty signal FOE or the read control signal $\overline{RCO}$ via gate 583.

3. The Interrupt Encoder

As seen in FIG. 6, the interrupt encoder 125 forms the interface between the central processing unit 130 and various input/output devices (I/O), such as the MPC interface 120, the attendant data I/O circuits 145, the digital conference circuits 140, the TTY control 138 and the data link 143.

The interrupt encoder 125 provides a plurality of functions, one of which is to provide the interface between the peripheral I/O devices and the CPU bus by selectively enabling a designated I/O circuit under control of the CPU 130. For this purpose, the interrupt encoder 125 is connected to the respective I/O devices by way of separate enable leads by which the I/O devices may be selectively enabled to connect to the central processing unit 130 via the peripheral bus.

Certain I/O devices, such as the attendant data I/O circuits 145 gain access to the central procesing unit 130 by generating interrupt requests. For an attendant, who is keying data which must be acted upon immediately, it is necessary to gain access to the central processing unit 130 more quickly than the man or machine operated equipment which may be requesting service and which can be made to wait for higher priority requests to be serviced. The interrupt encoder 125 receives the various interrupt requests from the I/O devices, generates interrupt vectors according to a predetermined priority, and initiates a single interrupt request to the central processing unit 130.

The interrupt encoder 125 also includes a boot strap and read only memory which is used during system initialization to load the system. Thus, during a power-up operation the central processing unit 130 will address the interrupt encoder 125 and request the contents of the boot strap ROM to effect initialization of the system.

The final function of the interrupt encoder 125 is to provide a 4 millisecond sync pulse to generate a real time clock interrupt to the central processing unit 130 for incrementing data and time counters.

FIG. 42 is a general block diagram of the interrupt encoder 125 showing the path of data to and from the central processing unit 130 and the I/O devices as well as the various control circuits which process the interrupt requests and generate the device enable signals for enabling the I/O devices.

Data and address information from the CPU is provided via the CPU bus to the send/receive buffer 600. Data is then forwarded from the buffer 600 through the data bus buffer 601 to the peripheral data bus, which extends to all of the I/O devices so that the data applied to the bus will be received by each I/O device. However, the address information provided from the output of the buffer 600 is received and stored in the address store 602, and includes selected bits which identify a particular I/O device. These bits are forwarded to the decode device enable circuit 603 which decodes the address bits and drives the send device enable circuit 604 to generate a device enable signal which will enable the single selected one of the I/O devices identified by the decoded address. Thus, only the enabled I/O device will receive the data which has been applied to the peripheral data bus from the central processing unit 130.

The address which is stored in the address store 602 also includes bits which may indicate that the central processing unit 130 desires to read the data stored in the ROM 606. These bits are forwarded from the address store 602 to the ROM enable circuit 605 which enables the ROM 606 and the ROM buffer 607. The contents of the ROM 606 are then forwarded through the buffer 607 to the send/receive buffer 600 from which the data is forwarded to the CPU on the CPU bus.

Since interrupt requests may be generated at the same time from a plurality of I/O devices, some means is normally provided for servicing the interrupt requests in some sequential order based on priority; however, such a "daisy-chain" type of selection provides inherent disadvantages in that a disabled I/O device which may be permenently providing an interrupt request could prevent service to the other I/O devices following it in the sequence of service. Accordingly, means is provided by which the central processing unit 130 may disable or mask an interrupt request from an I/O device with the scanning or priority selection of the interrupt request then being carried out only with respect to those unmasked requests which remain.

As seen in FIG. 42, the interrupt request from the I/O devices are received in a gating circuit 610 to which is applied selectively one or more masking signals from a mask circuit 609 based on data received from the central processing unit 130 via the send/receive buffer 600. In other words, the central processing unit 130 can selectively disable the gates associated with the interrupt request lead of selected I/O devices on the basis of data supplied to the read/write mask circuit 609. This is accomplished by the CPU including in the address information stored in the address store 602 a bit which requests the receipt of masked data, which bit is forwarded to the mask enable circuit 608 which enables the read/write mask circuit 609 to permit it to receive data in the form of mask instructions from the central processing unit 130.

The interrupt requests which are not masked by the mask circuit 609 are forwarded to an interrupt request store 611 and are then supplied to a priority encoder 612. The priority encoder 612 selects a single interrupt request on the basis of a predetermined priority, and uses this selected interrupt request to generate a vector which is forwarded through the vector buffer 613 to the central processing unit indicating the I/O device which is requesting service.

The various functions which are performed by the interrupt encoder 125 are performed under control provided by the central processing unit 130 via the control circuit 614, which is controlled by the control signals received on the CPU bus not only to perform its own internal operation but also so supply via the control buffer 615 various control signals required by the I/O devices to perform register selection and to shift data out or receive data in as required by the CPU.

In communicating with the interrupt encoder, the central processing unit 130 will first forward sixteen bits including address information and then follow it with sixteen bits providing data. Thus, data forwarded to the interrupt encoder 125 from the CPU is always preceded by address information.

Figure 43:
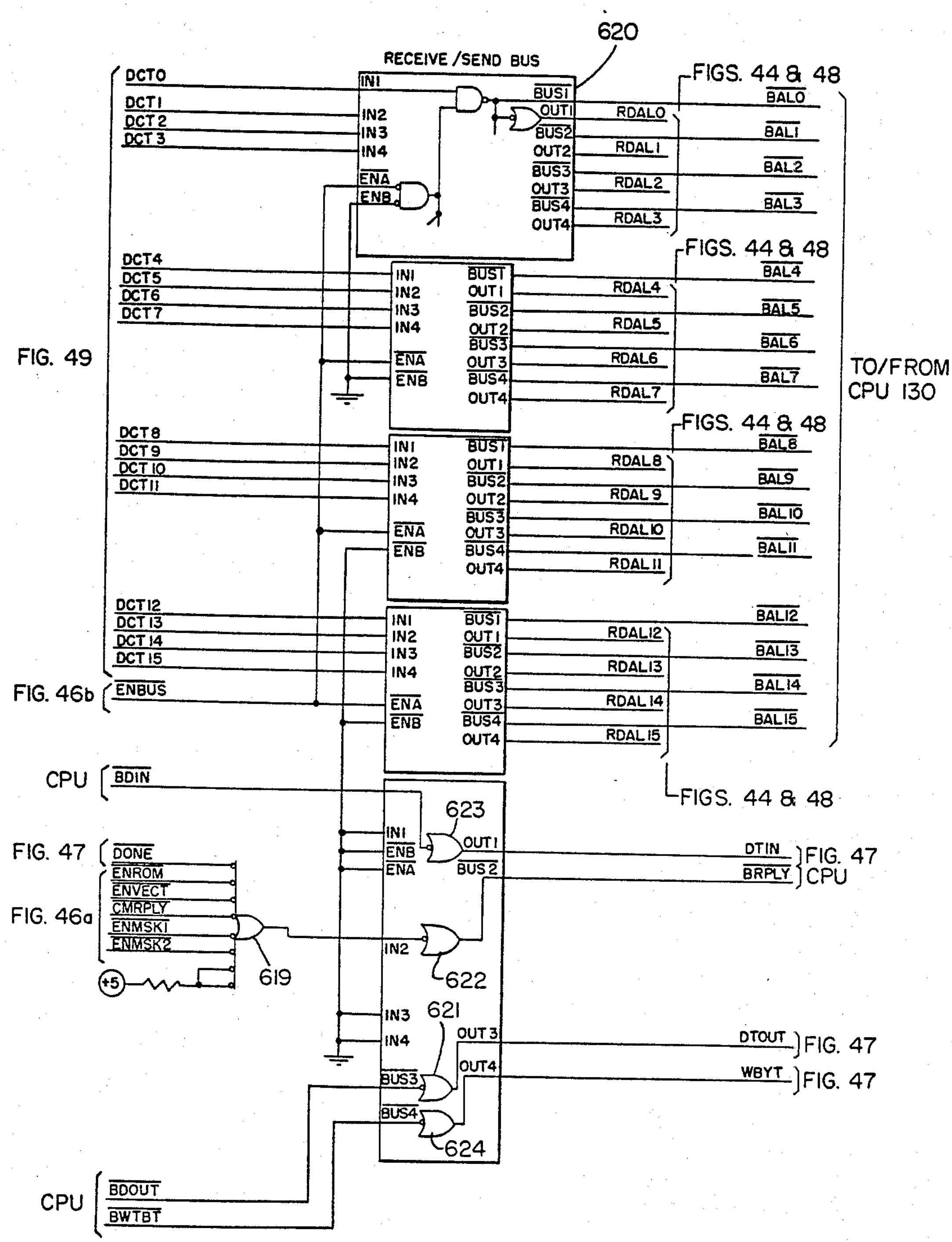

Referring to FIG. 43, which illustrates the send-/receive buffer 600, a differential gate arrangement 620 provides the interface between data going to and from the CPU on lead $\overline{BAL0}$–$\overline{BAL15}$ and data on leads RDAL0–RDAL15 going to the various circuits within the interrupt encoder as well as the data buffer 601 which interfaces with the peripheral data bus and the I/O devices. Data coming from the various circuits within the interrupt encoder and from the I/O devices via the peripheral data bus are applied on leads DCT0–DCT15.

Figure 44:
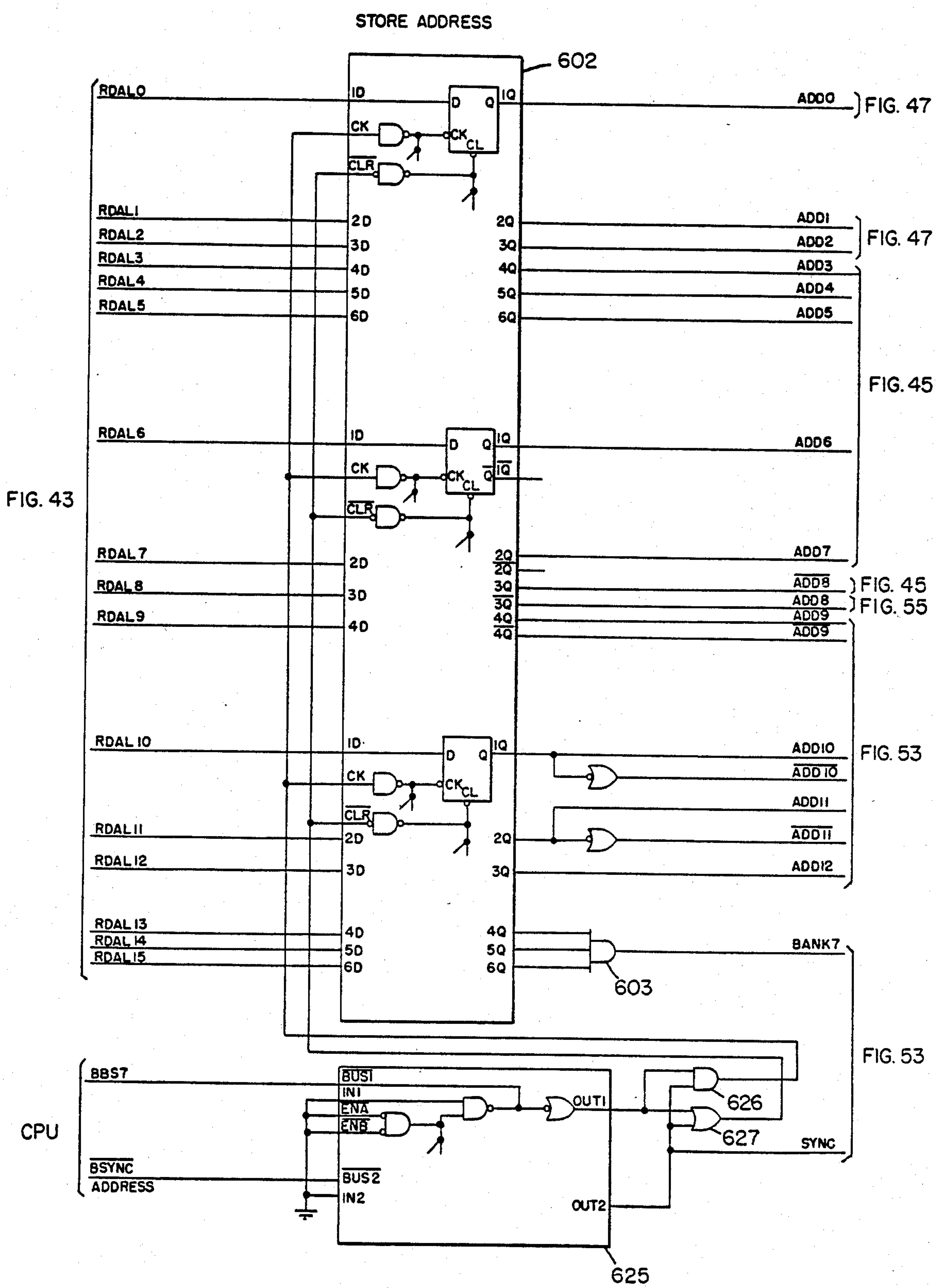
Figure 49:
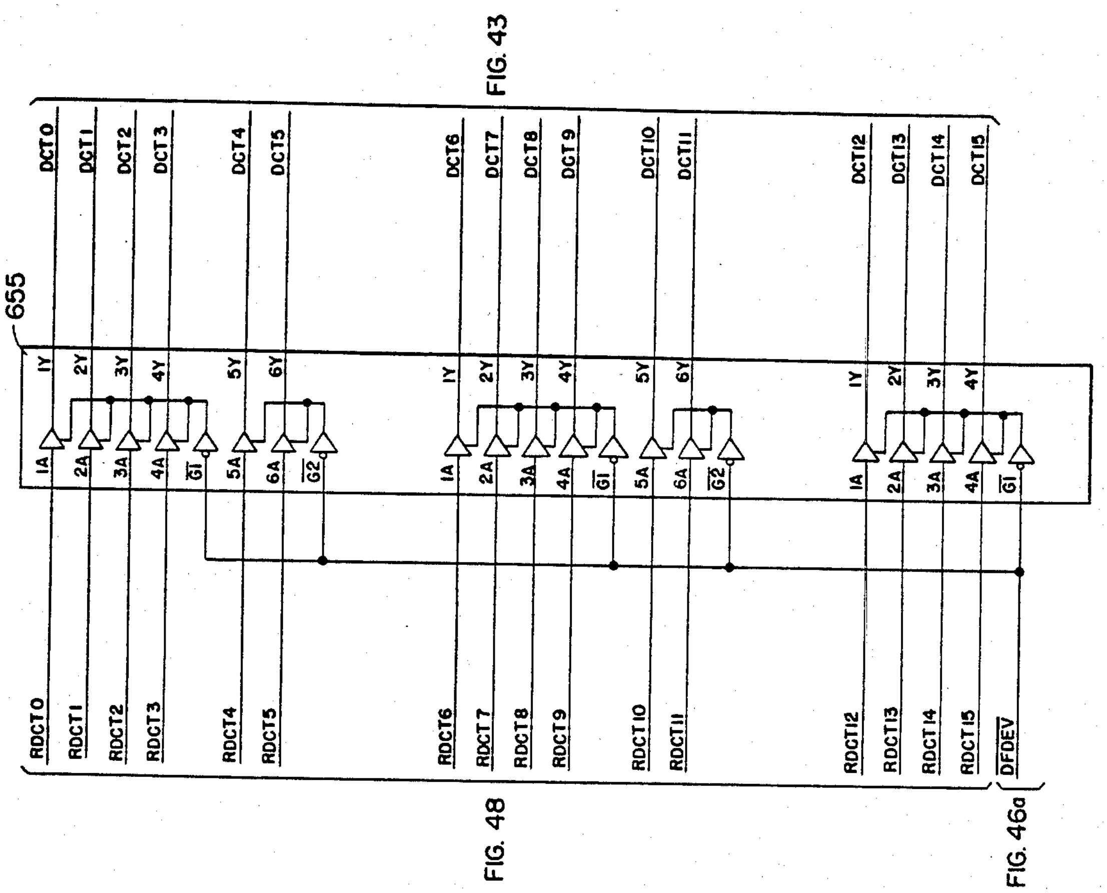

Any communication between the central processing unit 130 and an I/O device occurs under control of the central processing unit 130 which supplies address information to the interrupt encoder 125 on leads BAL0–BAL15, the data passing through the differential gate arrangement 620 in FIG. 43 onto leads RDAL0–RDAL15, which extend to the address store 602 illustrated in FIG. 44. AT the time the address information is forwarded, the CPU also will forward the control signals BSYNC and BBS7 to a gate circuit 625 which provides an output through gate 626 clocking the address information into the address store 602.

Bits 13, 14, and 15 of the address define the user area of the memory, a characteristic feature of the PCP 11/40 or LSI/11 multi-user computers, and receipt of these bits in the address store 602 in FIG. 44 will be detected by gate 603 to provide an output on lead BANK7. In addition, the gate circuit 625 will enable the SYNC lead upon receipt of the BSYNC signal from the central processing unit 130. This signal BANK7 and the synchronizing signals SYNC along with the address bits ADD8, ADD9, ADD10, ADD11, and ADD12 will be detected to indicate that the address received relates to an I/O device or an interrupt mask at gate 630 in FIG. 46. As a result, gate 630 will enable lead ADDEV which serves to enable the decoder 635 in FIG. 45 to decode the address signals ADD3–ADD7, representing the identity of the I/O device being addressed by the CPU. The decoder 635 causes a device enable to be forwarded on one of the lines DEB0–DEB22 to the I/O devices to enable one selected I/O device to receive data from the CPU or send data to the CPU via the peripheral bus and through the interrupt encoder 125.

Figures 46A, 46B:
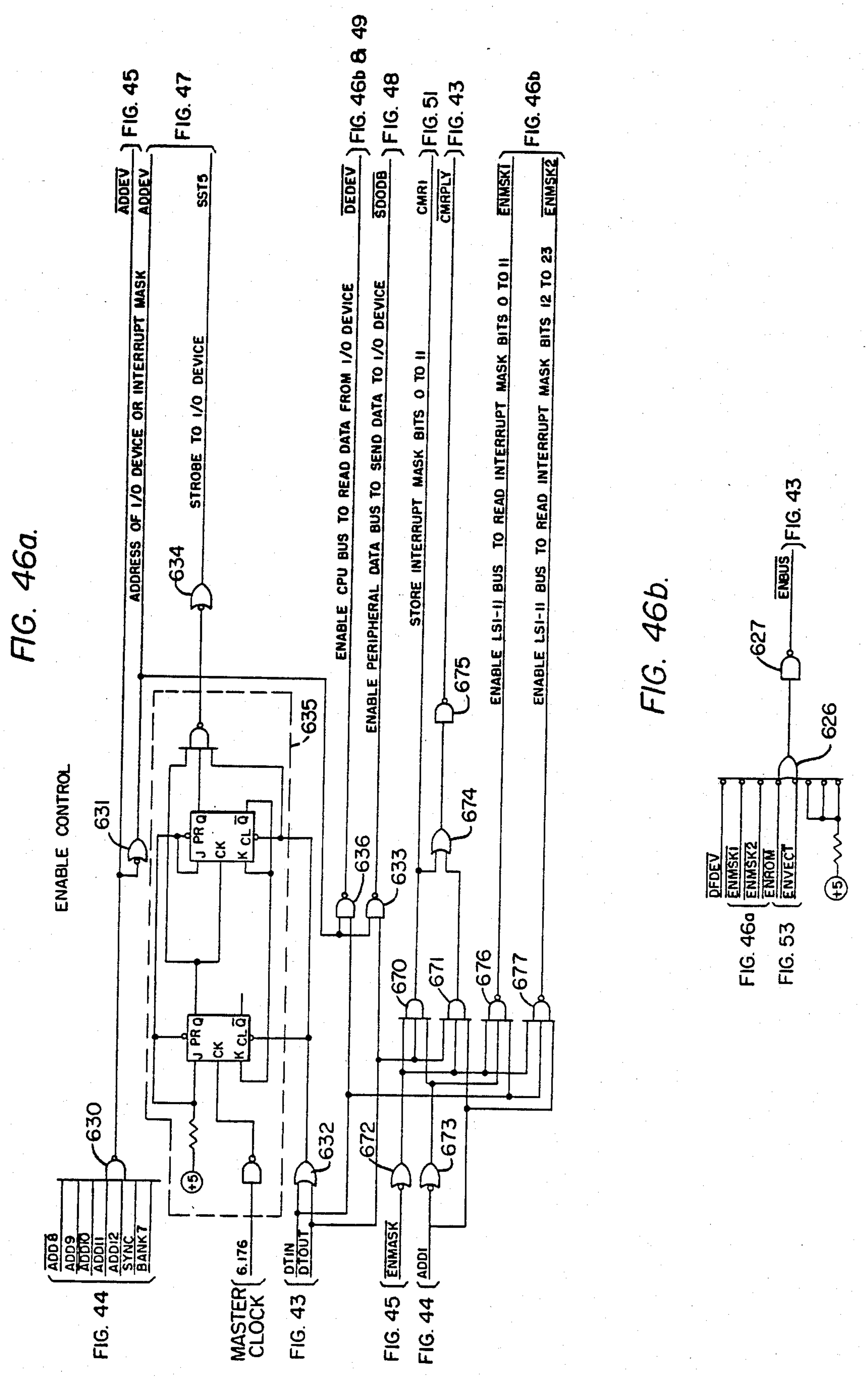
Figure 47:
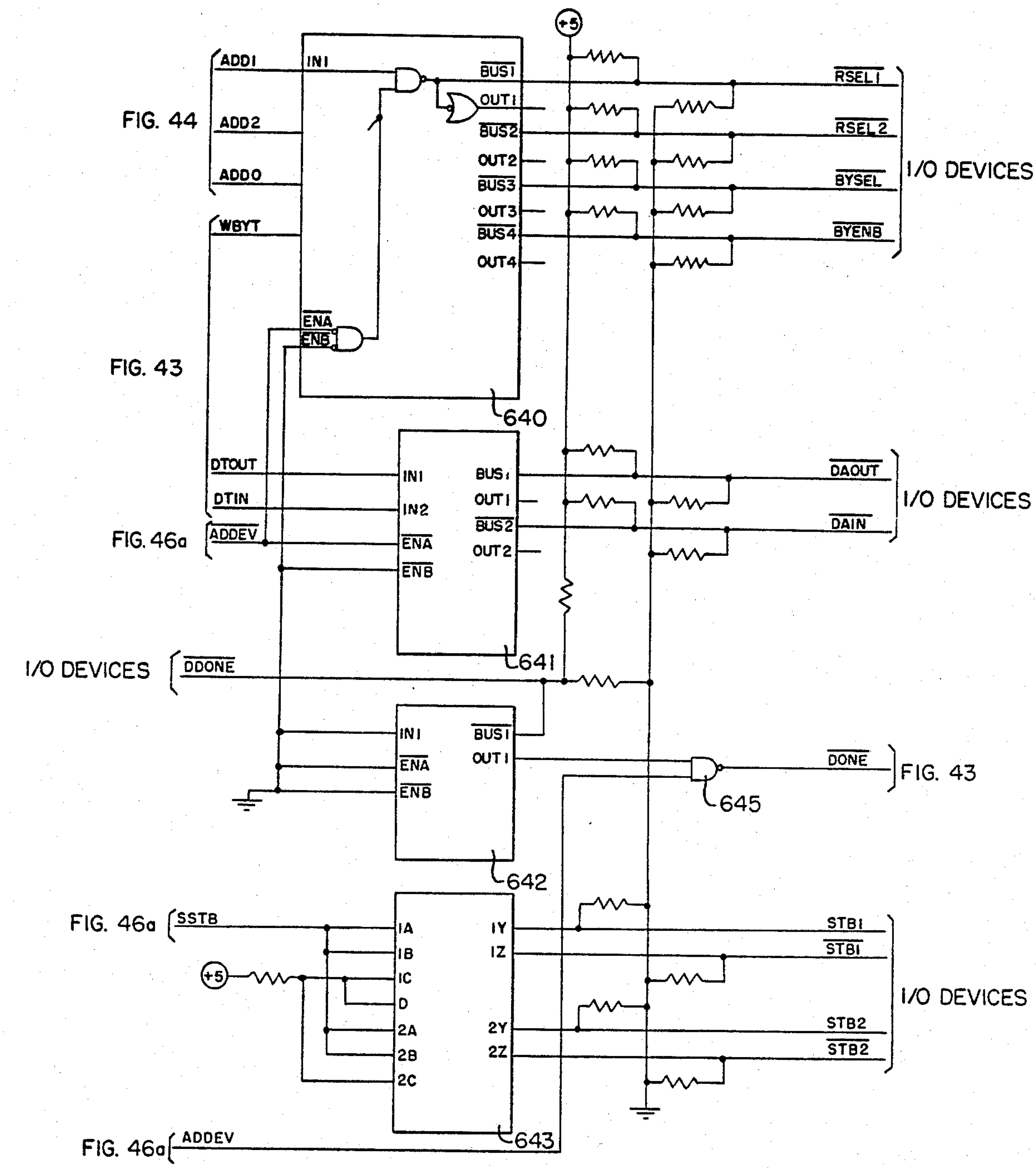

The CPU now sends either a command requesting data transfer into the CPU by enabling lead BDIN in FIG. 43 or requests that data be sent out to the I/O device by enabling lead BDOUT.

Where data is to be transferred to the I/O device from the central processing unit 130, the BDOUT signal from the central processing unit 130 enables the DTOUT lead at the output of the gate 621 which extends to the gate circuit 641 in FIG. 47. With the ADDEV lead from FIG. 46 enabled, the DTOUT lead will provide the control signal DAOUT to the I/O devices indicating that data is to be forwarded from the CPU. In addition, the address bits ADD1 and ADD2 will be forwarded from the address store 602 in FIG. 44 to the gate circuit 640 in FIG. 47 and will generate register select signals on leads RSEL1 or RSEL2 in response to receipt of the ADDEV control signal. Thus, the I/O device will be notified that data is to be received and will be instructed as to which the register to select for such data.

Figure 48:
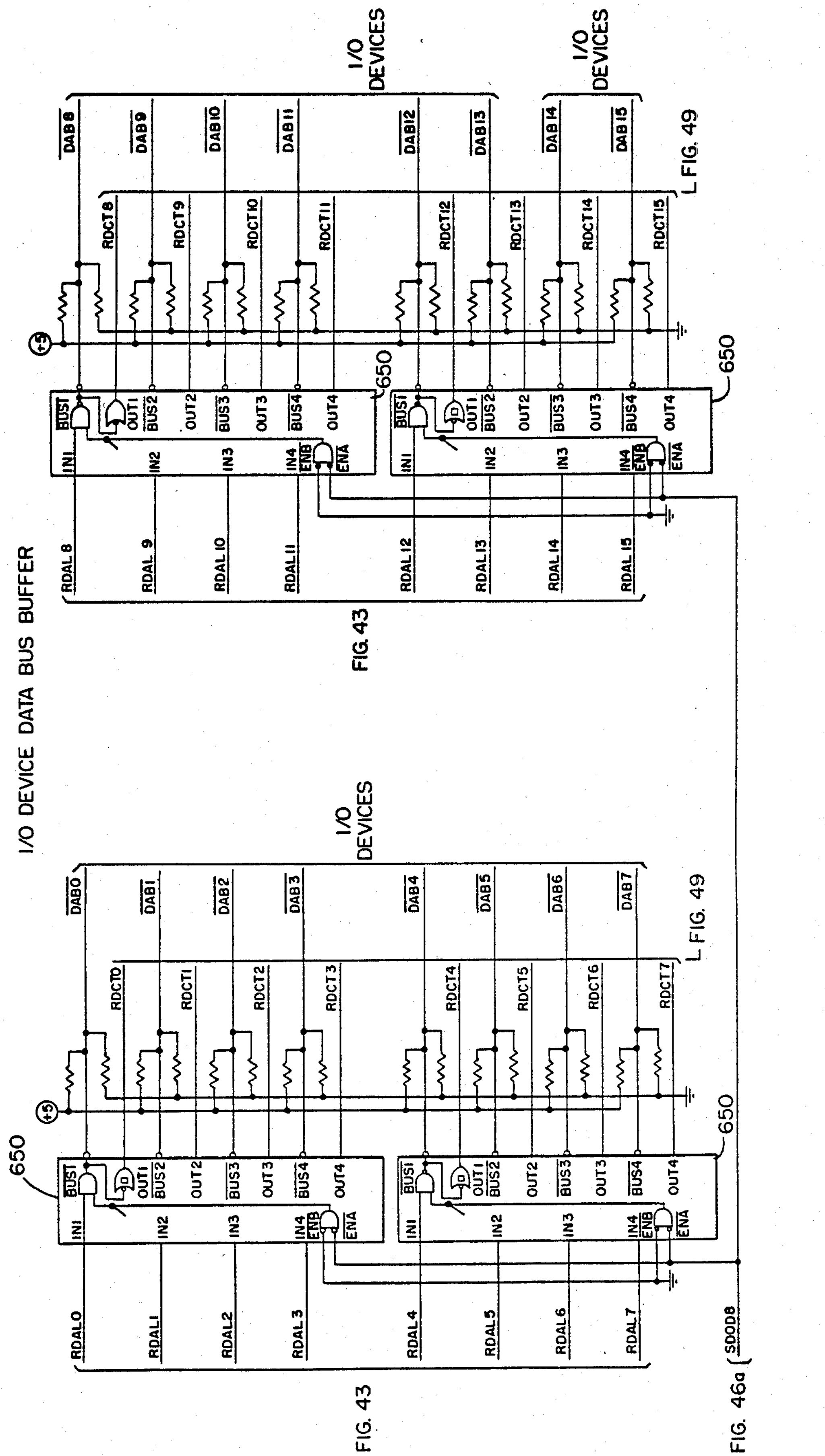

Data is received from the CPU on leads BAL0–BAL15 at the differential gate arrangement in FIG. 43 subsequent to receipt of the address and will pass on output leads RDAL0–RDAL15 to the data bus buffer 601 illustrated in FIG. 48. This data will be applied through a gate arrangement 650 to the peripheral bus on leads DAB0–DAB15 to the I/O devices upon generation of the gating signal SDODB in FIG. 46. This gating signal is generated in conjunction with generation of the DDOUT signal from the output of the gate 621 in FIG. 43 as well as the enabling of gate 631 from the output of gate 630 in FIG. 46. In other words, the gate signal SDODB results from the fact that the address provided from the CPU represents either an I/O device or an interrupt mask and the CPU has indicated a data out operation.

In the transfer of data on the peripheral bus to the I/O devices, it is possible that not all of the bits will reach the I/O device at the same time due to propagation delays which might occur. Thus, the I/O device is not finally enabled to receive the data applied to the peripheral bus until a strobe pulse is sent out from the interrupt encoder 125. In FIG. 46a the DTOUT signal will be applied through gate 632 to enable the strobe delay circuit 635 which is driven from the master clock and provides the strobe signal SSTB via gate 634.

When the I/O device has received all of the data forwarded from the central processing unit 130, it will send a reply signal DDONE which is received at gate circuit 642 in FIG. 47 and is applied to the AND gate 645. The gate 645 is enabled by the signal ADDEV from gate 631 in FIG. 46 and enables the lead DONE extending to the input of gate 619 in FIG. 43. The output of gate 619 is applied through gate 622 to the lead BRPLY directly to the CPU indicating that a reply has been received from the I/O device and the sequence is completed.

The receipt of data from an I/O device via the CPU is handled in a similar manner to the transfer of data to the I/O device. This is initiated by the CPU enabling the BDIN lead in FIG. 43 which is applied through gate 623 to enabled lead DTIN which extends to one input of AND gate 636 in FIG. 46a. The AND gate 636 is enabled by the output of gate 631 indicating that the address received is that of an I/O device or interrupt mask, thereby enabling lead DFDEV. As seen in FIG. 48, the peripheral data bus represented by leads DAB0–DAB15 extends through differential gate arrangement 650 and applies data from the I/O devices onto leads RDCT0–RDCT15 to the read I/O data gates 655 in FIG. 49. Upon receipt of the gating signal DFDEV, the data gates 655 are enabled to apply the data on lead DCT0–DCT15 to the differential gate arrangement 620 in FIG. 43 where the data is transmitted out to the CPU on leads BAL0–BAL15.

In transmitting data from the I/O device through the differential gate arrangement 620 in FIG. 43, the gates are enabled by the enabling signal ENBUF derived from FIG. 46a from the DFDEV signal generated at the output of gate 636 in FIG. 46a. Thus, the data from device enable signal DFDEV provides the means for enabling the receive gates in the differential gate arrangement 620 to permit the CPU to receive data from an I/O device.

As in the case of sending data out to an I/O device, data cannot be received by the CPU from the I/O device until it is so instructed. Thus, the DTIN signal generated at the output of gate 623 in FIG. 43 is applied through gate arrangement 641 (FIG. 47) which is enabled by the ADDEV gate signal from the output of gate 630 in FIG. 46a to provide the control output signal DAIN to the I/O device instructing that data is to be forwarded to the CPU. In addition, the DTIN signal is applied to the other input of OR gate 632 in FIG. 46a to enable the strobe delay circuit 635 which forwards a strobe signal to the I/O device from the output of gate 634 on lead SSTB to provide the final enable for data transfer from the I/O device to the CPU.

Once the I/O device has transmitted all of the data which it has for the CPU, it will send the signal $\overline{DDONE}$ in the same manner already described to provide an output from gate 645 in FIG. 47 on lead $\overline{DONE}$ to gate 619 in FIG. 43, which indicates to the CPU on lead $\overline{BRPLY}$ at the output of gate 622 that the I/O device has completed its transmission of data to the CPU.

As can be seen from the foregoing description, transfer of data to and from the CPU through the interrupt encoder 125 is always initiated by receipt of an address in the interrupt encoder 125 from the CPU which designates either a particular I/O device to be addressed or an interrupt to be processed. This is followed by command signals from the CPU indicating either a data-in operation or a data-out operation to designate whether data is to be forwarded from the CPU or is to be received by the CPU either from the interrupt encoder 125 or from an I/O device through the interrupt encoder 125.

In addition to data transmission to and from the CPU, the interrupt encoder also controls the processing of interrupts from the I/O devices. In this regard, the various interrupt requests are gathered in the interrupt encoder 125 and a determination is made as to whether or not the CPU desires to mask any particular interrupt before it is further processed. The interrupt encoder 125 then selects on a priority basis one of the received unmasked interrupt requests and generates a vector to the central processing unit 130 designating the I/O device which has been selected so that the CPU may address that I/O device as required.

Figure 51:
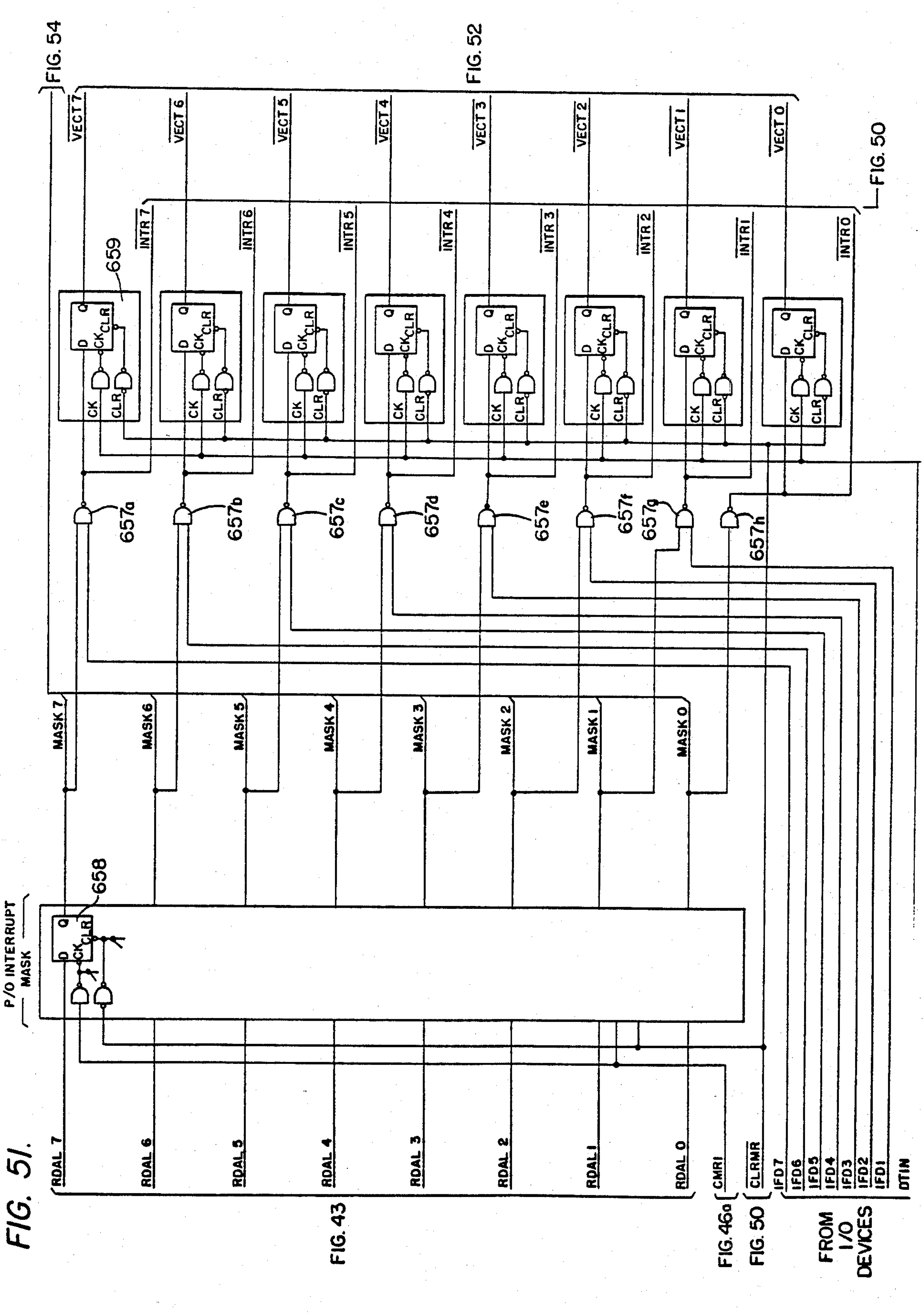

The system is designed to handle up to twenty-four interrupt requests from various I/O devices, which interrupt requests will be generated for the most part from the various operator positions in the operator complex. FIG. 51 shows a portion of the interrupt request store 611 which receives interrupt requests 1 through 7 on leads IFD1–IFD7 to one input of the respective AND gates 657a–657h. The other input of the AND gates 657 are connected to respective mask interrupt flip-flops 658a–658h which store the mask information relating to each of the I/O devices capable of generating an interrupt request. If the AND gate 657 is enabled by the mask interrupt flip-flop 658 connected thereto, the received interrupt request on one of the leads IFD1–IFD7 will be permitted to pass to the associated one of a plurality of interrupt request flip-flops 659a–659h where the interrupt request will generate a vector on the associated one of the lines $\overline{VECT0}$–$\overline{VECT7}$. Unmasked interrupt requests appear at the output of the gates 657 on leads $\overline{INTR0}$–$\overline{INTR7}$.

Figure 50:
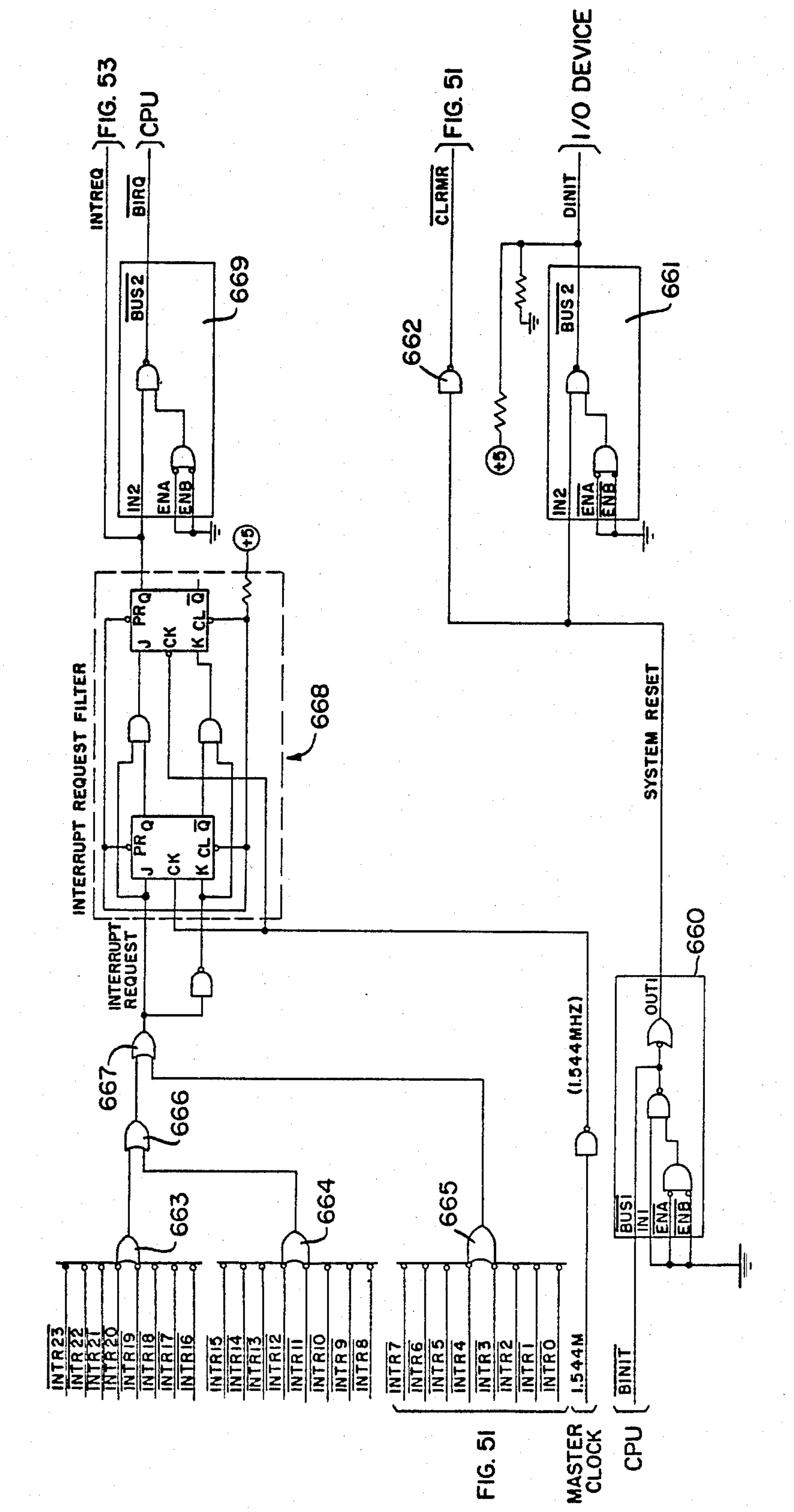

During system power-up, the central processing unit 130 will enable the lead $\overline{BINIT}$ in FIG. 50 to provide an output from gate circuit 660 through gate circuit 661 on lead $\overline{DINIT}$ to the I/O devices, producing an initialization of the I/O devices. At the same time, the output of the gate circuit 660 will be applied through inverter 662 to enable lead $\overline{CLRMR}$ which serves to reset the mask interrupt flip-flops 658 and interrupt request flip-flops 659 in FIG. 51. With all of the interrupt mask flip-flops 658 reset, no interrupt request can be recognized by the central processing unit 130 since the AND gates 657 will all be disabled. Thus, during initialization of the system, until the mask flip-flops 658 are set by the central processing unit 130, no interrupt request can be recognized by the system.

In setting the mask bits in the interrupt encoder, the CPU will forward address information to the interrupt encoder along with the control signals $\overline{BSYNC}$ and $\overline{BBS7}$ in FIG. 44 to store the address in the address store 602 in the manner already described. The stored address will enable gate 630 in FIG. 46 to enable leads $\overline{ADDEV}$ via gate 631 and lead ADDEV, indicating that the address relates either to an I/O device or to an interrupt mask. The lead $\overline{ADDEV}$ will enable the decoder 635 in FIG. 46 to decode the address bits ADD3–ADD7, which in this case will designate an interrupt mask function and result in the enabling of the lead $\overline{ENMASK}$ at the output of the decoder 635.

The CPU will now send the control signal BDOUT, which is received in FIG. 43 and applied through gate 621 to the lead DTOUT. As seen in FIG. 46a, the lead DTOUT is applied to AND gates 670 and 671, which are enabled via gates 672 and 673 by the signal $\overline{EN\ MASK}$ from the decoder 635 in FIG. 45 and the address bit ADD1 received from the address store 602 in FIG. 44. The enabled AND gate 670 will generate the control signal CMR1 which serves to enable the mask interrupt flip-flops 658 in FIG. 51 to receive the mask bits from the central processing unit 130. The enabled AND gate 671 will produce a second control signal CMR2 which serves to control in a like manner the mask interrupt flip-flops (not shown) associated with interrupt requests 8 through 24. Simultaneously with enabling of either of the gates 670 or 671, a reply will be generated via gate 674 and gate 675 in FIG. 46 on lead $\overline{CMRPLY}$ to gate 619 in FIG. 43. As indicated previously, enabling of gate 619 will produce an output via gate 622 on lead $\overline{BRPLY}$ to the CPU indicating receipt of the instructions and data.

The mask bits are received from the CPU on leads $\overline{BAL0}$–$\overline{BAL15}$ in FIG. 43 and pass through the differential gate arrangement 620 to leads RDAL0–RDAL15. Referring to FIG. 51, the leads RDAL0–RDAL7 provide the bits associated with interrupts 1 through 8 to selectively set the interrupt mask flip-flops 658. If the CPU wishes to mask the interrupt request from any particular I/O device, it merely provides no bit to the mask interrupt flip-flop 658 associated with that I/O device so that that flip-flop will remain reset. Thus, if an interrupt request is received from the particular I/O device, the AND gate 657 to which that interrupt request will be applied will remain disabled since it will not receive the necessary mask bit from the associated mask flip-flops 658. As a result, the system will not recognize that interrupt request. However, for all interrupt requests which the system will accept, the CPU will set the interrupt mask flip-flop 658 to enable the associated AND gate 657 upon receipt of that interrupt request.

The unmasked interrupt requests which appear at the outputs of the gates 657 in FIG. 51 are applied to a combination of OR gates 663–667 in FIG. 50 to an interrupt request filter and delay circuit 668, which provides an output through gate circuit 669 on lead $\overline{BIRQ}$ to the central processing unit 130. When the lead $\overline{BIRQ}$ is enabled it indicates to the central processing unit 130 that at least one unmasked interrupt request has been received in the interrupt encoder and requests that the central processing unit give attention to the handling of this interrupt request. The central processing unit 130 replies by sending the control signal $\overline{BDIN}$, which is received in FIG. 43 and provides at the output of gate 623 the data-in-control signal DTIN. The data-in control signal DTIN is applied to the interrupt request store flip-flop 680 in FIG. 53 to which is also applied the interrupt request signal INTREQ from the output of the interrupt request filter and delay circuit 668 in FIG. 50. These signals serve to set the flip-flop 680 thereby enabling one input to AND gate 681. The central processing unit 130 then forwards the signal BIAKI which is applied through gate circuit 682 to the other input of the AND gate 681. The enabling of the AND gate 681 produces the output enable signal EN VECT to the vector buffer gates 690, 691, and 692 in FIG. 52.

Figure 52:
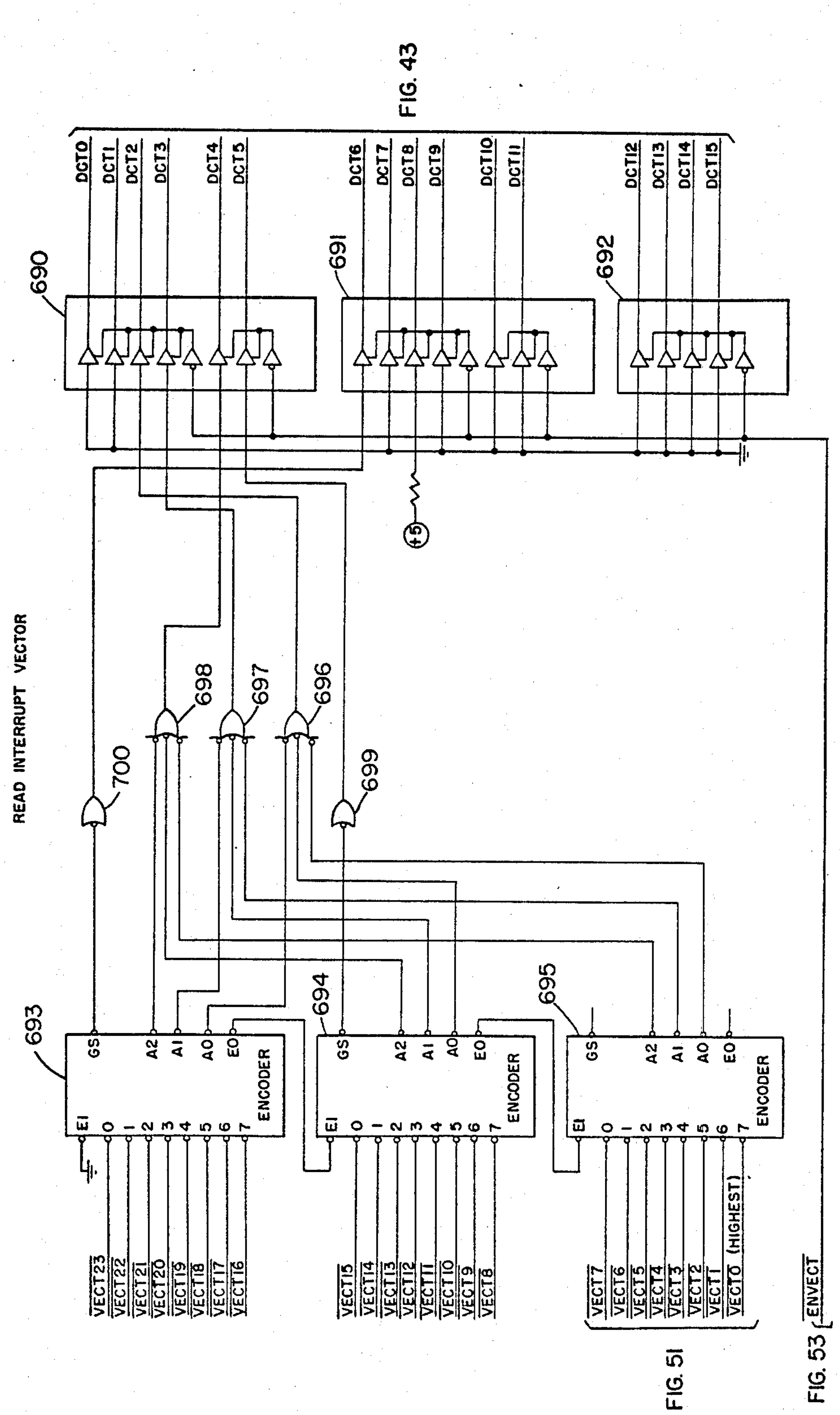
Figure 53:
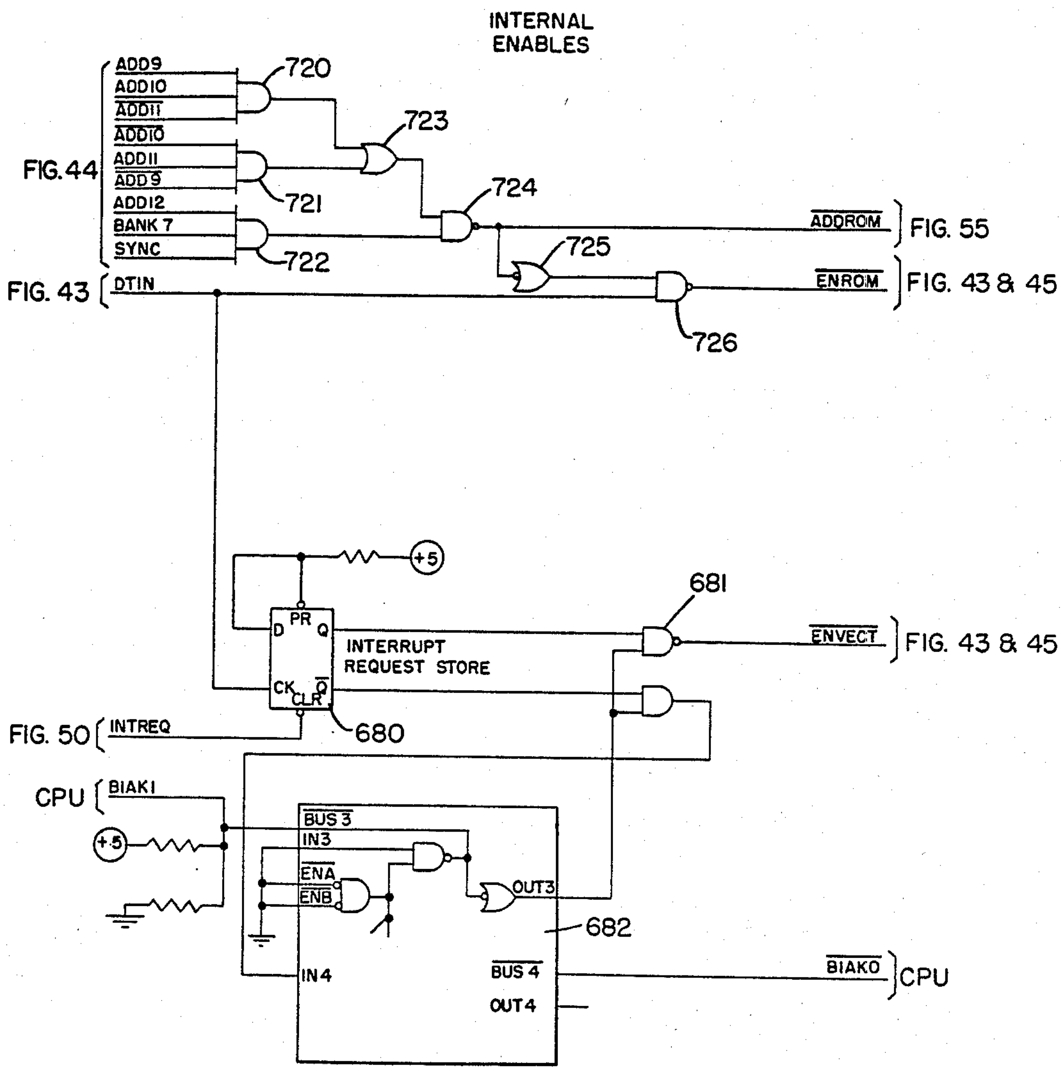

The vectors which are generated at the output of the interrupt request flip-flop 659 in FIG. 51 are applied to the encoder circuits 693, 694, and 695 in FIG. 52, which circuits are interconnected in such a way that priority is first given to the inputs to encoder 696, second priority is then given to the inputs to encoder circuit 694, and the lowest priority is given to the inputs to encoder circuit 693. The vector inputs to each of the encoder circuits 693-695 provides a decimal-to-binary encoding giving the highest priority to the lowest order vector and the lowest priority to the highest order vector in each group of inputs to each encoder circuit. The outputs of each of the encoder circuits 693-695 are applied to respective OR gates 696, 697, and 698 through the vector buffer gate circuit 690 onto data leads DCT3, DCT4, and DCT5, respectively.

If the vector which is selected is included in the first group of vectors received on leads VECT0-VECT7 at the input of encoder 695, the bits provided on leads DCT3-DCT5 will be sufficient to indicate to the central processing unit 130 that the vector is included in the highest priority group. On the other hand, if the vector is included in the second group provided at the output of encoder circuit 694, a bit will also be provided via gate 699 on lead DCT5 to indicate to the central processing unit 130 that the vector is one of the second group of vectors received on leads VECT8-VECT15. In a similar manner, if the selected vector is included in the lowest priority group including leads VECT16 through VECT23 at the input of encoder circuit 693, a bit will be provided via gate 700 through the vector buffer gate circuit 691 on lead DCT6 providing an indication that the vector designation is included in the lowest order group.

Upon generation of the enable vector signal EN VECT, which enables the buffer vector gate circuits 690, 691, and 692 to transfer the vector designation to the central processing unit 130, the enable signal also is applied to gate 626 in FIG. 46*b* to generate the signal ENBUS at the output of gate 627 which enables the differential gate arrangement 620 to connect the leads DCT0-DCT15 to the central processing unit 130 on leads BAL0-BAL15. The enable vector signal EN VECT is also applied to the gate 619 in FIG. 43 to provide a reply to the central processing unit 130 via gate 622 on lead BRPLY. The central processing unit 130 may then act on the received vector.

Figure 45:
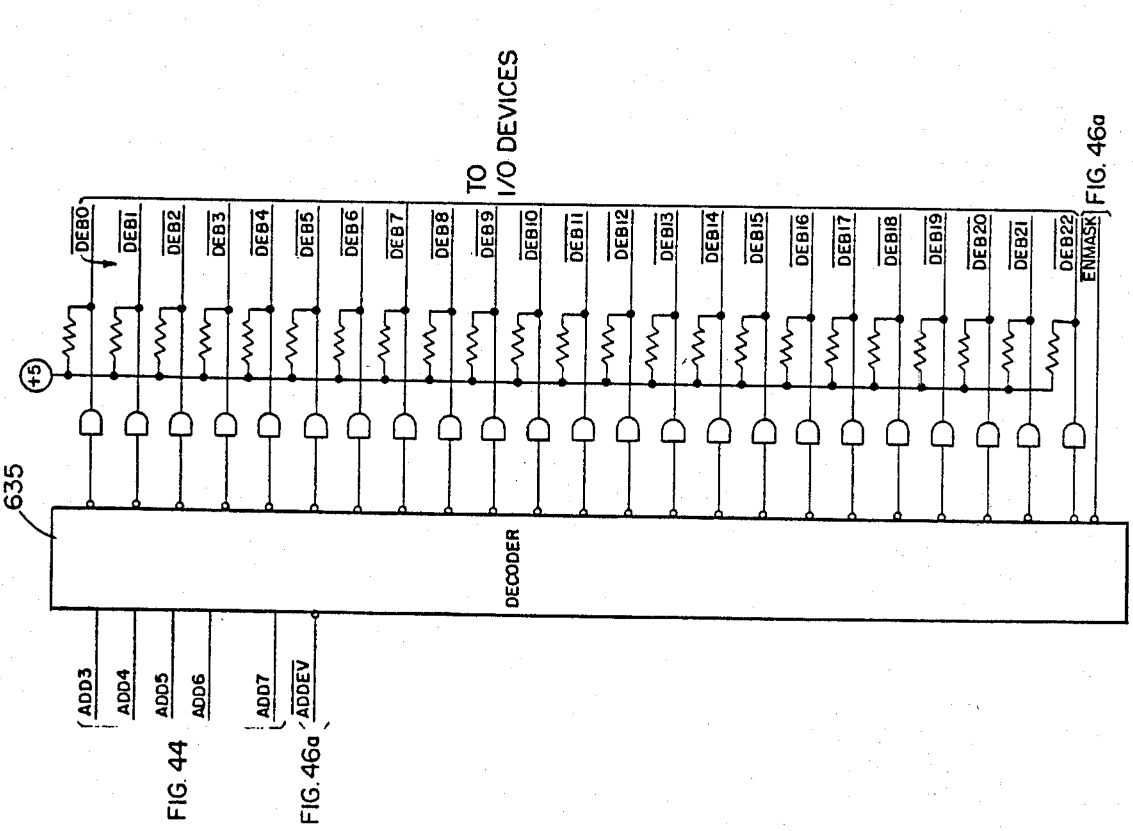

The mask bits stored in the interrupt encoder may be periodically scanned by the central processing unit 130 and updated if any changes may be necessary in the status of various I/O devices capable of generating interrupt requests. In this regard, the central processing unit 130 may review the mask bits which are stored in the interrupt encoder by forwarding an address along with control signals BSYNC and BBS7 in FIG. 44. The address information is stored and the signals SYNC and BANK7 along with selected address bits enable gate 630 in FIG. 46 in the manner already described to produce the address control signals ADDEV at the output of gate 631 and ADDEV. Thus, the decoder 635 in FIG. 45 is enabled by the ADDEV signal to decode the address bits ADD3-ADD7 producing the output EN MASK.

The CPU then forwards the control signal BDIN which is received in FIG. 43 and results in enabling of the data in-lead DTIN at the output of gate 623. With the generation of DTIN, and the enabling of gates 672 and 673 in FIG. 46 as a result of the ENMASK output from the decoder 635 in FIG. 45 and the address bit ADD1 from the address store 602 in FIG. 44, AND gates 676 and 677 will be enabled to produce the enable mask signals ENMASK1 and ENMASK2, which are applied to the input of gate 619 in FIG. 43 to generate an immediate reply to the central processing unit 130 via gate 622 on lead BRPLY.

Figure 54:
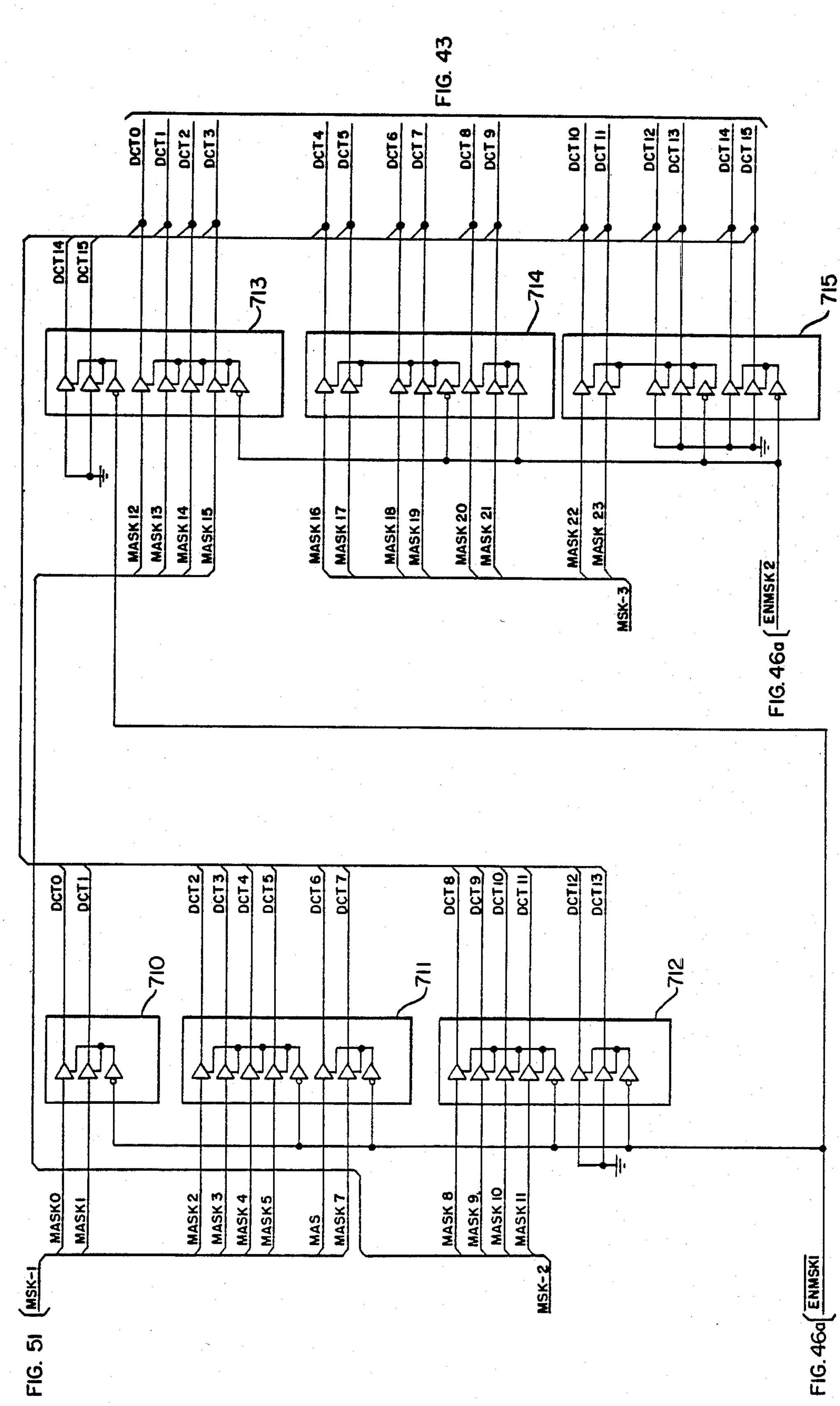
Figure 55:
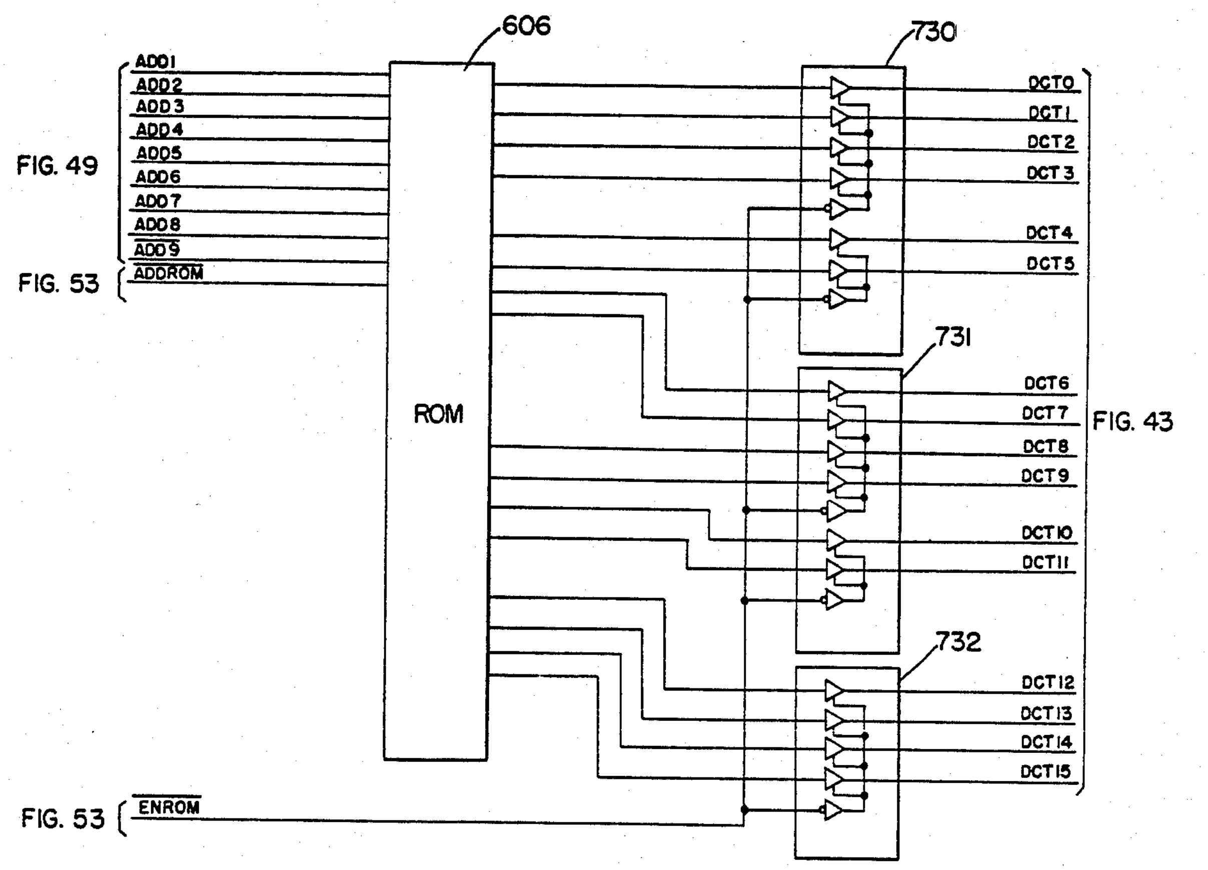

The mask bits which appear in the interrupt mask flip-flop 658, such as seen in FIG. 51, are applied to a plurality of gate circuits 710-715 in FIG. 54. With receipt of the enable mask signals ENMASK1 and ENMASK2, the gate circuits 710-715 are enabled to pass the mask bits to data leads DCT0-DCT15. In this regard, it will be noted from FIG. 46 that by controlling the first address bit ADD1, gate 676 can be enabled first from the output of gate 673 and then gate 677 will be enabled in a second operation directly from the output of the address store 602. Thus, the twenty-four mask bits will be forwarded to the central processing unit in two groups consisting of bits 0 through 11 in a first group and bits 12 through 23 in a second group. The control over the differential gate arrangement 620 in FIG. 43 is effected by generation of the enable bus signal ENBUS in FIG. 46*b* at the output of gate 627 when gate 626 is enabled by either of the enable mask signals ENMAKS1 and ENMASK2. The successive group transfer of bits in this case also applies to the earlier description in connection with the reading of the mask bits from the central processing unit. If the central processing unit desires to change any of the stored mask bits in the interrupt encoder 125, it merely clears the mask bit flip-flops in the manner already indicated, which temporarily prevents the system from acting on any interrupt requests until new mask bit data is forwarded to the interrupt encoder in the manner already indicated previously.

A further function of the interrupt encoder is to provide a boot strap program for the central processing unit during a power-up operation. The contents of the boot strap program which are stored in a read only memory can be accessed by request from the central processing unit 130. This is initiated as in other functions by forwarding from the central procesing unit 130 the control signals BSYNC and BBS7 in FIG. 44 along with address information received at the address store 602 on leads RDAL0-RDAL15. The address bits ADD9, ADD10, ADD11, and ADD12 along with the control signals SYNC and BANK7 are forwarded to the internal enable gates 720-724 in FIG. 53 where an enable signal ADDROM is generated at the output of gate 724 to address the read only memory 606 in FIG. 55. The ROM 606 receives the address on leads ADD-1-ADD8, and ADD9 and is enabled by the signal AD DROM.

The CPU then forwards a control signal BDIN to the interrupt encoder where it is received at gate 623 in FIG. 43 and enables the data-in lead DTIN. Enabling of the data-in lead DTIN in conjunction with enabling of the AND gate 724 in FIG. 53 through OR gate 725 will enable the AND gate 726 to generate the enable ROM signal $\overline{\text{ENROM}}$. This signal is forwarded to the ROM buffer gates 730, 731, and 732 in FIG. 55 to gate out the data in the ROM. With the generation of the enable signal $\overline{\text{ENROM}}$, gate 619 in FIG. 43 is enabled providing a reply through gate 622 on lead $\overline{\text{BRPLY}}$. Also, gate 626 is enabled in FIG. 46*b* to provide an output from gate 627 on $\overline{\text{ENBUS}}$ to enable the differential gate arrangement 620 in FIG. 43 to permit the data to be transmitted from leads DCT0–DCT15 onto the bus leads $\overline{\text{BAL0}}$–$\overline{\text{BAL15}}$ to the central processing unit 130.

Figure 56:
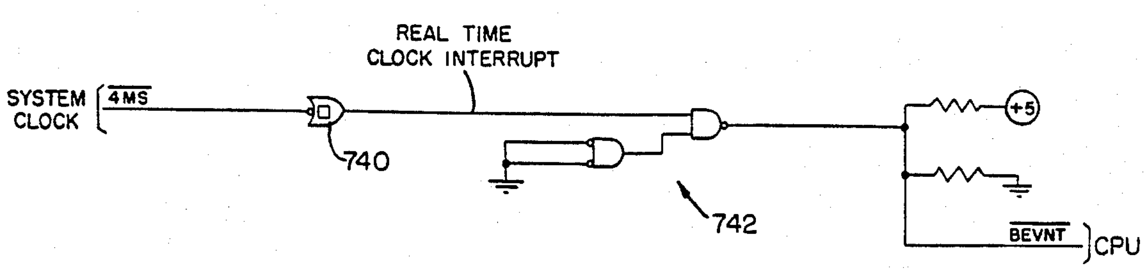

The final function performed by the interrupt encoder consists of periodically forwarding to the central processing unit 130 an event line interrupt occurring every 4 milliseconds. As seen in FIG. 56, the 4 millisecond clock pulse providing a real time clock interrupt is applied through the Schmitt trigger circuit 740 and gate circuit 742 to enable the $\overline{\text{BEVNT}}$ lead to the central processing unit so that a clock pulse of 125 microsecond duration is forwarded to the central processing unit 130 every 4 milliseconds as a real time clock interrupt for the purpose of incrementing date and time counters therein.

D. THE DIGITAL TRANSMISSION NETWORK

FIG. 57 schematically illustrates the time-division multiplex data transmission path through the system in accordance with the present invention. The pulse code modulation circuit 105 connected to a sending telephone station S samples each of twenty-four input analog terminations at a rate of 8,000 per second. The samples are converted to eight-bit pulse code modulation words and are multiplexed to provide a 1.544 MB serial digital output in a modified D3 channel bank format. Each of the 8,000 samples results in a "frame" of data consisting of one eight bit PCM word for each of the twenty-four input analog signals ($8\times24=192$) and a 193rd bit used for frame synchronization at the receiving end. The data is supplied to a data conditioner DC0, which converts the eight bit serial data of D3 format to an eight bit parallel PCM word at the 1.544 MB rate, and supplies this data to a matrix switch MS0.

The matrix switches MS0 and MS5 along with the expander-concentrator 800, as seen in FIG. 57, form part of a typical data switch arrangement in which data is transferred through the matrix switches and the exander-concentrator by time slot interchange in time slots of a repetitive time frame assigned and controlled by the central processing unit 130. Each matrix switch MS includes a send data memory and a receive data memory, and the system clock controls the operation of these memories in such a way that data from the data conditioner DC is applied to and stored in the send memory at the same time that data stored previously in the receive memory is gated out to the data conditioner DC. During the second half of the clock cycle, the data which has been stored in the send memory undergoes time slot interchange by transferring it from the send memory into the receive memory. Thus, as seen in FIG. 57, data from the data conditioner DC0 will be shifted into the send memory of the matrix MS0 during the first half of the clock cycle. During the second half of the clock cycle, the data which has been stored in the send memory of matrix MS0 will be transferred through the expander-concentrator 800 to the receive memory of the matrix MS5, and during the first half of the following clock cycle this data stored in the receive memory of the matrix MS5 will be shifted out to the data conditioner DC5.

The eight bit parallel PCM word received from the matrix MS5 in the data conditioner DC5 will be converted to serial format and outputted to the pulse code modulation circuit 106 the circuit 106 will convert the eight bit PCM word to voice frequency and apply it to the receive telephone station R. During the transmission of data from the pulse code modulation circuit 105(106) the internal clock in the fourth group is disabled and bit synchronization is obtained by driving the transmit section with a 1.544 MHz clock supplied the system master clock. The internal transmit frame generator also is disabled and the transmit section of the port group is "force" framed by a master frame pulse supplied by the master clock. This assures that all the transmitters of the respective port groups are bit and frame synchronized with respect to each other and with respect to the other transmission hardware within the system. In the reception of data, the pulse code modulation circuits establish bit synchroniztion by deriving clock from the received data signal and establish frame synchronization by decoding the frame pattern contained in the 193rd bit position of the data signal.

FIG. 58 illustrates a typical example of the digital transmission network in accordance with the present invention for a 960 port system, such as previously described in connection with FIG. 6. Such a system provides six matrix switches MS0–MS5 in the common control 101, with each matrix switch being capable of handling data derived from four port groups or three port groups and a miscellaneous cell and another lead from a digital conference circuit. The two pulse code modulation circuits 105 and 106 in each port group provide a line on the port group highway to the digital transmission network. Thus, each of the data conditioners DC0–DC5 has eight incoming lines each carrying serial data associated with twenty-four ports, and converts the serial data to eight bit parallel words and transfers the eight bit parallel words to the associated matrix switch MS0–MS5.

Time slot interchange in the system is effected by the central processing unit 130 through the interrupt encoder 125 and the controller 122, the latter directly controlling the respective matrix switches MS0–MS5 in accordance with instructions received from the central processing unit 130. Each matrix switch operates on an essentially standard time-division multiplex concept for time slot interchange. A set of eight memories are used on the send side to receive the eight bit words from the data conditioner and a set of eight memories are used on the receive side to store the data required for output to the data conditioner. The memories are time shared with the first half of the clock cycle being used for input/output to the line side interface (data conditioner) and the second half of the clock cycle for time slot interchange.

Since there are 192 unique inputs applied to the matrix, only 192 memory locations are utilized for input/output data. However, due to the frame data bit incorporated in the serial data stream, there are in reality 193 time slots available for time slot interchange. During the first half of the clock cycle memory addressing is under control of a sequential counter which steps through the 192 memory addresses. Data for the equivalent line address is clocked into the send memory and from the receive memory at this time. During the second half of the clock cycle, memory addressing is under control of the call store memories which transfer data from the send memory to the receive memory in accordance with the preprogrammed data received from the central processing unit 130 via the controller 122 and stored in the store memories. The expander-concentrator 800 enables time slot interchange between any of six matrix send memories to any one of the six matrix receive memories. To guarantee the integrity of the idle line condition to the port group, and to prevent transmission of random charcters to idle receive ports, a write after read memory cycle is incorporated in the receive data memories to restore them to the idle line condition after data is transferred out.

The call store memories in each matrix switch are programmed by the controller 122 which in turn receives its direction from the central processing unit 130. The call store memory consists of twenty-three individual memories. Eight memories store the send port number with a ninth memory used to designate whether the time slot is active or inactive, i.e., reserve. Eight memories store the receive port number with a ninth memory being used to designate the active-inactive status. Five memories are then provided to store the cross-office highway number through the expander-concentrator 800.

The controller 122, under control of the central processing unit 130, has the capability to write data into any given time slot in the call store memories, read data previously stored in any given time slot, or search the receive store memory to determine the time slot a given receive port number has been stored in. The send active-inactive and receive active-inactive memories provide the ability to store call data in the matrix and reserve time slots while data transfer is inhibited. Programming inactive call data does not interfere with data transfer on active time slots, and further permits reserving a time slot for a given port while at the same time actively transferring data with the same port on a different time slot without interference.

The expander-concentrator 800 is a space-divided network which permits up to six matrices to be interconnected, and consists basically of combinational logic which steers the data by the cross-office highway address information supplied from the matrix cross-office memory stores.

1. The Data Conditioner

The data conditioner, the details of which are illustrated in FIG. 59, basically forms a serial-to-parallel and a parallel-to-serial multiplexer/demultiplexer. In this regard, the data conditioner accepts input digital data from eight input sources and multiplexes this data by converting the serial data to eight bit parallel words which are then transferred sequentially to a matrix switch. Conversely, the data conditioner receives eight bit parallel words from the matrix switch and demultiplexes this data by converting these words into serial data which is then outputted on respective output lines.

Referring to FIG. 59, serial data on eight input lines from port cells, a miscellaneous cell, and/or a digital conference circuit are received at a serial-in parallel-out (SIPO) circuit 801, which consists of eight shift registers. Since the data received is bit and frame synchronized by the master clock, the data on each of the eight input signal lines is positionally coincident. Thus, one eight bit PCM word from each of the input signal lines is shifted into a respective one of the eight shift registers which make up the SIPO circuit 801. Upon loading the eighth bit, the contents of the eight registers are broadside loaded into a parallel-in serial-out (PISO) circuit 802, which also consists of eight shift registers, which provide the eight words in such a form that they are now bit parallel and word serial. During the next eight clock cycles, the eight words in the shift registers of the PISO circuit 802 are clocked out to the matrix switch while the next set of eight words are shifted into the input register formed by the SIPO 801. The shifting process is synchronized by the master frame pulse derived from the master clock which also injects an additional shift pulse at the appropriate time to compensate for the frame data bit, under control of the data flow control circuit 803.

Data output from the data conditioner is the reverse procedure with the bit parallel word serial data from the matrix switch being received at a serial-in parallel-out (SIPO) circuit 804, which broadside loads the data into a parallel-in serial-out (PISO) circuit 805. Eight channels of serial data are then supplied through a timing control circuit 806 in which a frame pattern generator under control of the data flow control circuit 803 inserts the appropriate frame bit in the 193rd bit position of each frame.

Figure 60:
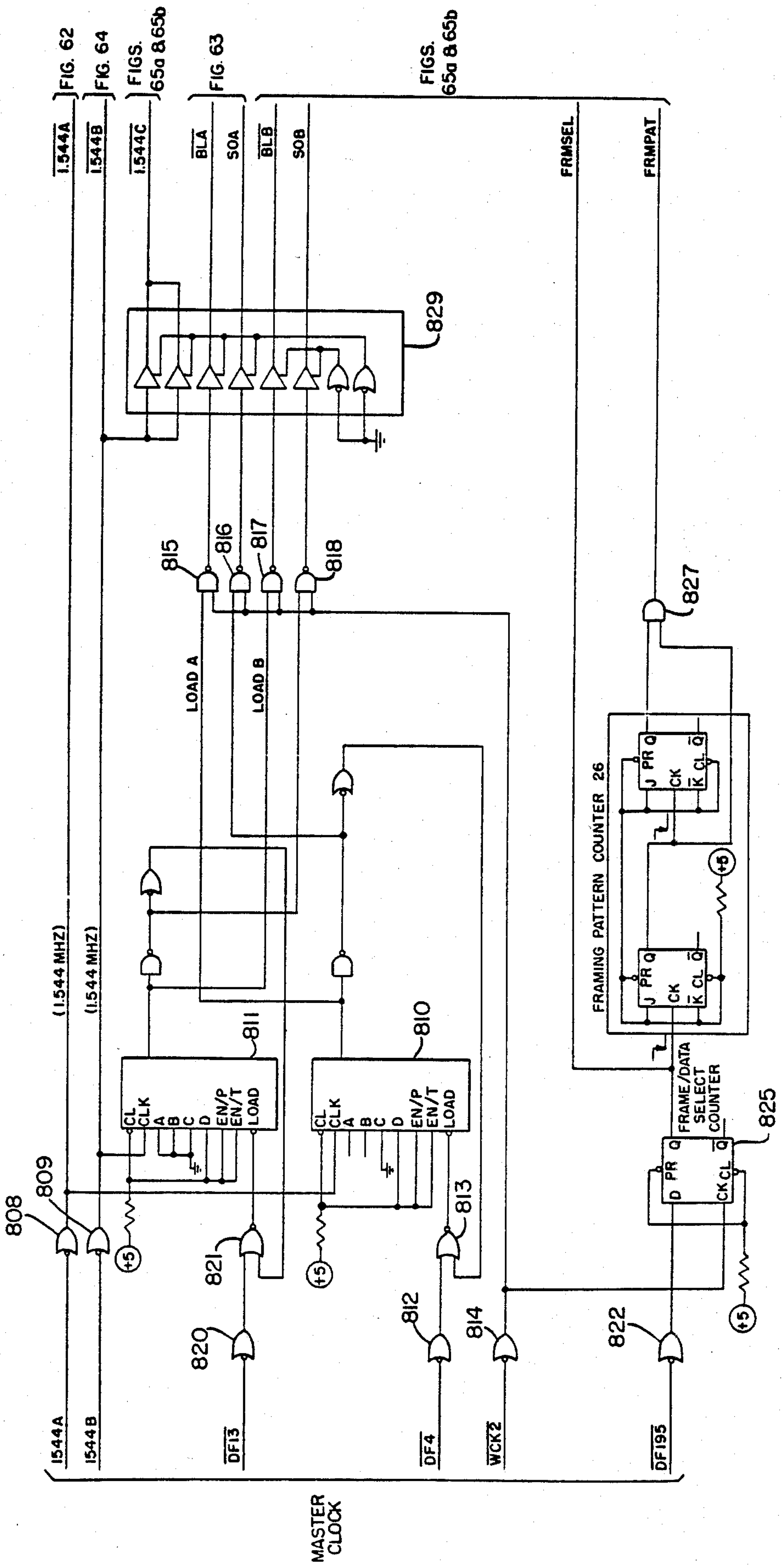
Figure 61:
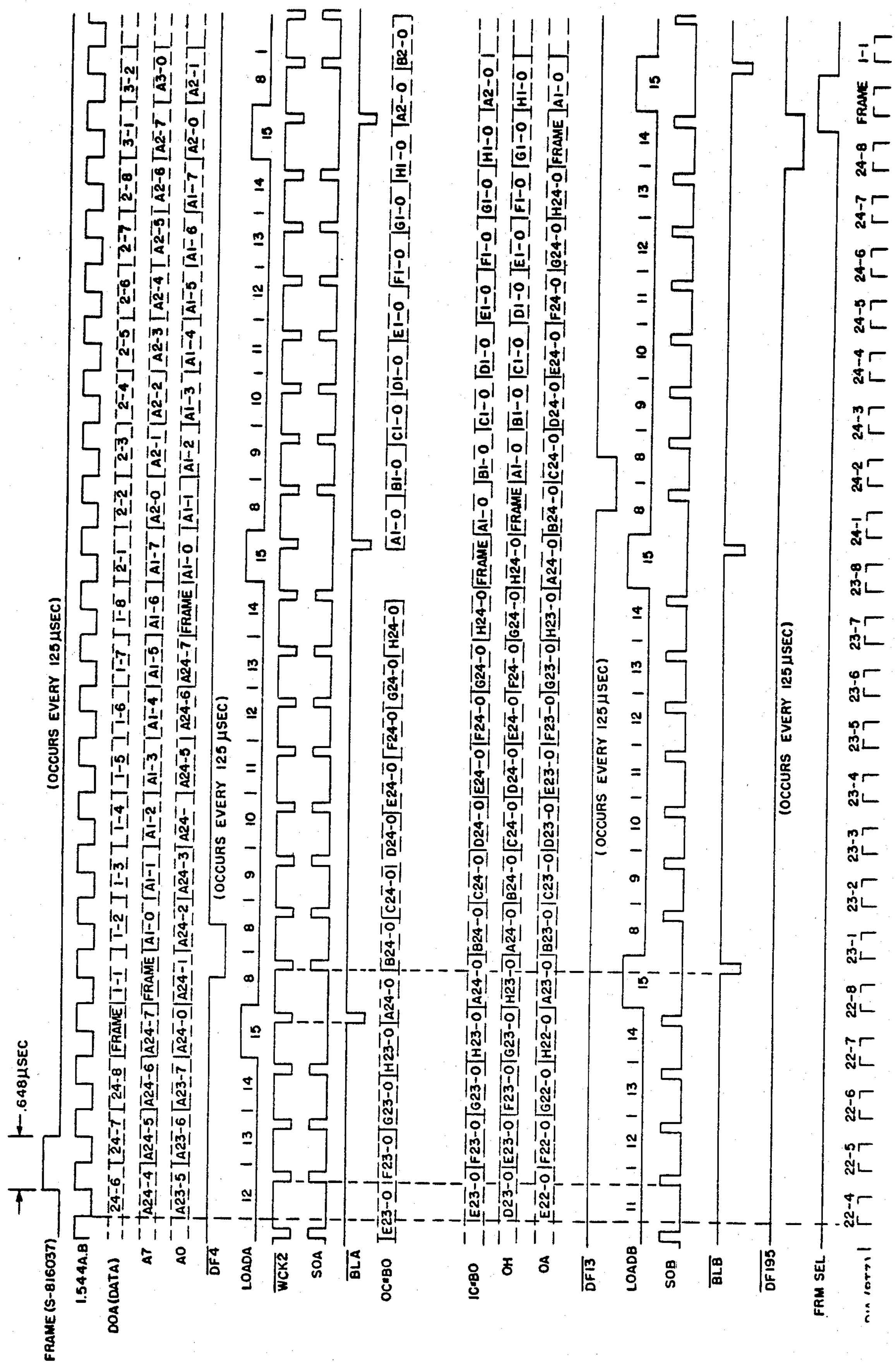

FIG. 60 is a circuit diagram of the data flow control circuit 803 and FIG. 61 is a timing diagram illustrating the various clock signals which are generated from the master clock and control operation of the data conditioner. The master clock provides the basic clock signals at the 1.544 MHz rate which control the sending and receiving of data through the data conditioner on leads 1544A and 1544B to the Schmitt trigger circuits 808 and 809, respectively. The outputs of the gate circuits 808 and 809, respectively control an A counter 810 which controls the sending of data through the data conditioner to the matrix switches and a B counter 811 which controls the transfer data from the matrix switches through the data conditioner. The master clock also generates the timing signals $\overline{DF4}$, $\overline{DF13}$, and $\overline{DF195}$, each being pulses of 680 nanoseconds duration. The signal $\overline{DF4}$ occurs 2.592 microseconds after the beginning of the FRAME pulse, the signal $\overline{DF13}$ occurs 7.424 microseconds after the beginning of the FRAME pulse, and the signal $\overline{DF195}$ occurs 12.636 microseconds after the beginning of the FRAME pulse. These pulses are used to select the proper time synchronization of broadside loading of the registers in the data conditioner with respect to the position of the bits in the data bit stream to be converted and forwarded to the matrix switches.

The signal $\overline{DF4}$ is provided from the master clock through the Schmitt trigger circuit 812 and gate 813 when the FRAME bit has just been shifted into the SIPO circuit 801 so as to ensure that the A counter 810 will be preset at this time to a count of eight. The counter 810 increments each time a data bit is shifted in, so that it is at the count of fifteen when the last bit (8) is shifted in indicating that a broadside loading may occur when the timing signal $\overline{WCK2}$ from the master clock is provided via Schmitt trigger circuit 814 to the load gates 815–818. The timing of data from the matrix switch is effected in a similar manner under control of the B counter 811, which is preset upon receipt of the timing signal $\overline{DF13}$ via Schmitt trigger 820 and gate circuit 821 to a count of eight. Receipt of the signal DF13 indicates that the positioning of the FRAME bit has been shifted in and that channel A is the next bit to be shifted in. The actual framing pattern is generated and inserted on the data bit stream upon receipt of the timing signal $\overline{\text{DF195}}$, which indicates that the last serial bit data has been shifted out and that the FRAME bit is to be next sent. Timing signal $\overline{\text{DF195}}$ is received from the master clock via Schmitt trigger circuit 822 and is applied to the frame select counter 825 which is clocked from the output of Schmitt trigger circuit 814 upon receipt of the timing signal $\overline{\text{WCK2}}$. The frame select signal FRMSEL is generated from the output of the counter 825 and this output is also applied through the framing pattern counter 826 to generate the framing pattern signal FRMPAT at the output of gate 287. The register loading signal $\overline{\text{BLA}}$ and the data shift signal SOA are generated from the outputs of gates 815 and 816 via a gate circuit 829 for controlling the transfer of data through the data conditioner to the matrix switches, and the loading signal $\overline{\text{BLB}}$ and the shift data signal SOB are provided at the outputs of gates 817 and 818, respectively, to the gate circuit 829.

Figure 62:
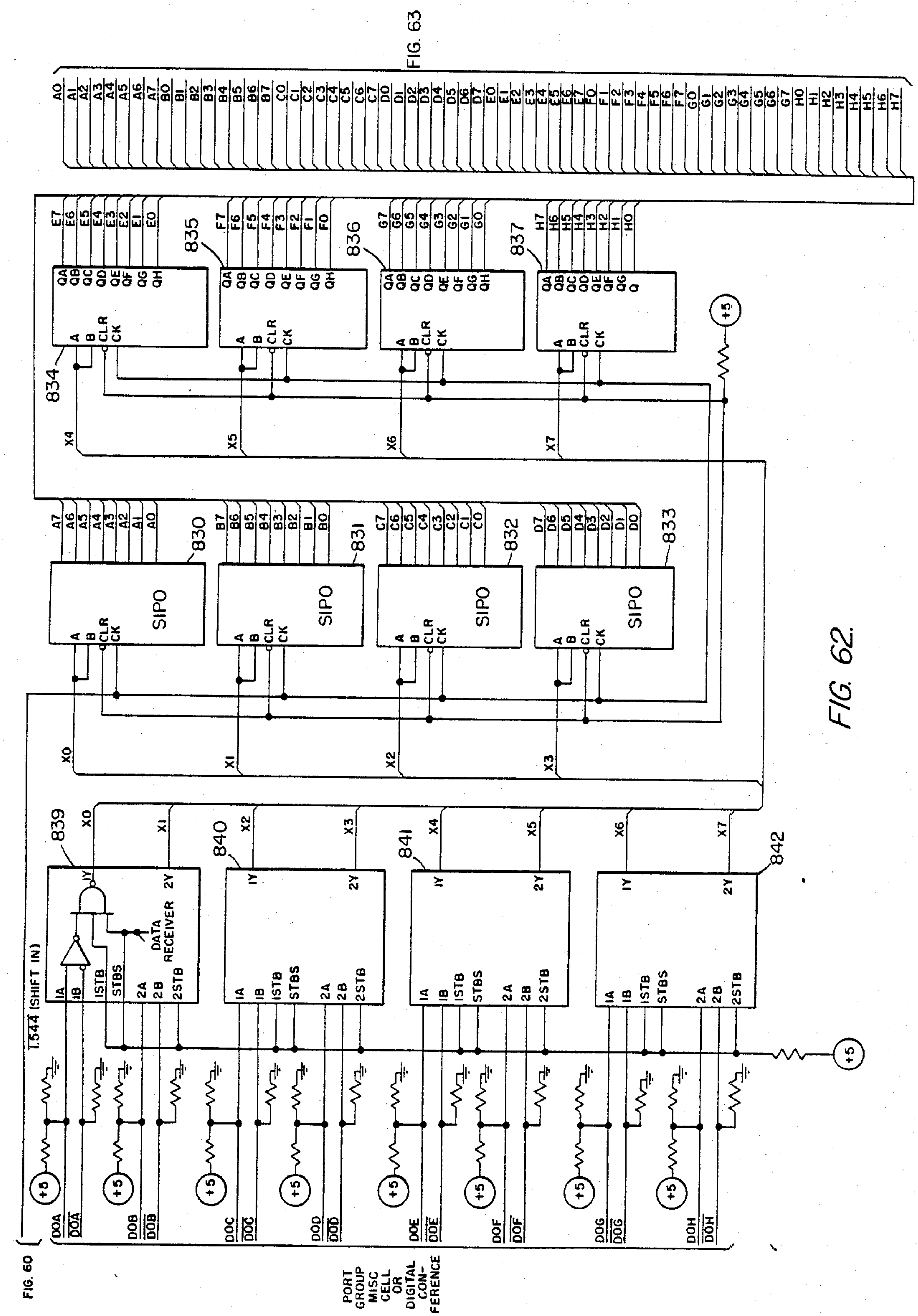

FIG. 62 illustrates the SIPO circuit 801 which basically consists of a plurality of eight bit shift registers 830–837. The receive pairs associated with eight data channels from port cells, miscellaneous cells, and/or a digital conference circuit are provided on leads DOA, $\overline{\text{DOA}}$ through DOH, $\overline{\text{DOH}}$ which connect to respective data receivers 839–842 where the receive pairs are converted to unidirectional lines X0–X7. The serial data provided on each of the receive channels X0–X7 is applied to a respective one of the shift registers 830–837 where the serial data is shifted in in time with the clock signal $\overline{\text{1544A}}$ received from the data flow control circuit 803. Each channel is shifted into its respective SIPO shift register at the same time at the clock rate, and after all eight serial bits have been shifted in, data is available at the output of the respective shift registers in parallel form.

Figure 63:
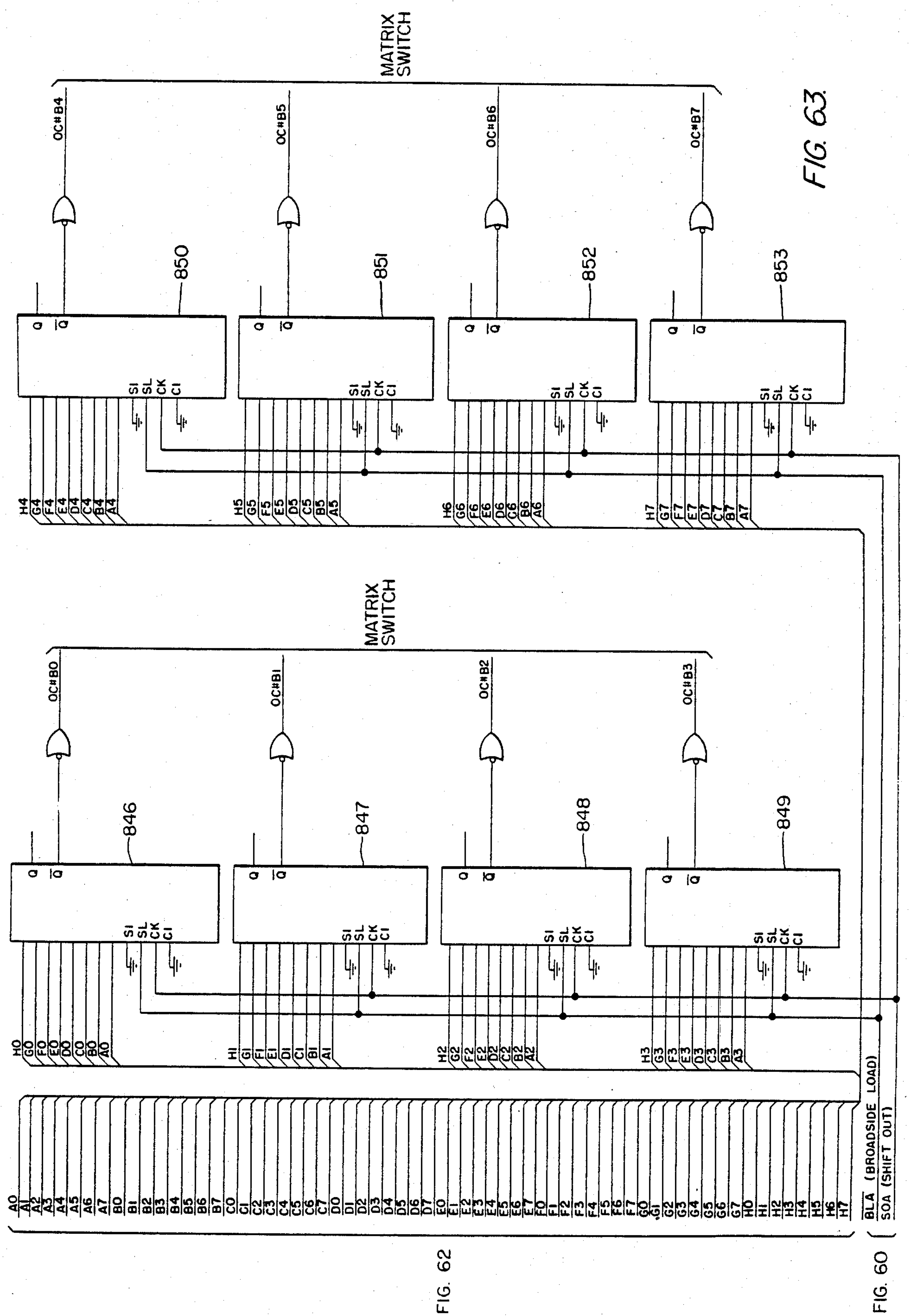

Referring also to FIG. 63, the data which has been shifted into the registers 830–837 in FIG. 62 is broadside loaded into a plurality of shift registers 846–853 which make up the PISO circuit 832. All sixty-four bits are loaded into the shift registers at the same time time except the eight words are now provided in the registers 846–853 in bit parallel word serial form. The data conditioner therefore has performed a multiplexing operation in taking the serial data from eight respective input channels and providing this data as one word from each channel provided successively in parallel form at the outputs of the registers 846–853 to the matrix switch. Loading of data into the registers 846–853 occurs upon receipt of the broadside load signal BLA from FIG. 60 and the shifting out of the data to the matrix switches occurs upon receipt of the shift-out signal SOA.

Figure 64:
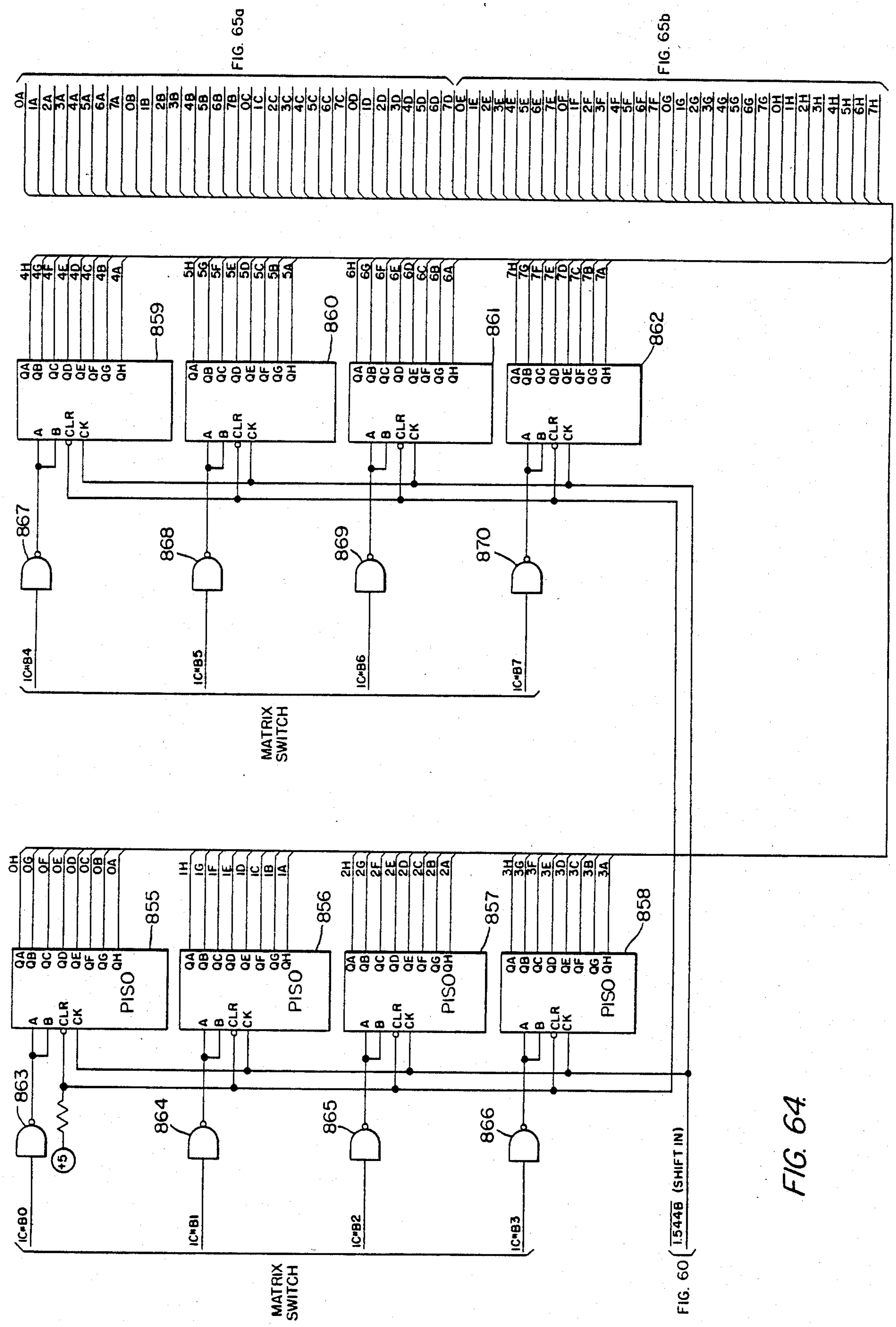
Figure 65A:
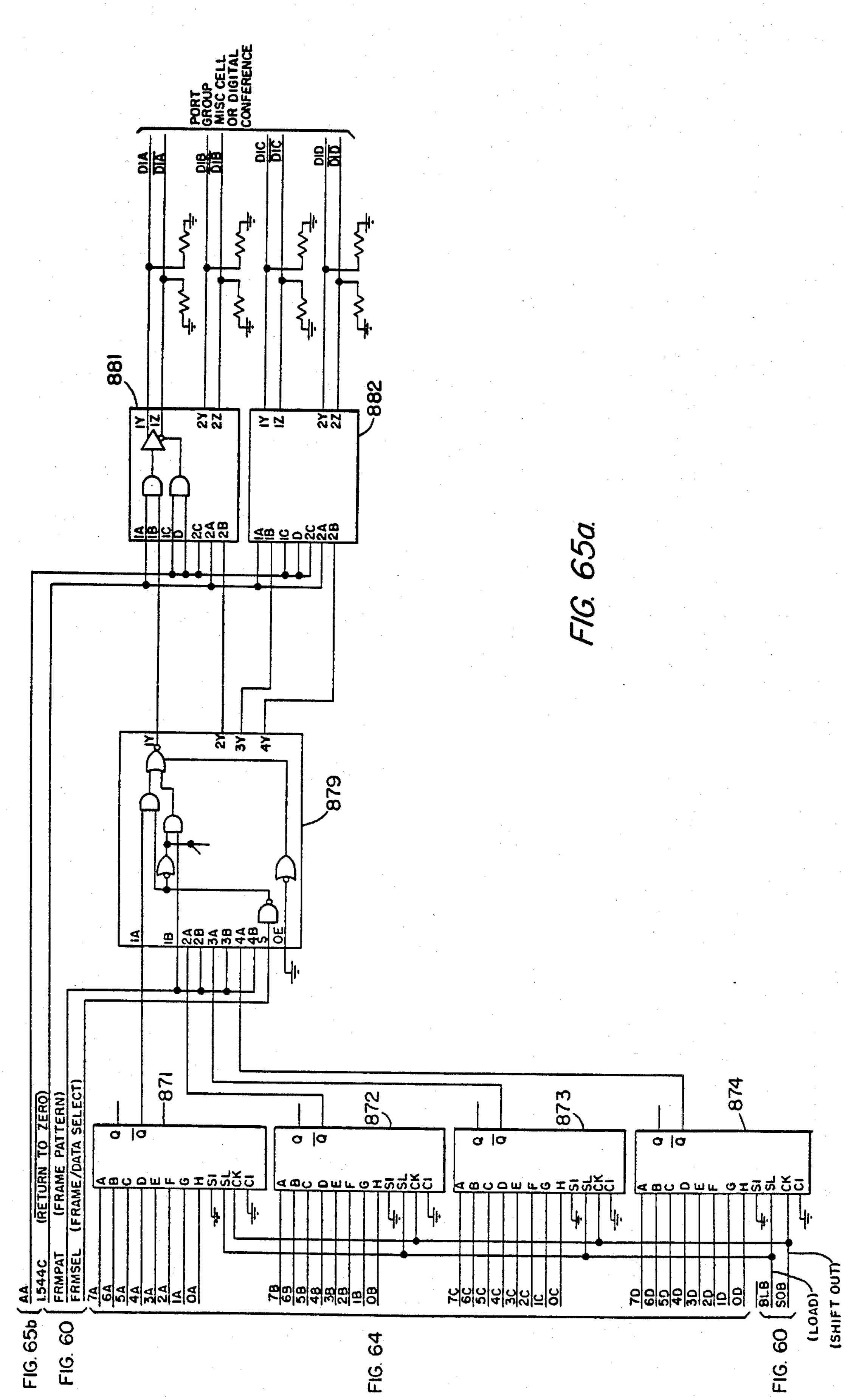
Figure 65B:
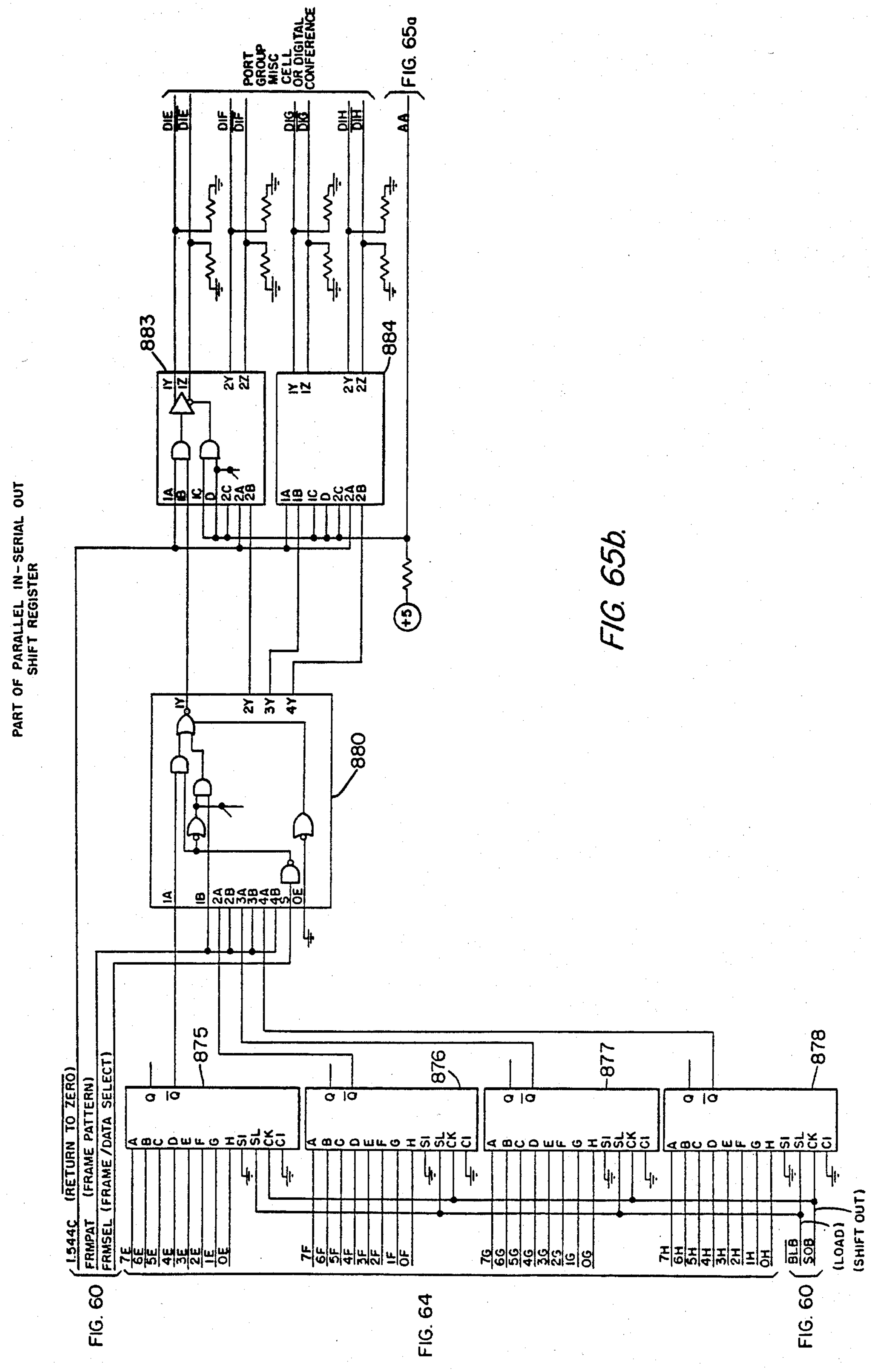
Figure 66:
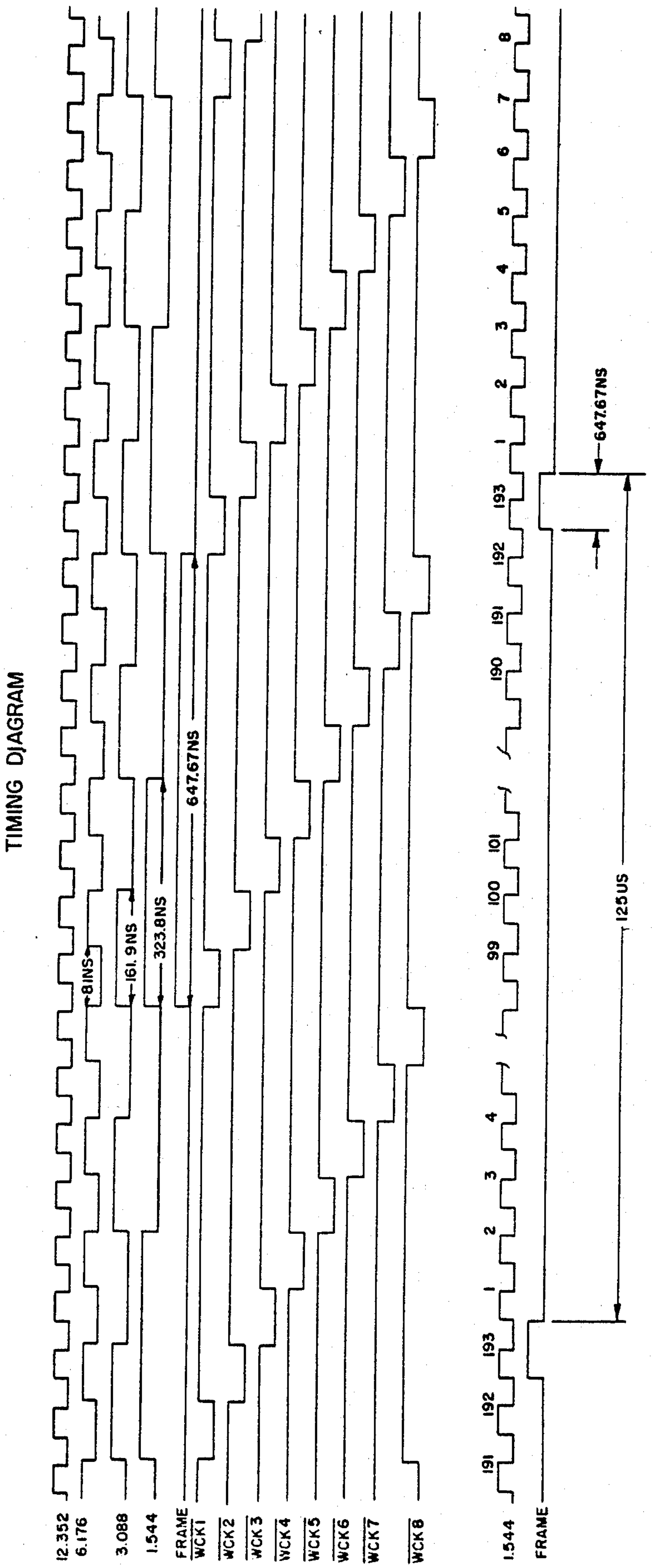

FIG. 64 illustrates the SIPO circuit 804 which receives data as eight bit parallel words from the matrix switch on leads B0–B7 which data is shifted into a plurality of shift registers 855–862 via respective Schmitt trigger circuits 863–870 in time with the clock signal $\overline{\text{1544B}}$ provided by the data control flow circuit 803 in FIG. 60. When eight channels of data have been shifted into the registers 855–862, they are broadside loaded into shift registers 871–878 in FIGS. 65*a* and 65*b*, which registers comprise the PISO circuit 805. The shifting of the data from the registers 855–862 into the registers 871–874 is effected upon receipt of the load signal $\overline{\text{DLB}}$ from the data flow control circuit 803 in FIG. 60. When the data has been loaded into the registers 871–878, and upon receipt of the shift-out signal SOB from FIG. 60, data is shifted out in serial form to circuits 879 and 880 which serve to insert the FRAME bit in the signal under control of the timing signals FRMPAT and FRMSEL from the data flow control circuit 803.

Eight channels of serial data are provided by the circuits 879 and 880 to driver circuits 881–884 which serve to convert the unidirectional lines to the receive data pairs which extend to the port cells, miscellaneous cells and/or digital conference circuits at the frame rate of 1.544 MHz under control of the timing signal 1.544C from the data flow control circuit 803. The driver circuits also serve to "return to zero" the data bit stream which is sent back to the port group. This means that the second half cycle of every data bit and frame bit is brought to zero. This is done to ensure bit synchronization in the port group and is accomplished in the data conditioner by gating the serial data bits with the 1.544 MHz clock.

2. The Matrix Switch

FIG. 67 is a general block diagram of the matrix switch, the principal components of which are the send data memory 890, the receive data memory 891, and the store memory 894. The matrix switch is a time division multiplex switch which interchanges eight bit parallel time slots from the input to the output, the matrix having a single eight-bit wide cross-office highway output and a dual eight-bit wide cross-office highway input. Interconnection of a plurality of matrices can be accomplished by use of the space-divided expander/concentrator 800.

The operating speed of the matrix switch is 1.544 MHz, the combined effect of the 8,000 sample per second rate and 193rd framing bit with the D3 format resulting in 192 input-output time slots and 193 switching time slots, which are generated within the clock and memory control 892 along with other control signals necessary to the functioning of the matrix switch. Functionally, the matrix switch performs continuous asynchronous time slot interchange between the send data memory 890 and the receive data memory 891 through the expander/concentrator 800 under control of the address data contained in the store memory 894. The matrix is transparent with respect to time slot data, the data out being equivalent to the data in with no restrictions on time slot contents or format. The time slot interchange and store memory programming functions are sufficiently independent that the two operations can be reviewed separately.

The store control logic 893 is responsive to the clock and control signals from the clock and memory control 892 as well as control and address signals from the controller 122, which is responsive to commands from the central processing unit 130. The store control logic 893 is basically responsible for the comparison of address information received from the controller with stored information in the memory store 894 and serves to control the three basic functions of the matrix switch, i.e., read, write, and search, once a match has been detected between the received and stored address information. The control data output circuit 895 is responsive to the store control logic 893 for forwarding to the controller 122 information stored in the store memory 894 upon request from the controller 122. Thus, the matrix switch provides not only time slot interchange of data under control of the controller 122, but also provides to the controller 122 upon request data which is stored in the store memory 894.

Figure 68:
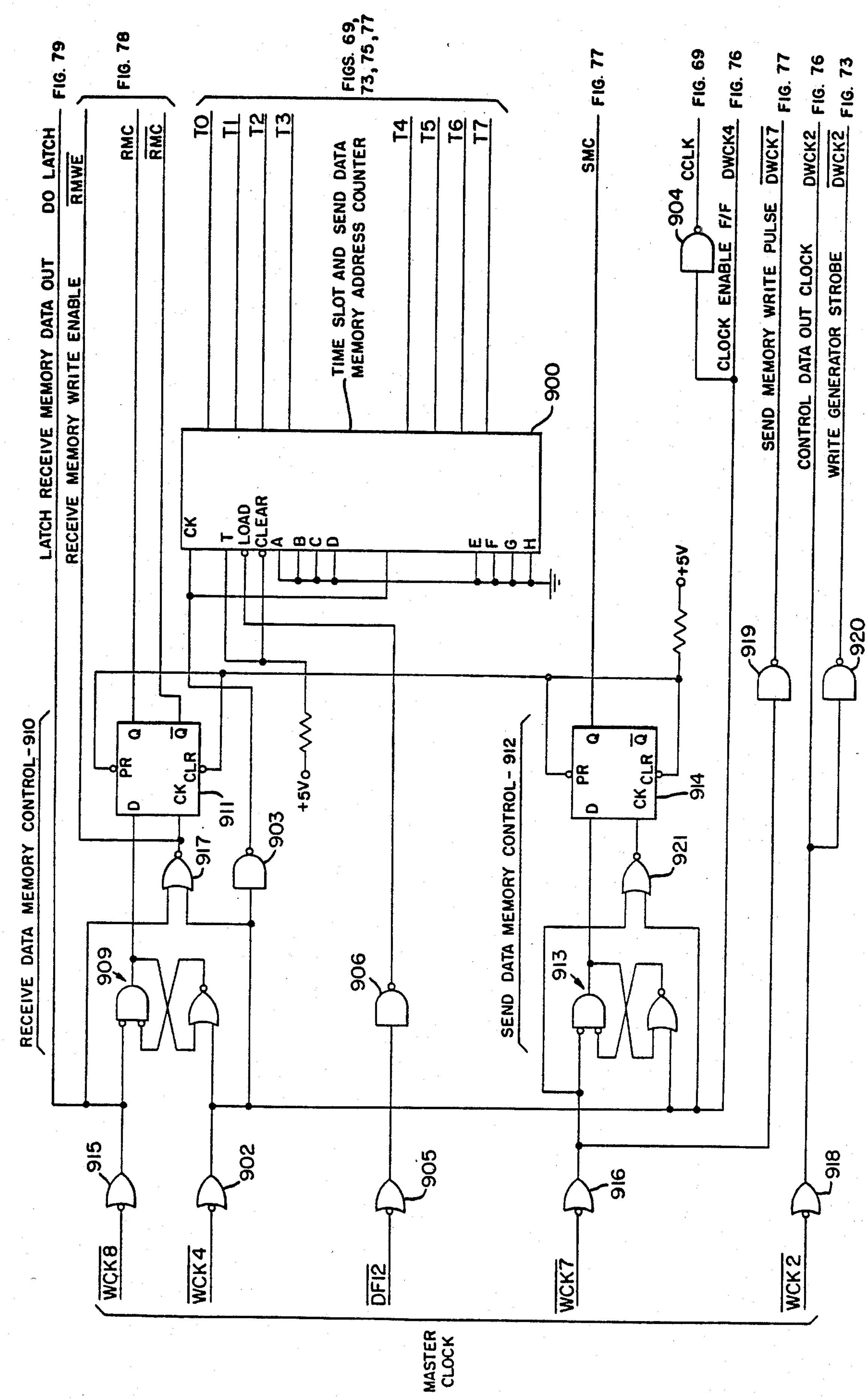
Figure 69:
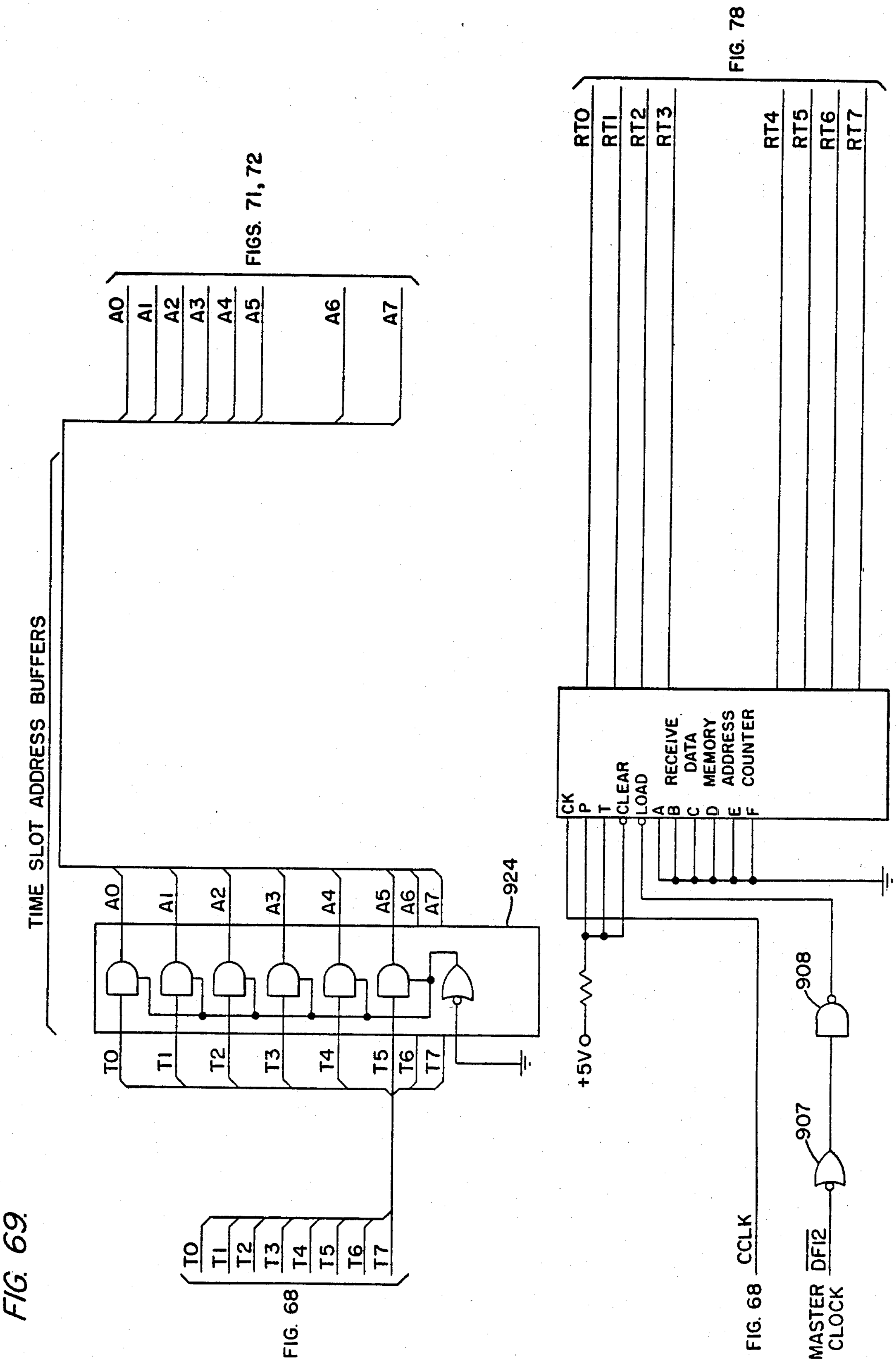
Figure 70:
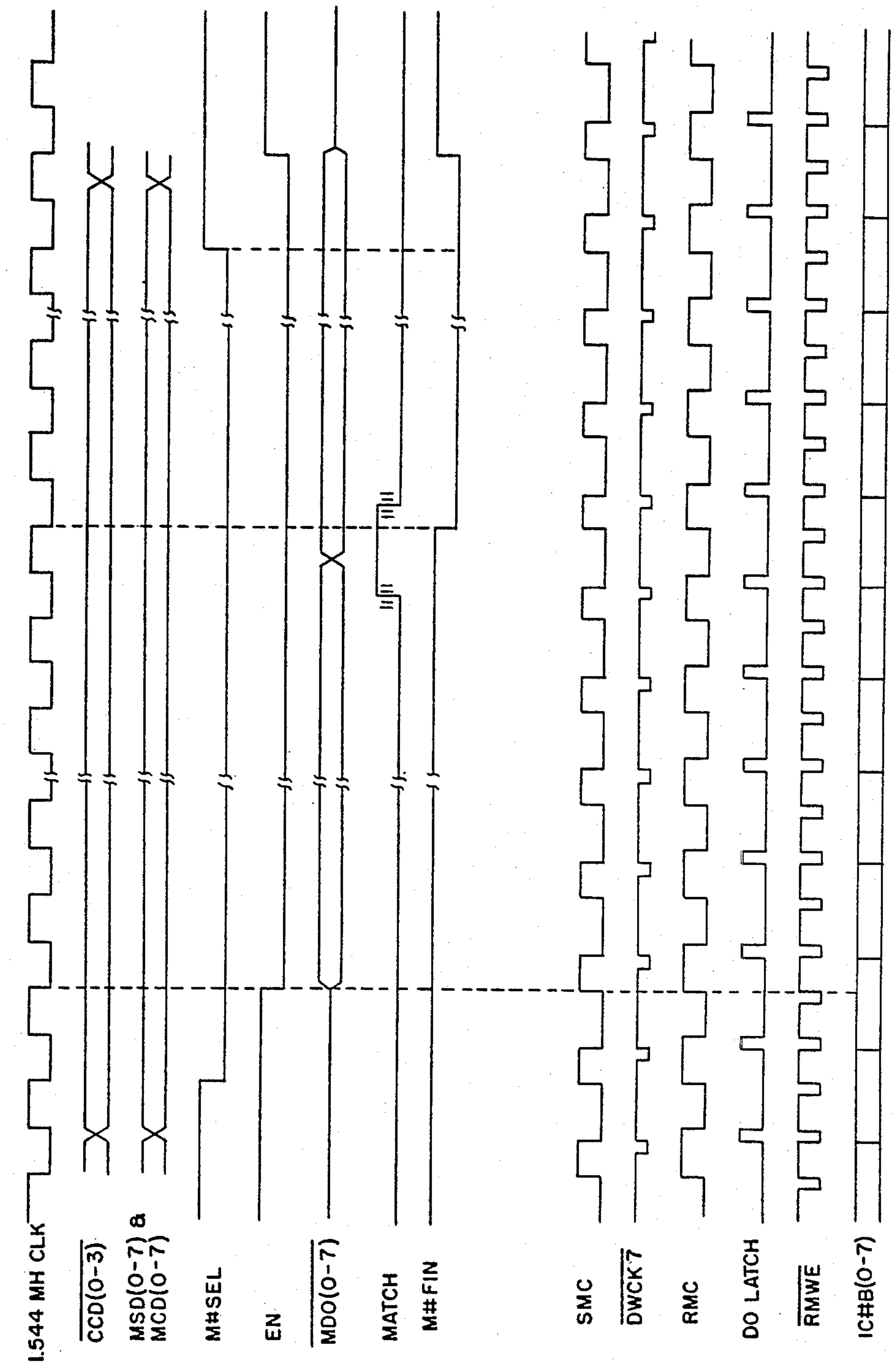

The clock and memory control circuit 892 is illustrated in greater detail in FIGS. 68 and 69, and the operation of this circuit can be determined from the timing diagram illustrated in FIG. 70. The clock and memory control circuit accepts clock signals from the master clock (FIG. 66) and regenerates the internal clock and memory control signals required for time slot interchange and store memory programming. All internal timing is synchronized to these input clock signals.

The time slot and send data memory address counter 900 and the receive memory address counter 901 are each eight stage counters which provide up to 256 distinct addresses for memory control (256 time slots). The counter 900 is incremented by the positive going transition of timing signal $\overline{WCK4}$ from the master clock applied through Schmitt trigger circuit 902 and gate 903; while, the counter 901 is incremented in a similar manner from the output of Schmitt trigger circuit 902 via gate 904 on lead CCLK. Both of the counters 900 and 901 are synchronized to the zero condition in coincidence with the external load signal supplied by the master clock on lead DF12 supplied to counter 900 via Schmitt trigger circuit 905 and gate 906 on the one hand, and supplied to counter 901 via Schmitt trigger circuit 907 and gate 908 on the other hand. The counter 900 supplies the address data for the send data memory 890 during the input portion of the send memory cycle and continuous address data for the store memory 894. The receive data memory address counter 901 supplies the address for the receive data memory 891 during the output portion of the receive memory cycle.

The send and receive data memories 890 and 891 are time shared for the input-output function and real time data transfer (time slot interchange). In this regard, the control signals RMC and SMC generated by the receive data memory control 910 and send data memory control 912, respectively, in FIG. 68 are the control signals which designate the operating mode for the memories 890 and 891, logic 1 indicating input and output, while logic 0 indicates data transfer. The receive data memory control 910 consists of a crossed NOR latch 909 and a D flip-flop 911. A low-going pulse on lead $\overline{WCK4}$ from the master clock via Schmitt trigger circuit 902 sets the flip-flop 911 via gate 917 to place a logic 1 on the lead RMC; while, a low-going pulse on lead $\overline{WCK8}$ from the system clock rests the latch 909 and provides a logic 0 to the D input of flip-flop 911. The positive going edge of $\overline{WCK8}$ resets the flip-flop and provides a logic 0 on lead RMC.

The send data memory control 912 operates in a manner similar to the control 910 in that the flip-flop 914 is set on receipt of a low-going pulse on lead $\overline{WCK4}$ produced at the output of Schmitt trigger circuit 902 via gate 921 and the output of latch 913 to produce a logic 1 on lead SMC. However, the transfer function for the send data memory control 912 is initiated earlier by the positive going transition of lead $\overline{WCK7}$ from the master clock, which resets the latch 913 and the flip-flop 914 to place a logic 0 on the lead SMC. The send transfer cycle is initiated earlier to partially compensate for the memory access time and propagation delay through the cross-office expander/concentrator circuit 800.

All other clock signals are directly regenerated from the clock signals received from the master clock with the exception of the receive data memory clock $\overline{RMWE}$, which is a double clock pulse produced at the output of gate 917 by both $\overline{WCK4}$ and $\overline{WCK8}$. The WCK8 component of signal of $\overline{RMWE}$ is used to erase the receive memory after data output and the WCK4 component of the signal $\overline{RMWE}$ is used to write in the transferred data during the transfer portion of the receive memory cycle.

The send memory write pulse $\overline{DWCK7}$ is generated at the output of gate 919 from the output of Schmitt trigger circuit 916 in response to the timing signal $\overline{WCK7}$. The control data outclock DWCK2 is generated from the output of Schmitt trigger circuit 918 in response to the timing signal $\overline{WCK2}$ from the master clock; while, the write generator strobe signal $\overline{DWCK2}$ is generated at the output of gate 920 from the output of Schmitt trigger circuit 918. The clock enable flip-flop signal $\overline{DWCK4}$ is merely the regeneration of the clock signal $\overline{WCK4}$ provided from the output of Schmitt trigger circuit 902. The latch receive data memory data-out signal DO LATCH is generated from the output of Schmitt trigger circuit 915 and is the regeneration of the timing signal $\overline{WCK8}$.

As seen in FIG. 69, the time slot signals T0–T7 provided from the counter 900 are supplied through buffer circuit 924 on leads A0–A7 to the store memory 894. The store memory 894, which is illustrated in more detail in FIGS. 71 and 72 contains the address data which controls the time slot interchange during the transfer portion of the send and receive data memory cycles. For this purpose, the store memory 894 comprises twenty-three registers 925–947 each of which provides 256 memory locations responsive to an eight bit address. Registers 925–933 comprise the send store memory and provide for the storage of eight address bits and an active/$\overline{active}$ bit. The eight address bits permit anyone of the 256 memory locations in the send data memories to be addressed during the data transfer portion of the send data memory cycle. The active/$\overline{active}$ bit inhibits data transfer when set to the active condition (logic 1). The data level condition in the matrix is logic level 1, with data inhibit being indicated by logic 0 or idle condition.

The receive store memory comprises registers 934–942 for storing eight address bits and an active/$\overline{active}$ bit, and its function is similar to that of the send store memory except that the active/$\overline{active}$ bit deselects the receive data memories when set to the active condition (logic 1) which prevents destruction of the data stored in the receive data memories.

The cross-office highway store memory comprises registers 943–947 and is capable of storing five address bits. Bit 4 selects one of the two eight-bit cross-office highways from the expander/concentrator 800, while bits 0–3 are connected on leads X0–X3 through drivers 948–951 to leads MX0–MX3 providing the steering address data required by the expander/concentrator 800.

Data in the store memory 894 is sequentially addressed under control of the time slot and send data memory address counters in the clock and memory control 892. The data remains stable except during execution of the store memory write commands issued by the controller 122 and received on leads MSD0–MSD7 in FIG. 71. Time slot interchange is not affected during execution of store memory commands except for the obvious case of the specific time slots involved in a store memory write command.

The matrix switch executes eleven distinct commands which basically can be grouped into three fundamental type operations: read, write, and search. These commands are executed under control of the controller 122 and will be described in greater detail in connection with that circuit. Control of the store memory 894 is provided by the control signals $\overline{\text{SWE}}$, $\overline{\text{RWE}}$, and $\overline{\text{XWE}}$ provided by the store control logic circuit 893. In the absence of any command from the controller 122, the store control logic 893 will be in the idle condition and time slot interchange in the matrix switch will proceed in accordance with the prior programmed data stored in the send, receive, and cross-office store memories indefinitely in response to the successively received time slot signals on leads A0–A7 from the clock and memory control circuit 892.

Figures 69, 71, 72, 73, 75, 77:
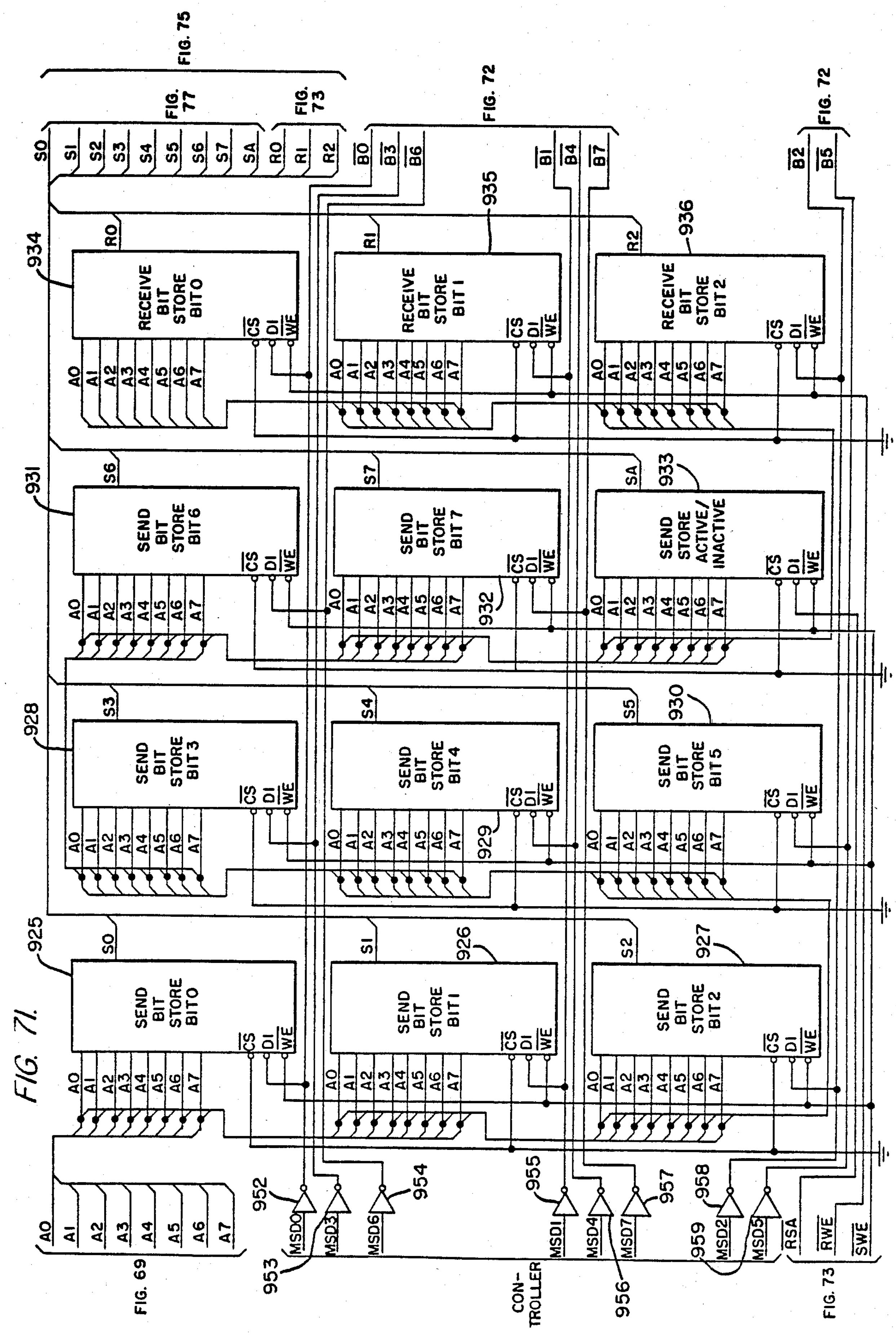
Figure 72:
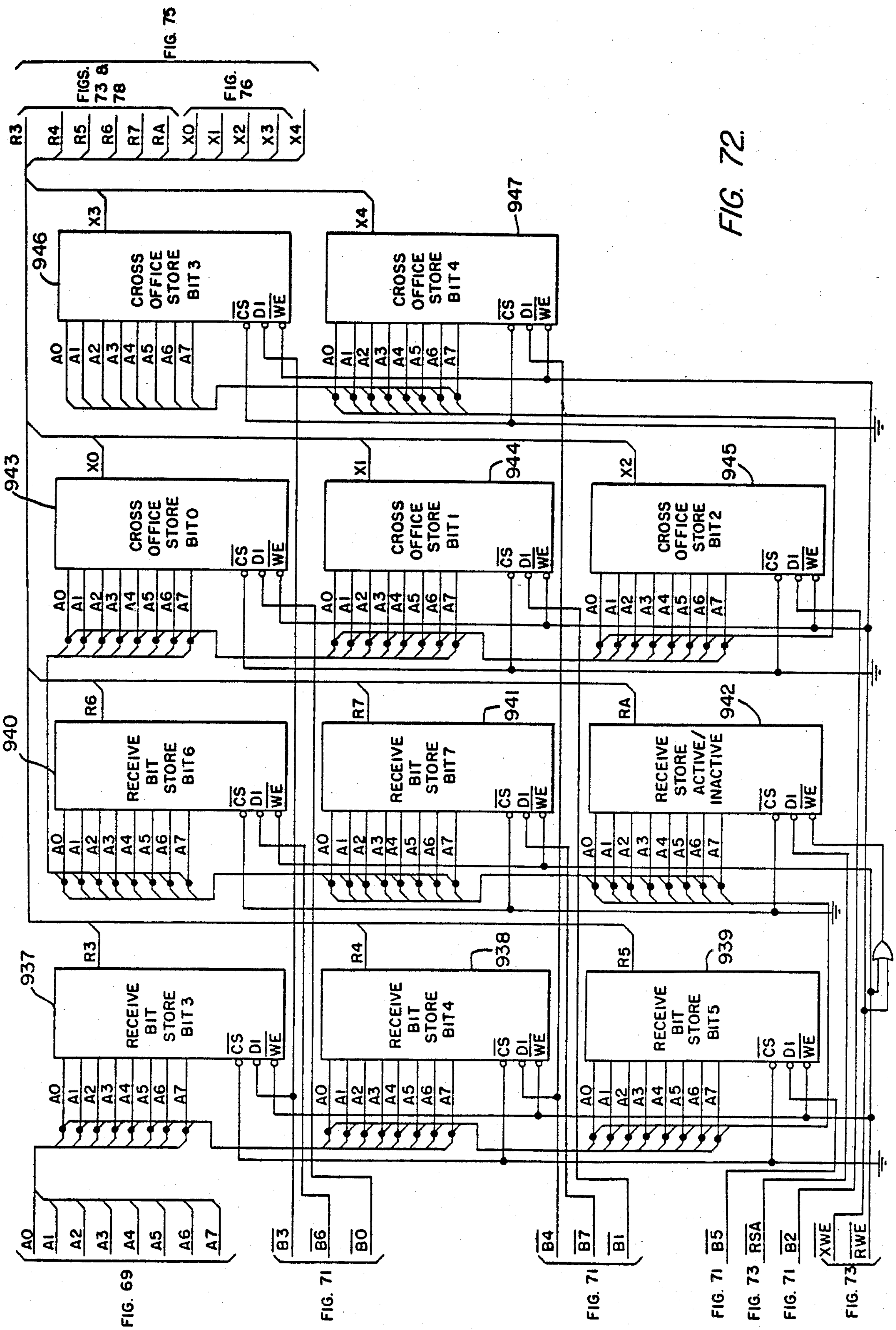
Figure 73:
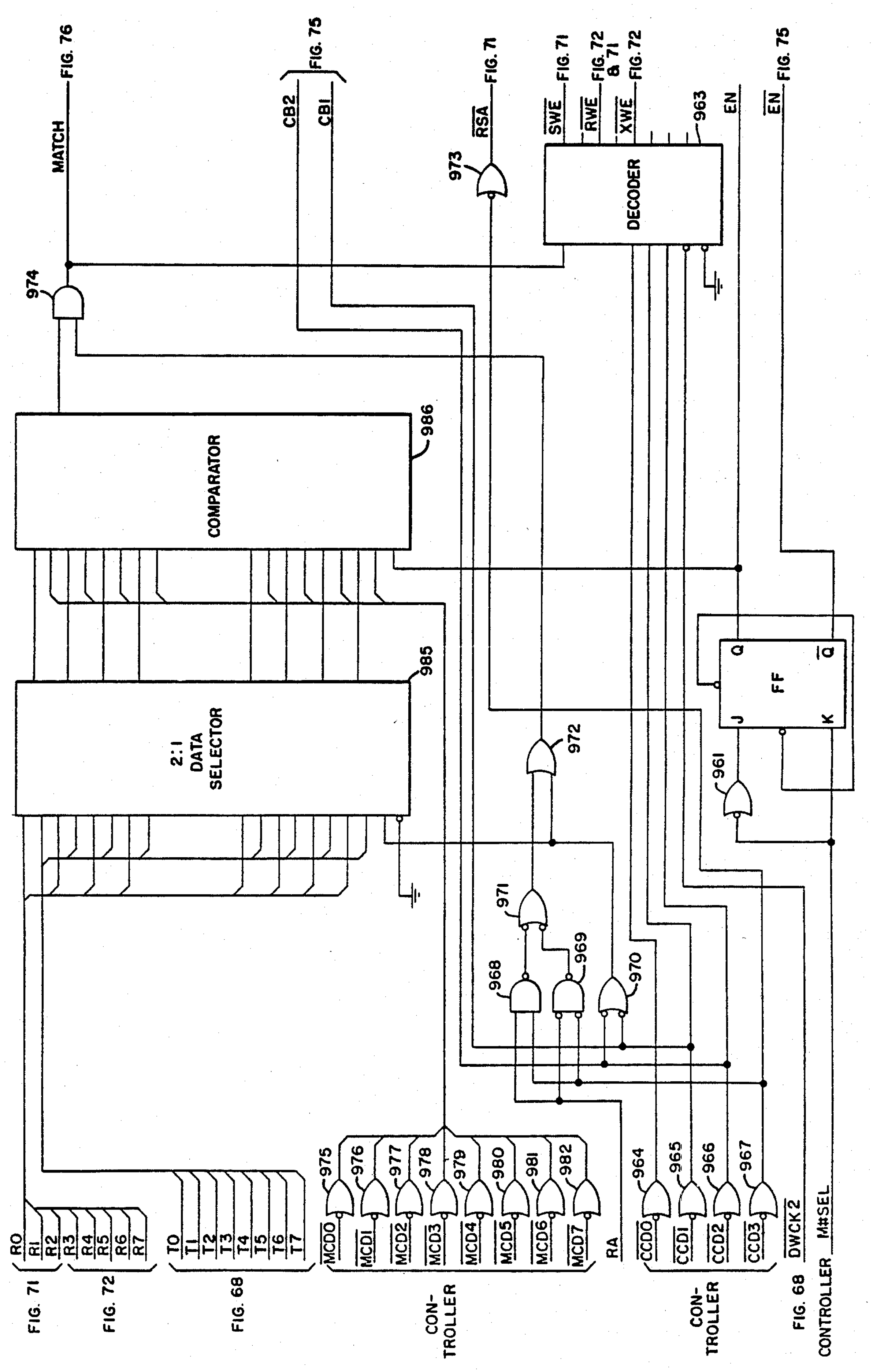
Figure 74:
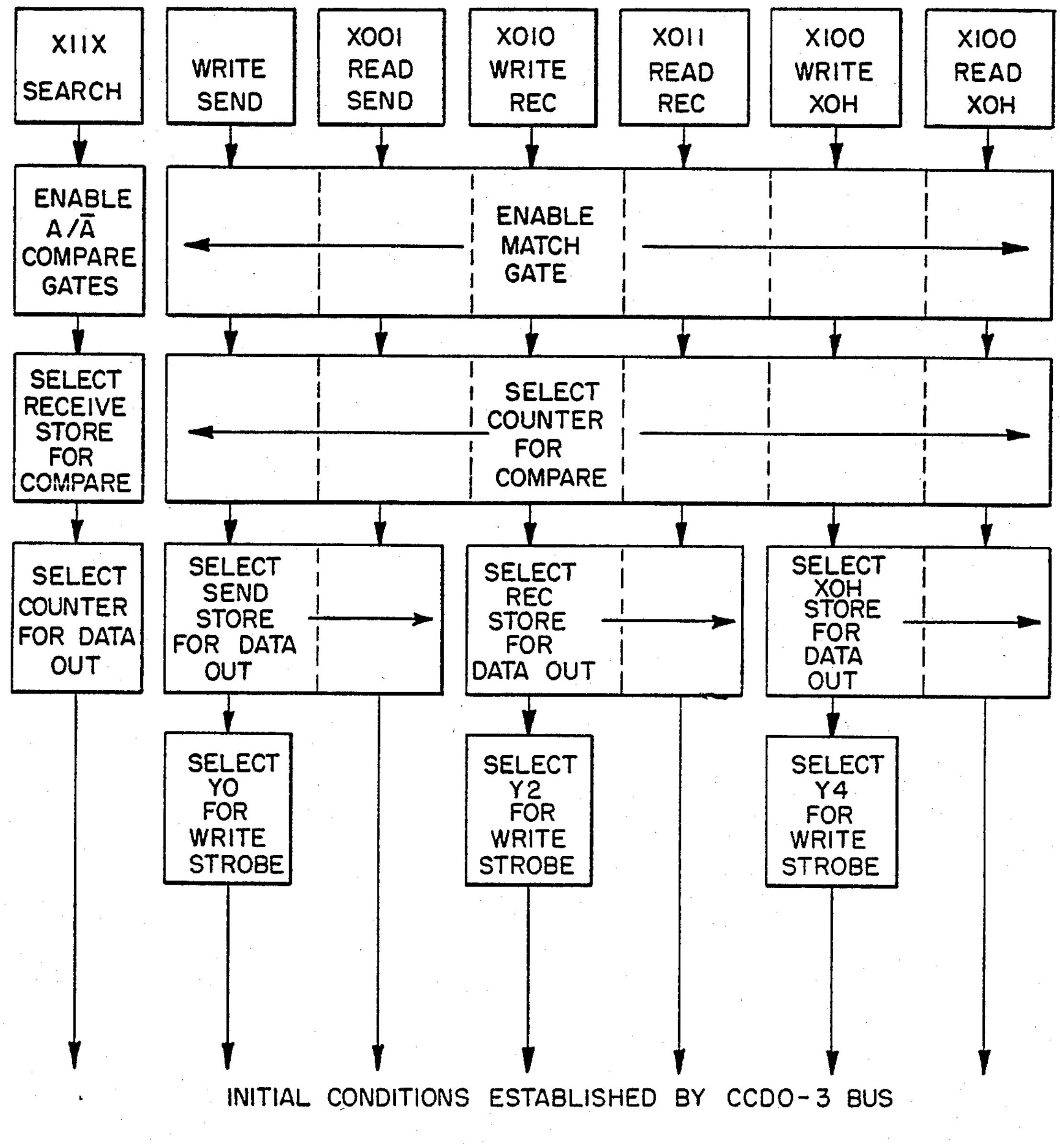
Figure 75:
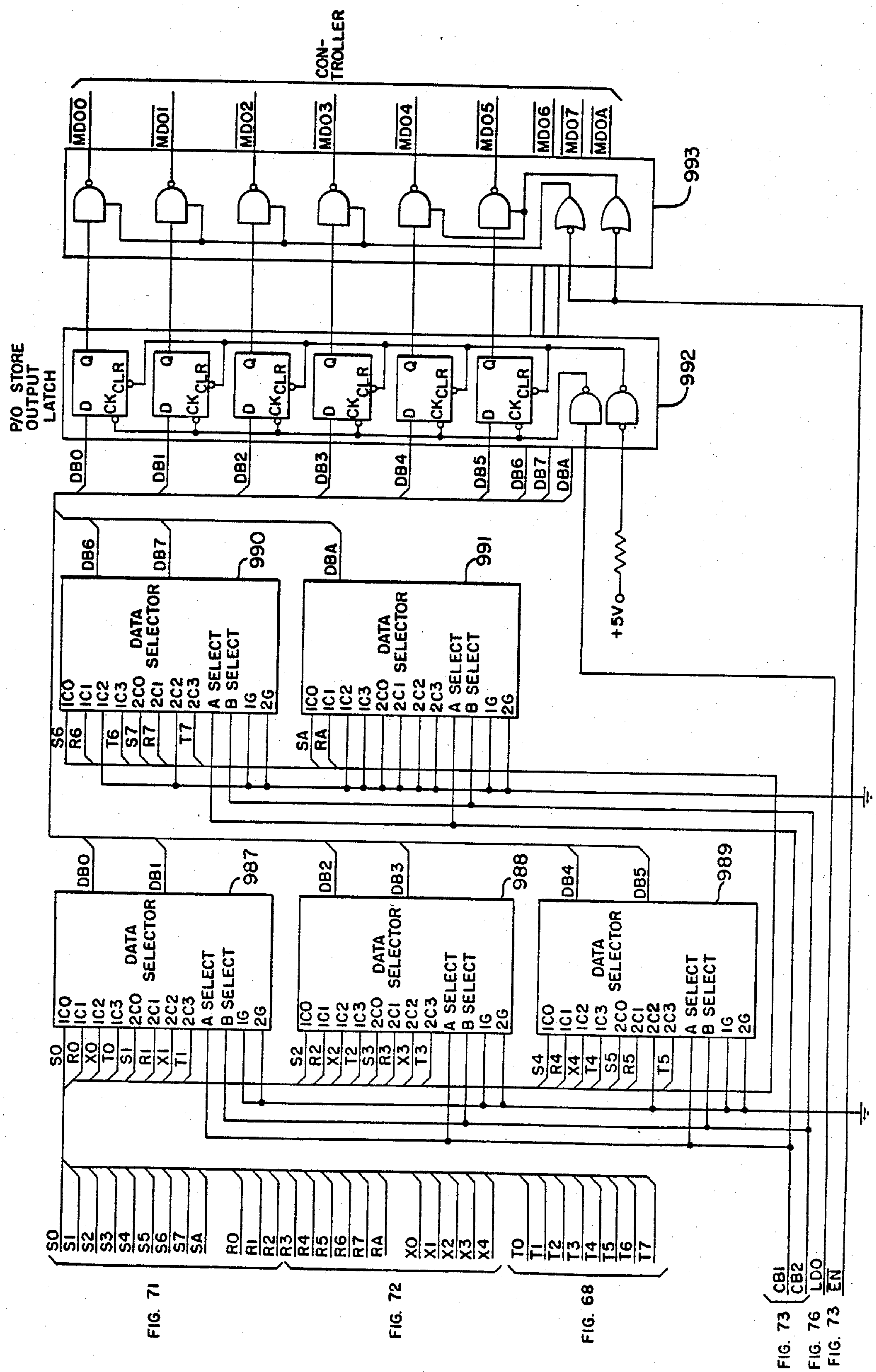

The store control logic circuit 893 is illustrated in greater detail in FIG. 73. Command execution from the controller 122 is initiated when the $\overline{\text{M SEL}}$ lead goes low to set the enable flip-flop 960 via Schmitt trigger circuit 961 to provide an enable signal on the lead EN to the control data output circuit 895. The data received from the controller 122 on the control bus $\overline{\text{CCD0}}$–$\overline{\text{CCD3}}$ indicates the type of operations to be performed, such as search, write-send, read-send, write-receive, read-receive, write-XOH, and read-XOH, the conditions for these functions being generally indicated in FIG. 74. The control signals on leads $\overline{\text{CCD0}}$–$\overline{\text{CCD2}}$ are applied through gates 964–966 to the decoder 963 which decodes these signals and produces one of the outputs $\overline{\text{SWE}}$, $\overline{\text{RWE}}$, and $\overline{\text{XWE}}$, representing the send write enable signal, and read write enable signal, and the cross-office write enable signal for controlling the store memory 894.

The bus comprising leads $\overline{\text{MCD0}}$–$\overline{\text{MCD7}}$ from the controller 122 provides one of the data inputs to the comparator circuit 896 via Schmitt trigger circuits 975–982. A data selector 985 supplies to the comparator 986 either the address read from the store memory 894 on leads R0–R7 or the time slot signals provided from the clock and memory control circuit 892 on leads T0–T7 in accordance with the output of gate 970 as determined by the information provided on leads $\overline{\text{CCD1}}$ and $\overline{\text{CCD2}}$ through the Schmitt trigger circuits 965 and 966.

The negative-going transition of DWCK4 applied to enable flip-flop 960 transfers the $\overline{\text{M SEL}}$ status signal through the enable flip-flop 960. When the lead $\overline{\text{M SEL}}$ goes low, the flip-flop 960 is set so as to enable the comparator 986. When the signal on DWCK4 is again inverted, the positive-going transition of the inverted clock pulse $\overline{\text{WCK4}}$ increments the time slot and send data memory address counter 900, the outputs of which are distributed on the address bus to the store memory 894 via leads A0–A7, as seen in FIG. 71. Thus, the store memory addresses are changed sequentially in synchronism with the signal on lead $\overline{\text{WCK4}}$. As noted previously, there are three basic commands: read, write, and search. Successful execution of each command requires that the $\overline{\text{MCD0}}$–$\overline{\text{MCD7}}$ data applied through Schmitt trigger circuits 975–982 from the controller 122 to the comparator 986 in FIG. 73 agrees with the internal data supplied by the matrix store memory 894. When the data compares, a match signal is generated at the output of AND gate 974. Under normal conditions, assuming a comparison can be obtained, the maximum time required to find the match in the store is one complete counter and memory cycle. On the average, it would be expected that the cycle time would be one-half a counter cycle.

For read and write commands, the data on leads MCD0–$\overline{\text{MCD7}}$ from the controller is compared against the counter output on leads T0–T7 (the store memory address). The match gate is enabled by the read+-write+active compare logic signal produced at the output of gate 972 to enable the gate 974. For search commands, the receive store active/$\overline{\text{active}}$ bit on lead RA from the store memory 894 (FIG. 72) is applied to gates 968 and 969 along with the active/$\overline{\text{active}}$ bit from the controller provided on lead $\overline{\text{CCD3}}$ through Schmitt trigger 967. The bits must compare to enable the match gate 974.

Figure 76:
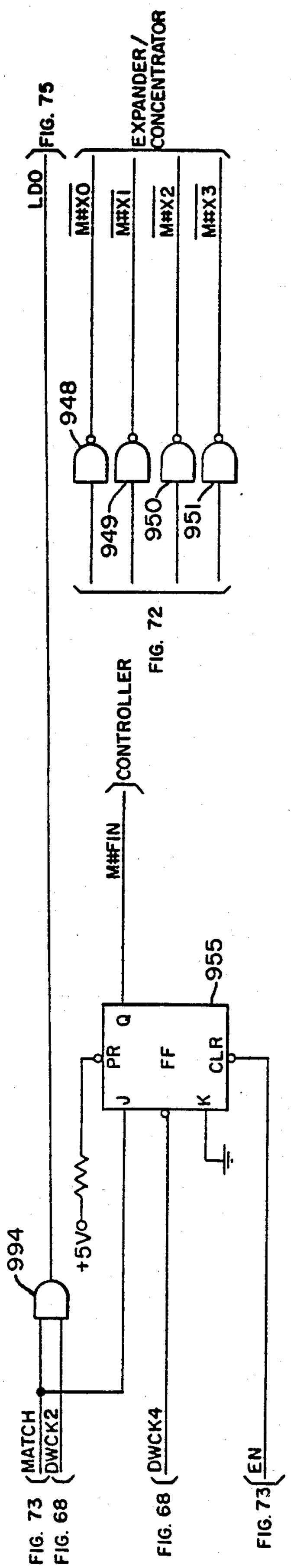

The details of the control data output circuit 895 are illustrated in FIGS. 75 and 76. The basic function of this circuit is to store the data received from the store memory 894 in response to a request from the controller 122 prior to transmission of the data to the controller 122. For this purpose, the circuit 895 includes data selectors 987–991, as seen in FIG. 75. The send data is received from the store memory 894 on leads S0–S7 and SA; the receive data is provided on leads R0–R7 and RA; the cross-office highway data is applied on leads X0–X4, and the time slot signals T0–T7 are received from the clock and memory control 892. The data selectors 987–991 each receive two bits from each field of data which is selected by the select gate inputs CB1 and CB2 derived from the outputs of gates 965 and 966 in FIG. 73. The data selected by the data selectors 987–991 is provided on leads DB0–DB7 and DBA to an output latch circuit 922 comprising a plurality of D type flip-flops into which the data bits are inserted for storage in response to the load output signal LDO. The data stored in the latch 992 then can be gated through the gate circuit 993 in response to the enable signal $\overline{\text{EN}}$ on leads $\overline{\text{MD00}}$ through $\overline{\text{MD07}}$, $\overline{\text{MD0A}}$ and $\overline{\text{M FIN}}$.

The load signal LDO is generated in FIG. 76 in response to receipt of the MATCH signal from the store logic control 893 at the output of flip-flop 974 in FIG. 73 along with the timing signal DWCK2 from the clock and memory control circuit 892. A finish flip-flop 995 is responsive to a clock signal DWCK4, the enable signal EN from the store control logic circuit 893 at the output of the enable flip-flop 960 in FIG. 73 and the MATCH signal at the output of gate 974 in FIG. 73 to produce an output on lead $\overline{\text{M FIN}}$ from the gate circuit 993 in FIG. 75 to the controller 122 indicating that the operation has been completed.

The send data memory 890 is illustrated in more detail in FIG. 77, and includes a pair of data selector circuits 1001 and 1002 receiving a first field of data comprising the time slot signals T0–T7 generated from the clock and memory control 892 and a second field of data comprising the send address information S0–S7 received from the store memory 894. Depending upon the state of the control lead FMC to each of these selector circuits, either the first or the second field of data will be applied by the selector circuits to the output leads FM0–FM7 to each of a plurality of send data registers 1011–1018, to each of which registers there is also provided one of the data bits received from the data conditioner on leads OB0–OB7 through Schmitt trigger circuits 1003–1010. The outputs SB0–SB7 from the send data registers 1001–1010 are provided through gates 1020–1027 to the expander/concentrator 800 on leads OM0–OM7 provided the gates have not been disabled via the active/$\overline{\text{active}}$ lead SA from the store memory 894.

As indicated in the description of the clock and memory control circuit 892 in FIG. 68, the positive going transition of $\overline{WCK4}$ initiates the input cycle for the send memory 890 and the output cycle for the receive memory 891 by generating the control signals RMC and SMC at the output of the flip-flops 911 and 914, respectively. A logic 1 on the control lead SMC to the data selectors 1001 and 1002 in FIG. 77 will gate the time slot signal represented by the condition on leads T0–T7 to each of the send data registers 1011–1018 on leads SM0–SM7 at the same time that a word is received from the data conditioner on leads OB0–OB7 via Schmitt trigger circuits 1003–1010. The received word is therefore written into the send data registers 1011–1018 upon receipt of the timing signal $\overline{DWCK7}$ at the address designated by the time slot signals T0–T7.

During the transfer cycle when the control leads SMC goes to logic 0, the data selector circuits 1001 and 1002 will apply the send address information on leads S0–S7 to the leads SM0–SM7 which extend to each of the send data registers 1011–1018. Thus, the data stored in these registers at the particular address designated by the leads S0–S7 will be gated out through gates 1020–1027 to the expander/concentrator 800, provided these gates are not inhibited by the condition of lead SA.

Figure 78:
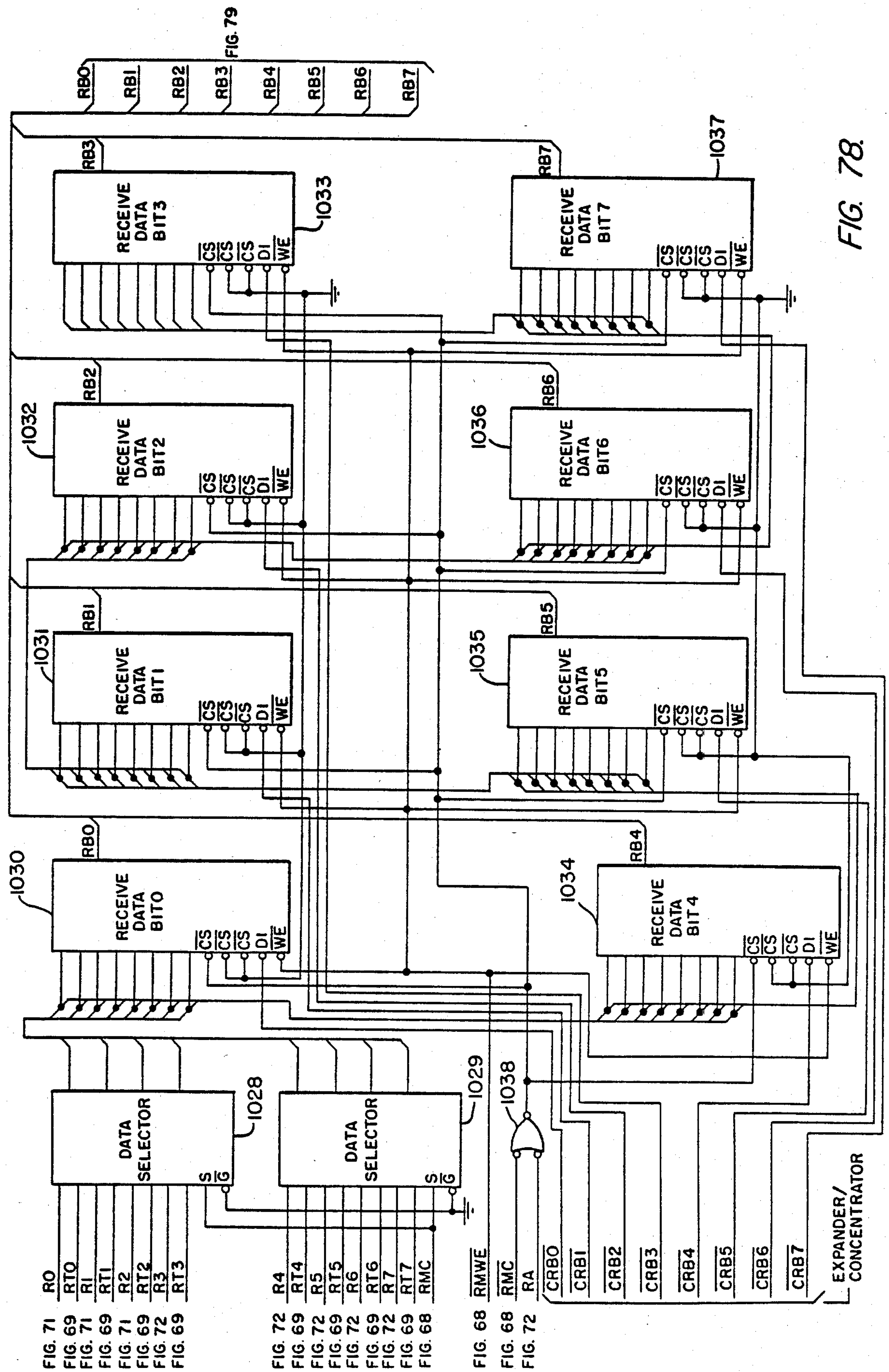

The receive data memory 891 is similar to the send data memory 890, as indicated in FIG. 78. The receive data memory 891 includes data selector circuits 1028 and 1029 which select either the receive time slot address generated by the clock and memory control 892 from the receive data memory address counter 901 in FIG. 69 appearing on leads RT0–RT7 or the receive address data received from the store memory 894 on leads R0–R7. The selector circuits 1028 and 1029 are controlled by the control signal RMC generated from the output of flip-flop 911 in FIG. 68 upon receipt of the timing signal $\overline{WCK4}$ at the Schmitt trigger circuit 902, as already described.

When the signal RMC is equal to logic 1, the time slot signals appearing on leads RT0–RT7 are applied by the data selector circuits 1028 and 1029 to the leads RM0–RM7 which extend to each of a plurality of receive data registers 1030–1037. Upon generation of the timing signal $\overline{RMWE}$ from the output of gate 917 in FIG. 68 as a result of either the clock signal $\overline{WCK4}$ or the clock signal $\overline{WCK8}$, data received from the expander/concentrator 800 on leads $\overline{CRB0}$–$\overline{CRB7}$ will be stored in the registers 1030–1037 as storage locations designated by the receive time slot signals RT0–RT7. During the subsequent input cycle, when the control lead RMC is equal to logic 1, the selector circuits 1028 and 1029 will apply the receive address signals R0–R7 from the store memory 894 to the leads RM0–RM7 which extend to each of the receive data registers 1030–1037.

Figure 79:
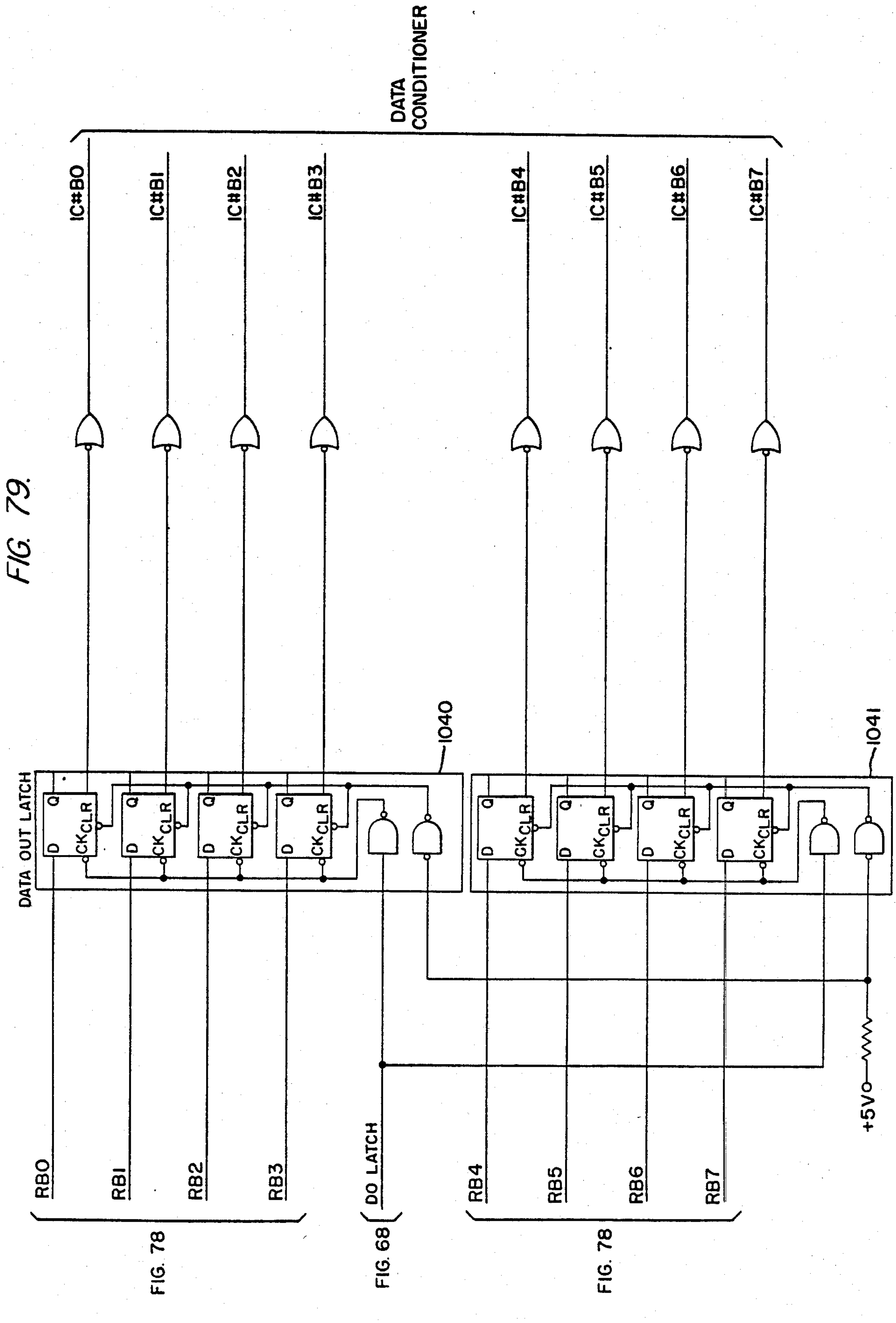

At this time, on the negative-going transition of $\overline{WCK8}$ from the clock and memory control 892 the data stored in the receive data registers 1030–1037 at the address indicated by the receive address leads R0–R7 will be transferred out on leads RB0–RB7 to the data out latches in FIG. 79, where the data is stored in response to receipt of the DO LATCH signal generated from the clock and memory control 892. This data stored in the data out latches 1040 and 1041 are provided on leads IB0–IB7 to the data conditioner 800.

3. The Controller

The controller serves as an interface between the central processing unit 130, which provides control signals and data via the interrupt encoder 125, and the matrix switches in the digital transmission network 135. The controller stores command bits for the matrix switches, filters replies and data from the matrix switches, and sends appropriate data to the central processing unit 130.

The controller programs the matrix switch in the time-division multiplex transmission network 135 to properly interchange time slots on the TDM cross-office highways. The basic traffic decisions affecting time slot interchange are accomplished by software in the central processing unit 130 and then relayed to the controller 122 via the interrupt encoder 125 in the form of send and receive addresses by which the calling and called subscribers are linked in the time slot interchange process performed by the transmission network 135. In addition, the central processing unit 130 can initiate instructions which cause the controller to search or read selected portions of the matrix call storage memories without affecting time slot interchange and then transfer the selected data back to the central processing unit 130. The details of the controller circuit 122 are illustrated in FIGS. 80–87.

In FIG. 80, the differential transmission gate arrangement 1100 connects the bus lines BIN0–BIN11 to the controller circuitry on leads $\overline{DAB0}$–$\overline{DAB11}$. Also, the controller circuitry is connected by the differential gate arrangement 1100 to the interrupt encoder bus via leads $\overline{BOUT0}$–$\overline{BOUT7}$.

The controller 122 is one of the I/O circuits connected to the central processing unit 130 via the peripheral bus, and therefore, as in the case of all I/O circuits, communication with the central processing unit 130 is always initiated by the CPU forwarding to the I/O circuit the bus enable signal, the register select signals, the data flow signals, and the strobe signal. As seen in FIG. 81, the register select signals $\overline{RSEL1}$ and $\overline{RSEL2}$ as well as the data flow signals $\overline{DAOUT}$ and $\overline{DAIN}$ are applied to driver circuit 1101. The bus enable signal DEB is applied to the input of Schmitt trigger circuit 1102, and the strobe signals STB1 and $\overline{STB1}$ are applied to the driver circuit 1107. Each of the command signals received from the interrupt encoder 125 are applied to a command decoder 1105 which produces a plurality of timing enable signals, which are illustrated in the timing diagram of FIG. 82.

The data-out command signal $\overline{DAOUT}$ is supplied through the driver circuit 1101 to one input of an AND gate 1108 in the decoder 1105 through gate 1109, and the other input of gate 1108 receives the strobe pulse from the output of driver circuit 1107. Gate 1108 enables a respective input of each of the AND gates 1110 and 1114. A second input of gate 1110 is connected to the output of gate 1111 whose input is connected to the output of driver circuit 1101 carrying the register select signal $\overline{RSEL1}$, and the second input of gate 1110 is connected to the output of gate 1115 whose input is connected to the output of driver circuit 1101 carrying the register select signal $\overline{RSEL2}$. Gate 1114 has a second input connected to the output of gate 1111 and a third input connected to the output of gate 1116, whose input is connected to the output of gate 1115. Gates 1110 and 1114 are sequentially enabled during the data-out operation to produce the timing signals SEL0OU at the output of gate 1113 and SEL2OU at the output of gate 1119.

The bus enable signal $\overline{\text{DEB}}$ is applied through Schmitt trigger circuit 1102 and gate 1103 to one input of AND gate 1104 in the decoder circuit 1105; the other input of gate 1104 is provided from the $\overline{\text{DAIN}}$ output of the driver circuit 1101 through gate 1106. The output of gate 1104 is supplied to each of the AND gates 1117 and 1118. A second input of gate 1117 is connected to the output of gate 1112 and a third input of that gate is connected to the output of gate 1115. A second input of gate 1118 is connected to the output of gate 1112 and a third input thereof is connected to the output of gate 1116. Gates 1117 and 1118 are enabled sequentially during the data-in operation in response to the command signal $\overline{\text{DAIN}}$ and serve to provide the timing signals SEL4IN at the output of gate 1120 and SEL6IN at the output of gate 1121.

Either of the outputs of gates 1117 or 1118 during the data-in operation will enable the gate 1125 in FIG. 81 to produce the shift enable signal SE46IN, which is applied to the differential gates 1110 in FIG. 80 for the shifting of data through the gates to the interrupt encoder 125. In addition, decoding of the command signal from the interrupt encoder 125 results in a reply being generated at the output of gate 1126 on lead REPLY with the enabling of either of the AND gates 1110 or 1114 in the decoder 1105. This signal is supplied to the input lead REPLY to driver circuit 1127 in FIG. 84 which generates an output on lead $\overline{\text{DDONE}}$ to the interrupt encoder 125. Gate 1126 in FIG. 81 is also enabled during the data-in operation from the output of gates 1123 or 1124 with the enabling of the respective gates 1117 or 1118 in the decoder 1105 in coincidence with the strobe signal applied from the output of driver circuit 1107 through a delay circuit 1102.

Figures 83A, 83B, 83C, 83D:
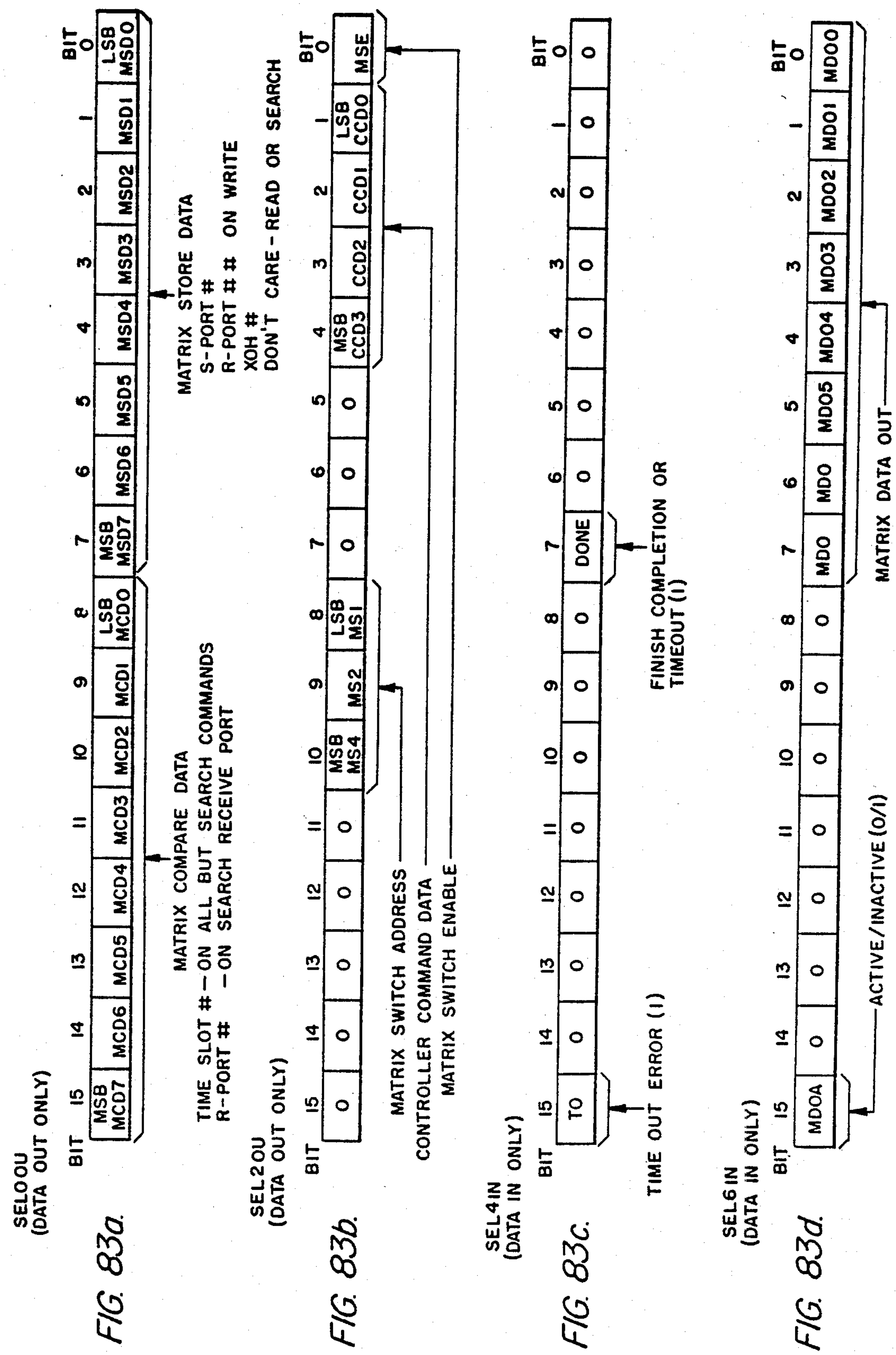

The amount of data required for a basic command from the central processing unit 130 to the controller 122 and vice versa requires the use of two 16 bit words for such communication. FIGS. 83*a*–83*d* indicate the format of the various sixteen bit messages which are transmitted between the CPU and the controller 122. In FIG. 83*a*, the first data-out message from the CPU will include the matrix store data signals MSD0–MSD7 in bits 0–7, which data represents the send port number, receive port number, or cross-office highway number, as described more particularly in connection with the digital transmission network 135. Bits 8–15 of this message include the matrix compare data signals MCD0–MCD7, defining the time slot number or receive port number. The second sixteen bit message from the CPU, as seen in FIG. 83*b*, provides various control signals, such as the matrix switch enable signal MSE in bit 0, the controller command data bits CCD0–CCD3 in bits 1–4, and the matrix switch address signals MS1, MS3, and MS4 in bits 8–10.

FIG. 83*c* illustrates the first message forwarded from the controller 122 to the CPU, which basically provides status data concerning the operation of the controller 122. In this regard, only two bits of the sixteen bit message are utilized, with bit 7 providing the finish or timeout indication DONE and bit 15 providing the time-out error signal TO. The second sixteen bit message forwarded from the controller 122 to the CPU is illustrated in FIG. 83*b*. This message includes the matrix switch data signals MDO0–MDO7 in bits 0–7 and the ACTIVE/INACTIVE signal MDOA in bit 15.

The data store for storing the first sixteen bit message from the CPU (FIG. 83*a*) is illustrated in FIG. 84. This data store comprises a pair of registers 1130 and 1131 to which the sixteen bit message is supplied on leads BIN0–BIN15. The second data may then be gated out to the matrix switches on leads MSD0–MSD7 and MCD0–MCD7 from the registers 1130 and 1131 through respective driver circuits 1132 and 1133. The second sixteen bit message (FIG. 83*b*) from the CPU to the controller 122 is received in the circuitry illustrated in FIG. 85. In this regard, the matrix switch enable signal MSE and the matrix switch address signals MS1, MS2, and MS4 are received in leads BIN0, BIN8, BIN9 and BIN10, respectively, and are clocked into the register 1140 by the timing signal SEL2OU, the register 1140 having been previously cleared to the timing signal $\overline{\text{SEL0OU}}$ applied through gates 1141 and 1142. Clearing of the register 40 may also occur in response to the initialization signal applied at the output of the driver circuit 1127 in FIG. 84 via gates 1128 and 1129 on lead INIT in response to the signal $\overline{\text{DINIT}}$ from the interrupt encoder 125.

The matrix switch enable signal MSE forming bit 0 of the message as stored in the register 1140 is applied to a matrix switch enable delay circuit 1143 consisting of flip-flops 1144 and 1145. Depending on the value of the signal MSE, the CPU can enable a selected matrix switch in the digital transmission network 135.

The controller command data signals CCD0–CCD3 forming bits 1–4 of the message (FIG. 83*b*) are supplied on leads BIN1–BIN4 to the input of a register 1146 in FIG. 85, from which the stored data may be supplied through a driver circuit 1147 onto leads $\overline{\text{CCD0}}$–$\overline{\text{CCD3}}$ to the matrix switches. Matrix switch selection is effected by applying the matrix switch address stored in the register 1140 to a decoder 1148 which decodes the address to enable one of the matrix select lines $\overline{\text{M0SEL}}$–$\overline{\text{M7SEL}}$ via the driver circuit 1149.

As indicated in connection with the operation of the digital transmission network 135, when the transfer of data to a matrix switch from the CPU has been completed, the switch will forward a message finish signal to the controller. Thus, one of the leads $\overline{\text{M0FIN}}$–$\overline{\text{M7FIN}}$ will be enabled through a respective gate 1150–1157 to a multiplexer 1158 at such time. The multiplexer 1158 also receives the address of the selected switch as stored in the register 1140, so that when a message finish signal is received on one of the leads M0FIN–M7FIN, the multiplexer will determine whether that signal has been received from the selected matrix switch designated by the address received from the register 1140. If so, the output of multiplexer 1158 will be applied to one input of AND gate 1162, the other input of which is received from a finish filter circuit 1159. The finish filter circuit 1159, which comprises flip-flops 1160 and 1161, is driven from the clock signal 1.544m through gate 1164 and is cleared from the output of the AND gate 1162 through gate 1163. The filter circuit 1159 provides the outputs FINISH and $\overline{\text{FINISH}}$ which provide the indication of whether a message finish signal has been received from the selected matrix switch.

A time out counter 1165 in FIG. 86 is enabled by the output of the matrix switch enable delay circuit 1143 in FIG. 85 and is driven by the clock signal 125SYN via gates 1166 and 1167. When the counter 1165 reaches its maximum count, gate 1166 at the output thereof will be enabled to set the flip-flop 1167 enabling the lead TIM- OUT which is applied to the decoder 1148 in FIG. 85 to remove the matrix select signal applied through the driver circuit 1149. In addition, the flip-flop 1167 will enable gates 1169 via gate 1168 and gate 1170 to place the time out signals through gates 1171 and 1172 on leads BOUT7 and BOUT15, respectively, to the central processing unit 130 in bits 7 and 15 of the first sixteen bit message, as seen in FIG. 83*c*. On the other hand, if the flip-flop 1167 is cleared by the output of the finish filter circuit 1159 in FIG. 85, the gate 1169 will be enabled from the output gate 1168 received on lead FINISH to apply the completion signal through gate 1171 to lead BOUT7 to the CPU. Gate 1170 will not be enabled under these circumstances and therefore no time out signal will be provided to the CPU.

The second sixteen bit message from the controller 122 to the CPU, as seen in FIG. 83*d*, consisting of the matrix data signals MDO0-MDO7 and the ACTIVE/INACTIVE bit MDOA are applied through respective gates 1180-1188 in FIG. 86 to register 1189. The first four bit byte of the message is applied onto leads BOUT0-BOUT3 to the interrupt encoder 125 and the second four bit byte of the matrix data along with the ACTIVE/INACTIVE bit is applied through gates 1192 through 1196 onto leads BOUT4-BOUT7 and BOUT15 to the interrupt encoder 125 in coincidence with the timing signal SEL6IN.

As seen in FIG. 88, the operation of the controller 122 begins with detection of the bus enable signal $\overline{\text{DEB}}$ and receipt of the register select signals, data flow signals and the strobe signals applied to the decoder 1105 in FIG. 81. The decoder 1105 will thereby produce one of the four timing signals SEL0OU, SEL2OU, SEL4IN, or SEL6IN to control the respective steps of the data-out and data-in operations.

While the timing signal SEL0OU is generated during the first step of the data-out operation, matrix store data and matrix compare data are clocked into the registers 1130 and 1131 in FIG. 84 from which they are forwarded to the matrix switches through driver circuits 1132 and 1133. The timing signal SEL0OU is also supplied through gates 1141 and 1142 in FIG. 85 to clear the matrix switch address register 1140. A reply is then sent to the central processing unit 130 on leads $\overline{\text{DDONE}}$ from the output of driver circuit 1127 in FIG. 84 in response to enabling of the lead REPLY at the output of gate 1126 in FIG. 81.

The next step of the data-out operation relates to the transfer of the controller command data to a selected matrix switch. This operation is initiated with generation of the timing signal SEL2OU in FIG. 81, which enables the address bits 8, 9, and 10 (FIG. 83*b*) to be clocked into the matrix switch address register 1140 in FIG. 85. Bit 0 represents the matrix switch enable signal MSE which is immediately applied to the delay circuit 1143. The address stored in the matrix address register 1140 is decoder by the decoder 1148 to select the desired matrix by by enabling one of the matrix select leads $\overline{\text{M0SEL}}$-$\overline{\text{M7SEL}}$. However, the decoder 1148 is gated with the matrix enable command bit received through the delay circuit 1143 to provide a short delay period permitting the data buses to settle down before the actual matrix select signal is transmitted to the appropriate matrix.

The command code provided by bits 8, 9, and 10 of the message are stored in the controller command register 1146 in FIG. 85 with generation of the timing signal SEL2OU and this command code is forwarded through the driver circuit 1147 to the matrix switches on leads $\overline{\text{CCD0}}$-$\overline{\text{CCD3}}$. The switch enable signal from the output of the delay circuit 1143 is also applied on lead ENABLE to FIG. 86 where it enables the time-out counter 1165 at this time. The controller 122 then waits for the selected matrix to signal that it has finished receiving the transmitted data, and in the interim, the central processing unit 130 monitors the leads BOUT7 and BOUT15 in FIG. 86 representing the status flags providing information concerning finish or time out.

When the matrix has completed receiving the data transmitted to it, it will energize its message finish lead, thereby enabling one of the leads $\overline{\text{M0FIN}}$-$\overline{\text{M7FIN}}$ through a respective gate 1150-1157 to the multiplexer 1158. If the execution completed signal is received from the selected matrix as determined by the address applied to the multiplexer 1158 from the register 1140, the multiplexer will enable the finish filter counter 1159 which not only resets flip-flop 1167 in FIG. 86 to inhibit the time-out counter 1165, but also clocks data from the matrix switches on leads $\overline{\text{MDO0}}$-$\overline{\text{MDO7}}$ and $\overline{\text{MDOA}}$ into the matrix data register 1189 through switches 1180-1188. Gate 1171 is also enabled from the output of gate 1169 to provide the finish completion signal in bit 7 to the central processing unit 130 indicating that the operation has been completed and that is provided on leads BOUT0-BOUT7 and BOUT15.

As seen in FIG. 89, if a finish signal had not been received at the multiplexer 158 in FIG. 85 from the selected matrix, the time-out counter 1165 would have set the flip-flop 1167, thereby permitting enabling of the gate 1170 to place the time-out signal TO at the output of gate 1172 onto lead BOUT15 to the central processing unit 130. At the same time, the signal TIMOUT at the output of flip-flop 1167 would be applied to the decoder 1148 to inhibit an output therefrom and thereby remove the matrix select signal at the output of driver circuit 1149.

E. THE OPERATOR COMPLEX

The operator console in a PBX generally includes the standard twelve-key operator key pad as well as a plurality of control keys for initiating various connections and operations within the system. In addition, the operator may be provided with a plurality of direct service keys which enable direct access to each of the stations within the PABX. As the number of services and functions available within a system increase, it is generally necessary to provide a greater number of control keys at the operator console to initiate and control such services and functions. This increases the number of keys on the operator console which further complicates an already difficult cabling problem in systems where it is necessary to provide a wire per key coming out of the console to the PABX system.

In order to solve the cabling problems associated with operator complexes in which a separate control line relating to a particular function is associated with each key on the operator console, the present invention utilizes a multiplex approach wherein the operating conditions of the various keys on the console are multiplexed on a four-wire bidirectional highway between the console and the central processing unit 130. This not only relieves the limits previously existing concerning the number of keys which may be provided on the console, but also eliminates the need to hardwire each control key to a particular function. Rather, the function associated with each key on the operator console is merely designated in an assigned storage location in the CPU memory so that only the CPU recognizes the particular function requested upon operation of a selected key on the console. In this way, the function associated with a particular key may be changed simply by changing the function stored in memory, eliminating the need for physical changes in the system.

The highly modular construction of the system as evident from FIG. 6 also makes possible application of the system to a multi-user function. In this regard, it should be clear that there are no constraints upon the distance which may be provided between each port group 100, miscellaneous cell 102, or operator complex and the common control 101. Thus, the common control 101 may be provided in a central location with one or more port groups being assigned to respectively different customers, each of which is also provided with one or more operator consoles, the links to the common control from the respective areas being by way of the various multiplex highways extending between the basic components of the system.

The use of a multiplex link between the operator console and the common control also makes possible suitable control over the lamps and other display indicators on the operator console from the central processing unit 130 in a more simplified manner. As in the monitoring of the control keys on the operator console, the use of such a multiplex technique in the controlling of lamp displays also lists the constraints previously applied to the number of display devices which may be included in the operator console.

The basic elements of the operator complex are illustrated in FIG. 90 in conjunction with various common control circuits. The attendant console 1210 has a keyboard arrangement of control keys 1210*a* with associated display lamps, as well as the standard twelve button key pad 1210*b*. In addition, an alphanumeric display 1210*c* is provided at each attendant console 1210 to provide a visual display of data to the operator. A plurality of direct service keys 1210*b* may also be provided; or station selection may be provided through the key pad 1210*b* if desired.

In order to supply key status information to the common control 130, the console 1210 includes a send control system which continuously scans the control keys and keys of the operator key pad to detect transitions indication operation or release of a key, and based on this information, formulates messages consisting of key identification, transition information, parity, and a synchronizing character for transmission to the central processing unit 130. The console 1210 also includes a receive control system which receives from the central processing unit 130 a message consisting of a key lamp identification and flash code, or an alphanumeric display identification and display code, preceded by a synchronizing character, and generates display control signals based on this information.

In order to eliminate expensive cabling normally required to carry key status information from the console 1210 to the common control 130 and display control signals from the common control 130 to the console 1210, and to facilitate remote console operation, the send control system includes a key data multiplexer and the receive control system includes an illuminator data demultiplexer to enable the multiplexing of this data on a four-wire highway 1212 between the attendant console 1210 and the common control 130. In addition, a modem is provided for modulating the digital message from the send control system into the voice-band using standard frequency shift keying (FSK) and for transmitting the converted message on the highway 1212 at approximately 600 BAUD. In the same manner, the modem serves to decode the FSK data representing key lamp and alphanumeric display messages received from the common control 130 into digital messages for decoding by the receive control system. The audio is handled in the attendant console 1210 in the conventional manner and is transmitted on a two-wire highway 1213 from the console 1210 to the attendant audio circuit 1211.

The attendant audio circuit 1211 includes a modem similar to that provided in the attendant console 1210 for converting the data passing therethrough between FSK and digital form. It also serves as a means for converting the audio between 2 and 4-wire transmission lines, the audio being received from the attendant console 1210 on a two-wire highway 1213 and being transmitted to the miscellaneous cell 102 on a four-wire highway 1214, and vice versa.

As already indicated, the miscellaneous cell 102 multiplexes the audio signals from the respective operator complexes onto a multiplex highway extending to the digital switching network 135 under control of the central processing unit 130. The central processing unit 130 communicates with various peripheral units connected to the peripheral bus via the interrupt encoder 125, one of the peripheral units being the controller 22, which receives time slot assignments and control signals necessary to control the operation of the digital switching network 135. Another unit connected to the peripheral bus is the attendant I/O circuit 145 which serves as an interface between the operator complex and the central processing unit 130.

1. The Attendant I/O Circuits

The attendant I/O circuit interfaces the operator complex and the central processing unit 130 via the interrupt encoder 125 and the CPU bus circuit. The main functions of the attendant I/O circuit is to send and receive console data, interface it with the central processing unit 130, and allow the CPU to control the attendant audio connections.

As seen in FIG. 91, the attendant I/O circuit includes four addressable registers R0, R1, R2, and R3. Register R0 is a write/read register which stores status information concerning the status of operation of the attendant I/O circuit. In the master-slave relationship between the central processing unit 130 and the peripheral circuits, the peripheral circuit cannot acquire the central processing unit 130, but must generate a request and wait for the central processing unit 130 to respond. This is done by the generation of interrupts which are stored in the register R0.

The register R1 is a write only register which receives data from the central processing unit 130 for forwarding to the attendant. Register R2 is a read only memory which receives data from the attendant for forwarding to the central processing unit 130. Register R3 is a write only memory which receives various command signals from the central processing unit 130 which are ultimately forwarded to the attendant audio circuit for control of the operation thereof.

Data to and from the interrupt encoder 125 is provided on the peripheral bus which is connected to the differential receivers and drivers 1230, connected by way of bidirectional lines to the respective registers R0–R3. The transfer of data between the registers and the receiver/driver circuit 1230 is effected under control of the register clock in control 1231 and the register data read out control and data bus switching circuit 1232.

Data transmitted from the attendant console through the attendant audio circuit is received at the serial-in parallel-out (SIPO) circuit which converts the data from serial to parallel form. The detector circuit 1237 connected to the SIPO 1235 checks to determine the length of the message, which may be two or three bits in length and determines whether the message has proper parity. The parallel data is then transferred to the register R2 for subsequent transmission through the circuit 1230 to the interrupt encoder 125.

Data from the interrupt encoder 125 which is destined for the attendant is supplied on the peripheral bus through the circuit 1230 to the register R1. Since the attendant audio circuit receives data in serial form, a parallel-in serial-out (PISO) circuit 1234 converts the data in the register R1 to serial form, and a sync and parity generator 1236 provides a first sync character and adds a proper parity bit to the message prior to its being forwarded to the attendant audio circuit 115.

The command signals for the attendant audio circuit 115 are supplied from the interrupt encoder 125 on the peripheral bus through the driver circuit 1230 to the register R3, where these control signals are then supplied directly to the attendant audio circuit 115 under control of the function control logic circuit 1233. The circuit 1233 also is responsive to the data stored in the status register R0 to effect the generation of interrupts from the interrupt generator 1238 indicating to the interrupt encoder 125 the need for the services of the central processing system 130. Commands from the interrupt encoder 125 to the interrupt generator 1238 also provide for indications of response to the interrupt request.

FIG. 92 illustrates schematically the contents of the zero register R0 which serves as the status register for the attendant I/O circuit. As seen in the drawing, only bits 1, 6, and 12–15 are utilized in the register R0, bits 1 and 6 being written into the register by the central processor unit 130 and the bits 12–15 being read by the central processing unit 130 to determine the status of the attendant I/O circuit.

When a new message has been received from the attendant in the attendant I/O circuit, bit 12 in the register R0 will be set to generate an interrupt to the central processing unit 130 indicating that data is present for transmission to the CPU. At this time, bit 14 may also be set if a parity error has been detected in the message received from the attendant. When the CPU connects to the attendant I/O circuit and the message stored in register R2 has been transmitted to the interrupt encoder 125, the CPU will enable bit 1 of register R0 which will be detected within the attendant I/O circuit and result in a clearing of bit 12.

For transmission from the central processing unit 130 to the attendant, data will be written into the register R1 via the interrupt encoder 125 and the attendant I/O circuit will insert the even parity in the message and forward it to the attendant audio circuit. During this time, bit 15 of register R0 is set indicating to the CPU that the attendant I/O circuit is busy sending data to the attendant. When transmission of the data in the register R1 is completed, bit 15 in register R0 is cleared and bit 13 is enabled to generate an interrupt to the CPU indicating that it is finished sending out the message to the attendant. This indicates to the CPU that a new message can be sent to the attendant I/O circuit if another message is to be sent. The CPU enables bit 1 of register R0 to clear bit 13 and forward another message to the register R1 for transmission to the attendant. Loading of register R1 causes the new data to be sent and sets the busy bit 15 in the register R0. This process continues until all data to be sent from the CPU to the attendant has been transmitted by the attendant I/O circuit.

FIG. 93 indicates the format of the data from the central processing unit 130 to be stored in the register R1 prior to transmission to the attendant. Messages transmitted to and from the attendant console are always preceded by a standard eight bit sync character 01101001, which serves not only to indicate to the receiving circuit that the data being received is a valid message but also to indicate to the receiving circuit when a complete message has been received. The message to be forwarded to the attendant may have one of three different formats, depending upon the content of the message. As seen in FIG. 93 for data releated to attendant key lamp control, the second byte of the message will include seven bits representing the key lamp code or address and a parity bit, while the third byte of the message includes a three bit flash code. A second type of message, which serves to control the attendant alphanumeric display, includes a second byte having seven bits identifying the address of the alpha display and a third byte comprising eight bits defining the particular ASC II character.

As will be described in greater detail in connection with the attendant console 1210, the link between the attendant console 1210 and the attendant audio circuit 115 is shared by the control keys and the direct station service keys. Thus, a third type of message, which may be forwarded to the attendant for controlling the DSS lamp display, includes a second byte indicating a DSS select code and a third byte providing the address of the DSS lamp. Thus, it can be seen that the second byte of the message to the attendant determines whether the message is for attendant key lamp control, attendant alphanumeric display control, or DSS lamp display control. Further details as to the manner in which these messages are decoded will be described hereinafter in connection with the description of the attendant console 1210.

FIG. 94 illustrates the format of the message received from the attendant in register R2 for forwarding to the central processing unit 130. Since the attendant console includes two types of keys, i.e., an attendant key and a DSS key, the messages received from the attendant may have one of two different formats. In either case, a message from the attendant will always include a first byte comprising the standard sync character 01101001 for reasons already indicated.

For messages relating to attendant key data, the second byte of the message will include six bits designating the key identity or address, a status bit indicating the state of the key and a parity bit. The third byte of the message will be all 0's and therefore can be ignored. For a message relating to a DSS key, the second byte of the message will include six bits which are all 1's indicating that the message relates to a DSS key, a status bit and a parity bit. The third byte of the message identifies the DSS key identity or address.

FIG. 95 indicates the format of the data stored in the register R3. As will be described in more detail hereinafter, the attendant audio circuit 115 is basically a four-way conference circuit including the attendant, line, source, and destination. Under control of the central processing unit 130, the attendant audio 115 can exclude either the source or the destination. In addition, the CPU can control the attendant audio circuit to inject ring-back tone into the various ports connected thereto. For the purpose of these control functions, the bit 1 of register R3 controls the injection of ring-back tone, bit 2 controls the exclusion of source and bit 3 controls the exclusion of destination in the attendant audio circuit 115.

Figure 96:
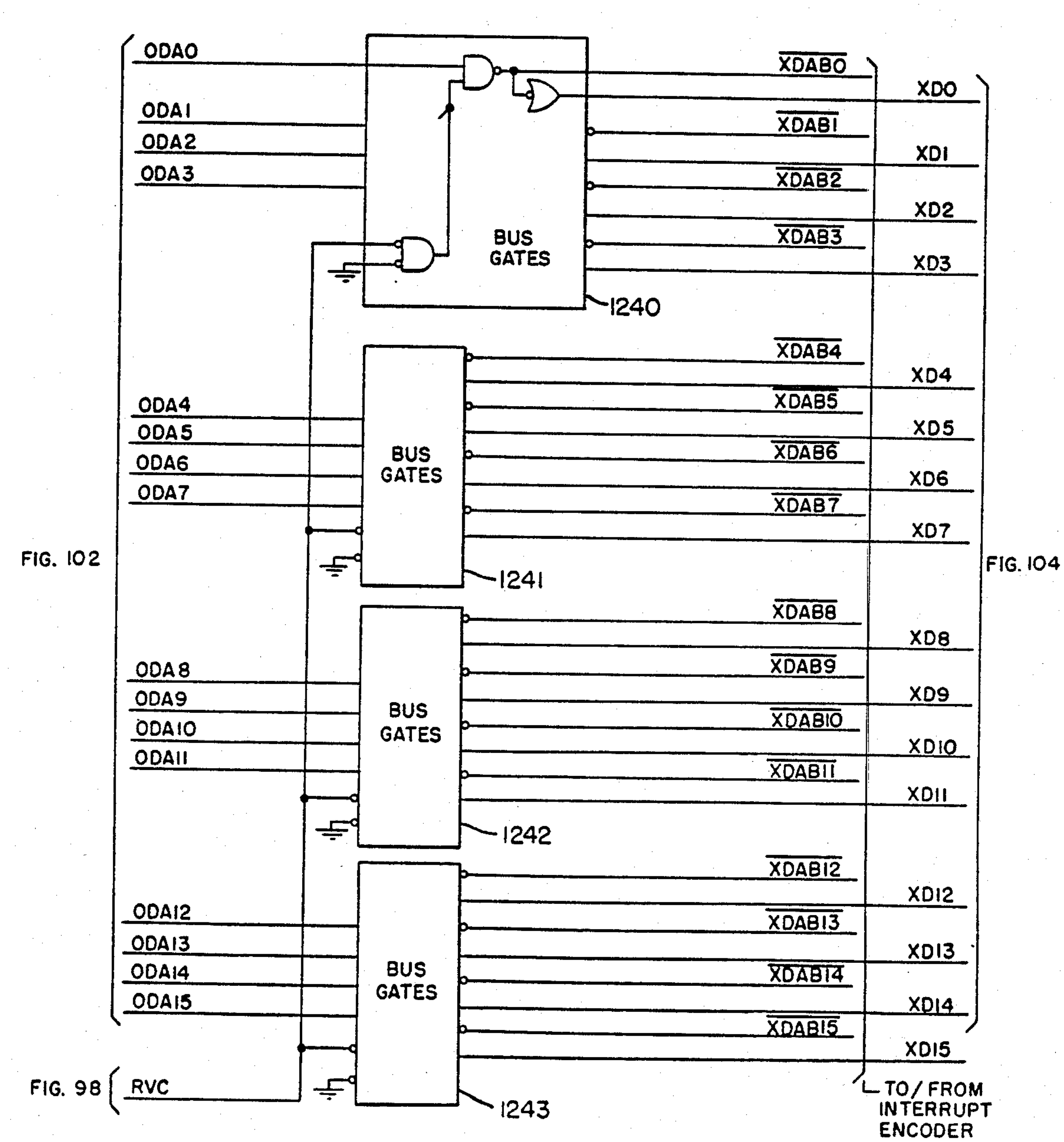

The details of the attendant I/O circuit are illustrated in FIGS. 96 through 106. Referring first to FIG. 96, which illustrates the details of the receiver/driver circuit 1230, data to and from the interrupt encoder 125 is provided on leads $\overline{XDAB0}$–$\overline{XDAB15}$ to the respective bidirectional data bus circuits 1240–1243. Data from the interrupt encoder 125 to the attendant I/O circuit is provided from the circuits 1240–1243 on leads XD0–XD15; while, data from the attendant I/O circuit to be forwarded to the interrupt encoder 125 is applied on leads ODA0–ODA15 to the circuits 1240–1243.

Figure 97:
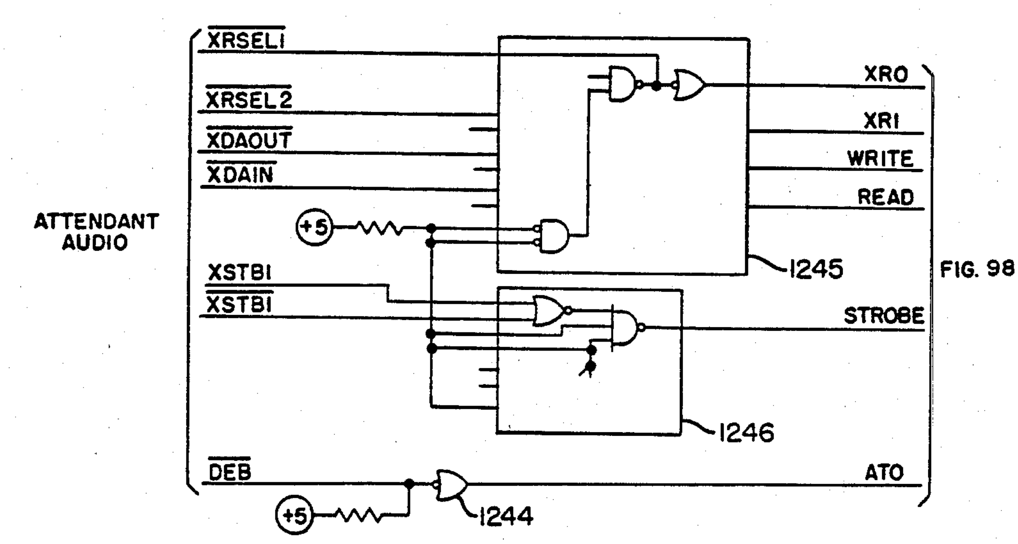

As with all peripheral devices, control is initiated by the central processing unit 130 by forwarding to the peripheral device the bus enable signal, the register select signals, the data flow control signals and the strobe signals. As seen in FIG. 97, the bus enable signal $\overline{DEB}$ from the interrupt encoder 125 enables gates 1244 providing an output on lead ATO. The register select signals $\overline{XRSEL1}$ and $\overline{XRSEL2}$ are applied through driver circuit 1245 to provide the register select signals XR0 and XR1; while, the data flow control signals $\overline{XDAOUT}$ and $\overline{XDAIN}$ are applied through the circuit 1245 to provide the signals WRITE and READ. The strobe signal from the interrupt encoder 125 on lead XSTB1 and $\overline{XSTB1}$ is supplied through driver circuit 1246 to generate the strobe signal STROBE.

Figure 98:
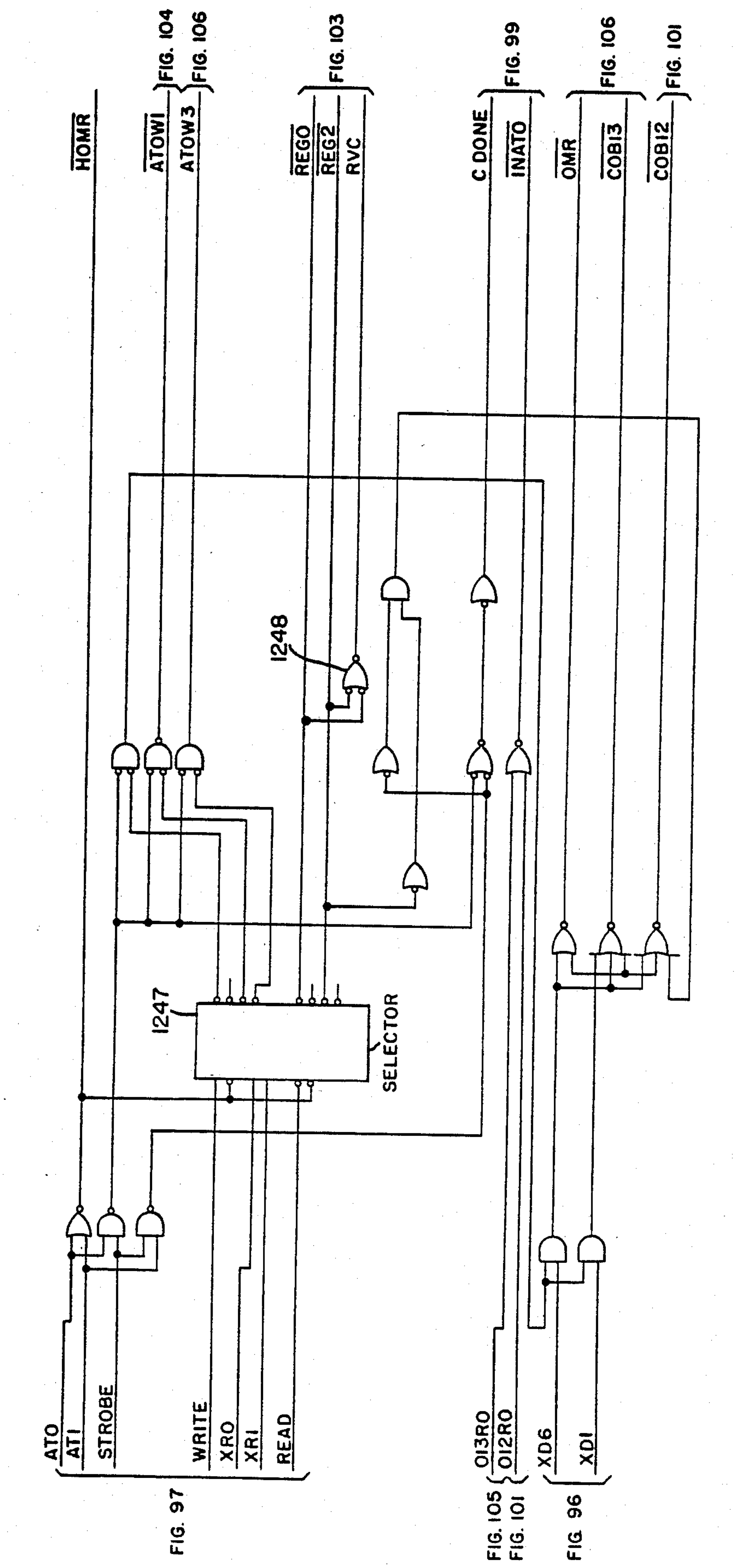

The control signals at the outputs of circuits 1245 and 1246 in FIG. 47 are applied to the control logic circuits in FIG. 98 to produce various timing and control signals on which the operation of the attendant I/O circuit is based. The signals not only control the timing of operations within the circuit but also control the loading of the various registers and the control of data to and from the attendant and the CPU, as will be seen from the following description.

Figure 99:
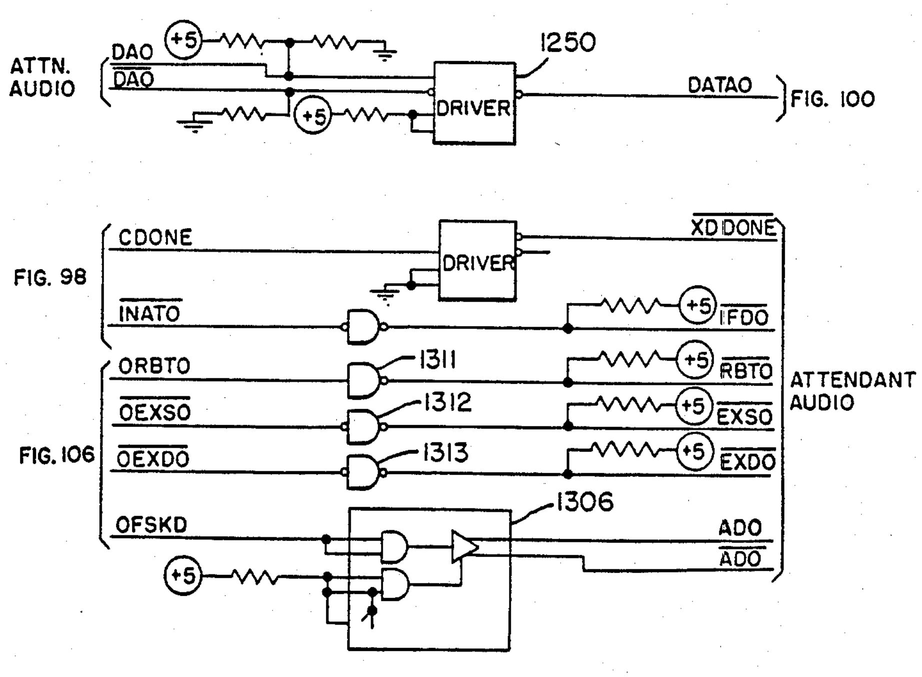
Figure 100:
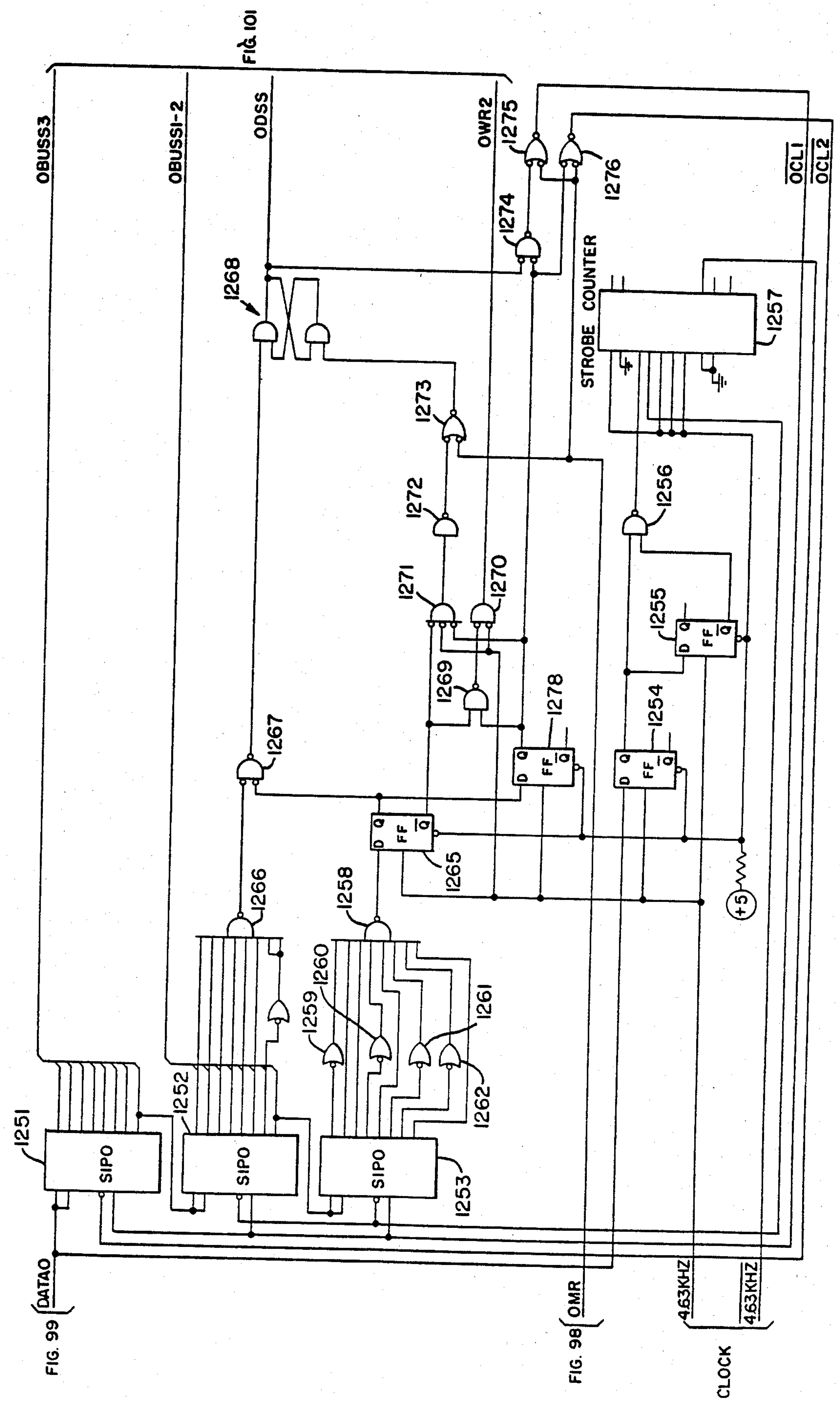

The data from the attendant console 1210 is forwarded from the attendant audio circuit 115 on leads DAO and DAO to the one-way bus receiver 1250 in FIG. 99, where the serial data is applied on lead DATAO to the registers 1251, 1252, and 1253 in FIG. 100. The registers 1251–1253 perform a deserializing of the data, taking the serial data in and providing the respective bytes of the message in parallel at the outputs of the three registers.

The data received on lead DATAO is also applied to the input of load enable flip-flop 1254 in FIG. 100 which serves as an edge detector for detecting the leading edge of the incoming data. Incoming data will set the load enable flip-flop 1254 upon receipt of the next clock pulse on lead 4.63 KHz providing an output through gate 1256, which is enabled by the reset output of gate 1255 to preset the strobe counter 1257. The counter 1257 is then driven from the clock lead $\overline{4.63\ KHz}$ for a predetermined number of clock pulses until an output OSTRB is provided at the output thereof to each of the registers 1251, 1252, and 1253 to clock data therein. On the next clock pulse, the flip-flop 1255 is set disabling the gate 1256. As a result of the edge detection provided by the flip-flops 1254 and 1255 in control of the counter 1257, the strobe signal OSTRB from the output of counter 1257 is generated at the center of the received data to ensure that data is available for shifting into the shift registers 1251–1253 before the registers are clocked. Thus, the clock which controls the shift registers aligns itself with the receipt of each set of serial data from the attendant audio circuit 115.

The register 1253 will receive the standard sync character which forms the first byte in each message, and the bits thereof will be decoded by the gates 1258–1262. When the full correct sync character has been received, an output will be provided from gate 1258 to set the first message ready flip-flop 1265. By detecting the standard sync character, this circuit clearly establishes that the data received is a message from the attendant and that the full message should have been received.

In order to determine at this point whether the message relates to the status of an attendant key or a DSS key, it is necessary to examine the second byte of the message which is stored in the register 1252. If the second byte of the message is equal to 63, gate 1266 will be enabled providing an output through one input of AND gate 1267, the other input of which is enabled from the output of the flip-flop 1265. The enabling of gate 1267 will set the DSS service latch 1268 providing an output on lead ODSS to indicate that the data in register 1252 applied to the bus OBUSS1–2 and the data in register 1251 applied to bus OBUSS3 relates to a DSS key.

On the other hand, if the gate 1266 in FIG. 100 is not enabled indicating that the message relates to attendant key status, the latch 1268 will remain reset. In any event, with the next clock pulse the second message ready flip-flop 1278 will be set, and gate 1269 will be enabled providing an output to one input of AND gate 1270, the other input of which will be enabled on the receipt of the next clock pulse on lead 4.63 KHz. The output of gate 1270 is provided on lead OWR2. At the same time, gate 1271 will be enabled providing an output through gate 1272 and gate 1273 to reset the DSS service latch 1268.

The gates 1274, 1275, and 1276 in FIG. 100 provide for a clearing of the data in the three registers 1251, 1252, and 1253. When the message ready flip-flop 1278 is set and the DSS service latch 1268 is reset, both gates 1275 and 1276 will be enabled to clear all three of the registers 1251, 1252, and 1253. On the other hand, if the message relates to DSS service, only the gate 1275 will be enabled to clear the first and second bytes of the message in registers 1252 and 1253, the registers 1251 not being cleared at this time to avoid the possibility of erasing data which may be following the received message.

Figures 98, 100, 101, 103:
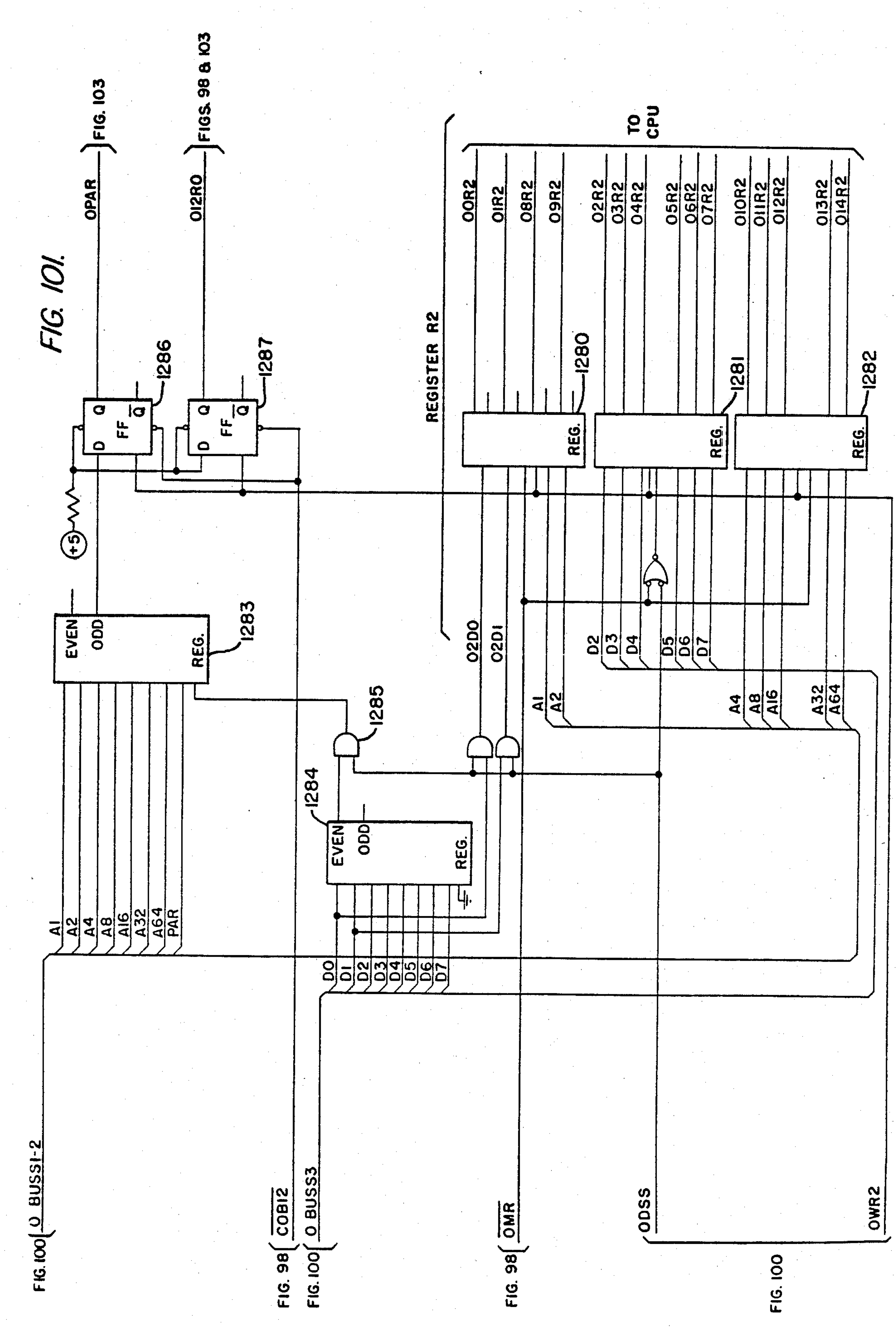
Figure 102:
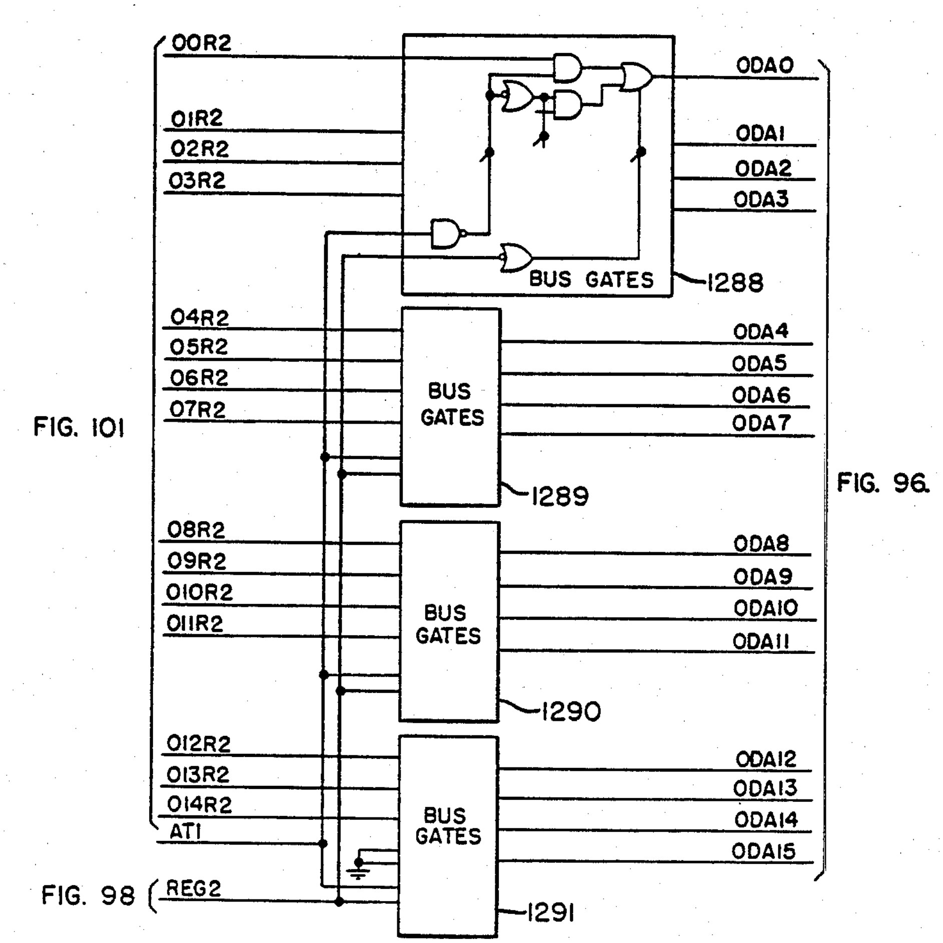
Figure 103:
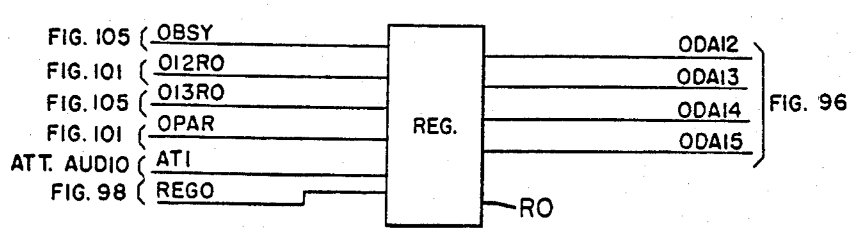

As seen in FIG. 101, the data from the register 1251 and 1252 in FIG. 100 are received on the buses OBUSS-1–2 and OBUSS3 at register R2, which comprises storage registers 1280, 1281, and 1282. The data is clocked into register R2 by the read enable signal OWR2 and is also applied to a pair of parity control circuits 1283 and 1284 which determine the parity of the data. In this regard, as noted from FIG. 94, if the message relates to an attendant key, only the first byte of the message will contain valid data and therefore a determination of parity will be made only with respect to the data applied to circuit 1283. On the other hand, if the data relates to a DSS key, both the second and third bytes of the message will be valid and therefore the parity of both bytes must be determined by the respective circuits 1283 and 1284, which are connected together under these circumstances by gate 1284, which is enabled by the signal ODSS from FIG. 100. If odd parity is detected, an output will be provided from circuit 1283 to the parity flip-flop 1286 which generates on lead OPAR.

The data is clocked into the storage registers 1280–1282 of the register R2 by the write enable signal OWR2 from FIG. 100. The data stored in the register R2 is then provided on leads OOR2–O14R2 to the data steering circuits 1288–1291 in FIG. 102 from which this data is then applied on leads ODA0–ODA15 onto the bidirectional data bus through circuits 1240–1243 in FIG. 96 to the interrupt encoder 125.

FIG. 103 illustrates the status register R0. As indicated in FIG. 92, when a new message is received in the register R2, the status bit 12 in register R0 is set and when parity error has been detected in connection with that received message status bit 14 in register R0 is set. Thus, the lead O12R0 from the flip-flop 1287 in FIG. 101, which is set by the write enable signal OWR2, is applied to the register R0 in FIG. 103 which enables the lead ODA12 connected through bidirectional circuit 1243 in FIG. 96 onto lead XDAB12 to the interrupt encoder 125. In a similar manner, the detection of parity error by the parity flip-flop 1286 in FIG. 101 serves to enable lead OPAR to the input of the register R0 in FIG. 103 providing an output on lead ODA14 to the bidirectional circuit 1243 in FIG. 96 thereby enabling the lead $\overline{\text{XDAB14}}$ to the interrupt encoder 125.

Figure 104:
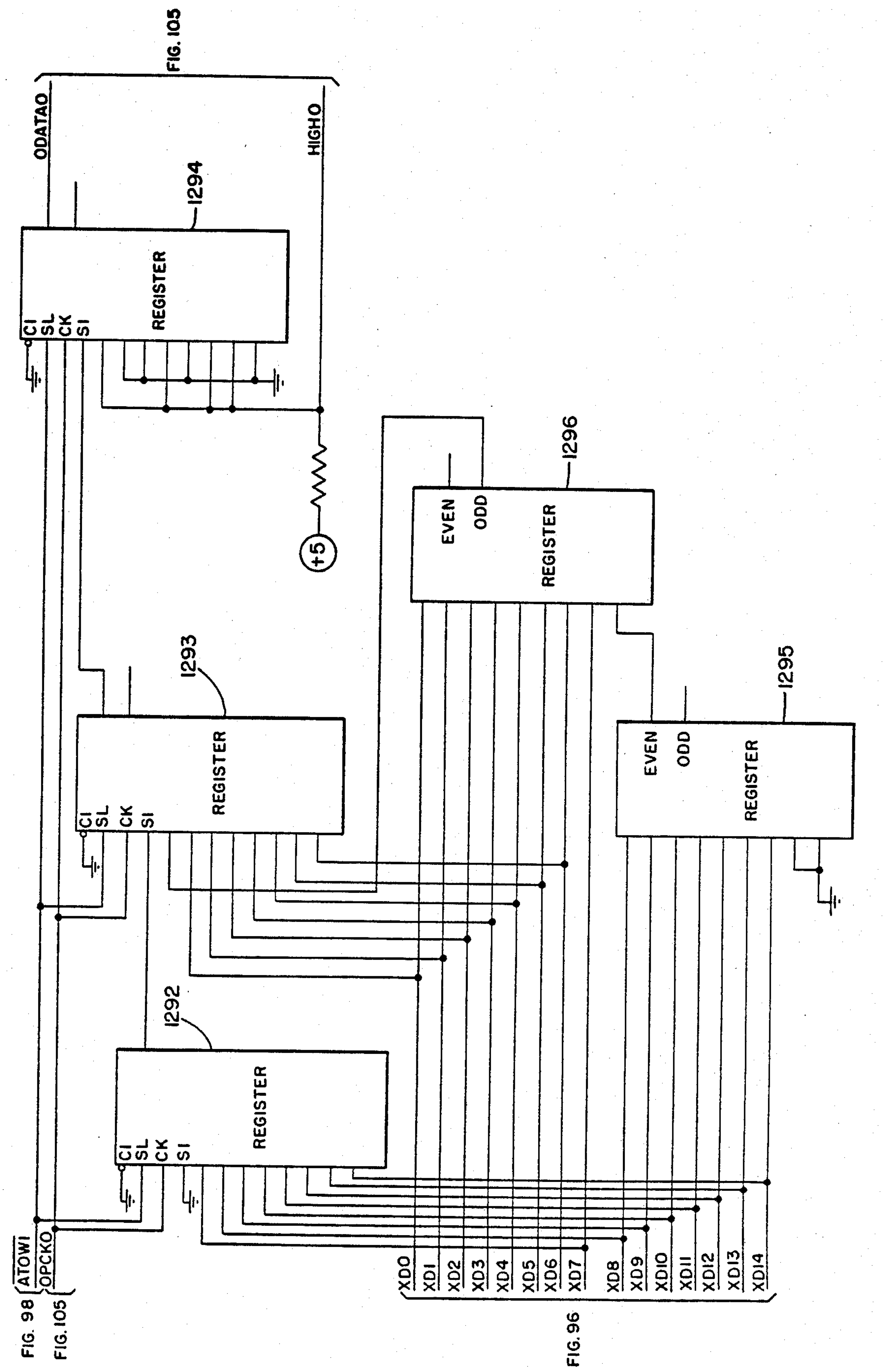

For data received from the central processing unit 130 for transfer to the attendant, this data is applied from the dibirectional data bus onto leads OX0–XD14 in FIG. 96, which leads are connected to register R1 in FIG. 104, comprising storage registers 1292, 1293, and 1294. This data is loaded into the storage registers 1292–1294 in response to the timing signal $\overline{\text{ATOW1}}$ and is clocked out in serial form on lead ODATAO in response to the clock signal OPCKO. The circuits 1295 and 1296 detect the parity of the data and insert the proper parity bit into storage register 1293.

Figure 105:
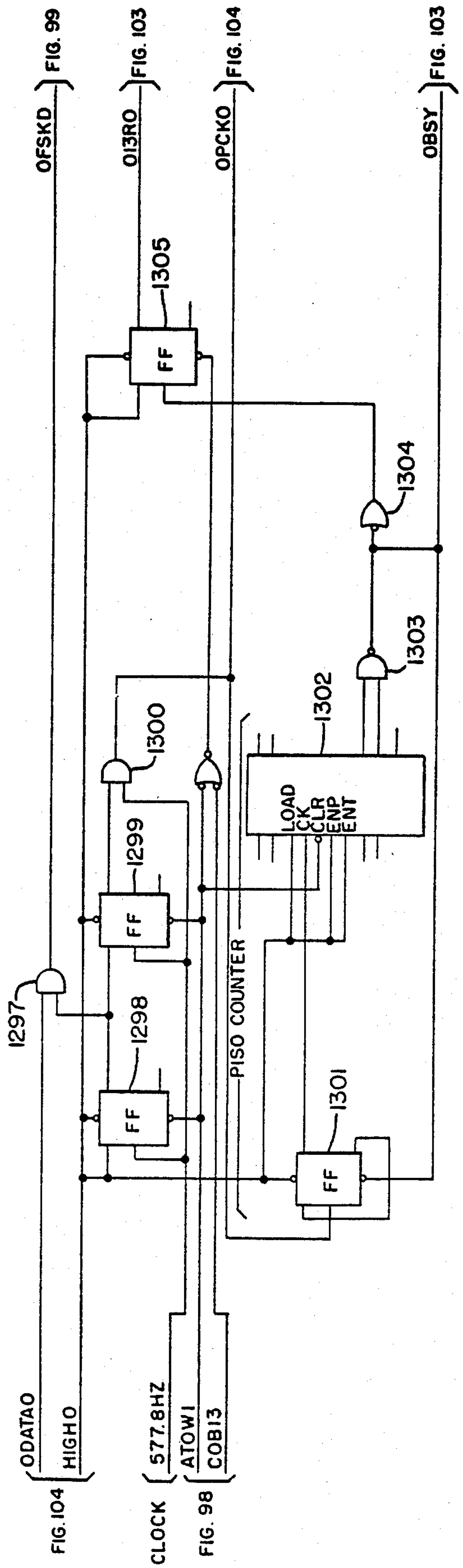

The serial data on lead ODATAO from FIG. 104 is applied to gate 1297 in FIG. 105 which is enabled from the output of flip-flop 1298. The flip-flops 1298 and 1299 are driven from the timing signals 577.8 HZ and provide the clock signal OPCKO via gate 1300 which clock the registers 1292 and 1294 in FIG. 104. The output of gate 1300 also drives flip-flop 1301 whose output clocks the PISO counter 1302. Thus, the counter 1302 is driven with the clock signals which clock data out of the registers 1292–1294 in FIG. 104 and thereby count the bits of data shifted through the gate 1297. When the count of the counter 1302 indicates that all bits have been shifted out, gate 1303 is enabled providing an output through gate 1304 to set flip-flop 1305. Flip-flop 1305 then enables lead O13R0 causing the bit 13 of the register R0 in FIG. 103 to be applied on lead ODA13 through bidirectional bus circuit 1243 onto lead $\overline{\text{XDAB13}}$ to the interrupt encoder 125. This indicates to the central processing unit 130 that the message has been shifted out and a second message may be received.

The data shifted out through gate 1297 in FIG. 105 travels on lead OFSKD to the driver circuit 1306 in FIG. 99 where the data is applied on the data pair ADO and $\overline{\text{ADO}}$ to the attendant audio circuit 115.

Figure 106:
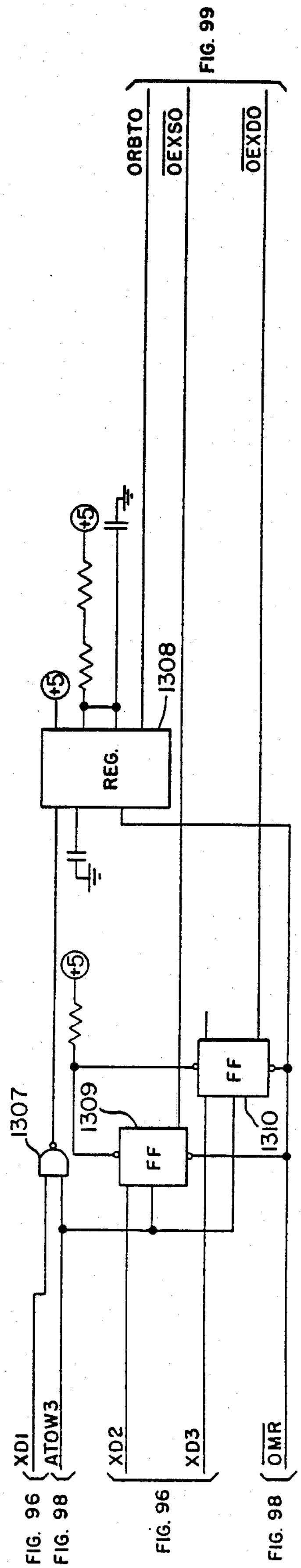

The details of register R3 are illustrated in FIG. 106. As seen in FIG. 95, only the bits 1, 2, and 3 of this register are pertinent, and therefore, command signals may be received from the interrupt encoder at the output of the bidirectional bus in FIG. 96 on leads XD1, XD2, or XD3. Lead XD1 is applied to gate 1307 along with the timing signal ATOW3, the gate 1307 enabling the driver circuit 1308 to provide an output on lead ORBTO. The data lead XD2 is applied to a flip-flop 1309 which is set from the timing signal ATOW3 and provides an output on lead $\overline{\text{OEXSO}}$. The data lead XD3 is applied to flip-flip 1310 which is set by the timing signal ATOW3 and provides an output on lead $\overline{\text{OEXDO}}$. As seen in FIG. 99, the leads ORBTO, $\overline{\text{OEXSO}}$, and $\overline{\text{OEXD}}$ are applied through the respective gates 1311, 1312, and 1313 to enable leads $\overline{\text{RBTO}}$, $\overline{\text{EXSO}}$, and $\overline{\text{EXDO}}$ extending to the attendant audio circuit.

In the operation of the attendant I/O circuit, with the transmission of data from the attendant to the central processing unit 130, data is received from the attendant audio circuit 115 at the input of the one-way bus receiver 1250 in FIG. 99, and is applied on lead DATAO to the registers 1251, 1252, and 1253 in FIG. 100. As data is received on lead DATAO, the edge of the data will set the load enable flip-flop 1254 enabling gate 1256 to reset the strobe counter 1257. On receipt of the next clock pulse, the load cut flip-flop 1255 is set disabling the AND gate 1256 and the clock pulses drive the strobe counter 1257 until the output OSTRB is enabled strobing the data into the registers 1251–1253.

When the data has been completely received in the registers 1251–1253, the standard sync character in the register 1253 will be detected by enabling of the gate 1258 to set the first message ready flip-flop 1265. If the message relates to a DSS key, the data in register 1252 will enable the gate 1266 which will set the DSS service latch 1268 via gate 1267. If the data in the message relates to an operator key, the DSS service latch 1268 will remain reset. Of the next clock pulse, the first message ready flip-flop 1265 will be reset and the second message ready flip-flop 1278 will be set thereby enabling gate 1269 to generate the write enable signal OWR2 at the output of gate 1270.

As seen in FIG. 101, the write enable signal on lead OWR2 will clock data from the SIPO registers 1251–1253 in FIG. 100 into the register R2 consisting of storage registers 1280–1282. At the same time, parity of the received message will be checked by the parity circuits 1283 and/or 1284 depending upon the state of the gate 1285, which is controlled by the signal ODSS at the output of the service latch 1286 in FIG. 100. Thus, for an operator key message only the second byte of the message will be checked for parity; while, for a DSS key message both the second and third bytes of the message will be checked. If a parity error has been detected, the flip-flop 1286 will be set enabling the lead OPAR, and with generation of the write enable signal OWR2 the new message interrupt flip-flop 1287 will be set enabling the lead O12R0. The signals OPAR and O12R0 are forwarded to the register R0 in FIG. 103 providing the interrupt signals in bits 12 and 14 of the register.

In its scan of the register R0, the CPU 130 will note that bit 12 is set indicating a new message is waiting for transmission in the attendant I/O circuit. The CPU will then forward via the interrupt encoder 125 the register two select and read signals on leads $\overline{\text{XRSEL2}}$ and $\overline{XDAIN}$ to the bus receiver 1245 in FIG. 97 which generates the signals XR1 and READ. As seen in FIG. 98, the signals XR1 and READ are applied to the multiplexer 1247 and will produce via gate 1248 the receive control signal RVC, which enables the data bus circuits 1240–1243 in FIG. 96 to transfer the data from register R2 to the interrupt encoder 125. Once the data has been received by the CPU, it will signal the attendant I/O circuit causing generation of the signal $\overline{COB12}$ in FIG. 98 which is applied in FIG. 101 to clear the flip-flop 1287 thereby clearing the interrupt designated by bit 12 of register R0.

For transmission of data from the CPU to the attendant, the data is received from the bidirectional data bus on leads XD0–XD14 in FIG. 96 and applied to register R1 comprising storage registers 1292, 1293, and 1294 in FIG. 104. At the same time the parity circuits 1295 and 1296 determine proper parity and insert the parity bit in the proper location in the data stored in storage register 1293. The serial data from the register 1292–1294 is applied onto line ODATAO to the gate 1297 in FIG. 105 which is enabled by the flip-flop 1298. The flip-flops 1298 and 1299 are driven from the system clock and provide via gate 1300 the output clock signal OPCKO which is applied in FIG. 104 to clock data out of the register R1. As the data is shifted out through gate 1297 in FIG. 105, the counter 1302 counts the bits of the message and will provide an output through gates 1303 and 1304 to set flip-flop 1305 when all bits have been shifted out. This results in enabling of the lead O13R0 to register R0 in FIG. 103 setting the interrupt bit 13 in the register to indicate to the CPU that the message has been completely shifted out to the attendant and that a new message may be received. The CPU will then enable lead XD1 in FIG. 98 to generate the signal $\overline{COB13}$ which serves to reset the flip-flop 1305 in FIG. 105 clearing the interrupt bit 13 in register R0.

2. The Attendant Console

FIG. 107 is a basic block diagram of the attendant console data control including both the send control system and receive control system and illustrating the various control lines which extend between the respective circuits. In some cases, these control lines consist of plural wires or paths; therefore, the number of wires or paths in each line is designated by a slash mark through the line and a number adjacent thereto.

The key/lamp field 1330 includes a plurality of control keys and key pad keys, which may total sixt-two keys, for example, along with a plurality of key display lamps for visually indicating the operating condition associated with the control key or the line designated thereby. Each of the keys in the field 1330 is connected via a KEY BUS to the send key scanner and multiplexer 1335, which provides for repetitive scanning of all keys to detect on/off key transitions. The circuit 1335 includes a binary coder driven by the scan clock pulses $\overline{SCNCLK}$ provided by the send control and serializer 1345. Thus, for each key being scanned, the circuit 1335 provides the key address S1–S32 and the key transition data $\overline{KEY}$ to the send message generator 1340.

The send message generator 1340 receives and stores the key transition data with receipt of the clock memory signal $\overline{CLKMEM}$ compares it with the previous status of that key as stored in memory, and determines whether a valid change in key state is to be recognized on the basis of four consecutive similar transitions. Thus, if the previous key status indicates that the key was "off", four consecutive "on" key transitions will be required to recognize a valid change in the state of the key. When a change in state is recognized, either an open signal $\overline{OP}$ or a closed signal $\overline{CLO}$, as the case may be, will be forwarded to the send control and serializer 1345, which will return a timing signal $\overline{WRITE}$ to the message generator 1340 to effect storage of the new status of that key. The stored key state received from circuit 1335 is then erased with receipt of $\overline{RLEASE}$ from circuit 1345.

The send control and serializer 1345 serves to format a message consisting of a key identification, a transition bit indicating the change in status of the key, a parity bit, and a synchronizing character. This message is then forwarded on line $\overline{TXDATA}$ to the modem 1350 which modulates the digital message into the voice frequency band using standard frequency shift keying and it transmits it to the attendant audio circuit 115 on the data highway 1212 via leads TS and RS.

The control data for controlling operation of the key lamp display and alphanumeric displays is received on highway 1212 from the attendant audio circuit 115 via leads TR and RR at the modem 1350 in FSK data form and the modem 1350 demodulates it to digital form. The digital data is then forwarded from the modem 1350 on lead $\overline{RXDATA}$ to the receive deserializer 1355 and on lead $\overline{RXDSS}$ to the direct station selection and busy station number display circuits.

In effect, the highway 1212 between the attendant console and the attendant audio circuit is shared with the direct station selection circuit (not shown) in that messages to and from the DSS circuit pass through the MODEM 1350 and the send control and serializer 1345, which are shared with the DSS circuit and the key/-lamp field 1330. The manner in which messages are formatted indicates whether the message relates to a control key or a DSS key.

If the message is directed to control key lamps or the alphanumeric display, the receive deserializer 1355 will decode the message consisting of the key lamp identification (address) and lamp flash code, or an alphanumeric display identification (address) and character code, preceded by a sync character. Upon detection of the synchronizing character in the message, a message ready signal on lead $\overline{MSGRDY}$ is forwarded to the receive timing and control circuit 1360 along with the parity bit on lead PARITY, the data bits on leads D0–D7 and the address bits on leads A1–A64.

The receive timing and control circuit 1360 first determines whether the message has proper parity. If incorrect parity is detected, the circuit 1360 will generate a signal on lead $\overline{PERESP}$ to the send message/generator 1340 to initiate the formulation of a message to the central processing unit 130 indicating that the message was not correctly received and should be repeated. The generator 40 also returns a parity acknowledge signal $\overline{PERACK}$. If proper parity is detected, address signals A1–A64 and the data signals D0–D2 forwarded from the receive deserializer 1355 will be accepted by the receive flash code generator 1365. The receive timing and control circuit 1360 will also generate a signal on line $\overline{WS}$ to permit writing of the data D0–D2 into a memory at the proper address location, as indicated by the address bits A1–A64 in the receive flash code generator 1365. However, if the message relates to the alphanumeric display, the receive flash code generator 1365 will generate a signal on line ALPHA to the receive timing and control 1360 to inhibit acceptance of this address and data information, which is to be provided for operation of the receive display driver 1370, as will be described hereinafter.

The receive flash code generator 1365 is addressed by two sets of addresses in an alternate manner under control of the signal applied from the receive timing and control circuit 1360 on lead SELWA. On the one hand, the memory in the generator 65 is continuously scanned from a binary counter to read out the flash codes associated with each of the keys as stored thereby to a flash code selector, which selectively gates out to the output line $\overline{\text{MFC}}$ a signal of selected frequency based upon the flash code. On the other hand, inbetween each general scanning step of the memory, a new flash code may be read into the memory at the selected address included in the message received from the deserializer 1355. The signals on leads $\overline{\text{MFC}}$ and 120 IPM from the receive flash code generator 1365 are applied to a receive lamp demultiplexer 1375 which selectively applied the signal to the appropriate lamp in the field 1330.

If the message received in the deserializer 1355 is directed to the alphanumeric display 1370, the address bits $\overline{\text{BA1}}$–$\overline{\text{BA8}}$ and the data bits $\overline{\text{BD0}}$–$\overline{\text{BD5}}$ from the message are forwarded from the deserializer 1355 to the receive display driver 1370 along with appropriate timing signals on leads PHASE 2, $\overline{\text{BWS}}$, and $\overline{\text{ALFSTB}}$, to suitably drive the alphanumeric display.

If a DSS key is operated, a request will be generated on line $\overline{\text{DSSREQ}}$ to the send control and serializer 1345 requesting use of that circuit. If the circuit 1345 is busy it will so indicate on line $\overline{\text{BUSY}}$, but if available, the circuit 1345 will receive the DSS key transition message on line $\overline{\text{DSSDAT}}$ and pass the message to the PABX system.

The send control system portion of the console comprises the send key scanner and multiplexer 1335, the send message generator 1340, and the send control and serializer 1345. The receive control system portion of the console comprises receive deserializer 1355, receive timing and control circuit 1360, and receive flash code generator 1365. Each of the circuits in the console is controlled by clock signals derived from the console master clock 1380.

The send control system will now be described in greater detail in connection with FIGS. 108–113. The multiplexer 1336 sequentially scans the key inputs K1–K62 in response to the addresses generated by the counter 1337, which is driven by the scan clock signals $\overline{\text{SCNCLK}}$ provided from the timing and control circuit 1346. The key state signals are forwarded from the multiplexer 1336 to a set of latches 1342, which also receive a three bit binary signal representing the old state of the key, as derived from key state ram 1341 in response to receipt of the address generated by the counter 1337. The latches 1342 thus store the present key state and the old status of the key being scanned by the multiplexer 1336. This data is clocked into the latches 1342 by a clock signal derived from the timing and control circuits 1346.

A key state decoder and generator 1343 then analyzes the data stored in the latches 1342 to determine whether a valid key transition (on to off or off to on) is to be recognized. In this regard, the old status of the key includes a count of an on or off transition detected up to four consecutive transitions so that the key state decoder and generator 1343 will recognize a valid key transition or change the status only after four such transitions are detected consecutively. In other words, if a key has been "off" and the system suddenly detects an "on" key condition, the system will not recognize this as a valid transition of that key from "off" to "on" until the "on" condition has been detected for four consecutive scans of the key. This is to avoid the recognition of a transition in connection with an invalid key indication, such as may be caused by contact bounce. From the key state information supplied by the multiplexer 1336 and the old status of the key supplied from the key state ram 1341, the key state decoder and generator 1343 will generate signals representing the new status of the key, which are forwarded to the key state ram 1341 and stored therein upon receipt of the write strobe signal from the timing and control circuit 1346.

Details of the key state ram 1341, latches 1342, and key state decoder generator 1343 can be seen from FIG. 109, which will be described in conjunction with the key state table illustrated in FIG. 111 and the timing diagram of FIG. 112. The address of the key being scanned is derived on leads S1–S32 from the counter 1337 and is applied to the key state ram 41, which reads out the three bits representing the old state of the key from the address storage location in the ram. These three bits are applied to inputs D1, D2, and D3 of the latches 1342, which receive at input D0 the key state of the addressed key on lead $\overline{\text{KEY}}$. The four bits of data are clocked into the latches 42 in response to the clock signal received on lead $\overline{\text{CLKMEM}}$ from the timing and control circuits 1346 in FIG. 110.

The data stored in the latches 1342 is available on outputs Q0–Q3 to the key state decoder 1343, which receives these bits at inputs D1–D4. This decoder 1343 in conjunction with its output gates G1, G2, and G3 determine the new status of the key on the basis of the old status and the key state information obtained from the present scan of the key. The fifteen possible combinations of key status are illustrated in the table in FIG. 111, which shows the old key status, the present key state, and the new key status, respectively. Depending upon the key status received from the multiplexer 1336, one of the fifteen key memory states will be determined by the decoder 1343. In FIG. 111 an open or non-operated key is represented by a "0" and a closed or operated key is represented by a "1". In sequence number 0, the key is idle open and so both the old key status and the new key status will be 000. When the first closed key transition is detected, the key state decoder 1343 will move the key status to sequence number 1 so that the outputs of gates G1, G2, and G3 representing the new key status will be 001, since the old key status was 000 and the present key status is 1.

The next time the key is scanned, if the present key state indicates that the key is now open, the decoder 1343 will move to sequence number 2 with the new key status at the output of the decoder gates G1–G3 being 000. Thus, if the next scan of the key indicates that the key is open, the decoder 1343 will move back to sequence 0. On the other hand, after sequence number 1, if the next key scan indicates that the key again is closed, the decoder 1343 will move from sequence number 1 to sequence number 3 in which the new status is 010, indicating that two closed key transitions have been detected. If the next scan again indicates a closed condition, the decoder will move to sequence number 5 with a new key status of 011, and if the closed key condition persists, the decoder will then move to sequence number 7 with a new key status of 100. Once sequence number 7 has been reached, the system may recognize a valid key transition from open to closed, since four consecutive closed key transitions have been detected. The system will therefore send a closure indication to the CPU.

It will be noted that in between each of the sequences 1, 3, 5, and 7, a sequence is provided for the case where an open key indication may be received subsequent to a closed key indication. If an open key condition is detected after a closed key condition, the decoder 1343 will revert back to sequence number 0. For example, if the key status is in sequence number 1 and an open condition is received, the status will move the sequence number 0. If the next key state is a closed key condition, the status will move back to sequence number 1. If another open key condition is then received, the status will again move back to sequence number 0. This ensures that only after four consecutive similar transitions will a valid transition be recognized.

Sequence number 9 in the key status represents an idle closed condition which will remain unchanged until an open key transition is detected. The sequence from idle closed to idle open is affected in the same manner already described in connection with the detection of idle closed, with four consecutive open transitions being required before a valid recognition of the transition will be made by the system.

When the key state decoder 1343 has completed its analysis of the four bits of key status information, the outputs of gates G1–G3 are applied to the key state ram 1341 at input DI1, DI2, and DI3, and the data is stored in the ram 1341 on receipt of the appropriate level on lead $\overline{\text{WRITE}}$, as indicated in FIG. 112. Also, when a valid idle closed condition has been detected at sequence number 7, as seen in FIG. 111, key state decoder 1343 provides an output to gate G12, which is applied through gate G13 onto lead $\overline{\text{CLO}}$ indicating the closed gate condition to the timing and control circuit 1346 in FIG. 110. Similarly, when the key state decoder 1343 reaches sequence number 14, recognizing a valid open key condition, the decoder 1343 provides an output through gate G6 onto lead $\overline{\text{OPE}}$ indicating the open condition to the timing and control circuit 1343 in FIG. 110.

Looking once again to FIG. 108, if a valid open or closed key transition is detected, the send control system will generate a message conveying the new key status information to the central processing unit. This message consists of two bytes of eight bits each, the first byte consisting of an eight bit sync character and the second byte including a six bit address, one bit representing the new key state and a parity bit. The message is formulated in a shift register SR1, which receives the eight bit sync character, and a shift register SR2, which receives the six bit key address from the counter 1337, the key state from the timing and control circuit 1346, and the appropriate parity bit from the parity generator 1347. When the message has been completely formulated, it is shifted out through gate G26 to the modem 1350, as seen in FIG. 107, for transmission to the attendant audio circuit 115.

While both open and closed key transitions must be detected in connection with the various control keys in the operator console, it is clear that those keys included in the operator key pad do not require detection of an open or released transition. In other words, release of the keys in the key pad has no general meaning within the system and therefore need not be recognized. Thus, to inhibit the sending of transition data in connection with key pad releases, the gate G6 in FIG. 109 is inhibited from the output of gate G5 for those addresses of the keys of the operator key pad received through gate G4. Thus, while an open transition may be detected by the key state decoder 1343, the gate G6 will be inhibited preventing enabling of the lead $\overline{\text{OPE}}$ for the keys of the operator key pad.

The details of the timing and control circuit 1346, parity generator 1347, and shift registers SR1, SR2 are illustrated in FIG. 110. A 111 KHz signal from the clock generator 1380 is applied through gates G21 and G22 to the send control timing flip-flops 1332 and 1333, which provide at the outputs of gates G27, G28, and G29 the respective timing signals $\overline{\text{WRITE}}$, $\overline{\text{SCNCKL}}$, and $\overline{\text{CLKMEM}}$. The signal $\overline{\text{SCNCLK}}$ drives the counter 1337 and the other signals are applied to FIG. 109 in control of the latches 1342 and the key state ram 1341, as already described. When a valid key transition is detected and one of the leads $\overline{\text{CLO}}$ or $\overline{\text{OPE}}$ is enabled through gate G16, a send request signal will be generated at the output of gate G17 at the end of the $\overline{\text{WRITE}}$ pulse, as seen in FIG. 112, which signal will inhibit the gate G22 to prevent further clock pulses from being applied to the flip-flops 1332 and 1333. Thus, no output will be provided on lead $\overline{\text{SCNCLK}}$, thereby stopping the counter 1337 which scans the key inputs to the multiplexer 1336. This is done to permit the previous message, if any, to be shifted out of the shift registers SR1 and SR2 before the new message is supplied thereto.

The shifting of data from the registers SR1 and SR2 through gate G26 onto lead $\overline{\text{TXDATA}}$ to the modem is controlled by a binary counter 1348, which is in turn controlled by a send message flip-flop 1349 driven from the clock generator 1380 by gate G20. When all the data has been shifted out of the shift registers SR1 and SR2, a signal will be provided from the CO output of binary counter 1348 to one input of AND gate G19. The send request signal at the output of gate G17 is supplied through gate G18 to a second input of AND gate G19, which will be enabled if no DSS request is received at that time on lead $\overline{\text{DSSREQ}}$. Enabling of AND gate G19 will set the send message flip-flop 1349 causing $\overline{\text{LOAD}}$ to go long and the address from counter 1337 will be shifted in parallel into the shift register SR2 along with the parity bit from parity generator 1347 and the key state derived from the key state decoder 1343. The synchronizing character is automatically loaded into the shift register SR1. At this time, the CO output of counter 1348 is also applied through gate G23 to enable gate G24 to generate an output on lead $\overline{\text{RLEASE}}$ to the latches 1342 in FIG. 109, thereby resetting the latches, and gate G25 is enabled to inform the DSS circuit on lead $\overline{\text{BUSY}}$ of the busy condition. With this, any outputs on leads $\overline{\text{OPE}}$ or $\overline{\text{CLO}}$ to gate G16 in FIG. 110 disappear, causing the send request signal at the output of gate G17 to disappear and thereby opening up the gate G22 to permit the scanner to drive the flip-flops 1332 and 1333 once again. Thus, scanning of the keys by the multiplexer 1336 resumes.

At the next clock signal applied through gate G20, the send message flip-flop 1349 is reset causing the $\overline{\text{LOAD}}$ signal to go high. This results in the message being shifted out of the registers SR1 and SR2 serially through gate G26 to the modem on lead $\overline{\text{TXDATA}}$ as the binary counter 1348 is reset and cycles with the applied clock pulses. Also, the release scanner flip-flop 1331 sets causing $\overline{\text{RLEASE}}$ to go high. When the counter 1348 reaches its maximum count, all data has been shifted out of registers SR1 and SR2, and the next message can be formulated.

If a DSS request comes into gate G19, flip-flop 1349 is inhibited, the $\overline{BUSY}$ lead is not enabled, and data from the DSS circuit may be applied through gates G30 and G26 to lead $\overline{TXDATA}$.

The receive control system will now be described in more detail in conjunction with FIGS. 114–119. The message received from the CPU 130 consists of three bytes of eight bits each. The first byte is a standard eight bit synchronizing character which is used to indicate that the message is a proper message and that it has been completely received. The second byte consists of a parity bit and seven data bits indicating the illuminator or alphanumeric display address. The third byte includes a three bit flash code if the second byte identifies illuminator codes, a six bit alphanumeric character code if the second byte designates an alphanumeric display, or an eight bit DSS illuminator identity if the second byte indicates that the message relates to DSS (direct station selection) service.

As seen in FIG. 114, the three bytes of the message are received serially from the modem in the three shift registers SR3, SR4, and SR5. When the sync detector G32 detects the synchronizing character in the shift register SR3, it signals the timing and control circuit 1361 that a complete message has been received and is ready for decoding. As indicated, the second byte of the message will indicate whether the message relates to illuminator control, alphanumeric display control, or the DSS service. Thus, the timing and control circuit 1361 will first determine whether the second and third bytes of the message have the proper parity and then decode the second byte of the message to determine what type of message has been received.

The details of the shift registers SR3, SR4, and SR5 and the control circuitry for shifting data into three registers is illustrated in FIG. 115. The timing diagram in FIG. 118 also indicates that timing of the receipt of the serial data from the modem 1350 and how the clock within the receive control system is aligned with the receipt of the incoming data.

The serial data is received on lead $\overline{RXDATA}$ and applied through gate G31 on the one hand to the data input of the shift register SR5, which is connected in series with the shift registers SR4 and SR3. The serial data at the output of gate G31 is also applied to an edge detector comprising flip-flops 1356 and 1357. The flip-flop 1357 detects the leading edge of the incoming data to enable gate G37, which generates the signal $\overline{PRSET}$ to preset the counter 1354. On the next clock pulse, the flip-flop 1356 is set disabling the gate G37. The clock pulses from the master clock 1380 are also applied through gate G38 to drive the counter 1354, which counts down from the preset count and in due course provides an output CLOCK IN to enable each of the shift registers SR3, SR4, and SR5 to shift data.

As seen in FIG. 118, the signal CLOCK IN is generated at the center of the received data to ensure that the data is available for shifting into the shift registers SR3–SR5. Thus, the edge detector formed by flip-flops 1356 and 1357 and the counter 1354 serve to align the clock for the shift registers SR3, SR4, and SR5 with the center of the received data. In this way, the clock which controls the shift registers aligns itself with the receipt of each bit of serial data from the modem 1350.

When the entire message has been received, the synchronizing character in the shift register SR3 will be detected by the sync detector consisting of gate G32 and inverting gates G33–G36. The output of gate G32 is applied to flip-flop 58 which enables gate G39 to generate the message ready signal $\overline{MSGRDY}$, which is forwarded to the timing and control circuit 1361 in FIG. 116. On the next clock pulse, the flip-flop 1359 will set disabling the gate G39 and generating a CLEAR MESSAGE signal to clear the data in each of the shift registers SR3, SR4, and SR5.

The seven data bits in the second byte of the message may have the following identities:

0–63 = illuminator identity for sixty-four lamps
64–79 = alphanumeric display identity
80–118 = spare
119-RUL request (third byte ignored)
120–127 = reserved for DSS Referring to FIG. 114, if the second byte of the message falls within 0–63, the message will relate to an illuminator identity. Thus, the six significant bits are forwarded to an address selector 1363 to address a storage location in the display and flash code store 1364, which stores selected flash codes for each of the key lamps in the console. The particular flash code to be stored at that address in the store 1364 is designated by the first three bits of the third byte of the message, which are applied to the store 1364 from the shift register SR5 and stored therein upon receipt of the write strobe signal applied from the timing and control circuit 1361 through gate G68.

The address selector 1363 is a multiplexer which alternately applies to the display and flash code store 1364 the address from the received message and a scanning address received from a seven bit counter 1362. The address from the message is applied to the store 1364 from the address selector 1363 to designate the storage location into which the data is to be written from the message; while, the address applied from the counter 1362 through the address selector 1363 to the display and flash code store 1364 designates the address from which data is to be read out to a flash code selector 1367. Thus, the storing of flash codes in the store 1364 is effected an an interdigitated manner with the scanning of the store 1364 to read out the stored flash codes to the flash code selector 1367.

The details of the timing and control circuit 1361 are illustrated in FIG. 116, and the timing diagram of FIG. 119 indicates the various signals involved in the operation of this circuit. When the message ready signal $\overline{MSGRDY}$ is generated at the output of gate G39 in FIG. 115, this signal is applied through gate G40 to one input of AND gate G41 in FIG. 116. The eight bits of the second byte and the eight bits of the third byte of the received message are applied from the shift registers SR4 and SR5 to respective parity checking circuits 1368 and 1369 on leads A1–A64, PARITY, and D0–D7, thereby checking the parity of the two bytes together. If even parity is detected, the checking circuit 1369 will provide an output to enable the AND gate G41 providing at the output thereof a MESSAGE VALID signal to a pair of flip-flops 1373 and 1374 which serve to generate a synchronize update pulse from the output of gate G42 via gate G43.

A pair of flip-flops 1376 and 1377 are driven from the master clock to provide respective timing signals $\overline{PHASE\ 1}$ and PHASE 2, as seen in FIG. 119. The PHASE 2 signal clocks the binary counter 1362 which generates the scanning address signals for scanning the storage locations in the display and flash code store 1364. The least significant bit of the output of the counter 1362 provided on lines SELWA is utilized to control the address selector 1363 to shift between the address from the received message and the address provided by the counter 1362.

Upon generation of the synchronize update pulse at the output of gate G43 after valid parity has been detected and a message valid signal has been generated, gate G44 will be enabled to generate the write strobe signal $\overline{WS}$ which serves to write the first three bits of the data in register SR5 into the display and flash code store 1364. On the other hand, if the received message relates to the alphanumeric display, the gate G45 will be enabled by enabling of the lead ALPHA along with the synchronize update pulse at the output of gate G43 and the output of enabled gate G51. Gate G45 will generate the alphanumeric strobe signal $\overline{ALFSTB}$.

If the parity checking circuits 1368 and 1369 detect odd parity in the received message, the parity error flip-flop 1376 will be set from the output of gate G56 to generate a parity error response on lead $\overline{PERESP}$. This signal is to be formulated into a message by the send control system to inform the CPU 130 that the message has been improperly received and should be resent. Referring to FIG. 109, the signal $\overline{PERESP}$ is applied through gate G10 to one input of AND gate G11, the other inputs of which are applied from the counter 1337 through gates G7, G8, G9 and G14. The logic gate combination serves to enable the AND gate G11 when the address for key 15 has been generated by the counter 1337 and a $\overline{PERESP}$ signal is received from the receive control system. The enabled gate G11 will set the flip-flop 1344 to provide an output through gate G12 and gate G13 on lead $\overline{CLO}$ indicating a closed key condition, which is inserted into the message in the shift register SR2 in FIG. 110. Thus, the CPU 130 will receive a message indicating that a closed key condition is detected in connection with key 15; however, key 15 in this system is a ficticious control key, which is recognized by the CPU 130 as an indication that a parity error has been detected in the console. Based on this information, the CPU 130 then initiates a retransmission of the message. Also, at the time flip-flop 1344 is set, a parity acknowledge signal $\overline{PERACK}$ is forwarded through gate G50 in FIG. 116 to reset the parity error flip-flop 1376.

Referring once again to FIG. 114, the flash codes which are sequentially read out of the display and flash code store 1364 are applied to a flash code selector 1367 which selects one of the flash signals from a flash timing generator 1366 on the basis of the received code. The signal is applied from the flash code selector to a key lamp display demultiplexer 1375 which is clocked by the signal $\overline{SHIFT}$ produced from gates G46 and G47 in FIG. 116 with the timing indicated in FIG. 119. These flash signals are applied to the key lamps LD1–LDn through the display latches 1331 which are strobed by the timing signal DA32 generated from the binary counter 1362 in FIG. 116.

FIG. 117 illustrates the details of the address selector 1363, display and flash code store 1364, flash timing generator 1366, and flash code selector 1367. The address selector 1363 comprises three multiplexers 1381, 1382, and 1383. The multiplexer 1381 is connected to receive the first three bits of the third byte of the message along with the seventh bit A64 of the second byte. Upon receipt of the strobe signal STST from the modem 1350, the three bits on leads D0–D3 will be applied to the multiplexer 1381 along with the bit A64. The six address bits from the second byte of the message are provided on leads A1–A8 to the multiplexer 1382 and leads A16 and A32 to the multiplexer 1382 and on leads DA16 and DA32 to the multiplexer 1383.

As already indicated, the least significant bit of the output of the counter 1362 on lead SELWA controls whether the address signals DA1–DA32 or A1–A32 are stored in the multiplexers 1382 and 1383. In this way, as seen in FIG. 119, a message address will be gated, then a scanning address will be gated, alternately applying one address and then the next address to the display and flash code store 1364, as controlled by the A and B inputs to the respective multiplexers 1382 and 1383 applied on lead SELWA and through gate G57.

When a message address is received in the multiplexers 1382 and 1383, the store 1364 will be addressed to receive the three bits of data from the third byte of the message supplied to the multiplexer 1381 on leads D0–D3 provided the message is related to key lamp display control. As already indicated, if the second byte of the message indicates an illuminator identity of 64–79, it will be determined that the message relates to alphanumeric display identity rather than illuminator identity. This is simply determined by examining the A64 bit to determine whether or not the message is of one type or the other. If the A64 lead is enabled at the output of the multiplexer 1381, the input $\overline{CE}$ of the store 1364 will be enabled to inhibit a reading of the data into the store. This is illustrated in FIG. 114 by the gate G68 being inhibited to prevent the write strobe signal to be applied to the store 1364. In effect, the function is accomplished without the provision of a gate, as seen in FIG. 117.

When a scanning address is applied to the store 1364, the flash code stored at that location in memory is read out to the flash code selector 1367 to which is connected a flash timing generator 1366. The flash timing generator 1366 produces a plurality of different flash signals which may be selectively gated through the selector 1367 on lead MPC to the key lamp display demultiplexer 1375.

As seen in FIG. 114, where the message relates to control over the alphanumeric display, the second byte of the message will provide the display address to the alphanumeric display demultiplexer 1372 while the third byte of the message will provide the identification of the character which is decoded by the decoder 1371. In this way, a selected element AD1—ADn of the addressed alpha-numeric display will be selectively energized as required.

A further feature of the present invention relates to the provision of means in the operator console to permit the CPU 130 to determine that the console is properly operating and scan the various key states which are stored in the key state ram 1341 of the send control system. The CPU 130 accomplishes this by sending a message to the console in which the second byte is set at a value 119. Referring to FIG. 116, the gates G52, G53 and G54 detect the code 119 in the third byte of the received message and provide an output through gate G55 to set flip-flop 1378 upon receipt of the message read signal $\overline{MSGRDY}$ via gate G40. The flip-flop 1378 generates an "are you well" signal on lead RUL which is applied to flip-flop 1334 in FIG. 109. The flip-flop 1334 is set by the clock signal on lead S32 and remains set for a full cycle of the scanning addresses. The output of flip-flop 1334 enables gate G15 to pass a signal from the key state decoder 1343 representing the sequence number 9 for each key state being scanned. In this way, as each of the keys are scanned in the multiplexer 1336, each key which is in the idle closed condition will cause gate G15 to be enabled generating a signal on lead $\overline{RULRSP}$ to the input of gate G16 in FIG. 110. As already described, the enabling of gate G16 results in generation of a send request at the output of gate G17 so that a closed key condition will be forwarded to the central processing unit 130 even though that indication may have previously been forwarded.

At the same time the flip-flop 1334 in FIG. 109 is set, an output is applied on lead $\overline{RULACK}$ to FIG. 116 acknowledging the "are you well" request and resetting the flip-flop 1378. In this way, the operator console will supply to the central processing unit during one complete scan of all the keys the present state of these keys so that the system may obtain this information, which may be needed for example after a loss of power in the system in which this information has been lost by the central processing unit 130.

3. The Attendant Audio Circuit

FIG. 120 illustrates the details of the data or control section of the attendant audio circuit 115, the basic function of which is to convert signals received from the attendant console in FSK form to digital form and to convert the digital data received from the attendant R/O circuit into FSK form. This is accomplished by a conventional model 1390.

The FSK signal received from the attendant console undergoes some conditioning before it drives the modem 1390. First of all, the signal is filtered by a band-pass filter 1385 which may consist of a combination of passive and active bandpass filters. The purpose of this filtering is to increase the signal-to-noise ratio and reduce accordingly, the probability of error detection. The output of the filter 1385 is applied through amplifier 1386 on the one hand to a limiter 1387 and on the other hand to a threshold detector 1388. The limiter 1387 serves to detect zero crossovers and basically provides a squarewave output which is applied to the modem 1390 when the input carrier signal is below a predetermined level, for example, approximately 55 millivolts. During this condition, the $\overline{CT}$ output of the modem 1390 goes high providing an alarm signal to indicate carrier loss to the system.

The data from the attendant I/O circuit is received by a line receiver 1392 on leads 1381 and 1382 and is applied to the modem 1390 for conversion to FSK form. The output from the modem 1390 is applied through amplifier 1393 and transformer TR4 onto leads T2 and R2 to the attendant console.

FIG. 121 illustrates the voice section of the attendant audio circuit. Basically, this circuit is a four-way conference active network which combines the audio voice signals of the source, designation, line, and attendant. The interface of this circuit with the attendant console is via the two-wire path T1 and R1; while, the audio interface with the PCM coded in the miscellaneous cell 102, as seen in FIGS. 7 and 90, is via four-wire paths.

The audio signals from the operator via the operator console are provided through transformer TR1 to the source interface 1400, destination interface 1401, and line interface 1402 via the respective amplifiers A1, A2, and A3. The four-wire interfaces 1400, 1401, and 1402 can each be divided into two basic sections. The first section interfaces with the conference circuit matrix in the PABX system, while, the second section comprises those lines which interface with the filters in the main matrix of the PABX system. Thus, as seen in the source interface 1400, depending upon the state of switches SW3 and SW5, the output of amplifier A1 will either be applied through amplifier A6 to the line SS, or the output of amplifier A1 will be applied through amplifier A7 and a transformer TR2 to the pair of lines SS1 and SS2. In a similar manner, depending upon the state of switches SW4 and SW6, either the receive signal on lead SR will be applied to the input of amplifier A4, or the receive audio signal on the transmission pair SR1 and SR2 will be applied through transformer TR3 via A4.

As seen in FIG. 121, the network is arranged in such a way that side tone is eliminated by reinjecting to each port its own signal in opposition of phase. Thus, the audio signal from the operator is not only applied to the input of amplifier A1, but is also reinserted through amplifiers A4 and A5 back to the operator. The received audio signal in each of the interface circuits 1400, 1401, and 1402 also are not only applied through amplifiers A4 and A5 to the operator, but are also reinjected through amplifiers A1, A2, and A3, respectively.

A capacitor C1 is provided at the attendant two-wire port in line R1 to block any D.C. current through the secondary of the hybrid transformer TR1. This hybrid transformer TR1 is also loaded with a series of varistors RV1–RV6 to provide for secondary lightning protection.

The basic outputs of the network as seen in FIG. 121 can be switched between the conference matrix and the main matrix by means of the analog gates G70–G73, as seen for example in connection with the source interface circuit 1400, wherein the gates G70 and G71 control the operation of the switches SW3, SW4, SW5, and SW6. These analog gates are also used to implement the exclude source or exclude destination operations by merely opening those paths as commanded by control signals received from the attendant I/O circuit on leads $\overline{EXS}$ and $\overline{EXD}$, respectively.

Dial tone can be selectively injected into the circuit from the tone source on leads DT1 and DT2 through transformer TR8 under control of the switch SW1, which is responsive to the control signal from the attendant R/O on lead $\overline{IDT}$. Similarly, intrusion tone can be injected into the circuit on leads IT1 and IT2 through transformer TR9 depending upon the condition of switch SW2, which is controlled from the attendant I/O on lead $\overline{IIT}$.

F. THE DIGITAL CONFERENCE

FIG. 122 is a basic block diagram of the digital conference circuit of the type which may be used with the system of the present invention. The basic function of this circuit is to provide for the simultaneous operation of four 4-party and one 8-party conferences by operating on eight bit compressed PCM words received from the matrix switch in such a manner that signals are expanded, combined linearly by arithmetic operations, recompressed, and redistributed back to the conferees via the matrix switch. The arithmetic combining operation provides for the deleting of the component of each speaker's voice signal from the data being send back to that speaker's receiver. In addition, the digital conference is capable of providing for expansion of the basic conference sizes by combining any of the conference groups C0–C4 either in pairs or in larger numbers. In such expansion of the conference size, one port of each basic conference group is required for linking it to another conference group. Hence, the linking of two 4-party conference groups results in a 6-party conference group, and the linking of a 4-party group and an 8-party group results in a 10-party conference. The manner in which this is accomplished will be described in greater detail hereinafter.

Referring to FIG. 123, each of the twenty-four 8-bit words allocated to the digital conference is received sequentially on the line 1.544 MB/S data bus from the digital switching network at an eight bit input data register 1408. The eight bits of each word are received in serial form and shifted into the register 1408 in time with clock signals generated from the master counter 1409, which is synchronized to the system timing by the receive preframe signal $\overline{RPF}$. As each word is received in the register 1408, it is transferred in parallel into an eight batch latch 1410 to permit processing while the next word is received serially and stored in the register 1408. Thus, each processor cycle of the digital conference comprises a clock cycle of bits 0–7 which are synchronized with the system clock and occur in time with each successive bit being received in serial form into the data register 1408. Thus, once a word has been received and stored in the latch 1410, the digital conference system has eight cycles of processing time until the next word will have been completely received in the data register 1408 and be ready for shifting into the latch 1410. The twenty-four words or channels allocated to the digital conference therefore come in in sequence and each word is processed as the next word is being received in the data register 1408.

The master counter 1409 is driven from the system clock so as to be synchronous therewith, and is reset by the received preframe signal $\overline{RPF}$ so that it is in synchronism with the data received from the system insofar as the sequential order and timing of the channels is concerned. Thus, the received preframe signal $\overline{RPF}$ which comes in from the common control tells the digital conference that the input switch 1408 is about to receive the first bit of the first word of the twenty-four word sequence. The received preframe signal PRF comes into the digital conference one and one-half bit times before the frame pulse and serves as a preliminary indication that a new frame is about to occur.

Before each word can be arithmetically processed, it must first be expanded into a thirteen bit linear form. In this regard, each eight bit word is made up of seven bits representing magnitude and an eighth bit representing the sign of the word. Since the sign bit will not be affected in the expanding operation, the first seven bits of the word are applied from the latch 1410 through a decompanding logic circuit 1420 where it is expanded to twelve bits. The sign bit is forwarded from the latch 1410 through a sign bit processor 1480, which formulates the arithmetic functions to be performed in connection with the word on the basis of the value of this bit. The sign bit is also forwarded from the sign bit processor 1480 with the twelve bit expanded word to an input RAM 1430 for storage. The arithmetic functions to be performed on the word are effected by an arithmetic and logic unit 1440, having a pair of inputs A and B, the B input being connected to the fifteen outputs of the RAM 1430. The purpose of the RAM 1430, which has a capacity of eight words, is to store the eight bits of each channel as it is received and retain these bits during processing by the ALU 1440 so that when a total is provided by the ALU 1440, the individual words of each conferee may be substrated from the total prior to outputting. Thus, as each word comes into the RAM 1430, it is processed by the ALU in accordance with the sign bit designated by the processor 1480 to produce a partial total until all of the words of a particular conference group have been received.

The processor 1480 also provides the manipulation of the sign bit which effectively results in inversion of every other (alternate) channels coming into the digital conference. In this regard, the input data latch 1410, which stores the incoming sign bit of each channel provides to the processor 1480 not only the stored sign bit but also an inverted sign bit. Thus, the processor 1480 merely selects the stored sign bit for one channel, and then selects the inverted sign bit rather than the stored sign bit for the next channel. This effective inversion of alternate sign bits provides the same result insofar as the digital conference is concerned as if an inverting amplifier has been placed in the analog section of the port associated with that channel.

The partial and total sums of the signals which constitute the different conference groups are stored in an ALU RAM 1450, which also provides a work area for storing data which is in the process of being converted from two's complement to sign magnitude. The partial and the total sums stored in the RAM 1450 are supplied through a sixteen bit latch 1450 back to the A input of the ALU 1440 for processing.

When the total sum of signals which constitute a given conference group has been provided by the ALU, the channels associated with that conference group which are stored in the RAM 1430 are then successively subtracted from the total, with the result being provided to a gain control register 1490. In the register 1490, gain control over the signals is provided by a gain control processor 1520, the gain being controlled by selectively shifting the word one bit to the right to attenuate the gain for those conference groups of larger size, such as the 8-party conference and the expanded conference groups. Each word is then once again compressed in the compander 1500 and shifted into a parallel-in serial-out shift register 1510 under control of the clock derived from the master counter 1409. The register 1510 receives the compressed seven bits from the compander 1500 and the sign bit from the sign bit processor 1480 and shifts the word into an output RAM 1520.

A RAM write address is provided from the master counter and timing generator 1409 through a multiplexing circuit 1530 which also receives the RAM read address from a data control counter 1540. The multiplexing circuit 1530 provides the RAM write address to the RAM 1520 during the first half of a clock cycle and provides the RAM read address from the data control counter 1540, which is synchronized to a transmit preframe signal $\overline{XPF}$ from the system. Thus, the data from the shift register 1510 is shifted into the RAM 1520 is synchronism with the timing of the digital conference and is then shifted out into the system in serial form onto the 1.544 MB/S data bus in synchronism with the data processed by the digital switching network.

Although the synchronizing receive preframe signal $\overline{RPF}$ and transmit preframe signal $\overline{XPF}$ have a known fixed time relationship to one another in the preferred embodiment and are synchronous with the clock signal, it is also possible in accordance with the present invention that the two synchronizing signals not have a fixed time relationship to one another. By providing the separate data control 1540 and multiplexing circuit 1530, such flexibility is permitted, so long as both synchronizing signals are synchronous with the incoming clock signal.

Figure 124B:
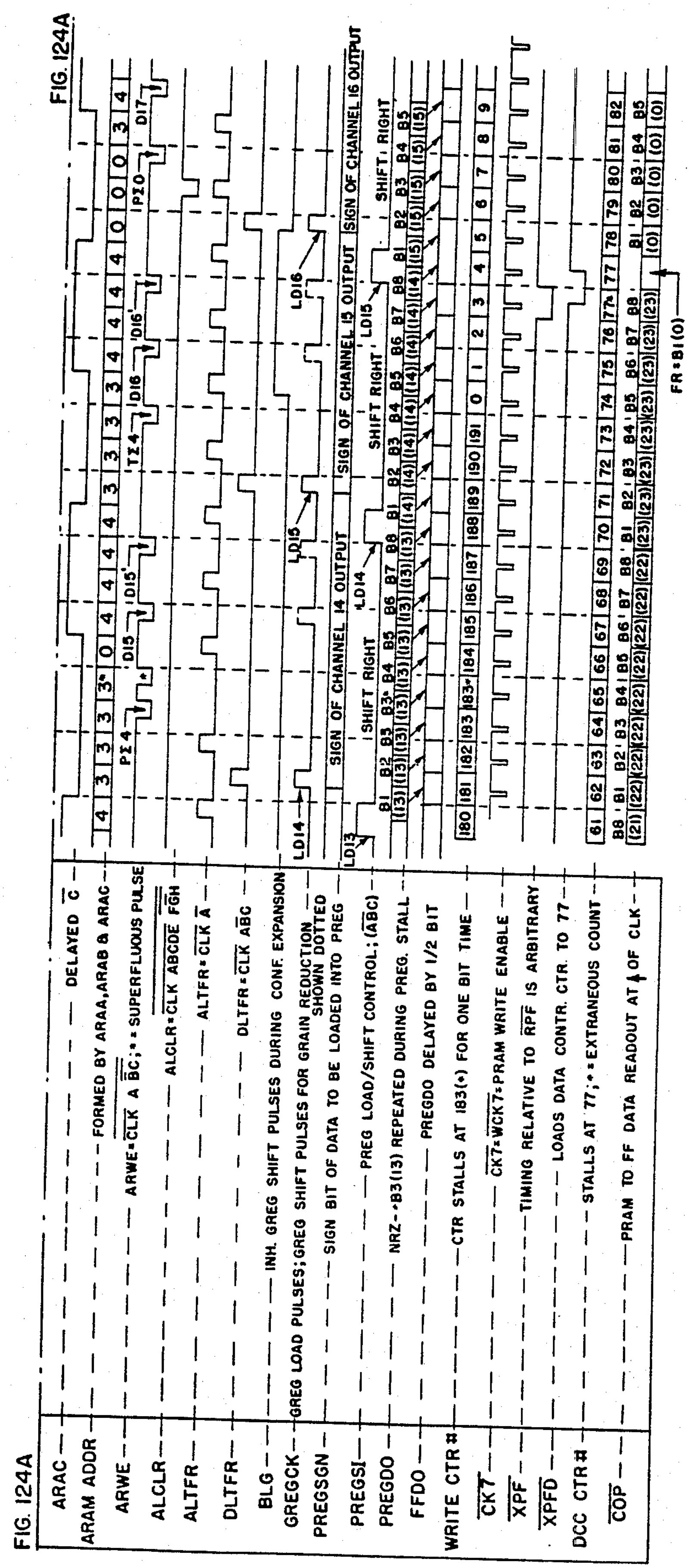

The timing of the various operations within the digital conference circuit in addition to the relative timing of the various system timing pulses produced by the master counter 1409 are illustrated in FIG. 124. All timing signals are derived by selectively gating signals from an eight bit synchronous binary counter which is driven by the basic system clock RCLK and the receive preframe pulse $\overline{RPF}$. From the basic system clock signals RCLK are derived the digital conference timing clock signals $\overline{CLK}$ and CLK for distribution and control over the various circuits within the digital conference.

The details of the digital conference will now be explained in connection with FIGS. 123 through 135. Referring first to FIG. 125, serial data on the 1.544 MB/S data bus is received in serial form on input CDATAI at the input data register 1408 and is clocked into the register in time with the input register clock signal IREGCK. When the register 1408, which is a serial-in/parallel-out register, has received all eight bits of the incoming word, the contents are shifted into the input data latch 1410 which comprises a plurality of flip-flops 1411 through 1418. The shifting of data from the register 1408 to the latch 1410 occurs upon receipt of the timing signal $\overline{C1}$.

The first seven bits of the word representing the magnitude of the data are applied to the expander 1420; while, the eight bit, which forms the sign bit designating whether the data is positive or negative and which is stored in the flip-flop 1418, provides both the sign bit and inverted sign bit on lines ISB and $\overline{ISB}$ to the sign bit processor illustrated in FIG. 126. The sign bit processor stores in a multiplexer 1481 three basic pieces of sign information for generation of appropriate ALU instructions. First of all, it stores the sign of each input data word provided by the signal ISB and the inverted sign provided by signal $\overline{ISB}$. Secondly, it stores the conditioned sign bit of each input data word in the form of a signal CSB. In this regard, since the sign bit of every other reference channel has been inverted, the CSB signal includes both sign bits and inverted sign bits to enhance conference stability, as already described. The third bit of stored information is the sign of the conference data to be transmitted back to each speaker in the form of a signal AL15. The ISB, $\overline{ISB}$, CSB, and AL15 bits are multiplexed onto a multiplexed sign bit line MXSB via a latch 1482 to determine the appropriate instruction to be given to the ALU 1440 and to provide the required sign bit during the various clock cycles of each processor cycle.

The multiplexer 1481 is driven by the clock signals B, C, and D to apply its contents sequentially to the MXSB latch 182. As already indicated, each processor cycle comprises eight clock cycles; however, the multiplexer 1481 is stepped once for each two clock cycles, so that for one channel being processed, the inputs D0–D3 thereof may be scanned, while for the next channel, the inputs D4–D7 will be scanned. From this, the manner in which the sign bit for every other channel is inverted can be readily seen, the normal sign bit being selected from input D3 of multiplexer 1481 during one processor cycle and the inverted sign bit being selected from input D7 during the next processor cycle.

There are only five ALU operations required by the digital conference:

1. A+B
2. A (transfer contents of A to the output)
3. A−B
4. $\overline{A}$
5. A+1

For this purpose only five control signals are required to control the operation of the ALU 1440, which signals are ALUS12, ALUS03, ALUM and ALUCN. FIG. 127 is a logic truth table which indicates how the various control signals for the ALU are formed from the various timing control input signals C1, B1, and the signal on MXSB for the various cross cycles of operation. The logic indicated in the truth table of FIG. 127 is performed by the gates 1483–1487 in FIG. 126 and the timing involved with such operations are clearly indicated in the timing diagram of FIG. 124.

Returning to FIG. 125, the twelve bit expanded word derived from the expander 1420 is applied to the input RAM 1430 consisting of respective chips 1431–1434, which store the twelve bits along with the sign bit provided on the multiplex line MXSB from FIG. 126. Each word is written into memory 1430 by the input RAM write enable pulse IRWE, and the write and read address lines are controlled by the timing signals D, E, and F which provided a 0–7 address sequence which repeats three times per frame. Thus, the input RAM 1430 is capable of storing eight words of data at a time and these words are allocated in the memory on the basis of the applied timing signals in the manner indicated in the table illustrated in FIG. 128. Thus, it will be seen from the description of the operation of this system to be provided hereinafter that when the total signal value for the eight conference groups including words 16–23 has been determined, for example, word 16 from the input RAM 1430 will be read out to the ALU 1440 to be subtracted from this total at the beginning of the same cycle that word 0 is shifted into the latch 1410. Thus, as the storage area in RAM 1430 for word 16 is no longer needed, the first word of the next conference group is ready to be shifted into the vacated storage location. During the next operating cycle, channel seventeen is transferred out of RAM 1430 and channel two is transferred into that vacated memory location. Processing continues sequentially in that manner.

As seen in FIG. 129, the ALU 1440 has A inputs AL0–AL15 derived from the sixteen flip-flops 1461–1476 of the latch 1460. The B inputs ID0–ID15 are derived from the input RAM 1430 (FIG. 125). The instructions which the ALU must perform at each step in the machine cycle is determined by the sign bit processor 1480, which provides the control signals ALUCN, ALUS12, ALUS03, and ALUM. All input data to the ALU 1440 is in sign-magnitude form as received from the decompanding logic circuit 1420. Since the ALU 1440 operates in a two's complement and arithmetic mode, the signs of the input sign magnitude data determines whether the ALU must perform an ADD or SUBTRACT function. After the ALU performs the various operations for determining the basic information to be sent back to each conference participant, this information is available in two's complement from and must be converted back into sign magnitude form before being applied to the compander circuit 1500. Hence, the sign bit of each result provided by the signal AL15 is tested to determine one of two courses of action. If the sign bit is positive, the data is outputted to the gain control register 1490 without modification. On the other hand, if the sign bit is negative, a one's complement plus 1 operation is performed to convert to a positive number.

With the limited set of instructions to be performed by the ALU 1440, the S0 and S3 control inputs are always identical as are the S1 and S2 inputs to the ALU 1440. Hence, the control signal ALUS03 is common to both S0 and S3 and the signal ALUS12 is common to S1 and S2. Various arithmetic, data transfer and clear operations take place within the ALU on each clock cycle, a group of eight clock cycles constituting a complete processor cycle. As already indicated, one processor cycle consists of processing the last input word and also outputting a data word to the gain control register 1490.

The ALU output RAM 1450 is capable of storing five words of fifteen bits and is addressed by the timing signals on control leads ARAA, ARAB, and ARAC which are applied to the A, B, and C address inputs of the RAM. The storage assignments are formulated so that memory location 4 is used as a work area during clock cycles 1, 2, 3, and 4 for storing data which is in the process of being converted into two's complement to sign magnitude form, prior to being loaded into the gain control register 1490. Memory locations 0, 1, 2, and 3 are time shared over the course of the twenty-four channel frame to store partial running sums of a given conference group and to also hold the total sum of the previously processed conference groups.

The ALU latch 1460 simply provides a temporary storage register to hold the information accessed from the RAM 1450 so that it can be inputted to the A input of the ALU 1440 for subsequent processing. Data is transferred to the latch 1460 by the transfer pulse ALTFR which operates in synchronism with the address presented to the RAM 1450, as shown in the timing diagram of FIG. 124. In order to minimize the amount of hardware required in the system, the control signal on line ALCLR which is to perform a CLEAR function, actually drives all the $\overline{Q}$ outputs to the ALU to their high states and thus present a data value of minus 1 instead of 0 to the ALU input whenever the latch 1460 is cleared. Thus, the data being summed up for each conference group is always low by one count. The only effect of this is to cause the conference data being returned to each channel to have a DC offset of one unit. The effect will, of course, have no affect on overall system performance.

The structure and operations which take place at each of the clock cycles contained in a basic data processing cycle are illustrated in the flow chart shown in FIG. 130. This chart gives the sequence of steps for the particular processor cycle where channel 0 data is being shifted to the latch 1410 from register 1408 and processed data is being outputted to channel 16.

During clock cycle 0, the seven magnitude bits of word 16 and the conditioned sign bit are read from the input RAM 1430 and applied on leads ID0–ID15 from location 0 in the input RAM 1430 to input B of the ALU 1440. As seen from FIG. 128, the input RAM 1430 at this time stores words 16–23 in memory locations 0–7 thereof. Next, the total sum of the eight words of conference group member 4 are read from location 3 in the ALU RAM 1450 into the latch 1460 in response to the transfer signal ALTFR and this total sum value is transferred to the A input of the ALU 1440 on leads AL-0–AL15.

In clock cycle 1, the condition sign bit CSB is tested to determine whether it is positive or negative. The sign bit CSB has been stored in the register 1481 (FIG. 126) which scans its contents in time with the signals B, C, and D connected to the logic circuitry which determines on the basis of the logic truth depicted in FIG. 127 which instructions are to be performed by the ALU 1440. If the sign bit CSB for word 16 is positive, the ALU 1440 will execute an A−B operation. If the sign bit CSB-16 is found to be negative, the ALU 1440 will execute an A+B operation. The result, which is a two's complement of the conference data for channel 16, is then stored in location 4 of the ALU RAM 1450.

During clock cycle 2, location 4 of the ALU RAM 1450 is read and the contents transferred through the latch 160 to input A of the ALU 1440. The sign bit AL15 is derived from flip-flop 1476 from the latch 1460 is also stored in the sign bit processor 1480 (FIG. 126) at this time.

During clock cycle 3, the sign bit AL15 is tested in the sign bit processor 1480 to determine whether it is positive or negative. If the sign bit AL15 is positive, the data at input A of the ALU 1440 is transferred to the output thereof without modification and is stored in location 4 of the ALU RAM 1450. If the sign bit AL15 is negative, a one's complement of the word at input A of the ALU 1440 is performed and the result is then stored in location 4 of the ALU RAM 1450.

During clock cycle 4, location 4 of the ALU RAM 1450 is read and transferred to the A input of the ALU 1440 through the latch 1460. During clock cycle 5, the data at input A of the ALU is transferred directly out to the gain control register 1490 without modification if the sign bit AL16 was positive; however, if the sign bit was negative, the ALU 1440 performs an A+1 operation of the data prior to transfer to the gain control register 1490.

At this point, word 16 has been transferred out of location zero in the RAM 1430 to make room for the incoming data from the next conference group. Thus, during clock cycle 6, the input sign bit ISB of incoming word zero is forwarded to the sign bit processor 1480 and the seven magnitude bits of word zero are stored in location 4 of the input RAM 1430 along with the sign bit on lead MXSB. During the same cycle, the partial sum of word 0 from location 4 of the ALU RAM 1450 is transferred through the latch 1460 to the A input of the ALU 1440. In this case, since we are working with the first word of the conference group, there is no partial sum in the RAM 1450, but for subsequent words, a partial sum will be forwarded to the A input of the ALU 1440 and then arithmetically processed with the next word.

During clock cycle 7, word 0 is read from the input RAM 1430 to become input B to the ALU 1440. Also, the sign bit ISB is tested to determine whether it is positive or negative. If the sign bit is positive, the sign bit processor 1480 will control the ALU to execute an A+B operation. On the other hand, if the sign bit ISB is negative, the ALU 1440 will be controlled to execute an A−B operation. The result of this arithmetic operation is then stored in location 0 of the ALU RAM 1450 and becomes the partial sum of the conference group 0.

The same functions are repeated for the following processor cycle in which channel 17 is outputted and channel 1 is inputted. The cycle contains in this manner outputting one channel and inputting the next channel.

Each channel outputted from the ALU 1440 is applied to the gain control register 1490 where it may be operated or under control of the gain control processor 1520. Since the digital conference is capable of combining conference groups to form an expanded conference facility, the gain of each channel must be controlled in accordance with the size of the conference facility. If a simple 4-party conference utilizing one of the available conference groups is selected, the channels of data supplied to the register 1490 may be merely stored without modifying the gain thereof; however, for expanded conference facilities including the 8-party conference group, the gain must be appropriately adjusted in the register 1490 under control of the gain control processor 1520.

Referring to FIG. 131, after the computations have been completed in the arithmetic logic unit 1440, the fifteen magnitude bits are parallel loaded from the ALU into the gain control register 1490, which comprises individual registers 1491–1494. The loading of data into the gain control register 1490 is effected in response to the gain control register clock signal GREGCK and the function performed by the gain control register is determined by the control signal GREGSI, which is applied to the SI inputs of each of the registers 1491–1494. The GREGSI control signals determine whether the GREGCK clock signals load data or shift data in the registers 1491–1494. This is clearly indicated in the timing diagram in FIG. 124.

Assuming that there are no conferences which are expanded (linked to other conferences to increase their size) none of the data being transmitted to the conferees in the four 4-party conferences will be attenuated. Therefore, the binary data corresponding to words 0 through 15 will not be shifted after they are individually loaded into the gain control register 1490. Hence, for those words under the conditions of no conference expansion, the gain control register 1490 acts simply as a temporary storage register. For words 16 through 23, which are associated with the 8-party conference, the gain control register 1490 will first be loaded upon receipt of a gain control clock signal GREGCK at the time the signal GREGSI is high. Then, the data in the registers 1491–1494 will be shifted one bit to the right by having a GREGCK clock signal present when the GREGSI control is low. The shifting of the words in the gain control register 1490 one bit to the right provides for adjustment of the gain of the signal.

The resultant data words represent the linear fifteen bit binary weighted words to be transmitted back to the individual conferees, after they are compressed. Compression is performed in the compander 1500 connected to the output of the registers 1491–1494.

As already indicated, the loading of the registers 1491–1494 and any shifting of the data in the registers is controlled on the basis of the values of the gain control clock signals GREGCK and the shift signals GREGSI. The shift signal GREGSI is derived from the timing signal C1 generated by the system clock, and merely provides for loading of data into the gain control register 1490 during the first four bit times and the possible shifting of data in the register during the last four bit times of a processor cycle. The gain clock signals GREGCK are generated in dependence upon various conditions, as determined by the gain control processor 1520, as illustrated in detail in FIG. 132.

As seen in FIG. 124, when GREGSI is high, the presence of GREGCK simply loads new data into the gain control register 1490. During the second half of each word cycle, the GREGSI control lead is low, and a GREGCK clock signal appears only if the contents of the gain control register belong to the 8-party conference, or to a 4-party conference which is interconnected to some other conference. Conference expansion is controlled by the central processing unit 130 which indicates to the gain control processor 1520 on leads C0EX–C4EX, which are connected to the input of a multiplexer 1521. A control circuit 1525 is responsive to the clock timing signals F, G, and H for scanning the inputs C0EX–C4EX of the multiplexer 1521 providing an output through gate 1522 to a multiplexer 1523 indicating whether the conference groups associated with the respective inputs are to be interconnected to some other conference group in an expanded conference facility. The control circuit 1524 also provides an output via gate 1525 to the multiplexer 1523 indicating whether the conference group being scanned forms part of a 4-party group or relates to the eight party conference group. A third input to the multiplexer 1523 is provided from gain control line GCTRL, which is left open will control the gain of the gain control register 1490 to provide a high gain, or may be wired to ground in order to provide a low gain for the gain control register 1490. In the high gain mode, all 4-party conference circuits contain zero db loss; whereas, the 8-party conference contains 6 db of loss. These values become 6 db and 12 db, respectively, for the selection of the low gain mode.

The scanning of the three inputs A, B, and C of the multiplexer 1523 are controlled by the timing signals from the system clock applied via gates 1526 and 1527. Thus, at each step of the word bit times a gain control pulse may be provided on the lead GCPUL to the gate 1529 depending upon the values provided at the inputs A, B, and C of the multiplexer 1523. The shift signal PREGSI is generated at the output of gate 1528 from the timing signals $\overline{A}$, $\overline{B}$, and C.

One additional factor must be considered in evaluating the presence or absence of a condition requiring a shift pulse on the GREGCK lead is that whenever two conferences are interconnected, the channel or word slot which serves as the connecting link is always the highest channel number of a particular conference group. This means that only channel numbers 3, 7, 11, 15, and 23 are valid interconnecting links. Whenever two conferences are connected via these links, the logic ensure that no shift pulses (gain reduction) takes place in these time slots. Hence, for example, if conference groups 0 and 1 are linked together (using word time slots 3 and 7 as interconnecting links), words 0, 1, 2, 4, 5, and 6 which are being sent back to their corresponding conferees would undergo a 6 db attenuation caused by the gain control shift pulses on lead GREGCK, but words 3 and 7 would merely serve to send composite data from one conference group to the other would not get attenuated. This is effected by application of an inhibit signal on lead BLG to the input of gate 1522, which inhibits the gate and prevents the generation of an output from the multiplexer 1523 through gate 1529 on the lead GREGCK.

FIG. 133 provides a table indicating the various signals provided on the lead GCTRL, the expansion control leads C0EX–C4EX and lead BLG, and the resultant number of gain control pulses provided from the output of multiplexer 1523 for 4-party and 8-party groups, respectively. The operation of the gain control processor 1520 can be easily determined from the values provided in FIG. 133 and the waveforms indicated in FIG. 124. It will be noted that a load pulse is generated on lead DLTFR in FIG. 132 to the input of gate 1529 from the master clock 1409 to provide for loading of each word from the ALU 1440 into the gain control register 1490. Whether or not an additional clock pulse will be generated on GREGCK then is determined on the basis of the output from the multiplexer 1523 on lead GCPUL to the gate 1529. Thus, if a channel forms part of an expanded group, the multiplexer 1523 will provide an output to produce a gain shift. The output of gate 1525 for the 8-party group also automatically produces a gain shift from the output of the multiplexer 1523, and depending upon the state of the gain control line GCTRL, the multiplexer 1523 may also provide an output pulse to determine the gain control mode.

Referring once again to FIG. 131, after the loading and possible shifting operations in the gain control register 1490 are completed for each word, the twelve most significant bits stored in the registers 1491–1494 are applied to the compressor 1500 which operates on twelve parallel lines to produce a compressed seven bit word. The compressed word, along with the proper sign bit are parallel loaded into the parallel load shift register 1510 by the clock pulse $\overline{\text{CLK}}$ which occurs when the PREGSI control line is high. This occurs once every eight positive transitions of the clock pulse CLK. The other seven positive transitions of the clock signals which occur when the PREGSI control line is low cause the resulting data in the register 1510 to be shifted out to the RAM 1520. Once each frame, at the time of the $\overline{\text{RPF}}$ preframe signal, the register 1510 is inhibited from shifting by applying this preframe signal to the S0 control line of the registers 1511 and 1512, which make up the shift register 1510. This is necessary to properly synchronize the register 1510 to the master counter which is stalled once per frame time at the time of arrival of the received preframe signal. The register 1510 is a parallel-in/serial-out register which shifts the data on output lead PREGDO to the RAM 1520.

The serial data on the PREGDO output of the shift register 1510 contains twenty-four channels of eight bit companded words, clocked out at a 1.544 MB/S rate, which must eventually be routed back to the receivers of each conferee via the digital switching network. The purpose of the RAM 1520, data control counter 1540 and multiplexer 1530 as seen in FIG. 123, is to synchronize this data with the transmit preframe pulse $\overline{\text{XPF}}$ which defines the frame time of all data which is to be injected into the digital switching network. The actual transmit preframe time $\overline{\text{XPF}}$ is fixed relative to the received preframe time $\overline{\text{RPF}}$; however, as already indicated, this is not a requirement of the present invention and the two preframe time signals could be received at various different times to properly control operation of the digital conference.

Referring to FIG. 134, the outputting of data from the digital conference is accomplished by writing the data on lead PREGDO into the RAM 1520 via the PREG output flip-flop 1544 in time with the system clock signal CLK. Each serial bit is for convenience written into the RAM location determined by the state of the master counter 1409, which applies timing signals on leads A–H through multiplexer 1530 comprising stages 1531–1538, to the RAM 1520 during the first half of each bit time by means of the narrow 80 ns write pulse CK3 which is supplied by the master clock. During the second half of the bit time, the RAM 1520 is addressed by the data control counter 1540, comprising counter stages 1541 and 1542. This allows data in the RAM 1520 to be read out to the output flip-flop 1521 to generate the serial data stream on lead CDATA0 to the digital switching network.

The addresses provided by the data control counter 1540 for this read operation are synchronized to the transmit preframe pulse $\overline{\text{XPF}}$. Whenever the transmit preframe pulse $\overline{\text{XPF}}$ is inputted to the digital conference, it causes the data control counter 1540 to be loaded to the count designating the first address in the RAM 1520. This thus ensures that the first bit of data which is accessed is bit 1 of channel 0, providing the desired synchronization of the data sent to the digital switching network.

As already indicated, in producing an expanded conference facility by combining conference groups, one channel of each conference group is used as a link between the conference groups, and therefore is lost as a possible conferee channel. Thus, if two 4-party conference groups are combined to form an expanded conference facility, six conferees may be accommodated with one channel in each 4-party conference being allocated to the link between the groups. The reason why this is necessary and the manner in which such expansion operates may be seen more particularly in connection with FIG. 135.

Assume that the two 4-party groups comprising channels 0–3 and 4–7 are to be combined in an expanded conference facility to provide a conference between parties A through F. The central processing unit 130 in setting up such a conference will assign the parties A, B, and C to channels 0, 1, and 2, respectively; while, leaving channel 3 blank. Channels 4, 5, and 6 will then be assigned to parties D, E, and F, respectively, and channel 7 will be left blank.

Under these circumstances, the digital conference will produce as an output from the channel 3 the sum of the contributions of channels 0–3 less the contribution of channel 3 itself. Thus, the output from channel 3 will represent a sample of the data from parties A+B+C. The central processing unit 130 will then supply the output from channel 3 directly to channel 7 through the digital switching network 135. Thus, channel 4 will provide an output corresponding to the sum of channels 4–6 less the contribution of channel 4; namely, E+F from channels 5 and 6 and A+B+C from channel 7. Party D thus receives the contribution from the other five conferees.

On the other hand, the output from channel 7 will correspond to the sum of channels 4–7 less the contribution of channel 7; namely, D+E+F. The central processing unit 130 directly connects the output from channel 7 through the digital switching network to the input channel 3. Thus, channel 0 will provide an output corresponding to the sum of channels 0–3 less its own contribution; namely, B+C from channels 1 and 2 and D+E+F from channel 3. In this way, with the interlinking of the two 4-party conference groups using channels 3 and 7, each of the six parties in the conference will receive the contribution from the other five parties, and in effect, the two 4-party conference groups have been cross-connected to form a six party conference.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An automatic private branch exchange comprising a plurality of ports including line circuits and trunk circuits, said ports being divided into a plurality of distinct groups;

first stored program control means including a single individual microprocessor unit dedicated to each port for performing all real-time control in connection with the ports of the respective groups;

a common transmission network for all of said port groups including a plurality of inputs and a plurality of outputs and switching means for selectively interconnecting an input to an output;

each port group including information transmission means for connecting the ports to the inputs and outputs of said transmission network; and second stored program control means including a central processing unit responsive to supervisory information from said first stored program control means for controlling said switching means to interconnect designated ports for establishing a communication path therebetween;

said first stored program control means further including, in each port group, strobe signal generating means responsive to the associated microprocessor unit for generating strobe signals for respective pairs of ports in the port group and port interface means connected to said microprocessor unit for applying said strobe signals to said pairs of ports sequentially in a repetitive cycle to sample the status of said ports.

2. An automatic private branch exchange according to claim 1 wherein said ports of each port group are subdivided into subgroups of common type ports, each subgroup of ports being connected in common to a first sense line for indicating the status of the port upon receipt of a strobe signal and being connected selectively in a predetermined combination to a second sense line for indicating the port type of the subgroup, said sense lines extending to said port interface means.

3. An automatic private branch exchange according to claim 2 wherein each strobe signal is applied on a separate line from said port interface means in common to a pair of ports in different port subgroups.

4. An automatic private branch exchange according to claim 1 wherein said port interface means includes means responsive to said microprocessor unit for applying command signals to said ports to effect control thereover.

5. An automatic private branch exchange according to claim 1, further including timer means connected to said strobe signal generating means for generating a signal to reset said microprocessor unit whenever a preselected strobe signal fails to be generated.

6. An automatic private branch exchange according to claim 1 wherein said first stored program control means further includes, in each port group, status means for transmitting status information regarding said microprocessor unit to said second stored program control means and control means responsive to control pulses from said central processing unit for timing the transmission of status information by said status means or resetting said microprocessor unit.

7. An automatic private branch exchange according to claim 6 wherein said control means includes means responsive to a pulse train to effect said timing or resetting functions in dependence on the pulse duration thereof.

8. An automatic private branch exchange according to claim 7 wherein said control means includes first means responsive to a pulse from said central processing unit for applying a load signal to said status means to enable transmission of status information to said second stored program control means, second means responsive to said pulse for inhibiting said first means, and third means responsive to the duration of said pulse for disabling said second means upon detection of a first duration and for generating a reset pulse upon detection of a second duration longer than said first duration.

9. An automatic private branch exchange according to claim 1 wherein said information transmission means comprises means for multiplexing communication signals from said ports onto a signal communication channel for application to said ports.

10. An automatic private branch exchange according to claim 9 wherein said transmission network comprises an asynchronous time slot interchange system.

11. An automatic private branch exchange according to claim 10 wherein each port further includes means for converting communication signals from said ports to digital form prior to application to said multiplexing means.

12. An automatic private branch exchange comprising a plurality of ports including line circuits and trunk circuits, said ports being divided into a plurality of distinct groups;

a group of service circuits separate from said port groups and including dial tone senders and detectors;

stored program control means including an individual microprocessor unit dedicated to each port group and said service circuit group for performing supervisory control in connection with the ports and service circuits of said groups; and common control means connected to said ports and service circuits including a transmission switching network and a central processing unit of the stored program type responsive to supervisory information from said stored program control means for controlling said transmission switching network to connect a given port to a service circuit or another designated port, further including an operator console comprising a plurality of actuatable keys, signal generating means responsive to actuation of one or more of said keys for generating respective key transition signals, multiplexing means for multiplexing said key transition signals, and a data link for transmitting said multiplexed key transition signals to said common control means.

13. An automatic private branch exchange according to claim 12, wherein said common control means further includes memory means for storing the functional identification of said actuatable keys for use by said central processing unit in controlling said transmission switching network.

14. An automatic private branch exchange according to claim 13, wherein said operator console further comprises visual indicator means for indicating the operating condition of selected ones of said keys, and decoding means responsive to selected control signals received on said data link from said common control means for selectively energizing said visual indicator means.

15. An automatic private branch exchange according to claim 12 wherein said common control means further includes a memory dedicated to said central processing unit and storing the functional identification of the keys of said operator console, a first bus connecting said memory to said central processing unit, controller means for controlling said transmission switching network in response to said central processing unit, attendant interface means for connecting said data link from said operator console to said central processing unit, a second bus connected to said controller means and said attendant interface means, and interrupt control means for connecting said first bus to said second bus.

16. An automatic private branch exchange according to claim 12 wherein said stored program control means further includes, in each port group, status means for transmission of status information regarding said microprocessor unit to said common control means, and control means responsive to control pulses from said central processing unit for timing the transmission of status information by said status means or resetting said microprocessor unit.

17. An automatic private branch exchange according to claim 16 wherein said control means is responsive to a pulse train to effect said timing or resetting functions in dependence on the pulse duration thereof.

18. An automatic private branch exchange according to claim 15 further including processor interface means for connecting said stored program control means to said second bus.

19. An automatic private branch exchange according to claim 18 wherein said interrupt control means comprises decoder mens for decoding address signals received from said central processing unit which identify one of the means connected to said second bus and enable means responsive to said decoder means for applying an enable signal on said second bus to enable said identified one of said means to communicate with said central processing unit via said second bus, said interrupt control means and said first bus.

20. An automatic private branch exchange according to claim 19 wherein each of said means connected to said second bus include request means for generating an interrupt signal when said means requires connection to said central processing unit and means for applying said interrupt signal on said second bus to said interrupt control means.

21. An automatic private branch exchange according to claim 20 wherein said interrupt control means further comprises storage means for storing interrupt signals received on said second bus, priority determining means for selecting stored interrupt signals on the basis of a predetermined priority and vector generating means for applying a vector signal on said first bus designating an interrupt signal selected by said priority determining means.

22. An automatic private branch exchange according to claim 21 wherein said interrupt control means further comprises masking means responsive to signals from said central processing unit on said first bus for inhibiting storage of selected interrupt signals by said storage means.

23. An information handling system comprising a plurality of information ports between which information is to be transferred;

stored program control means for performing supervisory control in connection with said ports;

transmission interconnection means for selectively interconnecting ports on the basis of supervisory information from said stored program control means; and common control means for controlling said transmission interconnection means including a central processing unit of the stored program type, a memory dedicated to said central processing unit, input/output means for directly communicating with said central processing unit, a first bus connecting said memory and said input/output means to said central processing unit, interface circuit means for connecting said stored program control means to said central processing unit, controller means for controlling said transmission interconnection means in response to said central processing unit, a second bus connected to said interface circuit means and said controller means, and interrupt control means for connecting said first bus to said second bus for interfacing said central processing unit with the means connected to said second bus so that said interface circuit means and said controller means may effectively operate with different types of central processing units.

24. An information switching system according to claim 23 further including processor interface means for connecting said stored program control means to said second bus.

25. An information handling system according to claim 24 wherein said interrupt control means comprises decoder means for decoding address signals received from said central processing unit which identify one of the means connected to said second bus and enable means responsive to said decoder means for applying an enable signal on said second bus to enable said identified one of said means to communicate with said central processing unit via said second bus, said interrupt control means and said first bus.

26. An information handling system according to claim 25 wherein each of said means connected to said second bus includes request means for generating an interrupt signal when said means requires connection to said central processing unit and means for applying said interrupt signal on said second bus to said interrupt control means.

27. An information handling system according to claim 26 wherein said interrupt control means further comprises storage means for storing interrupt signals received on said second bus, priority determining means for selecting stored interrupt signals on the basis of a predetermined priority and vector generating means for applying a vector signal on said first bus designating an interrupt signal selected by said priority determining means.

28. An information handling system according to claim 27 wherein said interrupt control means further comprises masking means responsive to signals from said central processing unit on said first bus for inhibiting storage of selected interrupt signals by said storage means.

29. An information handling system according to claim 25 further including an operator complex comprising a console having a plurality of actuatable keys each having first and second operative states, means for generating key state signals indicating the operative state of each of said keys, means for sequentially multiplexing said key state signals, and message formulating means for formulating messages to be sent to said common control including key state and key identification information.

30. An information handling system according to claim 29 further including attendant interface means connected to said second bus for applying to said second bus said messages from said message formulating means.

31. An information handling system according to claim 30 wherein the functional identification of said actuatable keys is stored in said memory dedicated to said central processing unit.

32. A digital information handling system comprising:

a plurality of ports including line circuits and trunk circuits, said ports being divided into a plurality of distinct groups;

data conversion means in each port group for converting data transmitted from and to the ports thereof from analog-to-digital and digital-to-analog form, respectively;

multiplexing-demultiplexing means in each port group for multiplexing the data derived from said ports through said data conversion means onto a single information channel and for demultiplexing data received from said information channel to be applied to said data conversion means; and common control means including a digital transmission network connected to the information channels of each port group for interconnecting ports through said digital transmission network by asynchronous time slot interchange, a central processing unit responsive to supervisory information received from said ports and a memory dedicated to said central processing unit for storing a program to effect said time slot interchange of data through said digital transmission network, said digital transmission network including data conditioner means for multiplexing the multiplexed data received on the information channels from each port group and for demultiplexing the data to be applied to the respective information channels, and matrix switch means connected to said data conditioner means and responsive to said central processing unit for effecting time slot interchange of the data obtained from said data conditioner means, said matrix switch means including a plurality of matrix switches each including a send memory, a receive memory and control means for shifting data into said send memory and out of said receive memory during one portion of a clock cycle and for shifting data from a send memory to a receive memory during another portion of said clock cycle, wherein said digital transmission network further includes an expander/concentrator network interconnecting the send and receive memories of each of said matrix switches.

33. A digital information handling system comprising:

a plurality of ports including line circuits and trunk circuits, said ports being divided into a plurality of distinct groups;

data conversion means in each port group for converting data transmitted from and to the ports thereof from analog-to-digital and digital-to-analog form, respectively;

multiplexing-demultiplexing means in each port group for multiplexing the data derived from said ports through said data conversion means onto a single information channel and for demultiplexing data received from said information channel to be applied to said data conversion means; and common control means including a digital transmission network connected to the information channels of each port group for interconnecting ports through said digital transmission network by asynchronous time slot interchange, a central processing unit responsive to supervisory information received from said ports and a memory dedicated to said central processing unit for storing a program to effect said time slot interchange of data through said digital transmission network, said digital transmission network including data conditioner means for multiplexing the multiplexed data received on the information channels from each port group and for demultiplexing the data to be applied to the respective information channels, and matrix switch means connected to said data conditioner means and responsive to said central processing unit for effecting time slot interchange of the data obained from said data conditioner means, wherein said data conditioner means includes first means connected to receive the information from said port groups for converting the serial data of each channel to parallel form and second means connected to the output of said first means for converting the parallel data from said first means to serial form on plural output leads to said matrix switch means.

34. A digital information handling system according to claim 32, wherein said common control means further includes a memory dedicated to said central processing unit for storing a program to effect time slot interchange of data through said digital transmission network, a first bus connecting said memory to said central processing unit, controller means for controlling said matrix switch means in response to control signals from said central processing unit, a second bus connected to said controller means, and interrupt control means for connecting said first bus to said second bus.

35. A digital information handling system according to claim 34, further including stored program control means including an individual microprocessor unit dedicated to each port group for performing all supervisory control in connection with the ports of the respective groups.

36. A digital information handling system according to claim 35, further including processor interface means for connecting said stored program control means to said second bus.

37. A digital information handling system according to claim 36 wherein said interrupt control means comprises decoder means for decoding address signals received from said central processing unit which identify one of the means connected to said second bus and enable means responsive to said decoder means for applying an enable signal on said second bus to enable said identified one of said means to communicate with said central processing unit via said second bus, said interrupt control means and said first bus.

38. A digital information handling system according to claim 37 wherein each of said means connected to said second bus includes request means for generating an interrupt signal when said means requires connection to said central processing unit and means for applying said interrupt signal on said second bus to said interrupt control means.

39. A digital information handling system according to claim 38 wherein said interrupt control means further comprises storage means for storing interrupt signals received on said second bus, priority determining means for selecting stored interrupt signals on the basis of a predetermined priority and vector generating means for applying a vector signal on said first bus designating an interrupt signal selected by said priority determining means.

40. A digital information handling system according to claim 39 wherein said interrupt control means further comprises masking means responsive to signals from said central processing unit on said first bus for inhibiting storage of selected interrupt signals by said storage means.

41. A digital information handling system according to claim 40, further including an operator complex comprising a console having a plurality of actuatable keys each having first and second operative states, means for generating key state signals indicating the operative state of each of said keys, means for sequentially multiplexing said key state signals, and message formulating means for formulating messages to be sent to said common control means including key state and key identification information.

42. A digital information handling system according to claim 41, further including attendant interface means connected to said second bus for applying to said second bus said messages from said message formulating means.

43. A digital information handling system according to claim 42 wherein the functional identification of said actuatable keys is stored in said memory dedicated to said central processing unit.

44. A digital communication switching system comprising a plurality of ports including line circuits and trunk circuits, said ports being divided into a plurality of distinct groups;

stored program control means including an individual microprocessor unit dedicated to each port group for performing supervisory control in connection with the ports of the respective groups;

data conversion means for pulse code modulating and demodulating data received from and applied to said ports in each port group;

common control means including a digital transmission network connected to the data conversion means in each port group and a central processing unit responsive to supervisory information received from said ports for controlling said digital transmission network to interconnect selected ports by asychronous time slot interchange; and a conference circuit connected to said digital transmission network by way of a preselected number of data highways for establishing one or more conference connections each including three or more ports, including means for summing the digital contents of selected data channels to produce group conference signals.

45. A digital communication switching system according to claim 44 wherein said conference circuit comprises means for receiving sequential data channels of information from said digital transmission network on said data highways, a random access memory connected to said receiving means for storing the contents of a predetermined number of said data channels, master counter means for producing a plurality of clock signals, arithmetic means responsive to said clock signals for summing the contents of said data channels stored in said memory in preselected conference groups to produce group total signals and for successively subtracting from said group total signals the contents of said data channels of the group to produce a plurality of group conference channels, and means for transmitting said group conference channels sequentially to said digital transmission network on said data highways.

46. A digital communication switching system according to claim 45, wherein said common control means includes means in combination with said central processing unit for interconnecting one data channel of a pair of conference groups by time slot interchange in said digital transmission network to create an expanded conference group.

* * * * *